US012430367B2

(12) United States Patent
Blonsky et al.

(10) Patent No.: US 12,430,367 B2
(45) Date of Patent: Sep. 30, 2025

(54) SERVERS, SYSTEMS, AND METHODS FOR MAPPING ATTRIBUTES TO A GEOGRAPHICAL LOCATION

(71) Applicant: VIZIENT, INC., Irving, TX (US)

(72) Inventors: Heather Walden Blonsky, Lakewood, OH (US); Elizabeth Ann Godsey, Dallas, TX (US); Jason Louis Mitchell, Bridgeton, MO (US)

(73) Assignee: VIZIENT, INC., Irving, TX (US)

( * ) Notice: Subject to any disclaimer, the term of this patent is extended or adjusted under 35 U.S.C. 154(b) by 153 days.

(21) Appl. No.: 18/136,814

(22) Filed: Apr. 19, 2023

(65) Prior Publication Data

US 2023/0359652 A1 Nov. 9, 2023

Related U.S. Application Data

(60) Provisional application No. 63/332,995, filed on Apr. 20, 2022, provisional application No. 63/332,580, filed on Apr. 19, 2022.

(51) Int. Cl.
*G06F 16/29* (2019.01)
*G06F 16/215* (2019.01)

(52) U.S. Cl.
CPC ............ *G06F 16/29* (2019.01); *G06F 16/215* (2019.01)

(58) Field of Classification Search
CPC ............................... G06F 16/29; G06F 16/215
See application file for complete search history.

(56) References Cited

U.S. PATENT DOCUMENTS

| | | | | |
|---|---|---|---|---|
| 11,782,588 | B1 * | 10/2023 | Bachmann | G06F 3/04842 702/5 |
| 2008/0318583 | A1 * | 12/2008 | Guill, Jr. | H04W 16/18 455/446 |
| 2011/0270705 | A1 * | 11/2011 | Parker | G06Q 30/0603 705/26.61 |
| 2015/0012292 | A1 | 1/2015 | Khan | |
| 2018/0342024 | A1 * | 11/2018 | Burgin | G06Q 50/16 |
| 2020/0342372 | A1 | 10/2020 | Ruddell et al. | |
| 2021/0272156 | A1 * | 9/2021 | Lin | G06Q 30/0255 |
| 2021/0280320 | A1 * | 9/2021 | Arora | G16H 15/00 |
| 2021/0383932 | A1 * | 12/2021 | Kobetz | G16H 50/70 |
| 2022/0350047 | A1 * | 11/2022 | Wiltshire | G06F 16/29 |

(Continued)

FOREIGN PATENT DOCUMENTS

CN 114048364 A 2/2022

OTHER PUBLICATIONS

International Search Report and Written Opinion for related International Application No. PCT/US2023/019156, dated Aug. 18, 2023, 11 pages.

(Continued)

*Primary Examiner* — Merilyn P Nguyen
(74) *Attorney, Agent, or Firm* — Greenberg Traurig, LLP

(57) ABSTRACT

In some embodiments, the system includes one or more computer implemented algorithms that when executed combine various sources of data onto a map. In some embodiments, the system is configured to modify existing map boundaries to include and/or exclude areas. In some embodiments, the system imputes missing data within tracts by extending and/or including data from surrounding tracts. In some embodiments, the system can link disconnected tracts for the purpose of imputing missing data.

14 Claims, 117 Drawing Sheets

(56) References Cited

U.S. PATENT DOCUMENTS

| | | | | |
|---|---|---|---|---|
| 2023/0070616 | A1* | 3/2023 | Oliver | G16H 50/80 |
| 2023/0152941 | A1* | 5/2023 | McKenzie | G06T 11/206 715/730 |
| 2024/0006883 | A1* | 1/2024 | Afsharinejad | H02J 3/0012 |

OTHER PUBLICATIONS

Rosati et al., "Building a sanitary vulnerability map from open source data in Argentina (2010-2018)", International Journal for Equity in Health, Sep. 24, 2020, 16 pages.

* cited by examiner

FIG. 2
Hardeman, Homan, Chantarat, Davis, and Brown. Improving The Measurement Of Structural Racism To Achieve Antiracist Health Policy. Health Affairs 41, NO. 2 (2022): 179–186 Improving The Measurement Of Structural Racism To Achieve Antiracist Health Policy | Health Affairs
Groos, Maya; Wallace, Maeve; Hardeman, Rachel; and Theall, Katherine P. (2018) "Measuring inequity: a systematic review of methods used to quantify structural racism," Journal of Health Disparities Research and Practice: Vol. 11 : Iss. 2 , Article 13. Available at: https://digitalscholarship.unlv.edu/jhdrp/vol11/iss2/13
-3.000
3.000

| | Area Deprivation Index | Distressed Communities Index | Social Vulnerability Index | Intercity Hardship Index | AHRQ Socioeconomic Status Index | Vizient Vulnerability Index |
|---|---|---|---|---|---|---|
| Data granularity | × County<br>× Zip Code<br>× Census Tract<br>✓ Block Group | ✓ County<br>✓ Zip Code<br>× Census Tract<br>× Block Group | ✓ County<br>× Zip Code possible<br>✓ Census Tract<br>× Block Group possible | × County possible<br>× Zip Code possible<br>× Census Tract possible<br>× Block Group possible | × County<br>× Zip Code<br>× Census Tract<br>✓ Block Group | ✓ County<br>✓ Zip Code<br>✓ Census Tract<br>✓ Block Group |
| Timeliness | Updated in 2015 and 2019 | Updated annually | Updated every two years | Not provided at the national level; algorithm available | Updated in 2015 and 2019 | Updated annually |
| Social Determinants of Health Domains | ✓ Income & Wealth<br>✓ Employment<br>✓ Education<br>✓ Housing<br>× Health Systems<br>✓ Transportation<br>✓ Social Environment<br>× Physical Environment<br>× Public Safety | ✓ Income & Wealth<br>✓ Employment<br>✓ Education<br>✓ Housing<br>× Health Systems<br>× Transportation<br>× Social Environment<br>× Physical Environment<br>× Public Safety | ✓ Income & Wealth<br>✓ Employment<br>✓ Education<br>✓ Housing<br>× Health Systems<br>✓ Transportation<br>✓ Social Environment<br>× Physical Environment<br>× Public Safety | ✓ Income & Wealth<br>✓ Employment<br>✓ Education<br>✓ Housing<br>× Health Systems<br>× Transportation<br>× Social Environment<br>× Physical Environment<br>× Public Safety | ✓ Income & Wealth<br>✓ Employment<br>✓ Education<br>✓ Housing<br>× Health Systems<br>× Transportation<br>× Social Environment<br>× Physical Environment<br>× Public Safety | ✓ Income & Wealth<br>✓ Employment<br>✓ Education<br>✓ Housing<br>✓ Health Systems<br>✓ Transportation<br>✓ Social Environment<br>✓ Physical Environment<br>✓ Public Safety |
| Health Care Focus | ✓ Life Expectancy / Mortality<br>× Chronic Disease Prevalence<br>✓ Readmissions<br>× ED utilization<br>× Maternal Health | × Life Expectancy/ Mortality<br>× Chronic Disease Prevalence<br>× Readmissions<br>× ED utilization<br>× Maternal Health | × Life Expectancy / Mortality<br>× Chronic Disease Prevalence<br>× Readmissions<br>× ED utilization<br>× Maternal Health | × Life Expectancy / Mortality<br>× Chronic Disease Prevalence<br>× Readmissions<br>× ED utilization<br>× Maternal Health | ✓ Life Expectancy / Mortality<br>× Chronic Disease Prevalence<br>✓ Readmissions<br>× ED utilization<br>× Maternal Health | ✓ Life Expectancy / Mortality<br>✓ Chronic Disease Prevalence<br>✓ Readmissions<br>✓ ED utilization<br>✓ Maternal Health |
| Measurement Focus | 17 components<br>2 components account for almost all of the variation (income and housing)<br>Intended to predict mortality, but a poor fit to life expectancy ($r^2$ 0.25) | 7 components<br>2 components account for almost all of the variation (income and housing)<br>Intended to describe economic differences; poor fit to life expectancy ($r^2$ 0.31) | 14 components in 4 domains, 2 components account for almost all of the variation (income and education)<br>Intended for disaster management planning; poor fit to life expectancy ($r^2$ 0.20) | 8 components<br>2 components account for almost all of the variation (income and education)<br>Intended to describe economic differences; poor fit to life expectancy ($r^2$ 0.14) | 7 components<br>no serious issues with partial correlations<br>Intended to describe economic factors related to health care access; poor fit to life expectancy ($r^2$ = 0.38) | 18 components in 8 domains<br>All are significant in different locations<br>Intended to describe differences in life expectancy ($r^2$ 0.63) |
| Geospatial Adjustments | Single index algorithm for the whole country | Single index algorithm for the whole country.<br>Small zip codes excluded | Single index algorithm for the whole country | Single index algorithm for the whole country | Single index algorithm for the whole country | Index adapts to local relevance of each domain as it correlates with life expectancy |

3 Vizient Presentation \| March 17, 2022 \| Confidential Information vizient

FIG. 3

| | US News & World Report | Lown Institute Inclusivity Index | Sutter Health Equity Score | County Health Rankings | NCQA | Vizient Equity Domain |
|---|---|---|---|---|---|---|
| **Data granularity** | × Encounter level<br>× Patient level<br>× Provider level<br>✓ Hospital level<br>✓ Hospital Service Area or County level | × Encounter level<br>× Patient level<br>× Provider level<br>✓ Hospital level<br>✓ Hospital Service Area or County level | × Encounter level<br>✓ Patient level<br>× Provider level<br>✓ Hospital level<br>✓ Hospital Service Area or County level | × Encounter level<br>× Patient level<br>× Provider level<br>× Hospital level<br>✓ Hospital Service Area or County level | × Encounter level<br>× Patient level<br>× Provider level<br>✓ Hospital level<br>× Hospital Service Area or County level | ✓ Encounter level<br>✓ Patient level<br>✓ Provider level<br>✓ Hospital level<br>× Hospital Service Area or County level |
| **Date measures established** | 2020 | 2020 | 2019 | 2010 | 2021 | 2005 |
| **Timeliness** | Updated in 2015 and 2018 | Updated annually | One time | Updated annually | Planned annual updates | Updated quarterly |
| **Measurement Focus** | ✓ Access to care<br>✓ Patient outcomes<br>× Provider process of care<br>× Resource utilization | ✓ Access to care<br>× Patient outcomes<br>× Provider process of care<br>× Resource utilization | ✓ Access to care<br>× Patient outcomes<br>× Provider process of care<br>× Resource utilization | ✓ Access to care<br>✓ Patient outcomes<br>× Provider process of care<br>× Resource utilization | ✓ Access to care<br>× Patient outcomes<br>× Provider process of care<br>× Resource utilization | ✓ Access to care<br>✓ Patient outcomes<br>✓ Provider process of care<br>✓ Resource utilization |
| **Comparison focus** | ✓ Interhospital evaluation/ ranking<br>✓ Intrahospital evaluation | ✓ Interhospital evaluation/ ranking<br>× Intrahospital evaluation | × Interhospital evaluation/ ranking<br>✓ Intrahospital evaluation | × Interhospital evaluation/ ranking<br>× Intrahospital evaluation | × Interhospital evaluation/ ranking<br>× Intrahospital evaluation | ✓ Interhospital evaluation/ ranking<br>✓ Intrahospital evaluation |
| **Provider locus of control** | ✓ Provider control over access to care<br>× Community needs<br>× Patient options | ✓ Provider control over community benefit and pay equity<br>× Inclusivity broadly driven by community distributions | ✓ Provider control over access to care<br>× Community needs<br>× Patient options | × Community focus and community driven metrics | ✓ Provider control over data collection of race/ethnicity | ✓ Provider outcomes within stay<br>✓ Patient outcomes within stay<br>✓ Provider internal processes<br>✓ Resource utilization |
| **Risk Adjustment** | Community factors (SVI) including race; risk adjusted unplanned readmissions | None | None | None | None | Prior comorbidities adjust inpatient mortality risk |
| **Stratification** | Race | Race, Education, Income (imputed at the zip code level) | Race | None | Race, ethnicity | Payer, Gender, Race, Ethnicity |
| **Measure Weighting** | None – not scored | 40% inclusivity<br>40% community benefit<br>20% pay equity | None – not scored | 50% Length of life<br>50% Quality of life | None – not scored | 30% process<br>70% outcomes |
| **Statistical significance** | Statistically significant differences by race | None | None | None | None | Bootstrapping or Fisher Exact Test for significant differences |

11 Vizient Presentation | March 17, 2022 | Confidential Information

FIG. 5

FIG. 8
Less vulnerable
More vulnerable
-3.000
3.000
© 2021 Mapbox © OpenStreetMap

Vizient Vulnerability Index – national map

Specific Domains and Components with High Vulnerability: Great State Hospital

| | high | | extreme | |
|---|---|---|---|---|
| Overall Vulnerability Index (VVI) | | 13% | | 3% |
| Economic Domain | 13% | 7% | | |
| - Poverty | 18% | 11% | | 1% |
| - Unemployment | | 3% | | |
| - Median Income | 13% | 10% | | 1% |
| Education Domain | | 1% | | |
| - Bachelors Degrees | | 1% | | |
| - 15-17 Year Olds in School | 12% | 3% | | 1% |
| - 3-4 Year Olds in School | | 3% | | |
| Health Care Access Domain | | 8% | | 2% |
| - Uninsured | | 8% | | 2% |
| Neighborhood Domain | | 1% | | |
| - Park Access | | 5% | | |
| - Food Deserts | | 6% | | 1% |
| - Alcohol Sales | | 3% | | 1% |
| Housing Domain | | 10% | | 1% |
| - Homeownership | 19% | 27% | 7% | 6% |
| - Incomplete Plumbing | | | | |
| - Crowding | | 8% | | 3% |
| - Extreme Housing Costs | 2% | 20% | | 6% |
| Clean Environment Domain | 7% | 6% | | |
| - Air Quality | | 7% | | 4% |
| - Water Quality | 7% | 10% | | |
| Social Domain | 8% | 7% | | |
| - Voting Participation | | 10% | | 2% |
| - Two Parent Households | 33% | 15% | | 4% |
| Transportation Domain | 18% | 14% | | 2% |
| - Access to Car or Public Transportation | 18% | 14% | | 2% |

A zip code with "high" vulnerabilities has index values greater than 1 standard deviation above the mean. A zip code with "extreme" vulnerabilities has index values greater than 2 standard deviations above the mean. In every case a higher number is a greater vulnerability (e.g. Higher poverty is a greater vulnerability, and lower median income is a greater vulnerability. Both have higher index values representing higher vulnerability.)

The percents reported here in orange represent the percent of this hospital's distinct patients residing in zip codes identified as having "high" or "extreme" vulnerabilities.

Any vulnerability affecting the zip codes in which less than 1% of the hospital's total patient population resides is left blank.

CDB-wide averages (in grey) are provided for comparison.

Source: CDB distinct patients of any age seen in any setting, 2018-2020. Vulnerability Index linked by patient zip code. In case of multiple zip codes, the last encounter in the time period is used.

FIG. 25

Great State System Overall Statistics and Measures of Vulnerability

The Vizient member hospitals that contribute data to the Clinical Database (CDB) serve a wide variety of neighborhoods across the country. This diversity of neighborhoods, as well as the particular specializations of individual hospitals especially within larger systems has to be taken into account as we interpret differences in the clinical outcomes and utilization patterns we will analyze in these hospital profiles.

A hospital that serves a larger proportion of pediatric patients will have a different focus than one that serves a larger proportion of patients over 65. Hospitals with behavioral health specializations will have different outcomes than those without that focus. Hospital may serve a much larger or much smaller geographic area than average.

Finally, we have a number of different definitions of "vulnerability". Comparing the neighborhoods served by a hospital, or the payer mix, or number of patients with a homeless diagnosis code each provide different context to clinical outcomes and utilization. We will be focusing on the Vizient Vulnerability Index in these hospital profiles, but payer mix and the coding of homelessness are provided for comparison.

Data source: CDB all distinct patients of any age seen in any setting 2019-2020

| | | Distinct Patients 2019-2020 | % Pediatric | % over 65 | % Behavioral Health Diagnosis | Range that includes 50% of all patients (in miles) | Range that includes 80% of all patients (in miles) | % from Neighborhoods with VVI > 1 | % Medicaid or Uninsured | % Coded Homeless Patients |
|---|---|---|---|---|---|---|---|---|---|---|
| | Clinical Database (CDB) Totals | 88,537,348 | 15% | 24% | 16% | 8 | 42 | 15% | 30% | 0.54% |
| 000001 | Great State Hospital | 141,082 | 17% | 22% | 18% | 7 | 22 | 9% | 38% | 0.22% |
| 000002 | System Peer | 532,527 | 19% | 25% | 7% | 12 | 67 | 1% | 19% | 0.11% |

FIG. 27

Great State System Diabetes Incidence and Complications Statistics

Total Volumes and rates for all adult patients (age ≥18) are provided here as context for the diabetes, high A1C and amputation analysis that follows.

A hospital that does not submit A1C lab data (with 0% in the "% of Diabetic patients with at least one A1C reported" field) will not have hospital-specific data on rates of High A1C by neighborhood vulnerabilities.

| | | Distinct Adult Patients | Diabetes Rate | % of Diabetic patients with at least one A1C reported | % Diabetic Patients with High A1C | Patients with an amputation performed in 2019 or 2020 | Patients with prior amputation | Total Amputation Rate |
|---|---|---|---|---|---|---|---|---|
| | Clinical Database (CDB) Totals | 74,892,418 | 14.5% | 39% | 14.2% | 82,560 | 153,670 | 2.2% |
| 00001 | Great State Hospital | 117,937 | 13.9% | 48% | 16.8% | 204 | 198 | 2.5% |
| 00002 | System Peer | 432,289 | 10.8% | 54% | 18.8% | 294 | 809 | 1.9% |

FIG. 28

Great State System Emergency Department Utilization Statistics

CDB member hospitals vary in the populations served by their Emergency Departments. This can reflect the location and size of an ED, the relative volume of other service lines, and the specific data that is reported to the CDB.

Office Visit data is included here from the CDB only. This is not the full picture of outpatient practice for all patients seen by our member hospitals, and depending on practice patterns may represent specific subsets of patients (specialty clinics etc.) that are reported in the CDB. Member hospitals that do not report any office visit data will show a 0 in the Office Visits column and are excluded from the CDB totals for patients with at least one office visit and patients with both ED Visits and Office Visits.

Of particular interest in this data is the very small overlap between patients with ED visits and patients with Office Visit data reported in the CDB. While approximately 36% of all CDB patients have at least one ED visit in 2019 or 2020, and 21% of patients of hospitals that report Office Visit data have at least 1 Office Visit in 2019 or 2020, only 4% of patients have both an ED visit and an Office Visit. They are nearly distinct populations.

Further metrics will be investigated using CPSC data, for members who participate in both databases.

| | | Distinct Patients 2019-2020 | % Patients with at least 1 ED Visit | Total ED Visits | % Returns to ED within 30 days | Office Visits | % Patients with at least 1 Office Visit* | % Patients with both ED Visits and Office Visits* |
|---|---|---|---|---|---|---|---|---|
| | Clinical Database (CDB) Totals | 88,537,349 | 38% | 54,888,829 | 15.8% | 19,140,222 | 21% | 4% |
| 000001 | Great State Hospital | 141,082 | 46% | 117,975 | 16.7% | 43,052 | 14% | 5% |
| 000002 | System Peer | 532,527 | 14% | 100,029 | 11.5% | 314,687 | 21% | 2% |

Data Source: All CDB discharged patients of any age, 2019-2020. Office Visit data reported only for hospitals that submit outpatient encounter data with CPT codes indicating Evaluation and Management.

* Note that for the CDB wide totals the percent of patients with at least one Office Visit and percent of patients with both ED Visits and Office Visits, hospitals with no office visit data were excluded from the calculations.

FIG. 42

Great State System Maternity Care Statistics

Metrics related to Pregnancy, Childbirth, and Newborns will apply differently to hospitals with maternity services, and those that specifically serve high risk pregnancies.

A member hospital could see a large number of pregnant patients regardless of the number of deliveries performed at that hospital. Similarly, any patient seen at an age of less than 30 days is included in the newborn metrics regardless of the place they were delivered.

Note that the count of pregnant patients in 2019-2020 will include patients who have not delivered yet at the end of this time period.

| | | Distinct Pregnant Patients | % of Pregnant Patients with Hypertension Complications | Deliveries | % of Deliveries with Severe Complications | Newborns | % of Newborns with Low Birthweight |
|---|---|---|---|---|---|---|---|
| | Clinical Database (CDB) Totals | 3,615,808 | 13.8% | 1,931,884 | 2.1% | 2,038,062 | 5.4% |
| 000001 | Great State Hospital | 6,447 | 11.3% | 3,529 | 2.6% | 3,709 | 5.2% |
| 000002 | System Peer | 5,347 | 8.2% | 3 | 0.0% | 177 | 3.4% |

Data Source: CDB 2019-2020 all patients seen in any setting with any diagnosis indicating pregnancy (Pregnancies), any inpatient encounter for childbirth (Deliveries), or of an age less than 30 days (Newborns).

FIG. 55

Great State System Breast Cancer Statistics

Breast Cancer Diagnosis, Screening, and Metastasis metrics are affected by a hospital's oncology specialization as well as the reporting of cancer screening appointments. In some systems mammograms may be concentrated in specific hospitals, where other system hospitals report very few or none. Hospitals that have no oncology specialization may see very few breast cancer patients as they are served by other hospitals. Hospitals with larger oncology programs may serve patients referred from several other hospitals and may have an overrepresentation of more severe cases. The relationship between the diagnosis rates, screening rates, and metastasis rates can only be interepreted in light of these differences among hospitals.

For the purposes of this analysis, all patients with a breast cancer diagnosis are counted as having been screened for breast cancer, as are patients whose diagnosis codes indicate an encounter for breast cancer screening. Additionally, this analysis is specifically restricted to women over 40, due to the recommendations for routine mammograms in this age group.

| | | Distinct Female Patients over 40 2019-2020 | Breast Cancer Diagnoses | % Women with Breast Cancer Diagnosis | Breast Cancer Screening | % Women with Breast Cancer Screening | Breast Cancer with Metastasis | % Breast Cancer with Metastasis |
|---|---|---|---|---|---|---|---|---|
| | Clinical Database (CDB) Totals | 29,131,920 | 803,527 | 2.8% | 6,859,497 | 21% | 174,521 | 22% |
| 000001 | Great State Hospital | 48,255 | 1,303 | 2.7% | 22,753 | 46% | 248 | 19% |
| 000002 | System Peer | 170,123 | 4,324 | 2.5% | 23,498 | 12% | 1,059 | 24% |

FIG. 68

New Haven has particular vulnerabilities in the Health Care Access and Transportation domains, as well as Food Deserts specifically

Norwalk is relatively less vulnerable, except in the Housing, Transportation, and Health Care Access Domains

Supporting Leading Providers to Advance Health Equity

Community Contracting Program Team
- Implementation, Facilitation, Capacity Building, Sustainability, and Enablement
- Locally Based, Dedicated Program Manager(s)
- Sourcing Executive
- Analyst Cbo's, Certification & Advocacy Org
- Anchor Organizations
- Supports Identification and Development of Diverse Suppliers
- Partners to Create Connections
- Supports Capacity Building

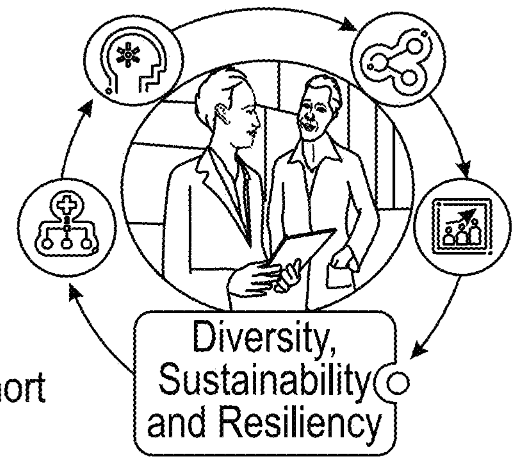

Cha + Healthcare Systems + Supplier Partners
- Participation and Collaboration in Cohort
- Inclusion and Contracting Strategy Development
- Identification and Engagement of Diverse Suppliers
- Increased Contract Utilization and Spend Diverse Suppliers
- Educate, Vet, and Assess
- Capacity Building
- Build Book of Business
- Commitment to Community Growth
- Tracking and Reporting

FIG. 89

FIG. 90
Connecticut Community Contracting Maturity Progression
Launch
• SOW Execution
• Staff implementation
• Identify and expand contracting categories based on availability of local, diverse suppliers
• Health system engagement
• Annual KPI's developed
Community Engagement
• Engage community-based organizations that support and develop diverse suppliers and small business
• Engage local diverse suppliers and small businesses for contracting opportunities
• Develop capable, local, diverse entrepreneurs
Sourcing & Utilization
• Drive local diverse suppliers to register with Vizient's Supplier Diversity Program
• Map contracting opportunities for conversion to geographic area diverse and small businesses
• Capacity building of diverse suppliers
• Expand cohort
Continued Growth & Impact
• Track and report spend
• Identify opportunities to convert spend to a local diverse supplier
• Continue sourcing local, diverse suppliers
• 2.0 grow utilization and the network
• 3.0 Build diverse supplier capacity
• 4.0 cohort led strategic financial investment(s)

Scaling Across Connecticut Fuels Unique Value

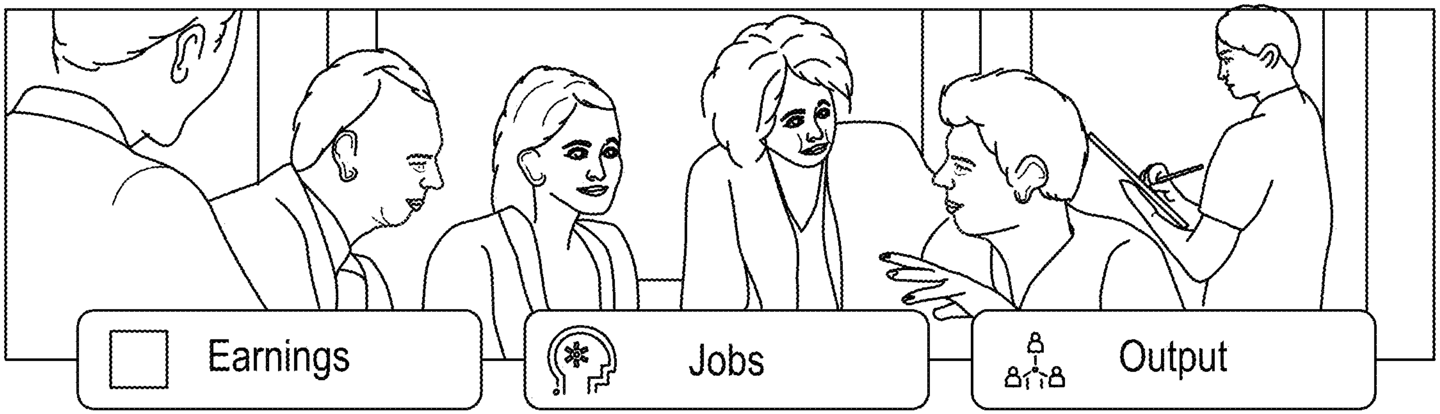

| | | | |
|---|---|---|---|
| Considering $50m in Spend with Connecticut Based Local, Diverse Suppliers | Measure of the Change in the Value Earnings that are Received by Households from Production of Goods and Services | Full Time Employment Per Million Dollars of Spend by CT Hospitals | Measure of the Economic Activity Created by Healthcare System Spending In Local CT Communities |
| | >$168m | ≈ 859 Employed | >143m |

FIG. 92

Scaling across Connecticut fuels unique value

Considering $50M in spend with Connecticut based local, diverse suppliers

Earnings

Measure of the change in the value earnings that are received by households from production of goods and services

>$168M

Jobs

Full time employment per million dollars of spend by CT hospitals

≈ 859 employed

Output

Measure of the economic activity created by healthcare system spending in local CT communities

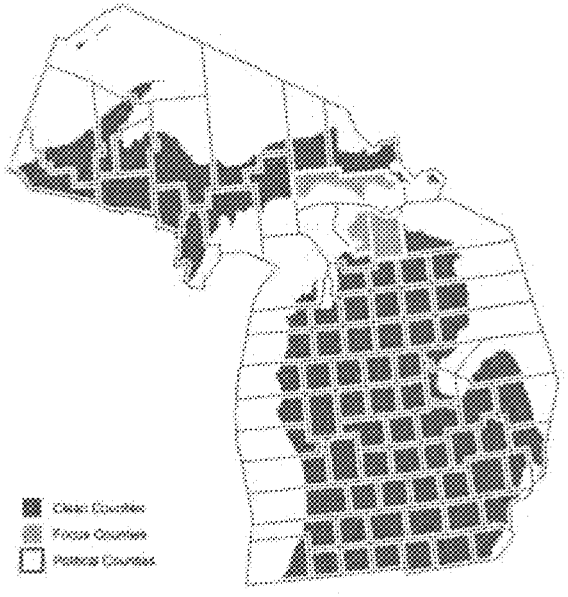

(a) The state of Michigan with its Clean Counties (land extent) in purple, its Political Counties (land + water extent) outlined in gray. Note that the Michigan Political Counties encompass large swaths of the surrounding Great Lakes. Mackinac, Emmet, and Cheboygan Counties highlighted in green.

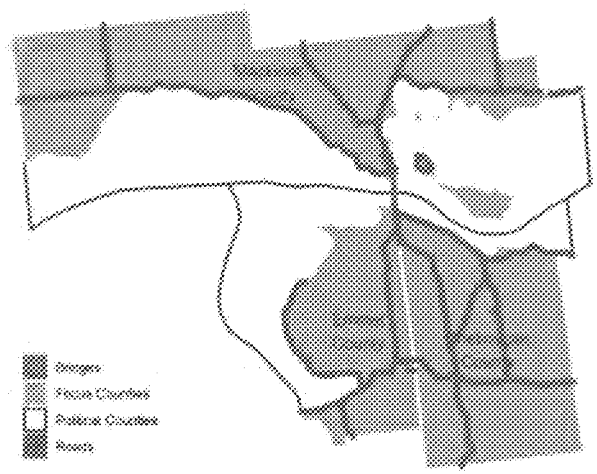

(b) Close-up of Mackinac, Emmet, and Cheboygan Counties with the Straits of Mackinac bridge of US Interstate 75, as a polygon, highlighted in orange. The algorithm spatially divides and adds the polygonal extent of the bridge to Mackinac and Cheboygan Counties, thereby extending the reach of each, and ensuring they share a common boundary. Other Primary and Secondary Roads are in cyan. Seemingly random dead-end and floater Roads derive from the Primary and Secondary Roads shapefile.

FIG. 94

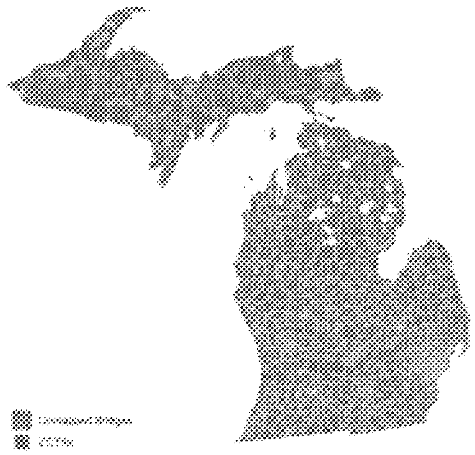

(a) The state of Michigan partitioned by its set of ZCTAs. Contrary to the differencing operation used on counties, note that no water areas are immediately apparent. The interior white areas are ZCTA holes, or the "empties." These tend to depict internal water features and parkland. By looking closely, orange potential bridges, with no ZCTA identifiers, are visible across empty internal features, and in this case, the external Straits of Mackinac separating the upper and lower Michigan peninsulas.

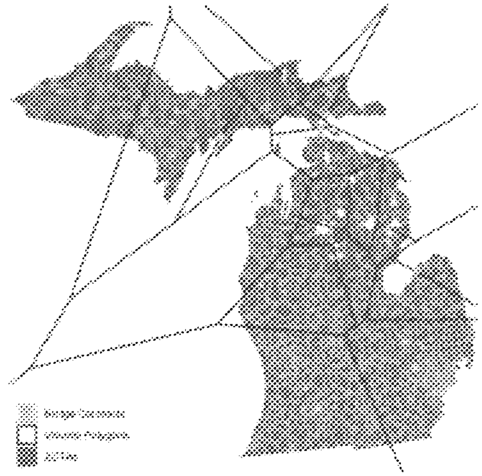

(b) The state of Michigan partitioned via a set of Voronoi polygons, anchored by Bridge Centroids. Yellow dots depict candidate-bridge centroids over identified empties. One yellow dot corresponds to one Voronoi polygon, outlined in dark gray. Yellow dots seemingly straddling dark gray Voronoi polygons typically represent two bridge centroids nearly on top of one another, as any one Voronoi polygon contains exactly one bridge centroid. Any point selected within a Voronoi polygon is closest to its anchoring bridge centroid.

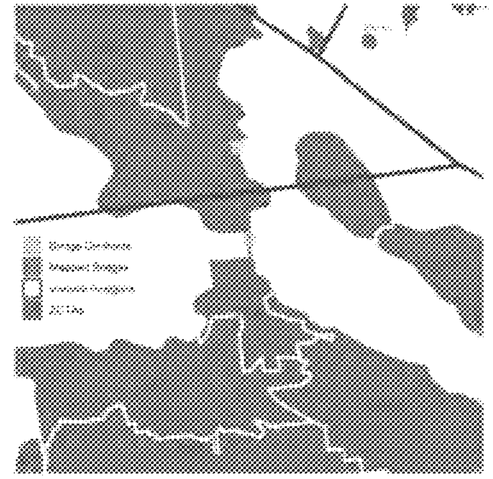

(c) A close-up of the bridge straddling the Straits of Mackinac via ZCTAs 49781 and 49701. The bridge (or rather, its yellow centroid) and resulting Voronoi polygon are clear. The use of the Voronoi polygons allows for identifying information about a nearby ZCTA to map to the Voronoi polygon, and therefore its generating centroid, and finally to the bridge polygon itself, allow for the bridge polygon to dissolve and merge with its true neighboring ZCTA.

FIG. 95

(b) Emmet County, MI ZCTA Contiguities.

(a) Emmet County, MI 3-Rings.

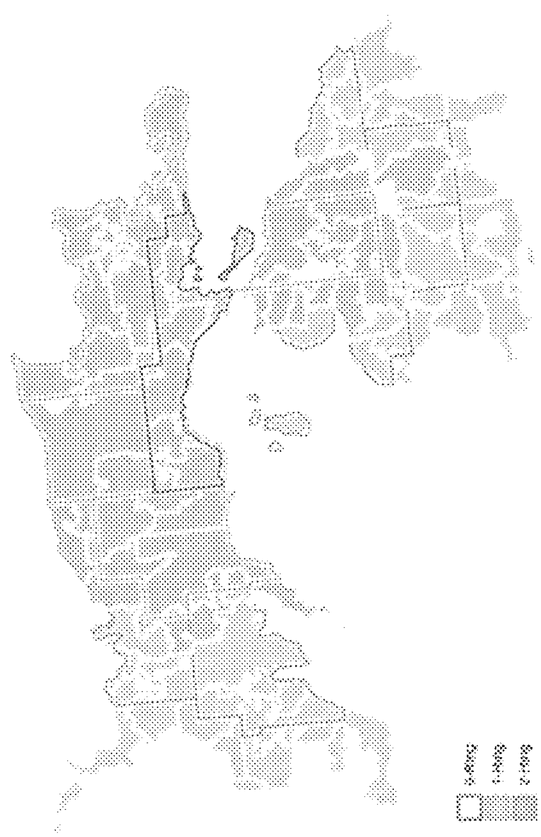
(c) Mackinac County, MI 2-Rings.
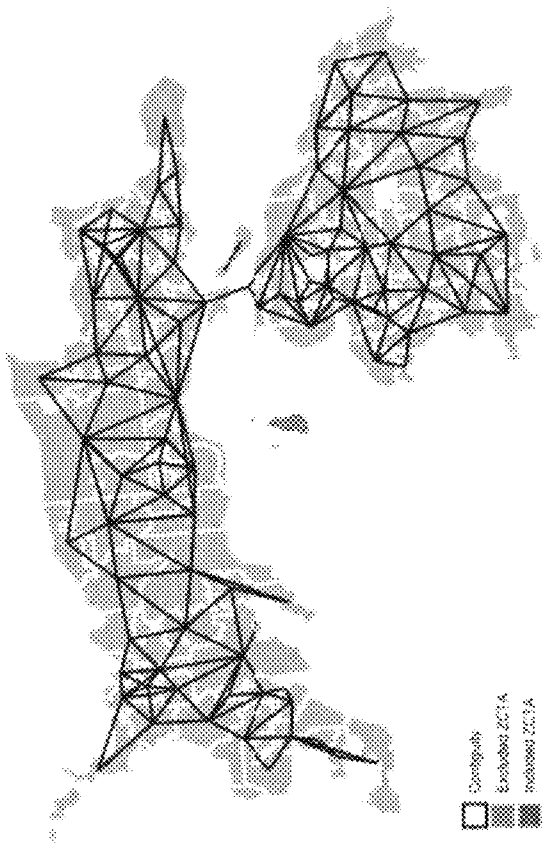
(d) Mackinac County, MI ZCTA Contiguities.
FIG. 97

(f) Cheboygan County, MI ZCTA Contiguities.

(e) Cheboygan County, MI 2-Rings.

Algorithm 1 Spatial Cross-validation

Partition all $N$ polygonal units into $F$ disjointed folds of approximate equal size $n_O$.
for fold $f = 1, 2, \ldots, F$ do
  Identify the $n_O^f$ polygonal units belonging to fold $f$.
  Label test outcome and covariate data of units in $f$ as $\{\boldsymbol{y}_O^f, \boldsymbol{X}_O^f\}$. Set aside.
  Label training outcome and data $\{\boldsymbol{y}_S^f, \boldsymbol{X}_S^f\}$ from remaining $n_S^f = N - n_O^f$ polygonal units (from the other $F-1$ folds).
  Construct weight matrix $\boldsymbol{W}_S^f$ via training polygonal-units.
  for model $m = 1, 2, \ldots, M$ do
    Regress $\boldsymbol{y}_S^f$ against $\boldsymbol{X}_S^f$ with relationships $\boldsymbol{W}_S^f$ via an SEM with $p$ exogenous variables.
    Extract $\widehat{\rho}_m$ and $\widehat{\beta}_m$ from the regression.
    for polygonal test-unit $u = 1, 2, \ldots, n_O^f$ do
      Extract from $\{\boldsymbol{y}_O^f, \boldsymbol{X}_O^f\}$ the polygonal-unit $u$ outcome and data $\{y_u^f, \boldsymbol{x}_u^T\}$, $y_u^f$ a scalar and $\boldsymbol{x}_u^T$ a row vector
      Expand $\boldsymbol{W}_S^f$, of size $n_S^f \times n_S^f$, to $\boldsymbol{W}_u^f$, of size $(n_S^f + 1) \times (n_S^f + 1)$, so as to include $u$.
      Append $\boldsymbol{X}_S^f$, of size $n_S^f \times p$, to $\boldsymbol{X}_u^f$, of size $(n_S^f + 1) \times p$, so as to include exogenous data $\boldsymbol{x}_u^T$, of size $1 \times p$, of $u$.
      Calculate quantities $[\boldsymbol{X}_O^f\beta]_u$, $\mathrm{Cov}(\boldsymbol{y}_u^f, \boldsymbol{y}_S^f)$, $\mathrm{Var}(\boldsymbol{y}_S^f)$, and $\mathrm{E}[\boldsymbol{y}_S^f]$ via $\widehat{\rho}$ and $\widehat{\beta}$, with $[\cdot]_u$ the $u^{th}$ row of $[\cdot]$.
      Estimate $\widehat{y}_u^f = \mathrm{E}[y_u^f|\mathbf{y}_S^f]$, the estimated test prediction of polygonal unit $u$ in fold $f$ (for model $m$).
    end for
    Calculate the root-mean squared error $RMSE_m^f$ for model $m$ in fold $f$.
  end for
end for
Calculate model-averages $RMSE_m$ for model $m$ across all $F$ folds.
Identify the best model via lowest $RMSE_m$.

FIG. 99

Algorithm 2 Bridging Algorithm

```
Outline all polygonal tracts by dissolving internal tract boundaries.
Outline non-zero population polygonal tracts by dissolving internal tract boundaries.
Outline polygonal counties by dissolving internal county boundaries.
Identify bridgeable water extents by differencing the all-tract outline with the county outline.
Identify bridgeable land extents by differencing the all-tract outline with the non-zero-population tract outline.
Combine bridgeable water and land extents.
Buffer linear roads perpendicularly 50 m, thereby creating road polygons.
Extract polygonal bridges by intersecting combined bridgeable polygonal extents with polygonal roads.
for state s = 1, ..., 51 do
    if the number of total bridges B_s > 0 in state s then
        Extract the bounding box b_s of all state s counties from the larger counties shapefile.
        for bridge b = 1, ..., B_s do
            Identify bridge b centroid c_b.
        end for
        Define Voronoi B_s polygons anchored by centroids {c_b} by partitioning the bounding box b_s.
        Intersect Voronoi polygons with tracts in s.
        for bridge b = 1, ..., B_s do
            Identify the 1 nearest neighbor tract to b. By design, b intersects this tract
            Label b with its overlapping tract.
            Union b with its overlapping tract.
        end for
    end if
end for
Combine all state s tracts.
```

FIG. 100

Algorithm 3 Ferrying Algorithm

Identify and remove all $T$ tracts discontiguous to at least one other tract $t'$.
for discontiguous tract $t = 1, \ldots, T$ do
    Identify commercial ferry routes between $t$ and $t'$.
    Digitize polygonal overlapping connector $C$ between $t$ and neighboring tract $t'$.
    Split $C$ into polygons $c$ and $c'$ such that both share a 1-dimensional boundary and each overlaps with one of $t$ or $t'$.
    for polygon sets $p_1 = \{t, c\}$, $p_2 = \{t', c'\}$ do
        Label all elements in $p_i$ the same.
        Dissolve overlapping polygonal extents over elements of $p_i$, thus replacing discontiguous $t$ with contiguous $t_{new}$.
    end for
end for
Combine polygonally updated now-contiguous tracts $T$ with all other contiguous tracts.

FIG. 101

Algorithm 4 Ringing Algorithm for ring $r = 1, \ldots, 3$ do
  for tract $t = 1, \ldots, T$ do
    Label tract $t$ as the anchoring 0-ring for its community.
    Identify, via queen contiguity DE9-IM `F*T**`, all $r$-ring neighbors of the $(r-1)$-ring of $t$.
    Identify, via modified queen contiguity DE9-IM `2*T**`, any additional $r$-ring neighbors of the $(r-1)$-ring of $t$.
    Combine all identified $r$-ring neighbors of $t$.
  end for
  Combine all tract-ring results for the $r^{th}$ ring.
end for
Combine all ring $r$ results.

FIG. 102

Algorithm 5 Spatial Cross-validation Algorithm

Partition all $N$ polygonal units into $F$ disjointed folds of approximate equal size $n_O$.
for fold $f = 1, 2, \ldots, F$ do
  Identify the $n_O^f$ polygonal units belonging to fold $f$.
  Label test outcome and covariate data of units in $f$ as $\{\boldsymbol{y}_O^f, \boldsymbol{X}_O^f\}$, resp. Set aside.
  Label training outcome and data $\{\boldsymbol{y}_S^f, \boldsymbol{X}_S^f\}$, resp., from remaining $n_S^f = N - n_O^f$ units (from other $F - 1$ folds).
  Construct weight matrix $\boldsymbol{W}_S^f$ via training polygonal-units.
  for model $m = 1, 2, \ldots, M$ do
    if $m$ is a spatial-error model (SEM) then
      Regress $\boldsymbol{y}_S^f$ against $\boldsymbol{X}_S^f$ with relationships $\boldsymbol{W}_S^f$ via an SEM with $p$ exogenous variables.
      Extract $\widehat{\rho}_m$ and $\widehat{\beta}_m$ from the regression.
      for polygonal test-unit $u = 1, 2, \ldots, n_O^f$ do
        Extract from $\{\boldsymbol{y}_O^f, \boldsymbol{X}_O^f\}$ the polygonal-unit $u$ outcome and data $\{y_u^f, x_u^T\}$, $y_u^f$ a scalar and $x_u^T$ a row vector.
        Expand $\boldsymbol{W}_S^f$, of size $n_S^f \times n_S^f$, to $\boldsymbol{W}_u^f$, of size $(n_S^f + 1) \times (n_S^f + 1)$, so as to include $u$.
        Append $\boldsymbol{X}_S^f$, of size $n_S^f \times p$, to $\boldsymbol{X}_u^f$, of size $(n_S^f + 1) \times p$, so as to include exogenous data $x_u^T$, of size $1 \times p$, of $u$.
        Calculate quantities $[\boldsymbol{X}_u^f \beta]_u$, $\mathrm{Cov}(\boldsymbol{y}_u^f, \boldsymbol{y}_S^f)$, $\mathrm{Var}(\boldsymbol{y}_S^f)$, and $\mathrm{E}[\boldsymbol{y}_S^f]$ via $\widehat{\rho}$ and $\widehat{\beta}$, with $[\cdot]_u$ the $u^{th}$ row of $[\cdot]$.
        Estimate $\widehat{y}_u^f = \mathrm{E}[y_u^f | \mathbf{y}_S^f]$, the estimated test prediction of polygonal unit $u$ in fold $f$ (for model $m$)
      end for
    end if
    if $m$ is a non-spatial linear model then
      Regress $\boldsymbol{y}_S^f$ against $\boldsymbol{X}_S^f$ via a non-spatial linear model with $p$ exogenous variables.
      Extract $\widehat{\beta}_m$ from the regression.
      Estimate $\widehat{y}_O^f = \boldsymbol{X}_O^f \widehat{\beta}_m$, the estimated test prediction of polygonal units $u$ in fold $f$ (for model $m$).
    end if
    Calculate the root-mean squared error $RMSE_m^f$ for model $m$ in fold $f$.
  end for
end for
Calculate model-averages $RMSE_m$ for model $m$ across all $F$ folds.
Identify the best model via lowest $RMSE_m$.

FIG. 103

| NOTES | | | Analyses are done at the census tract level unless otherwise noted<br><br>Government Authorities are reported at the county tract level which does not always match the census tract. In these situations, violations are weighted based on the number of people in the census area. This applies to water and violent crimes.<br><br>For each operation/calculation include how often this is done | | | |
|---|---|---|---|---|---|---|
| **VVI Attribute** | **Supplier** | **Input** | **Operation/ Calculation** | **Output** | **Consumer** | **Storage Location** |
| **CENSUS DATA PROCESS** | | | | | | |
| Census | US Census | Data Source: kdata.census.gov<br><br>Census api: https://api.census.gov/data/<br><br>Cran.r Package: https://cran.r-project.org/web/packages/censusapi/censusapi.pdf and this script https://vizientinc-my.sharepoint.com/:u:/p/heather_blonsky | Use the census api with the cran.r package to pull in the census data and meta data | cse file census data check2020 | Data Scientist H | Data Scientist H lap top |
| Census | Data Scientist H | cse file census data check2020 | Review and make decisions about any missing data or things that may not make sense | \\aelk3p01sas.uhc.edu\DSWork\SDOH\Census Data | Data Scientist H | Data Scientist H lap top \\aelk3p01sas.uhc.edu\DSWork\SDOH\SDOH Indices\Vizient Vulnerability Index\VVI Census Tract Data |
| Census | Data Scientist H | https://vizientinc-my.sharepoint.com/:u:/p/heather_blonsky/EeBc-KO9cD1CiQEsyR2m3uaBr588wCCpRT4U3qtrN6-eHA | Pull in 9 tables of census data at the census tract, zip code tablulation area (ZCTA), and county levels | R data frames | Data Scientist H | Data Scientist H lap top \\aelk3p01sas.uhc.edu\DSWork\SDOH\SDOH Indices\Vizient Vulnerability Index\VVI Census Tract Data |

FIG. 104

| OTHER DATA SOURCES PROCESS | | | | | | |
|---|---|---|---|---|---|---|
| Broad Band | Federal Communications Commision (FCC) | https://www.fcc.gov/general/broadband-deployment-data-fcc-form-477 | Broad Band Availability: Identify satellite, terestrial or regular sources, and the speed of each of them. Summarize the maximum provider speed of any source and the maximum speed of the regular provider type. | R data frames | Data Scientist H | Data Scientist H lap top \\aelk3p01sas.uhc.edu\DSWork\SDOH\SDOH Indices\Vizient Vulnerability Index\VVI Census Tract Data |
| Food Desert | United States Department of Agriculture (USDA) | https://www.ers.usda.gov/data-products/food-access-research-atlas/download-the-data/ | Food Deserts: Identify food desert. A food desert is a low income area with low access to a grocery store (more than half mile in an urban area, more than 1 mile in a rural area). | R data frames | Data Scientist H | Data Scientist H lap top \\aelk3p01sas.uhc.edu\DSWork\SDOH\SDOH Indices\Vizient Vulnerability Index\VVI Census Tract Data |
| Access To Parks | National Environmental Public Health Tracking Network (NEPHTN) | https://ephtracking.cdc.gov/IndicatorPages?selectedContentAreaAbbreviation=14&selectedIndicatorId=80&selectedMeasureId= | Access to Parks: Calculate the % of people who live within half mile of a public park or playground e.g., public school | R data frames | Data Scientist H | Data Scientist H lap top \\aelk3p01sas.uhc.edu\DSWork\SDOH\SDOH Indices\Vizient Vulnerability Index\VVI Census Tract Data |
| Air Pollution, Water Pollution, Lead Paint, Chemical Spills | Environmental Justice Screening | https://www.epa.gov/ejscreen | Identify areas with air pollution, water pollution, lead paint, chemical spills risks | R data frames | Data Scientist H | Data Scientist H lap top \\aelk3p01sas.uhc.edu\DSWork\SDOH\SDOH Indices\Vizient Vulnerability Index\VVI Census Tract Data |
| Water Pollution | Environmental Protection Agency | Data Downloads \| ECHO \| US EPA | Count the health-related violations and identify the area affected areas using geographic identifiers (City, County, Tribal Area, etc.) | R data frames | Data Scientist H | Data Scientist H lap top \\aelk3p01sas.uhc.edu\DSWork\SDOH\SDOH Indices\Vizient Vulnerability Index\VVI Census Tract Data |

FIG. 105

| | | | | | | |
|---|---|---|---|---|---|---|
| Housing | Housing and Urban Development (HUD) | https://www.huduser.gov/portal/datasets/cp.html | Severe Housing Costs: Housing and Urban Development (HUD) pull Table 8 . Five year housing problems by census tract. Below 80% of the local median inclome and spend more than half of their income on housing | R data frames | Data Scientist H | Data Scientist H lap top \\aelk3p01sas.uhc.edu\DSWork\SDOH\SDOH Indices\Vizient Vulnerability Index\VVI Census Tract Data |
| Life Expectacy | Centers for Disease Control (CDC) | https://www.cdc.gov/nchs/nvss/usaleep/usaleep.html | Life Expectancy: Predict life expectancy in a small area based on the Social Determinants of Health (SDOH) | R data frames | Data Scientist H | Data Scientist H lap top \\aelk3p01sas.uhc.edu\DSWork\SDOH\SDOH Indices\Vizient Vulnerability Index\VVI Census Tract Data |
| Alcohol Sales | Agency for Healthcare Research and Quality (AHRQ) | https://www.ahrq.gov/sdoh/data-analytics.html | County Only Alcohol Sales: Beer, Wine, Alcohol sales | R data frames | Data Scientist H | Data Scientist H lap top \\aelk3p01sas.uhc.edu\DSWork\SDOH\SDOH Indices\Vizient Vulnerability Index\VVI Census Tract Data |
| Opiods | CDC | https://www.cdc.gov/drugoverdose/rxrate-maps/index.html | Opiod dispensing by County | R data frames | Data Scientist H | Data Scientist H lap top \\aelk3p01sas.uhc.edu\DSWork\SDOH\SDOH Indices\Vizient Vulnerability Index\VVI Census Tract Data |
| Distance to a Hospital | The Centers for Medicare & Medicaid Services (CMS) | CMS data: https://data.cms.gov/provider-data/dataset/xubh-q36u<br><br>Geo-Coder api: : https://geocoding.geo.census.gov/geocoder/locations/addressbatch?form | Distance to a Hospital: Run CMS data through the census geo-coder api to return longitude and latitude. Map every hospital in the census tract. Calculate the distance from population centroid to critical care hospital and acute care hospital within the census tract. Perform quality check on distance to a Hospital | R data frames | Data Scientist H | Data Scientist H lap top \\aelk3p01sas.uhc.edu\DSWork\SDOH\SDOH Indices\Vizient Vulnerability Index\VVI Census Tract Data |

FIG. 106

| | | | | | | |
|---|---|---|---|---|---|---|
| Provider Shortages | Health Resources & Services Administration (HSRA) | https://data.hrsa.gov/data/download | Provider Shortages: By County, county-sub, and census tract, score provider shortages for physicians in Dental Health, Mental Health, Primary Care | R data frames | Data Scientist H | Data Scientist H lap top \\aelk3p01sas.uhc.edu\DSWork\SDOH\SDOH Indices\Vizient Vulnerability Index\VVI Census Tract Data |
| Violent Crime Rates | Federal Bureau of Investigation Crime Data Explorer (CDE)<br><br>Gun Violence Archive (GVA) independent research and data collection organization | https://cde.ucr.cjis.gov/LATEST/webapp/#/pages/home<br><br>https://www.gunviolencearchive.org/ | Calculate Violent Crime Rates | R data frames | Data Scientist H | Data Scientist H lap top \\aelk3p01sas.uhc.edu\DSWork\SDOH\SDOH Indices\Vizient Vulnerability Index\VVI Census Tract Data |
| Gun violece | Web-scrape script to identify gun violence to a location | https://www.gunviolencearchive.org/ | Calculate gun violence rates. Incidents within 5 miles of the population centroid of the census tract | R data frames | Data Scientist H | Data Scientist H lap top \\aelk3p01sas.uhc.edu\DSWork\SDOH\SDOH Indices\Vizient Vulnerability Index\VVI Census Tract Data |
| Incarceration Rates | A collaboration between researchers at the Census Bureau, Harvard University, and Brown University.<br><br>Multi-Resolution Land Characteristics (MRLC) Consortium | https://www.opportunityatlas.org/<br><br>https://www.mrlc.gov/ | Calculate Incarceration Rates | R data frames | Data Scientist H | Data Scientist H lap top \\aelk3p01sas.uhc.edu\DSWork\SDOH\SDOH Indices\Vizient Vulnerability Index\VVI Census Tract Data |
| Election Data | Harvard Dataverse (Election Data) US Census | https://dataverse.harvard.edu/dataset.xhtml?persistentId=doi:10.7910/DVN/K7760H https://www.census.gov/geographies/mapping-files/time-series/geo/cartographic-boundary.html | Overlay the Harvard Dataverse with census tract map to assign census tracts to voting precincts | R data frames | Data Scientist H | Data Scientist H lap top \\aelk3p01sas.uhc.edu\DSWork\SDOH\SDOH Indices\Vizient Vulnerability Index\VVI Census Tract Data |

FIG. 107

| | | | | | | |
|---|---|---|---|---|---|---|
| Election Data | Data Scientist | //aelk3p01sas.uhc.edu/DSWork/SDOH/Census Data/Weirdness_2020_to_2019_map.csv | Correct the census data reported incorrectly in 2020 to use 2010 data | R data frames | Data Scientist H | Data Scientist H lap top \\aelk3p01sas.uhc.edu\DSWork\SDOH\SDOH Indices\Vizient Vulnerability Index\VVI Census Tract Data |
| Deliverables | | | | VVI census tract standard VVI census tract brief VVI census tract brief ZCTA standard ZCTA brief | Data Scientist H Data Scientist J | Data Scientist H lap top \\aelk3p01sas.uhc.edu\DSWork\SDOH\SDOH Indices\Vizient Vulnerability Index\VVI Census Tract Data |
| **SPACIAL FILES PROCESS** | | | | | | |
| Census | US Census | https://www2.census.gov/geo/tiger/TIGER2019/ | pull shapefiles using census api (Census api: https://api.census.gov/data/) for Nations, Counties, Primary Secondary Roads, and Tracts | | Data Scientist J | PostgreSQL database |
| Nations Counties Primary Secondary Roads | US Census | https://www2.census.gov/geo/tiger/TIGER2019/ | Pull shapefiles into R Studio and run the Bridging algorithm for Counties, Primary Secondary Roads, and Tracts. The Bridging algorithm ensures that census tracts that probably share information and people flow act as they should. | | Data Scientist J | PostgreSQL database |
| Tracts | US Census | https://www2.census.gov/geo/tiger/TIGER2019/ | Pull shapefiles into R Studio and run the Bridging algorithm, Run Ferry algorithm to ensure places in the country that do not connect with another census tract (e.g., an island), get connected. Run Ring algorithm to assign locality to each individual tract in 3 rings | Modified Tract Shapefile Look Up table to see which census tracts map to a given 0 tract | Data Scientist J | PostgreSQL database |
| Census | Data Scientist (Heather) | B:\SDOH\SDOH Indices\Vizient Vulnerability Index\VVI Census Tract Data | Pull csv into R studio and run Imputation algorithm to fill in missing values | Indicies R dataframe | Data Scientist J | PostgreSQL database |

FIG. 108

| SPACIAL MODELLIN G PROCESS | | | | | | |
|---|---|---|---|---|---|---|
| Geographi c Data | Data Scientist J | B:\SDOH\SDOH Indices\Vizient Vulnerability Index\VVI Census Tract Data | Define model strings by setting up the files using R function build_model_strings | Strings file. A file containing formula strings to fit the various model options on the fly | Data Scientist J | PostgreSQL database |
| Geographi c Data | Data Scientist J | Strings file, Ring Look up table, Bridge and Ferry modified tract shapefiles (Geographic Data); Then Ring look up table for the entire country; Then Geographic Data for the entire country | Start the algorithm on a per tract basis in R Studio; Then What are the 3 rings areas to care about in the country?; Then What is the tract spacial information for the 3 rings of interest? | Indicies defined by the ring look up tables Bridge and Ferry modified tract shapefiles (Geographic Data)for the tracts defined by the ring look up tables | Data Scientist J | R Studio |
| Geographi c Data | Data Scientist J | Indicies defined by the ring look up tables for the entire country | What is the tract non-spacial data for the 3 rings of interest | Indicies defined by the ring look up tables R dataframe | Data Scientist J | R Studio |
| Geographi c Data | Data Scientist J | Geographic Data and Indicies | Merge together Geographic Data and Indicies | ans file in R dataframe | Data Scientist J | R Studio |
| Spacial Weights | Data Scientist J | ans file | Build a spacial weight matrix to identify which tracts touch one and other via queen contiguity (e.g. communities, nwighborhoods | R class containing the spacial weight matrix | Data Scientist J | R Studio |
| Spacial Weights | Data Scientist J | ans file and R class containing the spacial weight matrix | Fit all of the training models using the defined spacial weight matrix | allmod list | Data Scientist J | R Studio |
| Spacial Weights | Data Scientist J | allmod list | Spacial cross validation - assess quality of the models | Validated models | Data Scientist J | R Studio |
| Spacial Weights | Data Scientist J | Geographic Data | Define which tracts are defined to which folds, ensring resulting spacial weight matrices for each fold contain linearly independent columns | Fold Tract Assignment R dataframe in R studio with test data for each fold identified | Data Scientist J | R Studio |

FIG. 109

| | | | | | | |
|---|---|---|---|---|---|---|
| Spacial Models | Data Scientist J | Fold Tract Assignment and appropriate indicies data | Fit the spacial models on each fold assessing testing error | mods list | Data Scientist J | R Studio |
| Spacial Models | Data Scientist J | allmod list, and mod list | Extract mean square error from each of the training data in allmod and same from the testing data in mods | mse_summary in R studio | Data Scientist J | R Studio |
| Spacial Models | Data Scientist J | mse_summary file | Find the model with the lowest mean square error | win_type (spacial, non-spacial model) pred_summary_winning_model (model string) | Data Scientist J | R Studio |
| Spacial Models | Data Scientist J | allmod list | calculate corelations in the winning model in the one variable models | corr_summary_winning_model corr_summary_onesies_model | Data Scientist J | R Studio |
| Spacial Models | Data Scientist J | allmod list | Save the beta coefficients from the original training model fits | beta_summary_winning_model | Data Scientist J | R Studio |
| Spacial Models | Data Scientist J | allmod list | Save model demographic information | demo_summary_winning_model | Data Scientist J | R Studio |
| Spacial Tables | Data Scientist J | mse_summary in R studio, win_type (spacial, non-spacial model) pred_summary_winning_model (model string), corr_summary_winning_model corr_summary_onesies_model, beta_summary_winning_model, demo_summary_winning_model | Stack the individual tables vertically using SQL Union | tables in proper schema in PostgreSQL data base | Data Scientist J | PostgreSQL data base |
| Spacial Tables | Data Scientist J | steps 34-49 | run steps 34-49 72,410 times, 1 for each tract | 800,000 different tables PostgreSQL data base | Data Scientist J | PostgreSQL data base |
| Spacial Tables | Data Scientist J | 800,000 different tables PostgreSQL data base | query the database to see what is in it | List of what is in the 800,000 tables | Data Scientist J | PostgreSQL data base |

FIG. 110

| | | | | | | |
|---|---|---|---|---|---|---|
| Sequence Runs | Data Scientist J | completion sequence (8-10 sequences with at least 2 queries in each sequence) | run sequences to identify which models are complete | completion.cs v | Data Scientist J | PostgreSQL data base |
| Sequence Runs | Data Scientist J | mse_summary sequence | run sequences to create spacially average MSE | mse_summari es.csv | Data Scientist J | PostgreSQL data base |
| Sequence Runs | Data Scientist J | correlation_summ sequence | run sequences to create spacially average corelations of winning model with LEB (life expectancy at birth) | corr_comparis ions.csv | Data Scientist J | PostgreSQL data base |
| Sequence Runs | Data Scientist J | correlation_ones sequence | run sequences to create spacially average corelations of one covarient with LEB | corr_comparis ions.csv | Data Scientist J | PostgreSQL data base |
| Sequence Runs | Data Scientist J | correlation_comparis ons sequence | run sequences to combine corr_comparisions.csv and corr_comparisions.csv | corr_comparis ions.csv | Data Scientist J | PostgreSQL data base |
| Sequence Runs | Data Scientist J | winning_models sequence | run sequences to create summarizes statistical information of the winning model along withidentifying wimming model covarients | winning_mod el_stats_and_ indies.csv | Data Scientist J | PostgreSQL data base |
| Sequence Runs | Data Scientist J | vvi sequence | run sequences to create spacially averaged vvi hats | vvi.csv | Data Scientist J | PostgreSQL data base |
| Sequence Runs | Data Scientist J | demo_summ sequence | run sequences to create spacially averaged statistical information of the winning model | mo_summari es_.csv | Data Scientist J | PostgreSQL data base |
| Deliverabl es | Data Scientist J | | | B:\SDOH\SDO H Indices\Vizien t Vulnerability Index\v2020 Updates\from Jason | Data Scientist J Data Scientist H | B:\SDOH\SDOH Indices\Vizient Vulnerability Index\v2020 Updates\from Jason |
| | | | | | | |
| | | | | | | |

FIG. 111

| VVI category | Supplier | Input | Operation/ Calculation | Output | Consumer/Storage location |
|---|---|---|---|---|---|
| Water Pollution | Environmental Protection Agency | Data Downloads \| ECHO \| US EPA | Scroll down to "Drinking Water Data Downloads" and download the SDWA Dataset zip file. The data we need from this is based on the PWSID (public water system ID), and our metric is a count of health-related violations in SDWA_VIOLATIONS_ENFORCEMENT.csv (where IS_HEALTH_BASED_IND = 'Y'). Identifying the area affected relies on the SDWA_GEOGRAPHIC_AREAS.csv file which has a selection of geographic identifiers (City, County, Tribal Area, etc.) | | |
| Water Pollution | Environmental Protection Agency | SDWA_VIOLATIONS_ENFORCEMENT (>3GB) SDWA_PUB_WATER_SYSTEMS (130MB) SDWA_GEOGRAPHIC_AREAS (40MB) SDWA_REF_CODE_VALUES (120KB) | Extract these files and import to SQL Server (import data, not import flat file): | | |
| Water Pollution | Environmental Protection Agency | | SDWA_VIOLATIONS_ENFORCEMENT is too big and "import flat file" will "run out of memory" on a file this size (for whatever reason) | | |
| Water Pollution | Environmental Protection Agency | | SDWA_PUB_WATER_SYSTEMS allow nulls on all fields, varchar for everything and set length to 100 for PWS_NAME, ORG_NAME, ADMIN_NAME, EMAIL_ADDR | | |
| Water Pollution | Environmental Protection Agency | | SDWA_GEOGRAPHIC_AREAS all varchar50 | | |
| Water Pollution | Environmental Protection Agency | | SDWA_REF_CODE_VALUES varchar for everything and set length to 255 for VALUE_DESCRIPTION | | |
| Water Pollution | Environmental Protection Agency | | SDWA_REF_ANSI_AREAS all varchar50 | | |

FIG. 112

| | | | | | |
|---|---|---|---|---|---|
| Water Pollution | | | Created a view called dbo.vw_HealthRelatedViolations that counts violations by PWDIS where IS_HEALTH_BASED_IND = 'Y' and viol_first_reported_date < 2021-01-01 and viol_last_reported_date > 2015-12-31 (Note: there are records where the reported date has a dummy value of 1899-01-01, but only one is a health related violation, and all other related dates for that one record are 2009-2010. So we will disregard this possibility.) | | |
| Water Pollution | | | Created a view called dbo.vw_PublicCommunityWaterSystems from dbo.SDW_PUB_WATER_SYSTEMS, restricting our interest to Community Water Systems (PWS_TYPE_CODE = 'CWS') and linking those systems to locations via dbo.SDWA_GEOGRAPHIC_AREAS with the SDWA_REF_ANSI_AREAS lookup (see https://www.census.gov/library/reference/code-lists/ansi.html for details). Note that we do not restrict by service_area_type_code (which distinguishes for instance schools | | |
| Water Pollution | | | Created a lookup table using the SDWA_REF_CODE_VALUES where VALUE_TYPE = 'TRIBAL_CODE' and manually matched to the NAMELSAD_AIANNH_20 field in dbo.tab20_aiannh20_county_20 so that we have a tribal code to AIANNH code lookup. There are a small number of tribal codes that have no geographic match in the census data. | | |
| Water Pollution | | | Created a view dbo.vw_CountyFIPS to serve as a table of counties from dbo.tab20_aiannh20_county_20 to provide a match for the FIPS codes we expect to populate. 3234 rows. | | |
| Water Pollution | | | From this point: | | |

FIG. 113

| | | | | | |
|---|---|---|---|---|---|
| Water Pollution | | | 1. We have a view (dbo.vw_HealthRelatedViolations) that lists PWSID and countViolations for all systems we want to include in this time frame. To update the time frame we would change this table. This also excludes systems in military bases, American Samoa, Guam, Puerto Rico, Virgin Islands, and two abbreviations that I can't identify ('ON' which has no population, and 'PQ' that appears to be a Canadian border situation) - as NOT IN ('AP', 'AS', 'GU', 'ON', 'PR', 'PQ', 'VI') | | |
| Water Pollution | | | 2. We have a view (dbo.vw_PublicCommunityWaterSystems) that lists those systems (inner join on dbo.vw_HealthRelatedViolations, so this list will shift over time) and links them to a variety of geographies | | |
| Water Pollution | | | 1. Tribal code | | |
| Water Pollution | | | 2. County FIPS (ANSI_ENTITY_CODE) | | |
| Water Pollution | | | 3. City by name | | |
| Water Pollution | | | 4. County by name | | |
| Water Pollution | | | 3. Note that this table has multiple entries for multiple geography links. The prioritization for multiple measures is: | | |
| Water Pollution | | | 1. Tribal area to (multiple) county codes, plus county FIPS if available, summarized to distinct county FIPS identified with either method. (e.g. if Tribal area overlaps two counties, and one of those is identified directly, we will identify both counties. If Tribal area overlaps two counties and a third is identified directly, we will identify all three counties. I'm not sure this ever happens... and if there is no Tribal area identified, and county FIPS is identified, we use the county and stop looking for more geographies. If there is a Tribal area identified and | | |
| Water Pollution | | | 2. If no Tribal area is identified and no county FIPS is identified, we look at city or county by name. | | |

FIG. 114

| | | | | | |
|---|---|---|---|---|---|
| Water Pollution | | | 4. We have a view (dbo.vw_PublicCommunityWaterSystemsLocations) that lists counts and multiples of locations for each system | | |
| Water Pollution | | | 5. We have a view (dbo.vw_PublicCommunityWaterSystemsCounties) that summarizes dbo.vw_PublicCommunityWaterSystemsLocations as it links to countyFIPS codes. | | |
| Water Pollution | | | 6. We have a view (dbo.vw_PublicCommunityWaterSystemsMissingCounties) that matches the missing county records from dbo.vw_PublicCommunityWaterSystemsLocations to those records in dbo.vw_PublicCommunityWaterSystemsCounties where countymatch = 0 -- when we have all systems identified this will be empty. | Script | Script saved to \\aelk3p02sas.uhc.edu\Analyst_G\DS Work\SDOH\Public Data\EPA as SDWIS_VVI.sql |

FIG. 115

Table 1: ZCTA tabulation counts for each subsequent $k^{th}$ ring. In all cases, the 0-Ring corresponds to a single county. ZCTAs added via queen contiguity

| | Total ZCTAs | | |
|---|---|---|---|
| Anchoring 0-Ring | 1-Ring | 2-Ring | 3-Ring |
| Charlevoix County MI | 64 | 107 | 176 |
| Emmet County MI | 40 | 73 | 117 |
| Mackinac County MI | 33 | 102 | 161 |

FIG. 116

Algorithm 1 Imputation Algorithm

```
Extract centroids from all tracts.
for variable v = 1, ..., 10 do
    Identify all T tracts missing variable v values and 72,410 − T tracts with non-missing variable v values.
    for buffered distances b = 5, 10, 20, 100, 2500 km do
        for missing tract t = 1, ..., T do
            Convert tract-t coordinates to latitudinal and longitudinal (l_1, l_2).
            Project (l_1, l_2) to azimuthal-equidistant coordinates (a_1, a_2) centered on (l_1, l_2).
            Calculate distances between missing-tract-t projected-centroid (a_1, a_2) and all 72,410 − T non-missing v values.
            if there exists at least 1 non-missing azimuthal-equidistant coordinate v value with distance < b then
                Identify up to the 3 closest non-missing azimuthal-equidistant coordinates to t.
                Impute for missing t via inverse distance weighting, with a power of 2, using the identified 3 closest.
            end if
        end for
    end for
    Stack imputed values over all buffered distances b
end for
Combine all variable v results.
```

FIG. 117

SERVERS, SYSTEMS, AND METHODS FOR MAPPING ATTRIBUTES TO A GEOGRAPHICAL LOCATION

CROSS-REFERENCE TO RELATED APPLICATIONS

This application claims the benefit and priority to U.S. Provisional Application No. 63/332,995, filed Apr. 20, 2022, and U.S. Provisional Application No. 63/332,580, filed Apr. 19, 2022, each of which is hereby incorporated herein by reference in its entirety for all purposes.

COPYRIGHT PROTECTION

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND

Health care organizations sometimes rely on data to identify health issues and social vulnerabilities that significantly impact their patients. However, analyzing publicly available data to understand patients' specific obstacles to care is challenging and makes it difficult for hospitals to provide the right resources for the right people to improve health equity.

For example, patient data provided by Medicare and Medicaid includes information for only a subset of patients, and without complete health care data on all patients, hospitals are left with a fragmented picture of their patient population's health. While data available from the CDC's Social Vulnerability Index as well as other sources like the Distressed Communities Index and Area Deprivation Index do an excellent job of identifying poverty, they fall short when analyzing other issues including specific, neighborhood-level risk factors.

Additionally, multiple layers of social determinants of health complicate producing accurate measurements of equity. It is not a simple problem to identify the areas within a provider's control or within a payer's control while considering the context of policy and structural inequities. Real change requires action outside of providers' and payers' scope. Change requires accurate and specific measures of all layers of social determinants of health. Metrics need to be clearly placed in the context of the whole system—focusing on areas where action is possible and accounting for the constraints of everything else, but not adjusting away the real sources of inequity.

The long-standing debate of including social needs, race, ethnicity and language ("REAL") and sexual orientation and gender identity ("SOGI") considerations into risk adjustment involves two significant points of view: including risk factors to improve risk adjustment accuracy and more accurately reflecting provider performance. However, these views run the risk of masking social needs and potential inequities. For measures where the provider locus of control is not clearly aligned with measurement, these measures should not be risk adjusted for social needs factors until clearer provider equity assessment is available.

The combination of concordant geographic units defines local healthcare communities. Typical units subsume Census blocks, Census tracts, and ZIP-Code Tabulation Areas (ZCTAs), a simplified Census version of United States Postal Service (USPS) ZIP Codes. Utilization also includes larger units, such as counties. Generally, estimates of neighborhood variability benefits from smaller geographies, as these more readily homogenize local social determinants of health (a previous reference to the Modifiable Areal Unit Problem [MAUP]?). ZIP Codes enjoy wide use within healthcare due to their inclusion on UB-04 insurance claims, making ZCTAs and Census data a convenient means for inference [American Hospital Association, 2022].

The construction of communities radially around a center point of interest (e.g., the latitudinal and longitudinal location of a hospital), include all geographic units within a fixed radial distance from the defined center. The inclusion of areas in which no population resides, e.g., mountain ranges and ocean, is an obvious downside to the radial approach. A radial extent around a hospital in land-locked Kansas City means something different when applied to the oceanside city of Los Angeles.

Therefore, there is a need in the art for a system that provides a clearer equity provider assessment to isolate and better identify provider opportunities. Furthermore, there is a need for a system that leverages social needs factors to output more accurate risk assessments.

SUMMARY

In some embodiments, the disclosure is directed to a system for improving mapping accuracy for a distribution of a vulnerability index. In some embodiments, the system comprises one or more computers comprising one or more processors and one or more non-transitory computer readable media. In some embodiments, the one or more non-transitory computer readable media include program instructions stored thereon that when executed cause the one or more computers to execute one or more algorithm steps. In some embodiments, a step includes to receive, by the one or more processors, mapping data from one or more population databases. In some embodiments, the mapping data comprises at least one map. In some embodiments, a step includes to receive, by the one or more processors, population data from the one or more population databases. In some embodiments, a step includes to receive, by the one or more processors, domain data from one or more domain databases. In some embodiments, a step includes to execute, by the one or more processors, an imputation algorithm configured to combine the mapping data, the population data, and the domain data into index data.

In some embodiments, a step includes to modify, by the one or more processors, the at least one map using the index data to generate an index map. In some embodiments, a step includes to display, by the one or more processors, the at least one map a graphical user interface. In some embodiments, the mapping data comprises one or more tracts. In some embodiments, each of the one or more tracts includes polygonal boundaries defining a geographical area on the at least one map.

In some embodiments, the imputation algorithm comprises program steps that cause the one or more computers to execute, by the one or more processors, an attempted assignment of at least a portion of the population data to each of the one or more tracts. In some embodiments, a step includes to execute, by the one or more processors, an attempted assignment of at least a portion of the domain data to each of the one or more tracts. In some embodiments, the imputation algorithm comprises program steps that cause the one or more computers to identify, by the one or more processors, one or more tracts comprising missing data. In some embodiments, the missing data includes the population data and/or the domain data.

In some embodiments, the imputation algorithm comprises program steps that cause the one or more computers to identify, by the one or more processors, one or more candidate tracts with non-missing data closest to the one or more tracts with the missing data. In some embodiments, the imputation algorithm comprises program steps that cause the one or more computers to execute, by the one or more processors, a missing data assignment of at least a portion of the population data and/or of at least a portion of the non-missing data from the one or more candidate tracts to the one or more tracts with the missing data.

In some embodiments, wherein the system is configured to execute shapefiles configured to simplify three-dimensional curvilinear polygonal extents on Earth's spherical surface via two-dimensional planar polygonal extents. In some embodiments, the domain data comprises one or more variables. In some embodiments, the system is configured to execute the missing data assignment for each of the one or more variables. In some embodiments, the imputation algorithm comprises program steps that cause the one or more computers to determine, by the one or more processors, a centroid for each of the one or more tracts. In some embodiments, a step includes to convert, by the one or more processors, each centroid for the one or more tracts with the missing data to latitudinal and longitudinal coordinates.

In some embodiments, the imputation algorithm comprises program steps that cause the one or more computers to define, by the one or more processors, a custom azimuthal equidistant projection for each centroid. In some embodiments, the imputation algorithm comprises program steps that cause the one or more computers to generate, by the one or more processors, at least one buffer encompassing at least one of each centroid.

In some embodiments, the system is configured to execute one or more of a bridging algorithm, a ferrying algorithm, and a ringing algorithm. In some embodiments, the bridging algorithm is configured to ensured connectivity over one or more of a population void over water and a population void over land by identifying bridges. In some embodiments, the ferrying algorithm is configured to ensured connectivity over one or more of a population void over water and a population void over land by identifying ferry routes. In some embodiments, the ringing algorithm is configured to identify one or more neighboring tracts at a predetermined distance from a centroid of a tract.

In some embodiments, "Health equity" and "Social Determinants of Health" (SDoH) are terms often used in health care to brand measured needs in underserved populations and communities. In some embodiments, in many of those communities, the connection between people and the issue surrounding those needs is fragmented and disconnected. Some embodiment described here work to change this through the execution of a unique system that includes a vulnerability index that serves as a singular clinical data index for SDoH at the neighborhood level. In some embodiments, the system is designed to support members' existing health equity strategy.

In some embodiments, by leveraging member data in a system's Clinical Data Base (CDB) such as the one commercially available from Vizient, Inc., a vulnerability index can be provided. In some embodiments, the vulnerability index outputs and/or displays neighborhood-level data which enables members to understand the context around the obstacles that patients face in accessing health care and to quantify the direct relationship between those obstacles and patient outcomes personalized to their communities.

In some embodiments, when looking at health disparity in different areas, outside factors like access to transportation play a key role. In some embodiments, especially in rural America, people typically live farther from a primary care doctor and a hospital. This factor intersects with access to transportation which creates obstacles to accessing care. Leveraging CDB data, CDB subscribers to the system can view their member-specific profile to measure community health care needs within the scope of a hospital or its partnerships with a community which helps to identify the unique clinical metrics that impact people differently in the context of different obstacles to care.

In some embodiments, the vulnerability index described herein is configured to go beyond the basic characterization of health disparity—namely, poverty. The CDC's Social Vulnerability Index as well as others like the Distressed Communities Index and Area Deprivation Index identify poverty but fall short on other specific, actionable components of neighborhood-level risk factors. In some embodiments, the vulnerability index is configured to analyze a robust database of neighborhood factors that can pair with actual clinical information from the CDB. In some embodiments, the vulnerability index provides outputs and displays to show SDoH is more complex than just poverty impacting vulnerable populations. In some embodiments, the system is configured to accept as inputs factors influencing community health and correlate them to socioeconomic, transportation, food insecurity and/or chronic health issues like diabetes, hypertension and heart disease. In some embodiments, one strength of the vulnerability index is the flexibility to work the data. In some embodiments, it's not just a single index of information applied to the entire country. In some embodiments, the contribution of each factor flexes geographically: what is important in New York City might not be the same as what is important in Nebraska. In some embodiments, the system is configured to enable a user to add, remove, and rebalance data sources based on the unique characteristics of distinct locations as well as economic, lifestyle and health differences in those populations.

In some embodiments, the vulnerability index is configured to receive zip codes and publicly available data from the U.S. Census Bureau, U.S. Department of Housing and Urban Development, U.S. Department of Agriculture and U.S. Environmental Protection Agency into one or more system modules described herein. In some embodiments, unique to the vulnerability index is the ability to integrate data from Vizient, Inc.'s CDB. In some embodiments, the system database functions as a component of a definitive analytics platform for performance improvement and a repository of proprietary data for members.

In some embodiments, the vulnerability index integrates CDB data from 789 member hospitals and 88 million distinct patients of all ages and payor groups with data from the U.S. Census Bureau, U.S. Department of Housing and Urban Development, U.S. Department of Agriculture and U.S. Environmental Protection Agency. In some embodiments, the index is configured to distinguish specific neighborhood vulnerabilities and their impact on community health outcomes and life expectancy.

In some embodiments, the Vizient Vulnerability Index identifies one or more (e.g., eight) social determinants of health domains that when combined with CDB data give hospitals a deeper understanding of the obstacles their patients face in accessing health care and how those obstacles impact patient outcomes. In some embodiments, by identifying specific obstacles to care, intervention strategies can be defined and tested, and with the identification of provider peer groups that serve similar neighborhoods, best practices can be shared.

In some embodiments, the vulnerability index is configured to characterize health system patient community vulnerabilities and/or identify key social determinants of health factors driving vulnerabilities within the community. In some embodiments, the Vizient Vulnerability Index is configured to provide insights between community vulnerability and patient outcomes that could inform potential interventions, and/or identify specific vulnerabilities associated with specific risks and patient outcomes and contribute to a patient-centered, longitudinal approach to outcomes, that extends beyond the inpatient acute-care focus. In some embodiments, the vulnerability index is configured to identify peer hospitals with similar health equity challenges and/or output peer-to-peer comparisons based on specific health equity challenges and identify hospitals that have developed effective interventions that could be best practices in the context of their patient population.

In some embodiments, while other vulnerability indices lack clear insights, layering in CDB data enables the system to identify and display to users trends and patterns in utilization as well as associated cost drivers unique to the high-impact or underserved areas their facilities serve. In some embodiments, users recognize they have vulnerable populations within their markets. In a non-limiting example, the system can enable a user to address readmissions reduction for their heart failure patients by increasing the availability of primary care and chronic disease management for patients in their most vulnerable neighborhoods. In some embodiments, the vulnerability index can show that this population was vulnerable because transportation and access issues that led to a lack of prenatal care, poor nutrition, hypertension, diabetes and other chronic diseases. In some embodiments, if a member provider has a system to calculate the vulnerability index that verifies these data points, the member has an informed opportunity to improve patient care.

In some embodiments, the system is configured to output and/or display insights from the data that are comprehensive and will distinguish specific vulnerabilities among members' patients' neighborhoods and populations. In some embodiments, markets with a high incidence of diabetes, as a non-limiting example, can execute the system to obtain additional insight to learn if housing, transportation, poverty or whether being located in a food desert are underlying causes of growing health problems.

In some embodiments, for all patients, knowing their zip code, exactly what neighborhoods they come from, the vulnerabilities associated with those neighborhoods, as well as clinical outcomes and utilization, all provide the necessary points that correlate highly with some domain or component of the vulnerability index.

DRAWING DESCRIPTION

FIG. 3 shows various prior art indices as compared to the index output by the system according to some embodiments.

FIG. 5 shows prior art equity data collection factors as compared to those incorporated into the system according to some embodiments.

FIG. 25 illustrates a system output that includes specific domains and components with high vulnerability according to some embodiments.

FIG. 27 illustrates a system output that displays overall statistics and measures of vulnerability according to some embodiments.

FIG. 28 illustrates Great State system diabetes incidence and complications statistics outputs according to some embodiments.

FIG. 42 shows Great State System Emergency Department utilization statistics according to some embodiments.

FIG. 55 depicts great state system maternity care statistical outputs according to some embodiments.

FIG. 68 shows Great State breast cancer statistics generated by the system according to some embodiments.

FIG. 89 depicts how the community contracting module supports various aspects of the system according to some embodiments.

FIG. 91 depicts social, economic, local, and investment impacts of the community contracting module executing in conjunction which various aspects of the system according to some embodiments.

FIG. 92 shows how scaling the system across a state fuels unique value according to some embodiments.

FIG. 94 depicts various tract boundaries according to some embodiments.

FIG. 95 shows the state of Michigan partitioned by the system according to some embodiments.

FIGS. 96-98 depict the results of the ringing process for each of the three counties according to some embodiments.

FIG. 99 shows a non-limiting example Algorithm 1 summarizing one or more steps in the Imputation Algorithm according to some embodiments.

FIG. 100 shows a non-limiting example Algorithm 2 summarizing an example of the Bridging Algorithm according to some embodiments.

FIG. 101 depicts a non-limiting example Algorithm 3 summarizing one or more ferrying algorithm computer implemented steps according to some embodiments.

FIG. 102 shows a non-limiting example Algorithm 4 summarizing the Ringing Algorithm according to some embodiments.

FIG. 103 depicts a non-limiting example Algorithm 5 which itemizes each step in applying the prediction methodology described herein to define a spatial cross-validation procedure.

FIGS. 104-111 depict a table with various non-limiting process steps according to some embodiments.

FIGS. 112-115 show a table with various non-limiting process steps for a water solution subprocess according to some embodiments.

FIG. 116 show ZCTA tabulation counts according to some embodiments.

FIG. 117 shows a non-limiting example of one or more steps for an imputation algorithm according to some embodiments.

DETAILED DESCRIPTION

In some embodiments, the system is configured to standardize cultural identity data (e.g., Real and SOGI). In some embodiments, the system is configured to measure community social needs and structural inequities. In some embodiments, the system is configured to measure provider equity. In some embodiments, the system is configured to collect patient-specific social needs factors.

In some embodiments, standardizing cultural identity data includes providing clear clinical value and reducing provider burden. In some embodiments, standardizing cultural identity data includes setting a standard that reflects the diverse US population, and/or aligning to the Center for Disease Control (CDC) recommended race and ethnicity code list (CDC-Race-Ethnicity-Background-and-Purpose). In some embodiments, a patient sharing personal information requires trust, and needs to be asked in a way that empowers the patient and aligns with patient care. In some embodiments, standardizing cultural identity data includes the system enabling patient self-reported and populated REAL & SOGI, which improves likelihood of accuracy. In some embodiments, the system is configured to (e.g., using SOGI data) collect and communicate preferred patient information such as, in a non-limiting example, correct pronouns, to a patient-provider. To reduce the burden of data collection, in some embodiments, the system is configured to expand the Centers for Medicare & Medicaid Services (CMS) beneficiary sociodemographic profile, and/or expand Electronic Health Record (HER) vendor data standardization.

Figure 1:
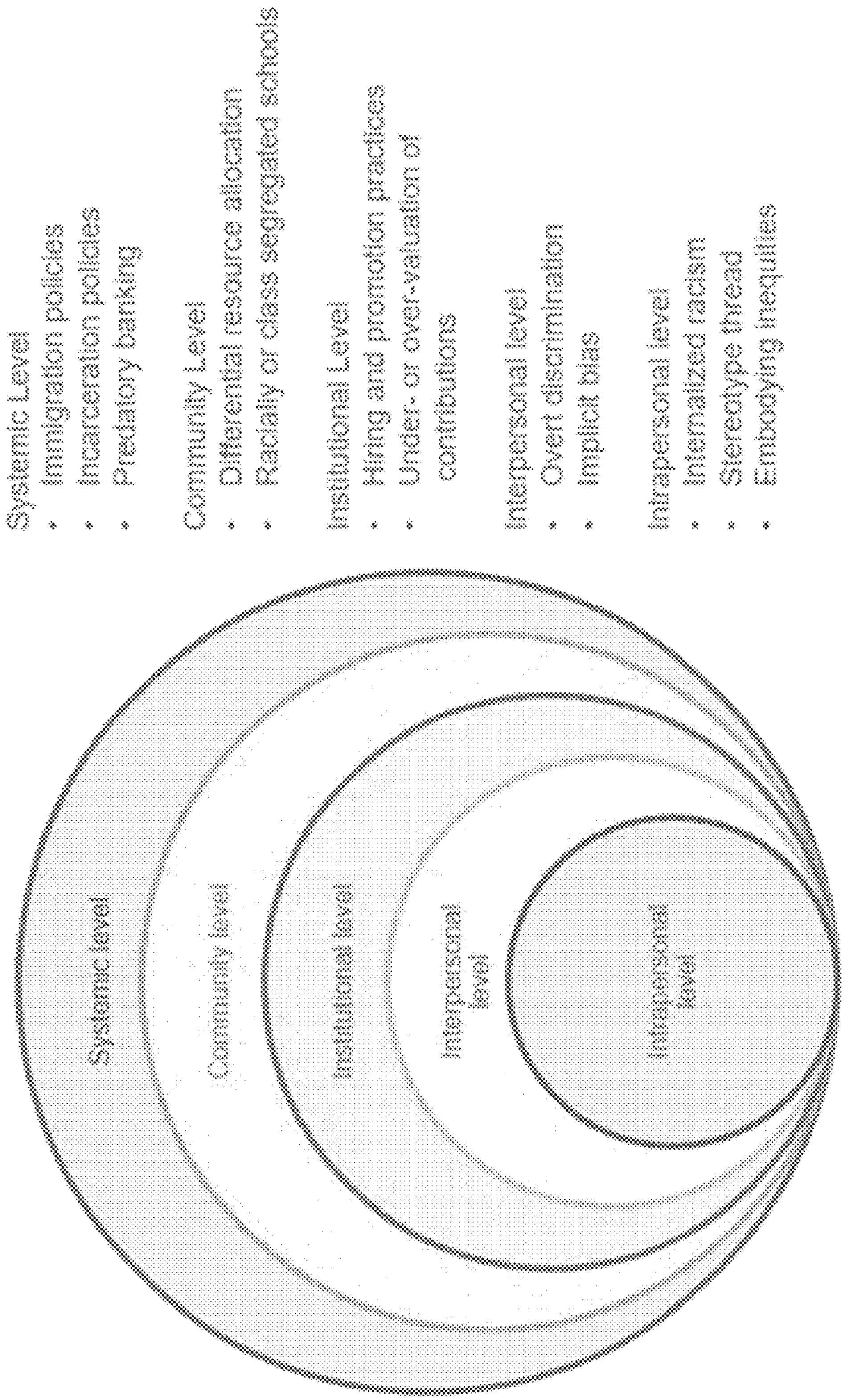
FIG. 1 shows nested layers analyzed by the system for measuring community social needs and structural inequities according to some embodiments.

FIG. 1 shows nested layers analyzed by the system for measuring community social needs and structural inequities according to some embodiments. In some embodiments, health inequity has its roots in a whole system of issues of different scopes and sources. In some embodiments, some of the needs are within a hospital or payer's control and some are not, but all need to be addressed. In some embodiments, the system is configured to address sources of health inequities in partnership with the communities. In some embodiments, the system is configured to create a comprehensive measurement across the nested layers shown in FIG. 1.

Figure 2:
FIG. 2 shows a map of the United States depicting a range of less vulnerable to more vulnerable areas according to some embodiments.

In some embodiments, the system is configured to analyze the effects of structural inequities when determining a solution to health equity. FIG. 2 shows a map of the United States depicting a range of less vulnerable to more vulnerable areas according to some embodiments. In some embodiments, the system is configured to include in a determination one or more factors including one or more of: disenfranchisement, incarceration rates, local school funding, wealth, segregation of people, environmental conditions (e.g., clean air and water) and segregation of opportunity.

In some embodiments, the system is configured to quantify community challenges which includes complete and accurate measurement of social needs. In some embodiments, the system is configured to analyze and/or provide accurate and specific data on community challenges and provide outputs that drive real improvement in people's lives. Indices reflecting poverty only and not combinations of obstacles to care, such as those in the prior art are less actionable. In some embodiments, the system is configured to identify the specific community obstacles to care that align with specific clinical risk. In some embodiments, the output of this identification includes displays which enable a user to focus efforts where they will be most effective. In some embodiments, the system is configured to identify community partners and stakeholders with the means to make meaningful changes. In some embodiments, the system is configured to measure results against relevant peers and in the context of those specific relevant obstacles.

FIG. 3 shows various prior art indices as compared to the index output by the system (far right column: vulnerability index) according to some embodiments. In some embodiments, prior art indices include one or more of Area Deprivation Index, Distressed Communities Index, Social Vulnerability Index, Intercity Hardship Index, and AHRQ Socioeconomic Status Index. In some embodiments, each of these indices are compared to the system output by one or more of Data Granularity, Timeliness, Social Determinants of Health Domains, Health Care Focus, Measurement Focus, and Geospatial Adjustments.

In some embodiments, Data Granularity comprises factors which include one or more of county, zip code, census tract, and block group. In some embodiments, Timeliness comprises factors which include periodic updates. In some embodiments, Social Determinants of Health Domains comprises factors that include one or more of income and wealth, employment, education, housing, health systems, transportation, social environment, physical environment, and public safety. In some embodiments, Health Care Focus comprises factors that include life expectancy and/or mortality, chronic disease prevalence, readmissions, Emergency Department (ED) utilization, and maternal health. In some embodiments, Measurement Focus comprises factors that include calculations that describe differences in life expectancy. In some embodiments, Geospatial Adjustments comprises algorithms that correlate life expectancy by area and/or location.

As shown in the chart, some embodiments of the system include all of these factors in calculating the index, where any one of the prior art indices does not. Reviewing each of the prior art indices individually or together does not create the comprehensive index provided by the system as an output according to some embodiments.

Figure 4:
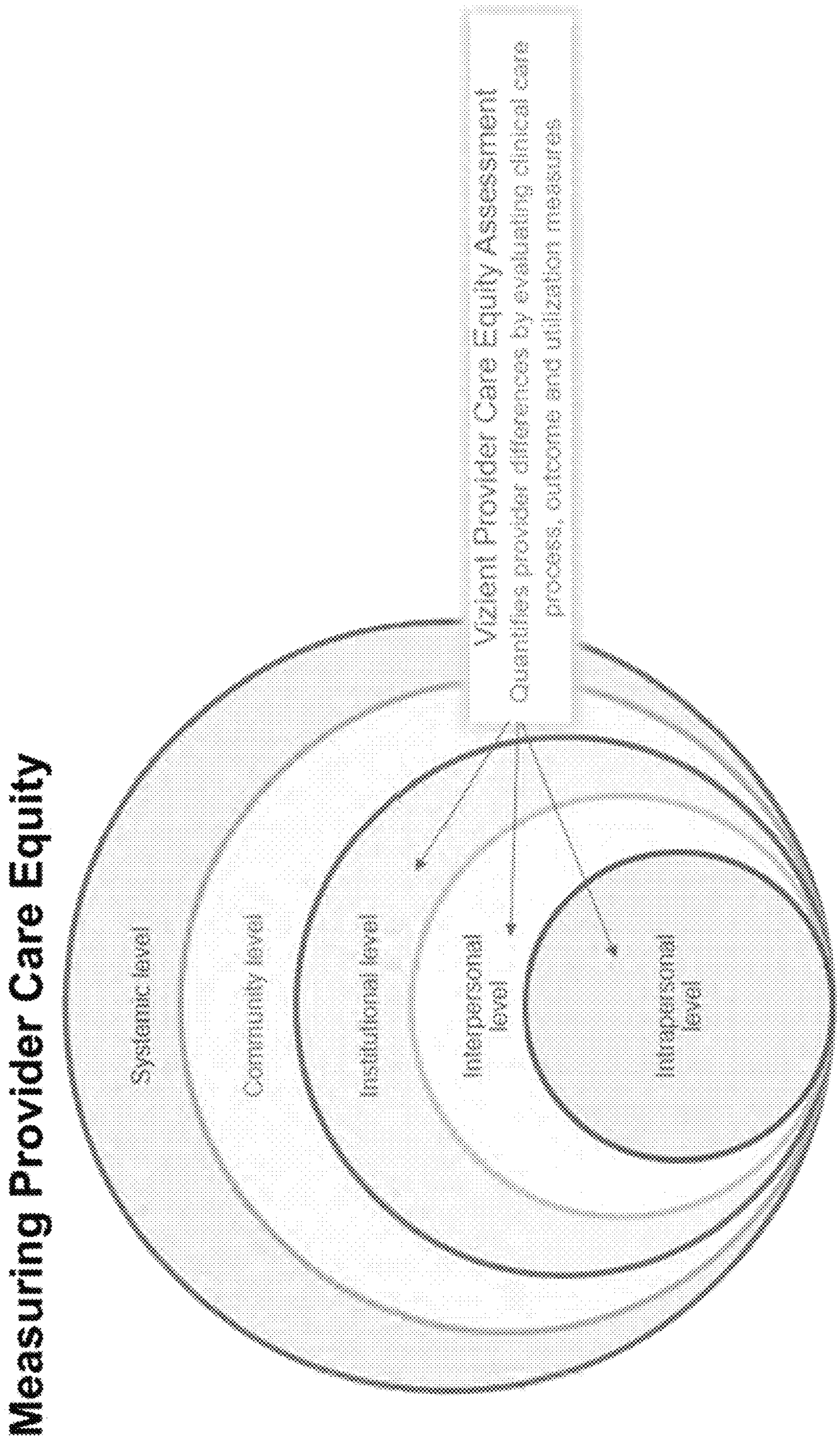
FIG. 4 illustrates a portion of how the system measures provider care equity according to some embodiments.

FIG. 4 illustrates a portion of how the system measures provider care equity according to some embodiments. In some embodiments, the system is configured to quantify provider differences by evaluating clinical care process, outcome, and utilization measures across one or more of an institutional level, an interpersonal level, and an intrapersonal level. In some embodiments, an equity measurement framework provided by the system helps to drive change. In some embodiments, the system is configured to evaluate providers in equity leveraging one or more of the following factors: provider locus of control; clinically meaningful and cohesive patient population assessment; evaluation of access to care, process measures, outcome measures, resource allocation; detailed encounter level assessment available; inter- and intra-provider assessments; meaningful stratification (race, ethnicity, gender); and appropriate and thoughtful use of risk adjustment.

FIG. 5 shows prior art equity data collection factors as compared to those incorporated into the system according to some embodiments. In some embodiments, prior art equity data resources include one or more of the U.S. News and World Report, the Lown Institute Inclusivity Index, the Sutter Health Equity Score, the County Health Rankings, and the NCQA. In some embodiments, one or more factors included in calculations by the system come from an Equity Domain database commercially available from Vizient, Inc.

In some embodiments, equity calculations comprise Data Granularity factors that include one or more of encounter level, patient level, provider level, hospital level, and hospital service area and/or county level. In some embodiments, equity calculations are a function of when measures were established, with the Equity Domain database comprising far more datapoints than prior art systems resulting in more accurate results. In some embodiments, equity calculations comprise timeliness factors that include when the resources are updated. In some embodiments, equity calculations comprise measurement focus factors that include one or more of access to care, patient outcomes, provider process of care, and resource utilization.

In some embodiments, equity calculations comprise comparison factors that include one or more of interhospital evaluation and/or ranking and intrahospital evaluation. In some embodiments, equity calculations comprise provider locus control. In some embodiments, equity calculations comprise risk adjustment factors that include one or more of provider control over access to care, community needs, and patient options. In some embodiments, equity calculations comprise risk adjustment factors that include one or more of community factors (SVI) such as race, and risk adjusted unplanned readmissions. In some embodiments, equity calculations comprise stratification factors that include one or more of race, payer, gender, ethnicity, education, and income. In some embodiments, equity calculations comprise measure weighting factors that include one or more of process, outcomes, inclusivity, community benefit, and pay equity. In some embodiments, equity calculations comprise statistical significance factors that include one or more of bootstrapping or Fisher Exact Test for significant differences, which include differences by race.

In some embodiments, the system is configured to collect patient-specific social needs. In some embodiments, the system is configured to supply support to providers to enable gathering information about social needs challenges. In some embodiments, the support enables the system to execute one or more of: data standardization including REAL, SOGI, community, and patient-specific social needs factors; measurement including provider-specific social needs reporting, equity provider measure assessment, and/or Accountable Community Care Organization (ACCO) performance evaluation; infrastructure and support including IT & EHR recommendations, cultural, equity & community resource integration guidelines, framework & collaborations; and incentive plans including ACCO resource allocation structure, pay for performance realignment to incorporate equity, and/or social needs improvement.

In some embodiments, the system includes a Provider Equity Assessment configured to analyze outcomes, processes, access to care and resource utilization within a provider's locus of control (inter- & intra-), as well as quantify providers' Medicare beneficiary community social needs using a comprehensive index to support more community-specific efforts. In some embodiments, the system is configured to implement cultural identity (REAL) and SOGI data collection standards consistent with CDC code categories & data quality reporting. In some embodiments, the system includes person-specific social needs data collections standards encompassing a complete set social need domains. In some embodiments, the system includes culturally intelligence (CI) assessment & training to expand healthcare providers experience in support culturally diverse patient populations. In some embodiments, the system includes an Accountable Community Care Organization that includes providers, CMS and community supporters.

Figure 6:
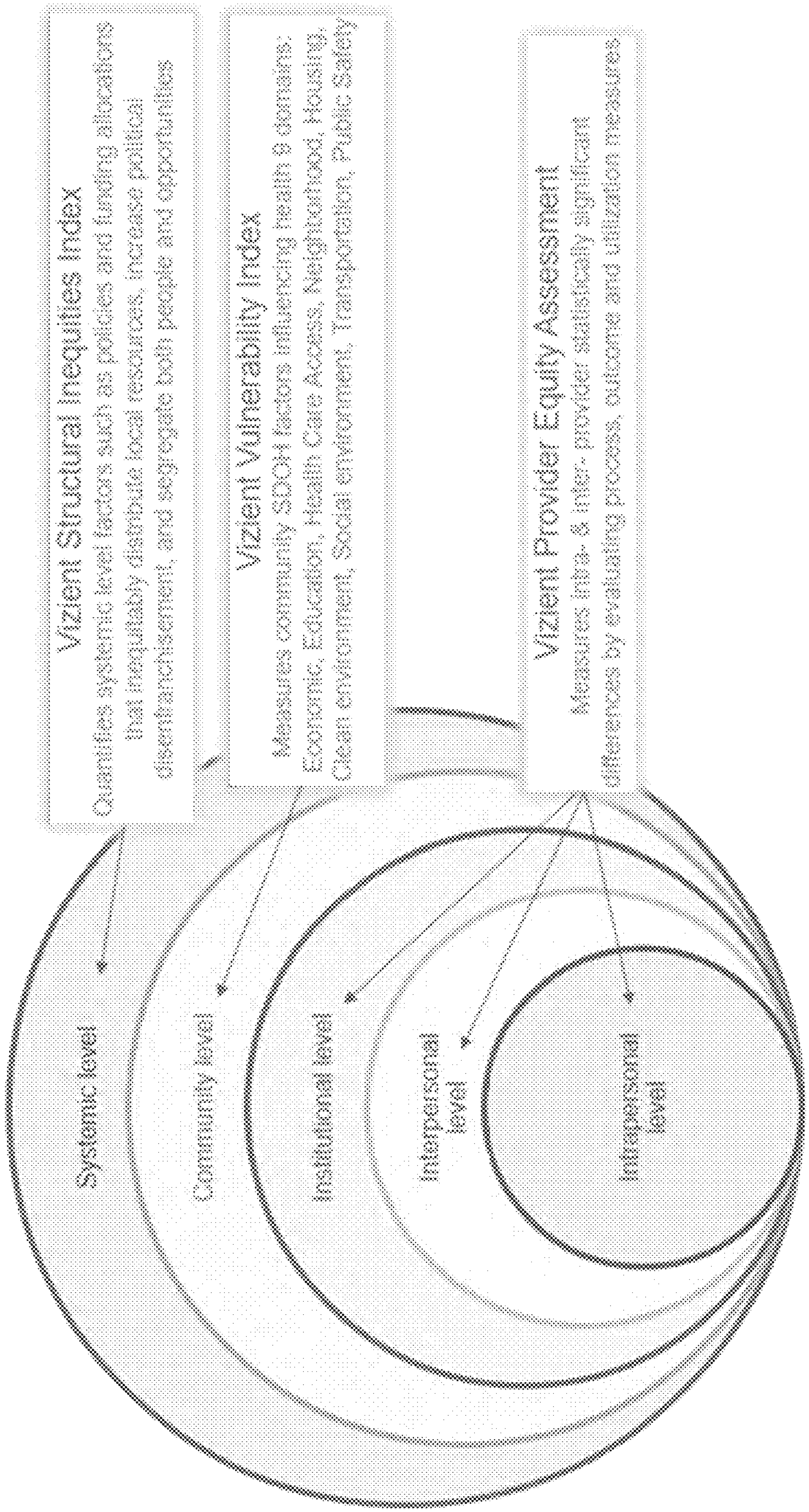
FIG. 6 illustrates how one or more system modules accept equity data inputs at various levels during risk assessment.
Figure 7:
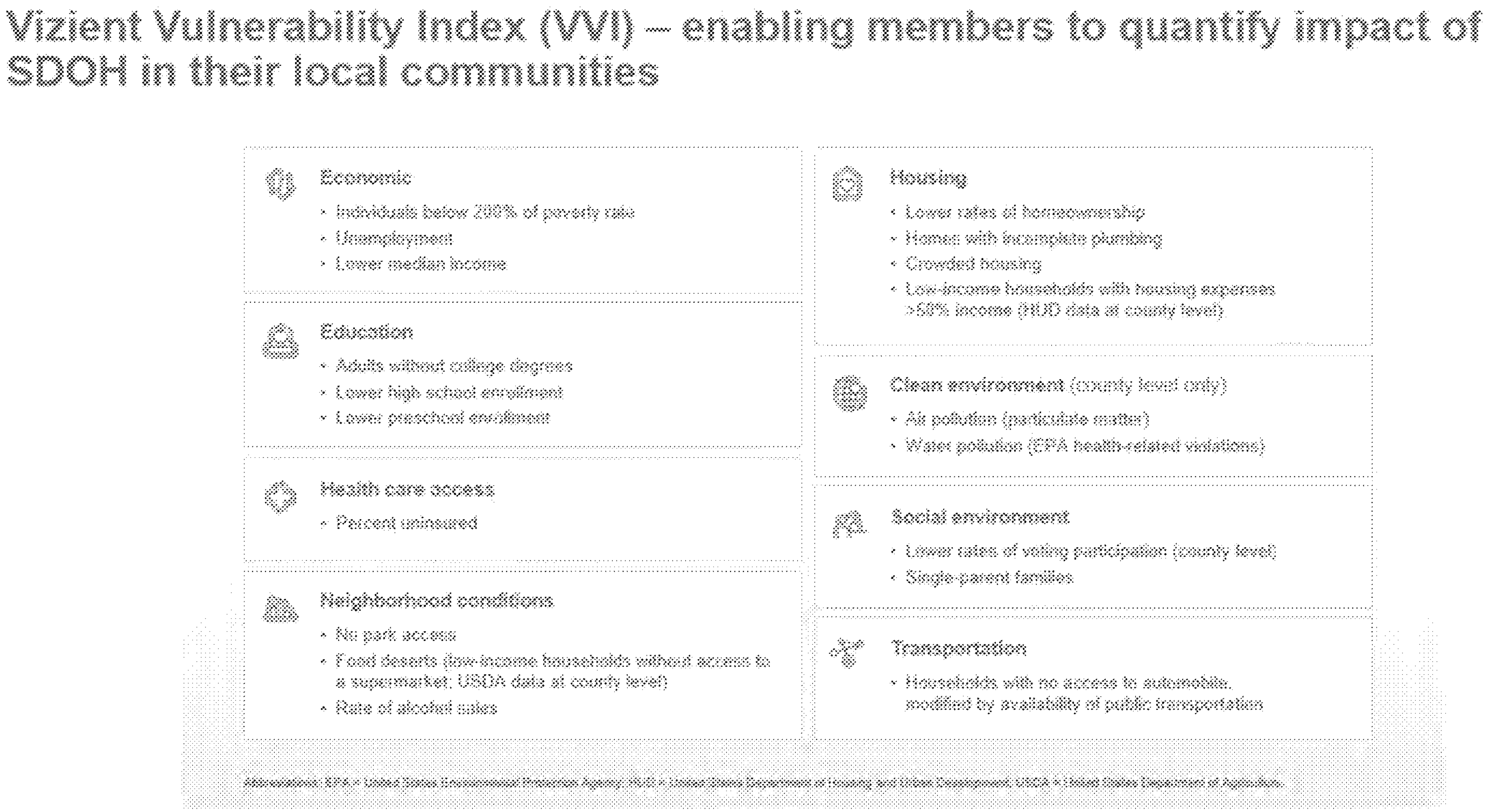
FIG. 7 shows how implementations of the vulnerability index enable members to quantify the impact of SDOH in their local communities according to some embodiments.
Figure 8:
FIG. 8 show a vulnerability index national map according to some embodiments.
Figure 9:
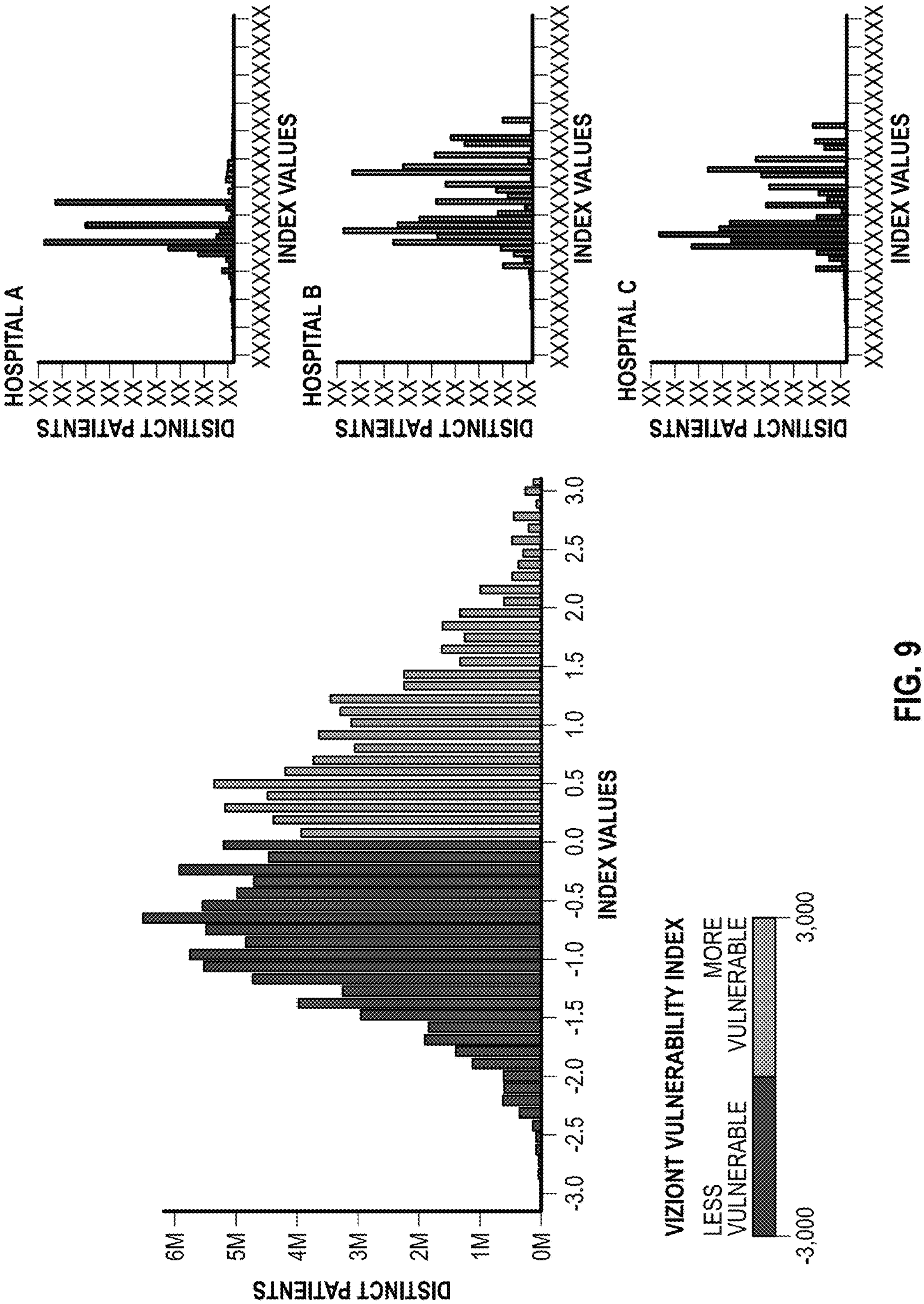
FIG. 9 illustrates a system output displaying how patient distributions by vulnerability index vary among CDB hospitals according to some embodiments.
Figure 10:
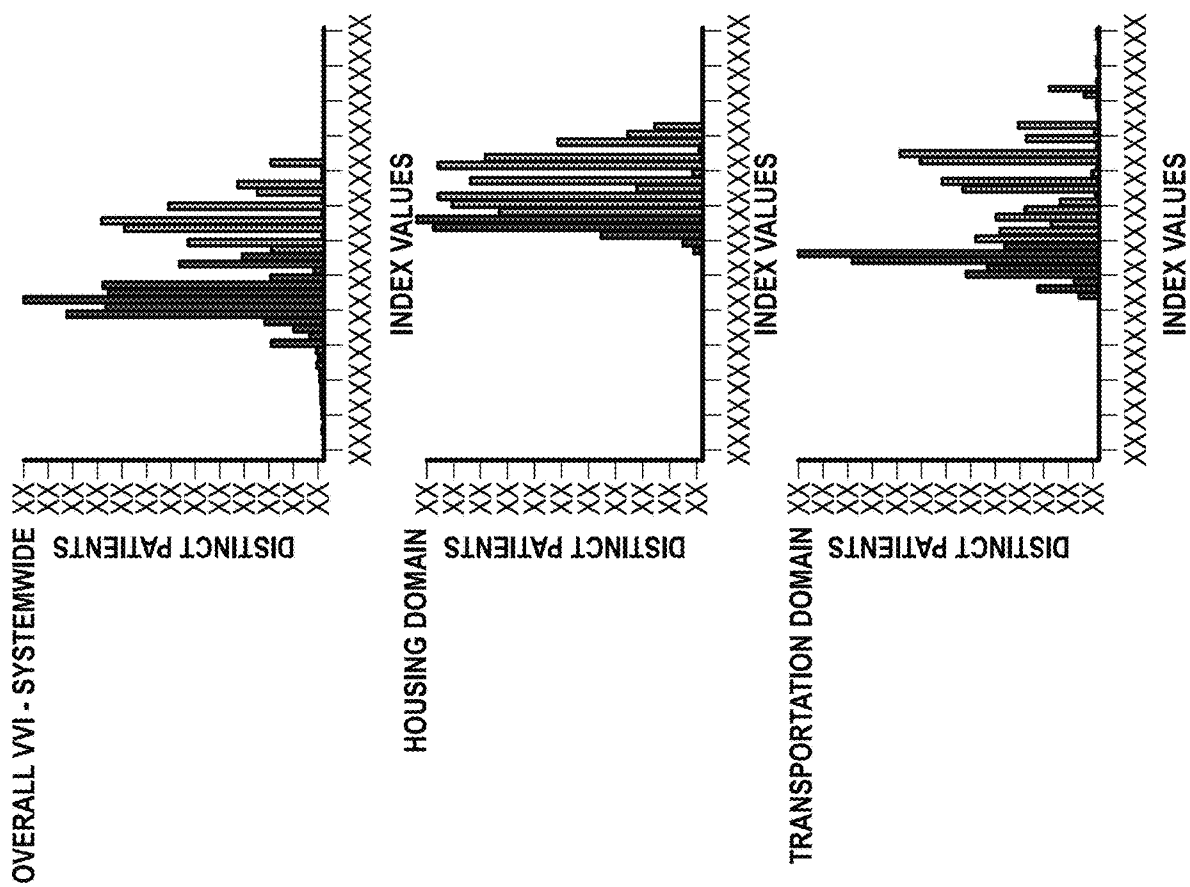
FIG. 10 depicts system outputs showing how specific housing and transportation vulnerabilities are more common in neighborhoods served by hospitals according to some embodiments.
Figure 11:
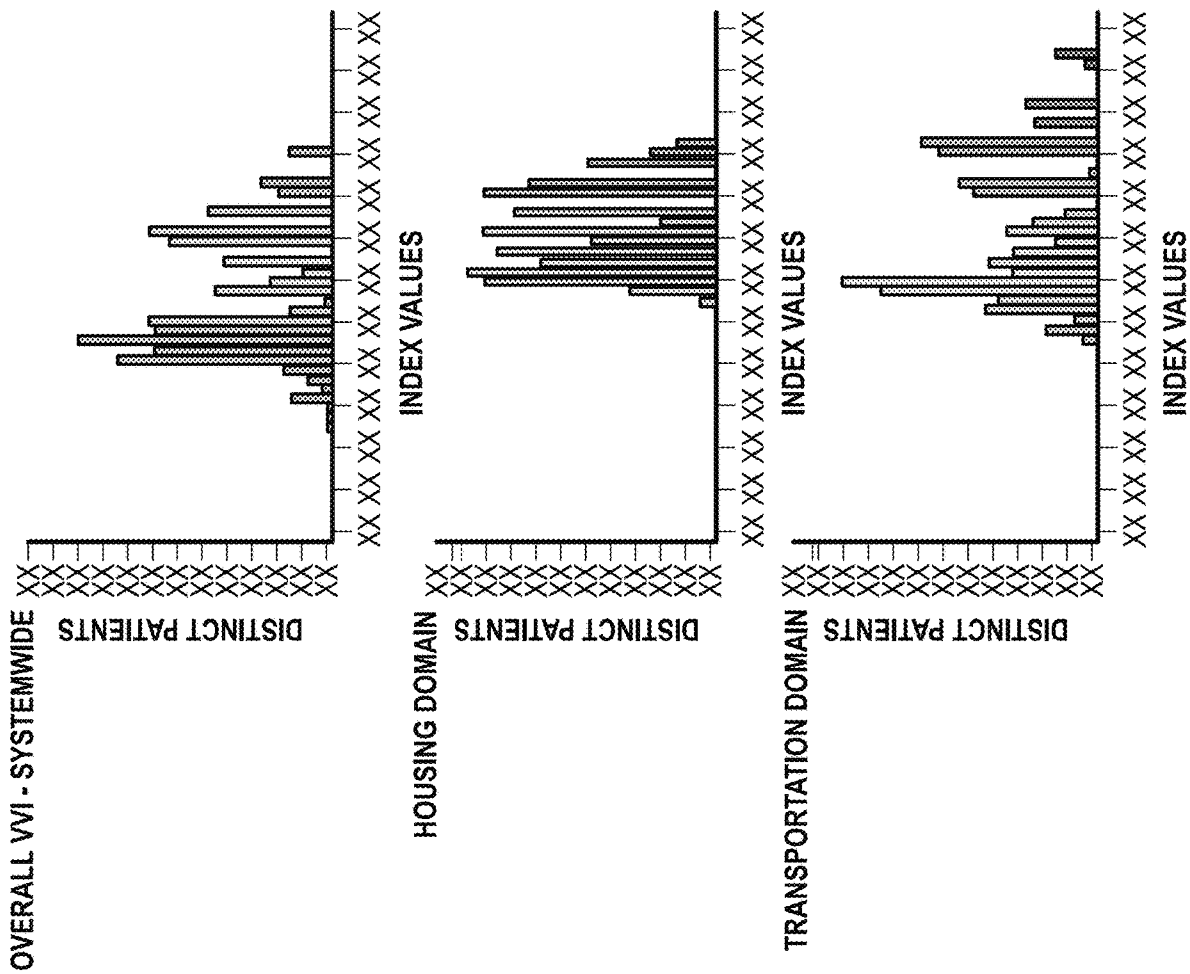
FIG. 11 depicts further system outputs showing how specific housing and transportation vulnerabilities are more common in neighborhoods served by hospitals according to some embodiments.
Figure 12:
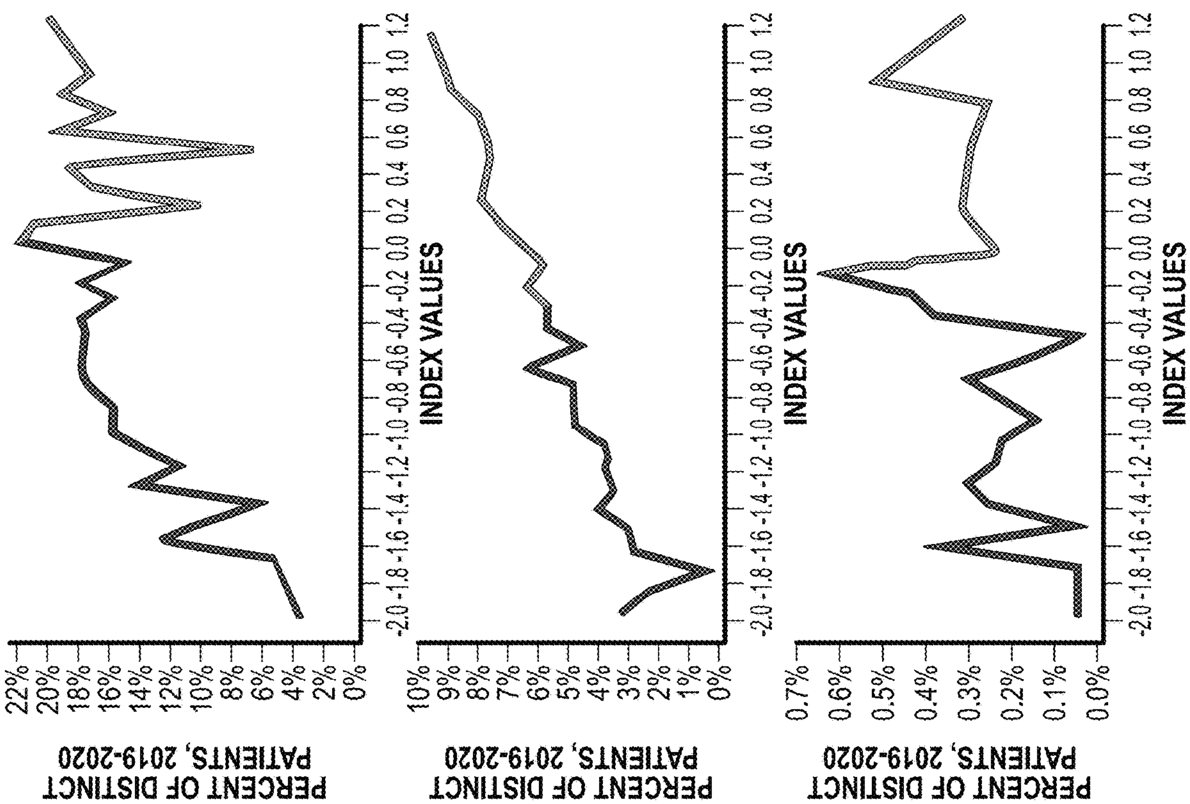
FIG. 12 shows health system-wide correlations to diabetes incidence and outcomes according to some embodiments.

FIG. 6 illustrates how one or more system modules accept equity data inputs at various levels during risk assessment. In some embodiments, a structural inequities index module is configured to quantify systemic level factors such as policies and funding allocations that inequitably distribute local resources, increase political disenfranchisement, and segregate both people and opportunities. In some embodiments, a vulnerability index module is configured to measure community SDOH factors influencing health 9 domains: economic, education, health care access, neighborhood, housing, clean environment, social environment, transportation, and public safety. FIGS. 7-12 show various vulnerability index module inputs and outputs according to some embodiments.

In some embodiments, the system includes a provider equity assessment module configured to measure intra- & inter-provider statistically significant differences by evaluating process, outcome and utilization measures. In some embodiments, the structural inequities index module comprises data describing social factors that particularly relate to policy and funding decisions at a local level, that can be measured both as an absolute effect (such as high or low incarceration rates) as well as in terms of their variability across the area (segregation of opportunity) and alignment to the segregation of people by race in the same area. In some embodiments, a high structural inequity index score calculated by the system reflects a neighborhood with high rates of disenfranchisement and incarceration and low rates of local school funding and wealth compared to its region, that is segregated by race, and where the racial distribution and resource distribution are correlated.

Figure 13:
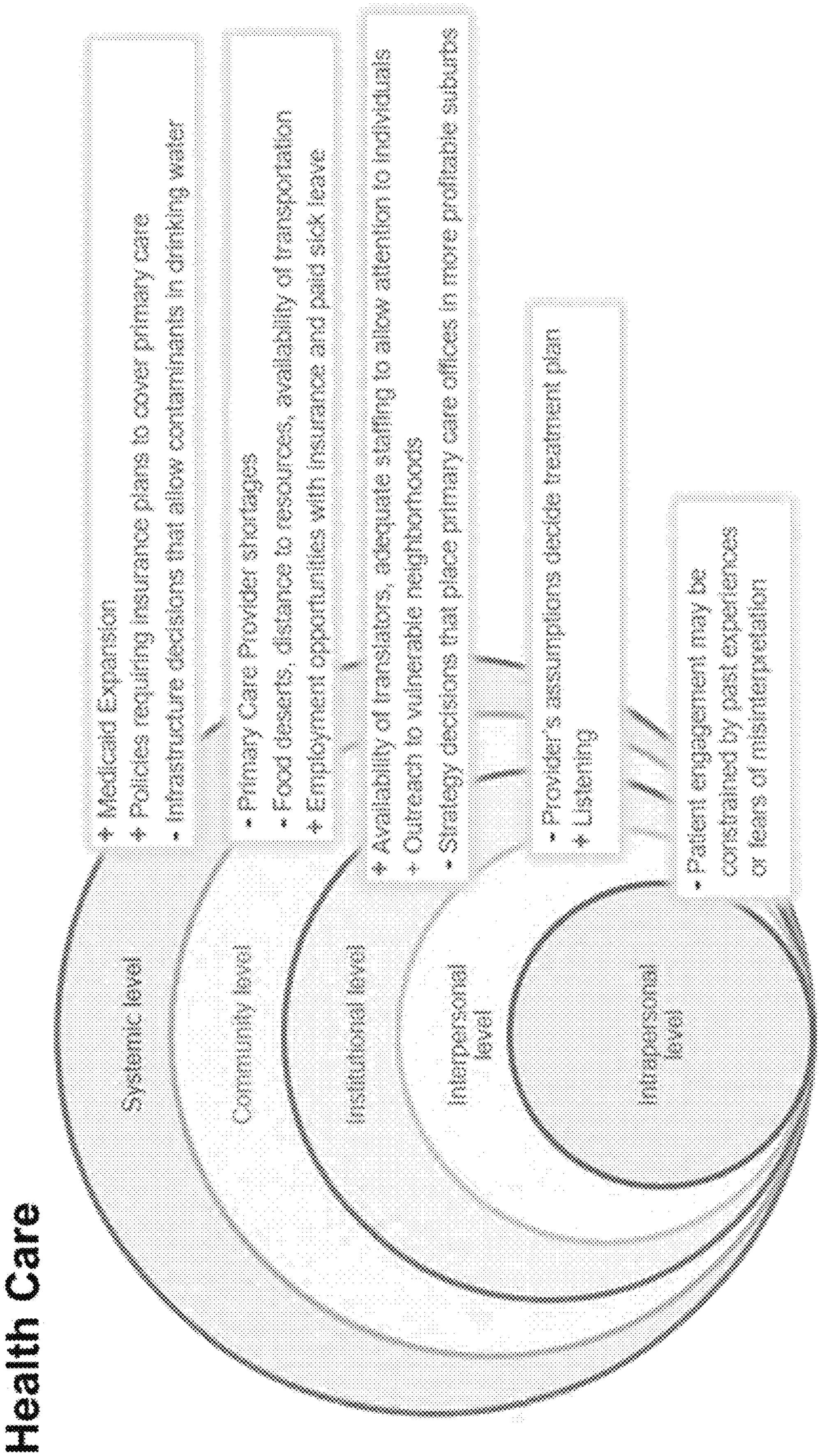
FIGS. 13 and 14 illustrate challenges considered when developing the system at various levels according to some embodiments.
Figure 14:
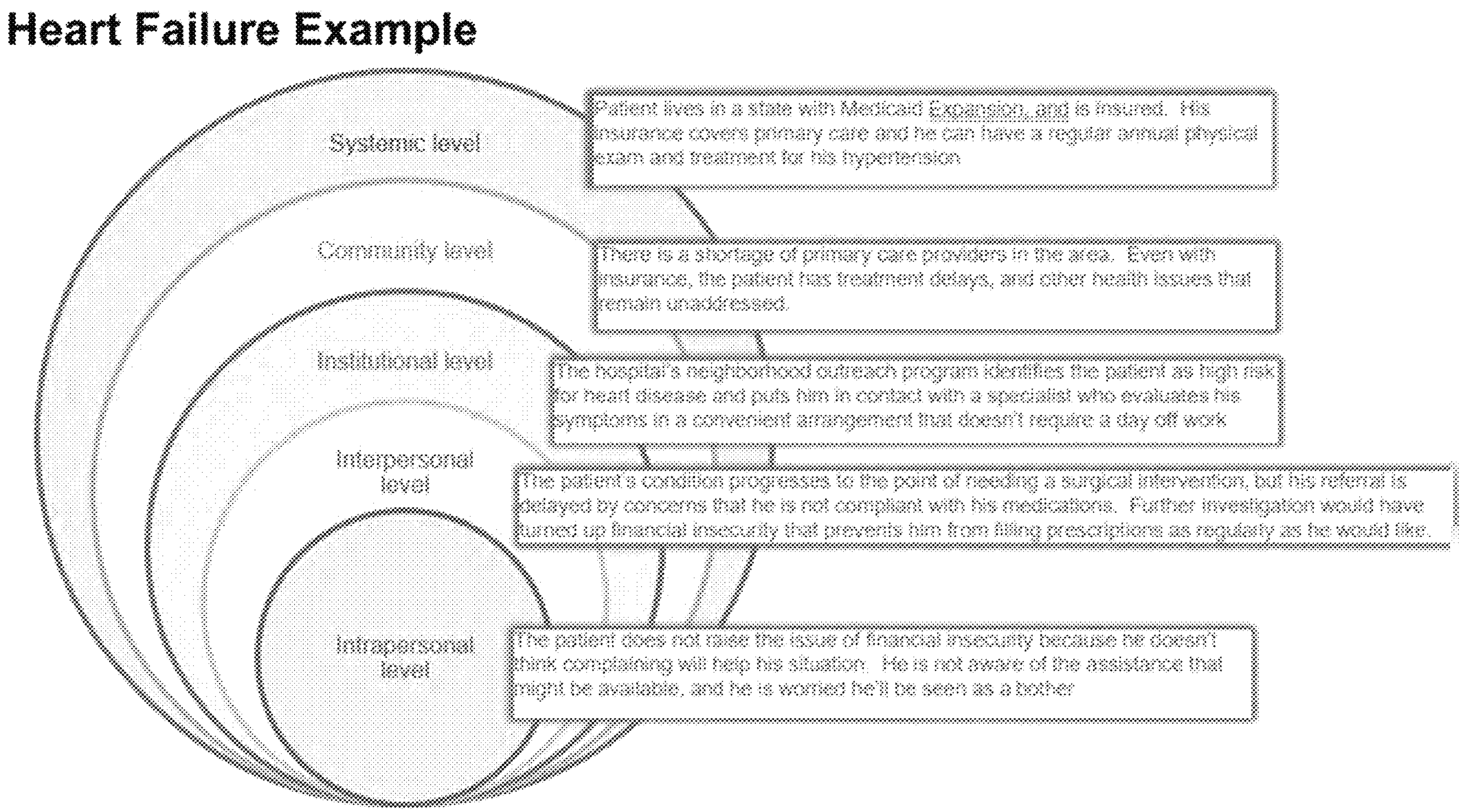

FIGS. 13 and 14 illustrate challenges considered when developing the system at various levels according to some embodiments. In some embodiments, disenfranchisement reflects the number of voters in the 2020 election compared with the population of citizens older than 18. In some embodiments, incarceration rates are the result of a longitudinal study of children raised in a neighborhood in the 1970s and 1980s and their risk of incarceration in adulthood. In some embodiments, local school funding compares the variability of local contributions to school funding. In some embodiments, wealth is measured in any neighborhood as the percent homeownership multiplied by the median home value, to be interpreted as the average wealth held in the home. In some embodiments, segregation of people reflects the extent to which the neighborhoods in this county and all adjacent counties are unequally populated by any one race or ethnicity including Hispanic ethnicity of any race, or non-Hispanic White, Black, Asian, Pacific Islander, or Native American. In some embodiments, segregation of opportunity calculates the extent to which each of the factors above (disenfranchisement, incarceration, wealth, local school funding) as well as poverty and measures of environmental pollution are correlated to the segregation of people described above.

In some embodiments, the system comprises a community needs indices module. In some embodiments, the module comprises factors that include one or more of data granularity and timeliness, social determinants of health domains, health care focus, measurement focus, and geospatial adjustments. In some embodiments, data granularity and timeliness reflect the geographies and timelines on which these data are provided. As these indices are based on public data, those with a published algorithm could be re-calculated at any geography and are noted as "possible" according to some embodiments.

In some embodiments, social determinants of health domains include nine or more domains: income and wealth can include median income, population below the poverty threshold or below 150% or 200% of the poverty threshold; employment can include unemployment rates, white collar employment rates, local business pattern data on employer growth; education can include high school and preschool attendance, and percent of population with 8th grade, 12th grade, or college degree completed; housing can include homeownership, crowding, vacant housing, incomplete plumbing, and housing costs greater than 50% of income; health systems can include population with no insurance, provider shortages, and distance to hospitals; transportation can include access to an automobile or public transit; social environment can include disenfranchisement, as well as single parent rates (which correlates highly to incarceration rates); physical environment can include measures of local air and water pollution as well as proximity to environmental hazards; and public safety can include crime and policing data.

In some embodiments, health care focus describes the validation against health care outcomes. In some embodiments, measurement focus describes system analysis of partial correlations to evaluate the contribution of each component on an index to the overall index, and the effects of correlated components on each other, as well as the correlation that this index has with life expectancy at birth. In some embodiments, geospatial adjustments include features unique to the vulnerability index, which calculates a local model for each county in the context of all of its adjacent counties. Other indices use a single model for the entire country.

In some embodiments, equity measure dimensions used in one or more risk assessment calculations here include one or more of data granularity and timeliness, measurement focus, provider locus of control, risk adjustment, stratification, measure weighting, and statistical significance.

In some embodiments, data granularity and timeliness include data specificity and timelines on which this data is provided. An index that provides encounter-level data provides visibility to the provider to the encounter-level variability in their own data that results in their measure scores according to some embodiments.

In some embodiments, measurement focus describes system analysis of partial correlations to evaluate the contribution of each component on an index to the overall index, and the effects of correlated components on each other, as well as the correlation that this index has with life expectancy at birth. In some embodiments, access to care can include broad measures of patient volume in any setting, or specific measures of patients' ability to schedule and complete primary care appointments (e.g., time to schedule, completion of post-discharge follow-up appointment). In some embodiments, for county health rankings specifically, access to care focuses on the broad availability of primary care and rates of cancer screening and vaccinations in place of more specific measures of patient access to care. In some embodiments, patient outcomes include one or more of mortality, readmissions, maternal outcomes, and in the county health rankings, patient-reported health at the county level. In some embodiments, provider process of care is unique to the system's equity domain measures calculations, which include data on process and timing of care within an inpatient stay. In some embodiments, resource utilization is unique to the equity domain measures calculations, which include data on the variability of specific interventions in both the inpatient and outpatient setting.

In some embodiments, provider locus of control lists the factors that drive variability in the measure outcomes and identifies those within the control of a provider. In some embodiments, risk adjustment includes factors included in the measure analysis that are used to exclude some sources of variability from the outcome. In some embodiments, stratification lists those factors on which the measure is stratified for comparison either between hospitals or within hospitals. In some embodiments, measure weighting describes the relative contributions of each component for any measure that has a scoring algorithm. In some embodiments, statistical significance includes the use of statistical tests in determining the significance of any measure result.

In some embodiments, the system comprises a vulnerability index which includes a quantitative assessment of community social determinants of health (SDOH) factors that may influence a person's overall health. In some embodiments, eight domains, consisting of 19 factors were identified and a vulnerability index was calculated for each zip code in the US by the system. In some embodiments, the vulnerability index represents a relative vulnerability compared to the rest of the US. In some embodiments, the system is configured to report the indices in z-scores (standard deviations) so that κ is average and the distribution is bell-shaped. In some embodiments, a negative index value represents lower vulnerability, and a positive index value represents higher vulnerability. In some embodiments, the overall index is built from the eight domains using a principal components analysis, performed in overlapping local areas (counties) and combined to allow for variation in the weighting of the domains across different geographic areas. Great State Hospital is fictional and is used for illustrative purposes only according to some embodiments.

Figure 15:
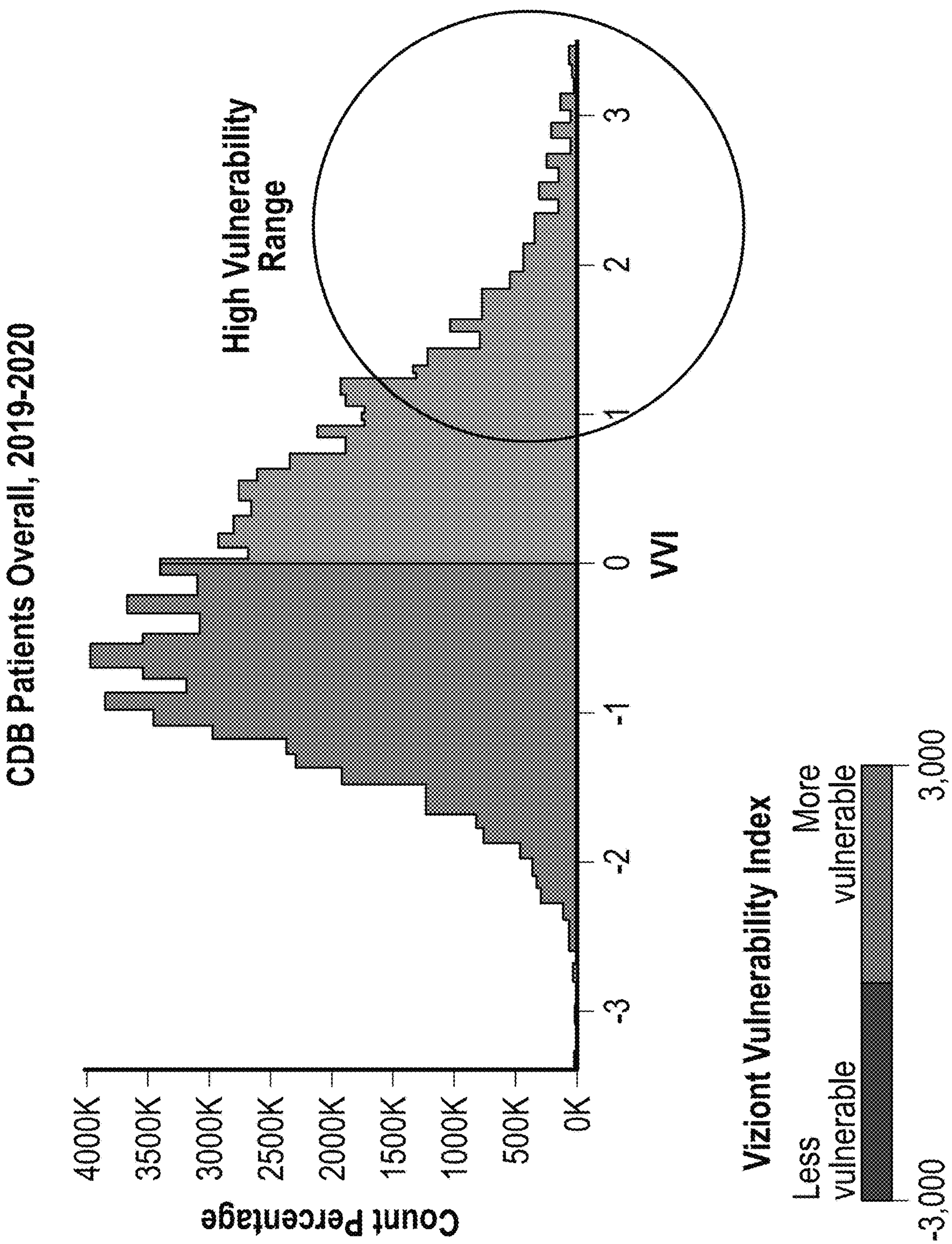
FIG. 15 shows patient distributions according to some embodiments.
Figure 16:
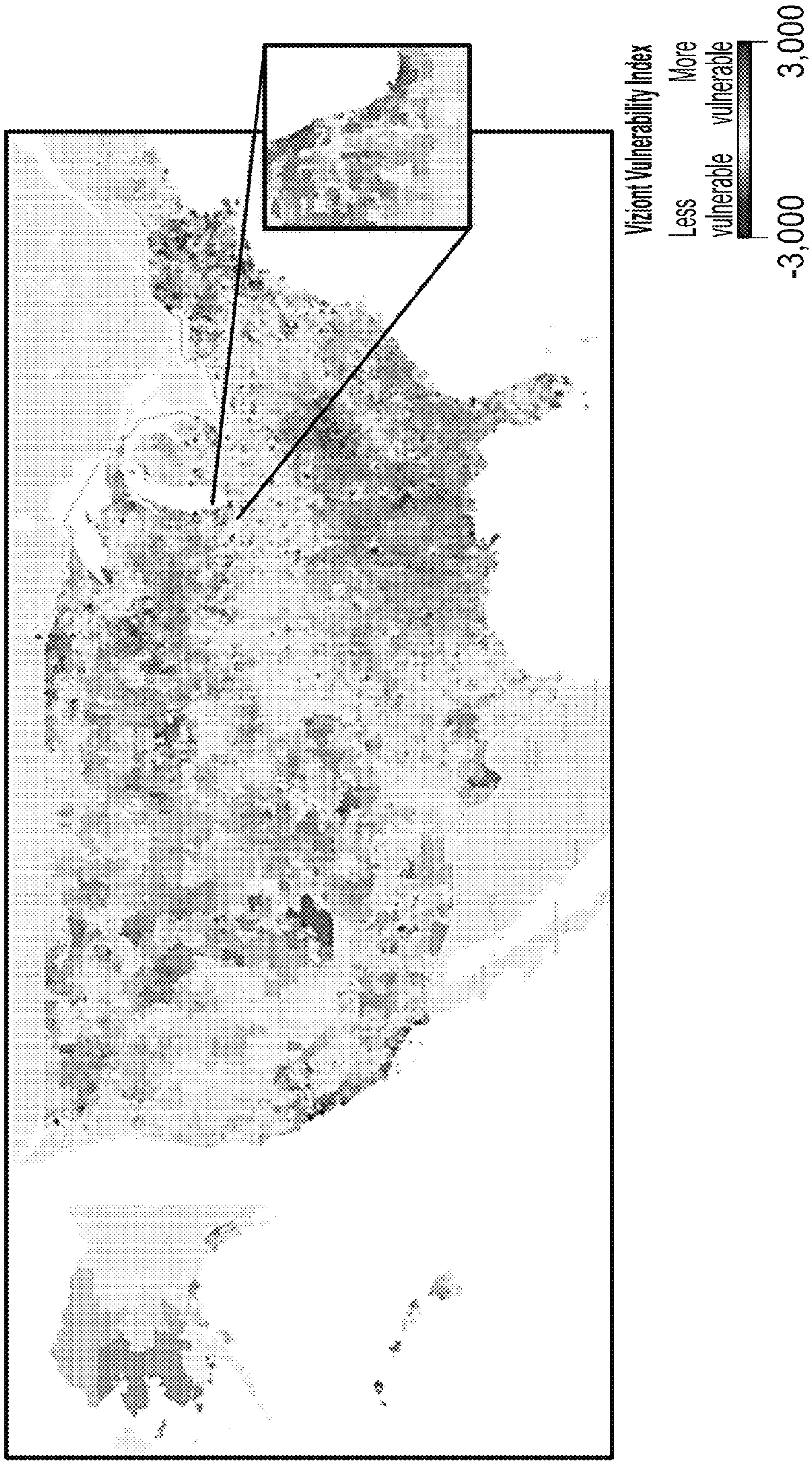
FIG. 16 shows how the vulnerability index varies regionally according to some embodiments.

In some embodiments, the vulnerability index system is configured to identify hospital-to-hospital similarities and peer groups with similar patient populations. In some embodiments, the vulnerability index system is configured to interface with clinical database records by patient zip code in order to: characterize your health system's patient community vulnerabilities to identify key SDOH factors driving vulnerabilities within the community; provide insights between community vulnerability and patient outcomes that could drive potential interventions within your health system to identify interventions where specific vulnerabilities (transportation, food deserts) are associated with specific risks (primary care access, high A1C) and patient outcomes, and contribute to a patient-centered, longitudinal approach to outcomes, that extends beyond the inpatient acute-care focus; and identify peer hospitals in 'communities-like me' with similar SDOH challenges, provide peer to peer comparisons based on SDOH challenges, identify hospitals that have developed effective interventions that could be best practices in the context of their patient population. FIG. 15 shows patient distributions according to some embodiments. FIG. 16 shows how the vulnerability index varies regionally according to some embodiments.

In some embodiments, the vulnerability index system is configured to weigh a domain when calculating risk. In some embodiments, the overall index is built from the eight domains (in some embodiments the system uses more or less than 8 domains) using a principal components analysis, performed in overlapping local areas (rings of adjacent counties) and combined to allow for variation in the weighting of the domains across different geographic areas. In some embodiments, the benefit of this approach is that the domains that matter in one area can be different from those that matter in another area, depending on how they correlate to life expectancy in each place. In some embodiments, each domain stands on its own as an index of its components.

Figure 17:
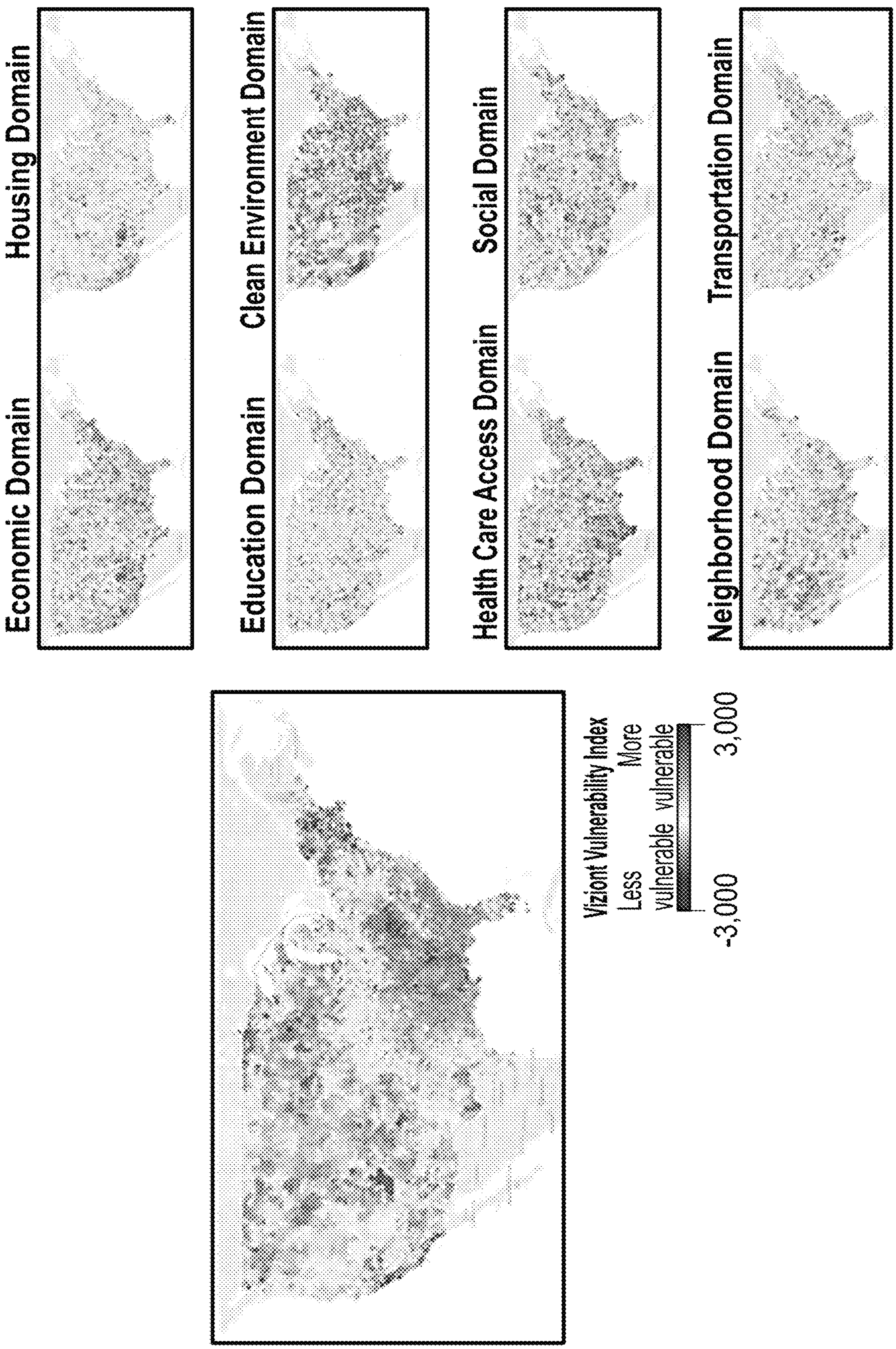
FIG. 17 illustrates substantial regional differences in domain vulnerabilities according to some embodiments.
Figure 18:
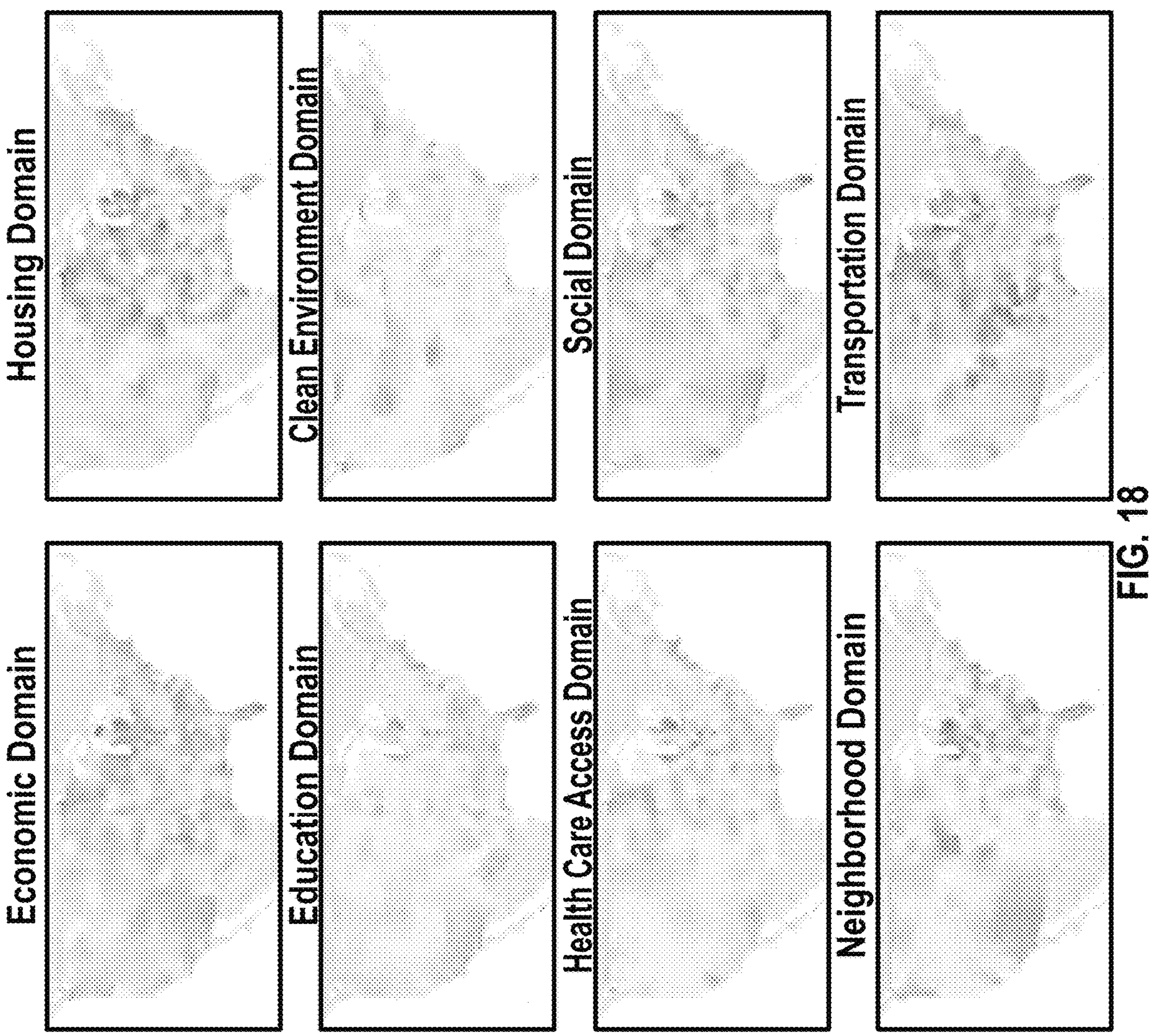
FIG. 18 shows how domain weights calculated by the system vary across the country according to some embodiments.

In some embodiments, while the vulnerability index overall represents the combination of domain values that best relate to life expectancy, each domain represents the severity of vulnerabilities of a specific type. In some embodiments, a particularly high value in the economic domain represents a neighborhood that has unusually high poverty and unemployment, and unusually low median income, compared with the entire country. In some embodiments, both the overall vulnerability index and the domains and components that it comprises have relationships to clinical outcomes. FIG. 17 illustrates substantial regional differences in domain vulnerabilities according to some embodiments. FIG. 18 shows how domain weights calculated by the system vary across the country according to some embodiments.

Figure 19:
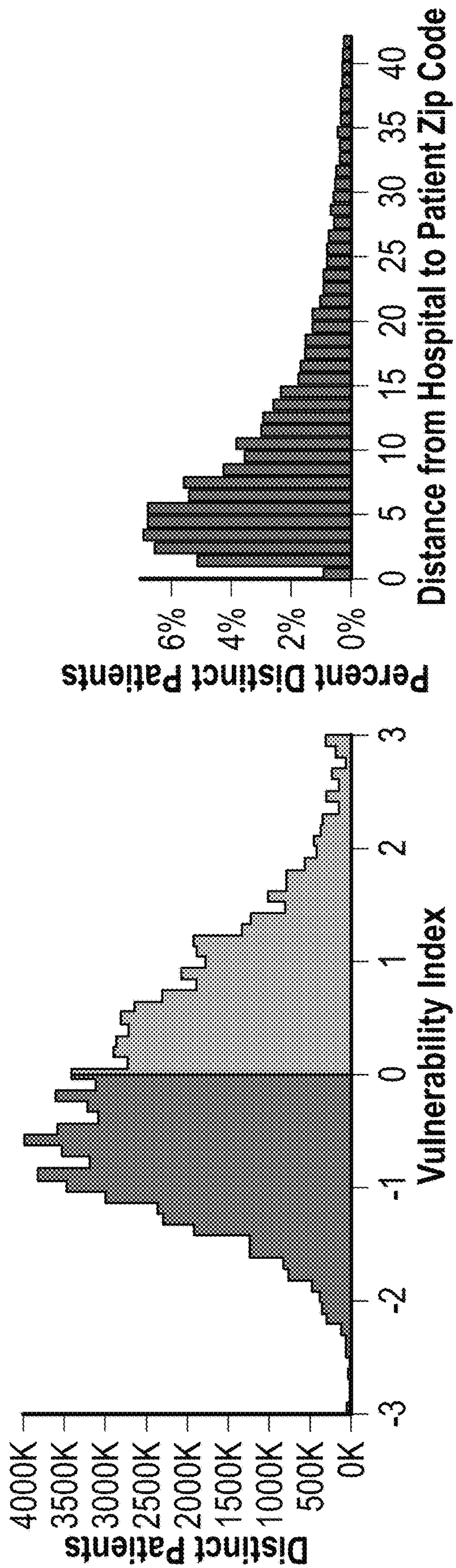
FIG. 19 depicts how CBD members see patients from a relatively balanced distribution of neighborhoods according to some embodiments.
Figure 20:
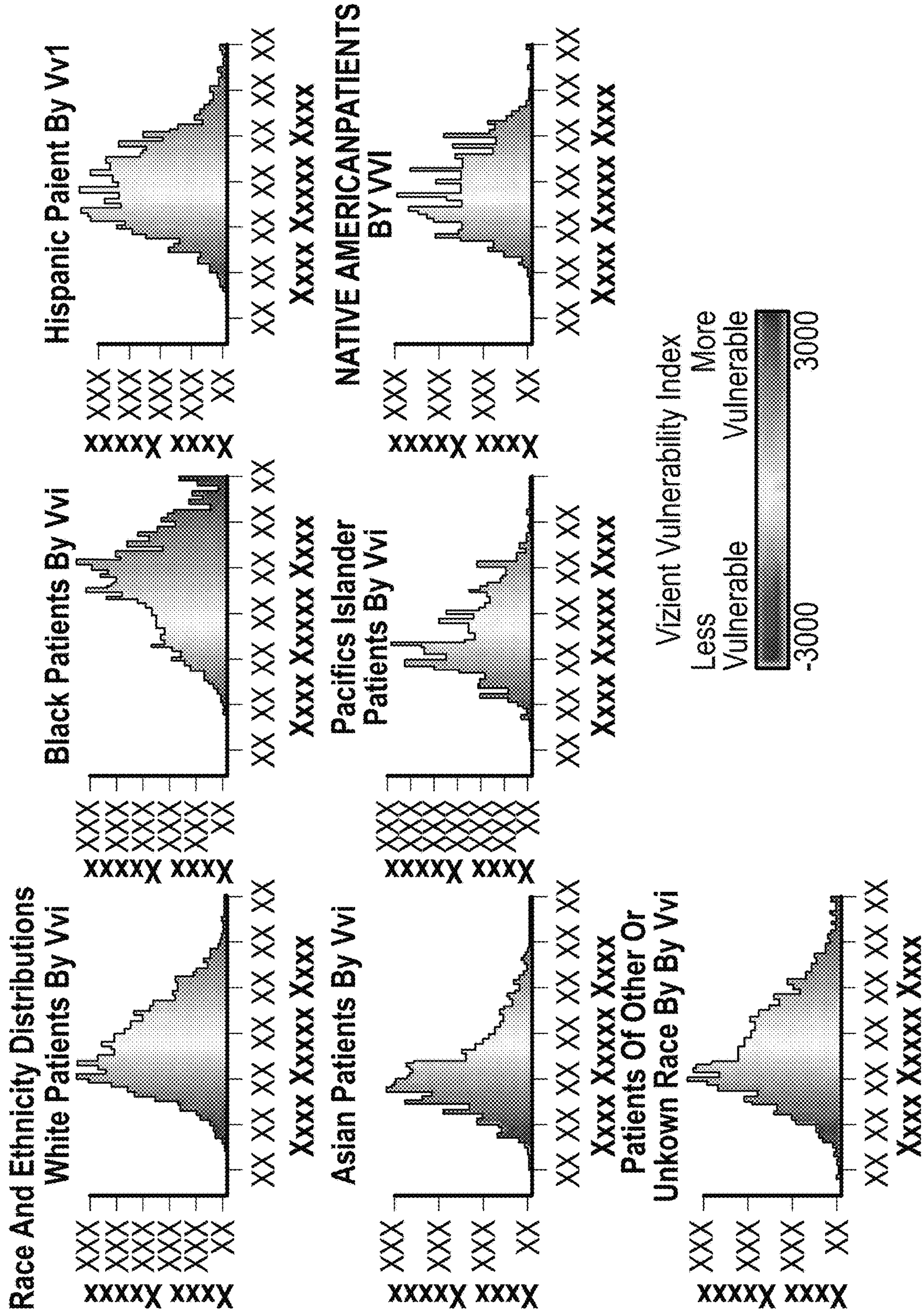
FIG. 20 shows race and ethnicity distributions according to some embodiments.
Figure 21:
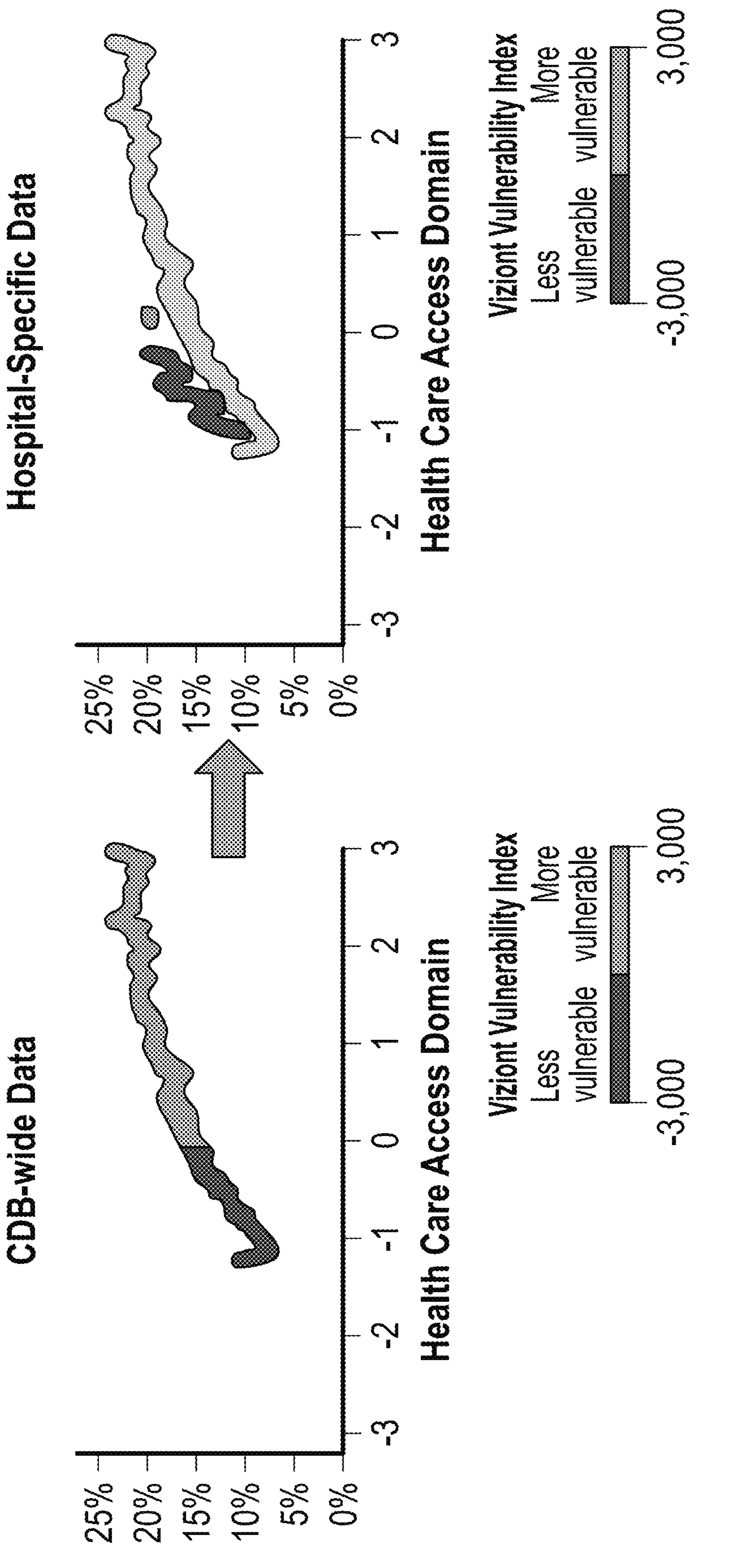
FIG. 21 is a quick guide to reading the vulnerability index line graphs according to some embodiments.

In some embodiments, the vulnerability index is configured to accept clinical database (CDB) data as an input when calculating risk. In some embodiments, in addition to the vulnerability index's relationship to life expectancy that led its design, both the overall vulnerability index and the domains and components that it comprises provide context to existing clinical outcomes and utilization measures. In some embodiments, the vulnerability index is configured to focus on its relevance to actionable interventions that can improve health equity all along the continuum of patient care. In some embodiments, a vulnerability index principal interest is on measures that affect large numbers of patients, especially those that are upstream of the acute inpatient setting and that show a relationship to the vulnerability index overall or to its specific domains or components. In some embodiments, clinical outcomes and utilization focus for vulnerability index include measures relevant to Diabetes (12% of all CDB patients), ED Utilization (33% of all CDB patients), Maternity Care (7% of all CDB patients, including both pregnant patients and newborns), and Breast Cancer (9% of all CDB patients screened or diagnosed). FIG. 19 depicts how CBD members see patients from a relatively balanced distribution of neighborhoods according to some embodiments. FIG. 20 shows race and ethnicity distributions according to some embodiments. FIG. 21 is a quick guide to reading the vulnerability index line graphs according to some embodiments.

Figure 22:
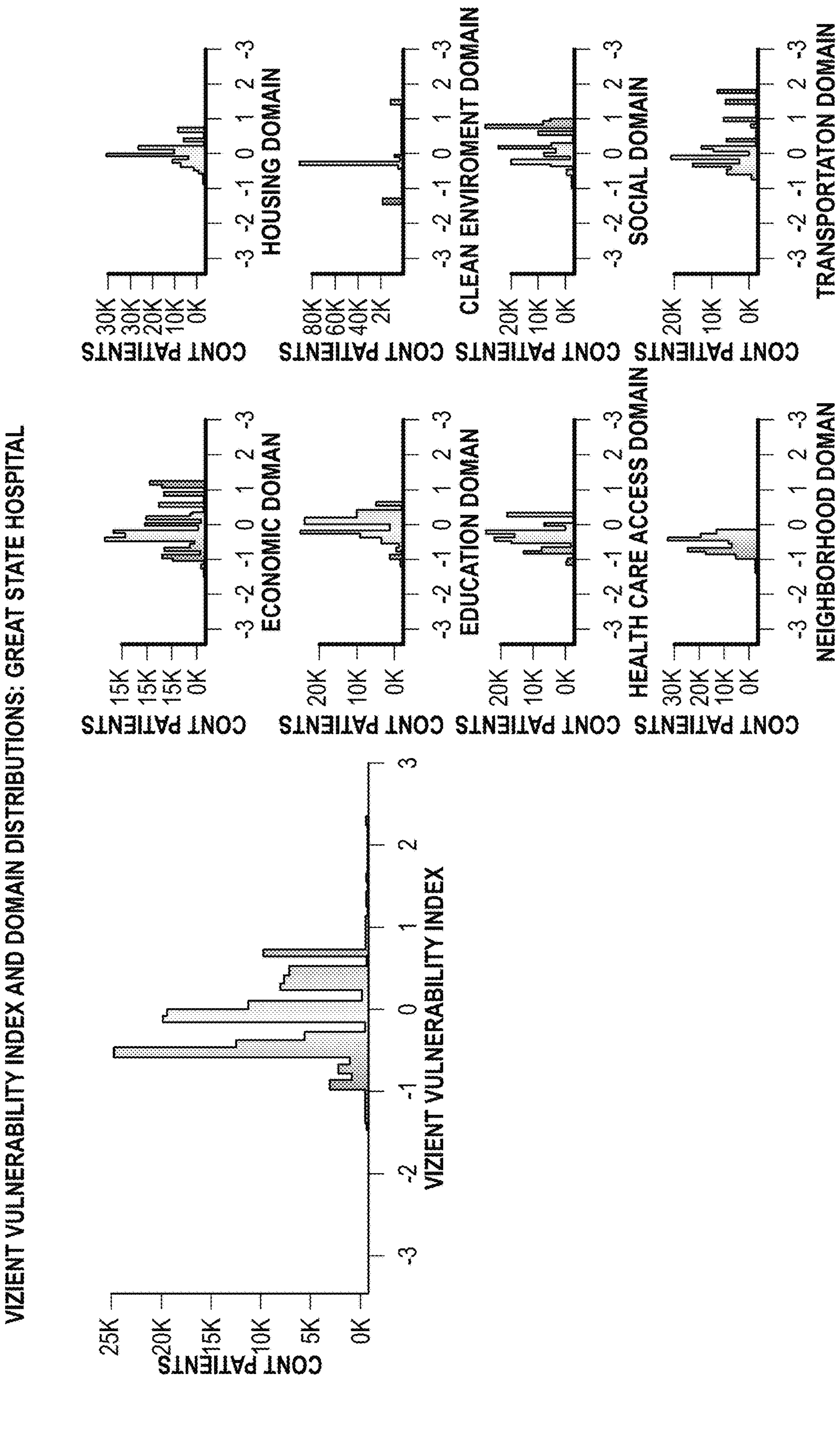
FIG. 22 illustrates system outputs for vulnerability index and Domain Distribution for a theoretical Great State Hospital according to some embodiments.
Figure 23:
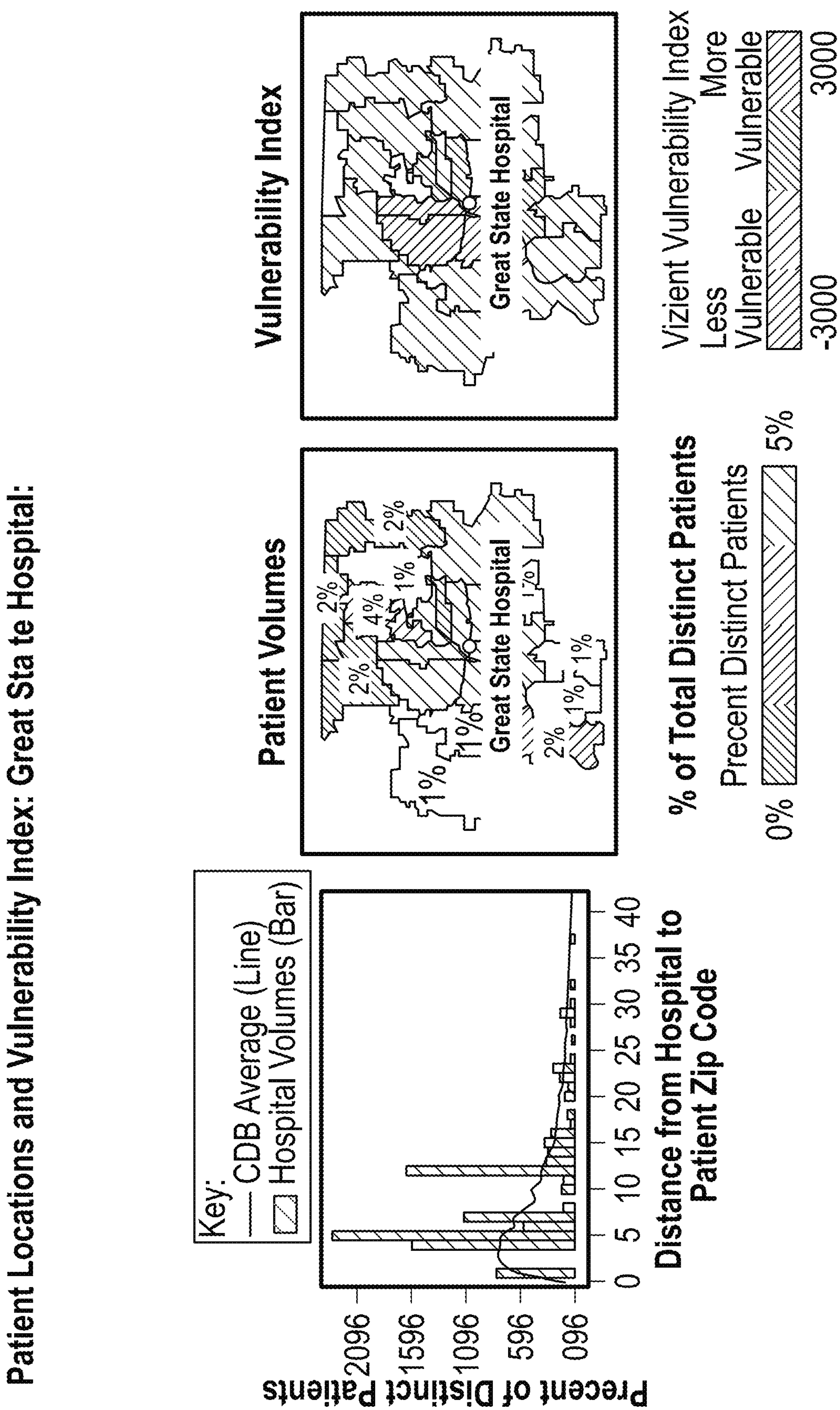
FIG. 23 illustrates system outputs for a patient locations and vulnerability index according to some embodiments.
Figure 24:
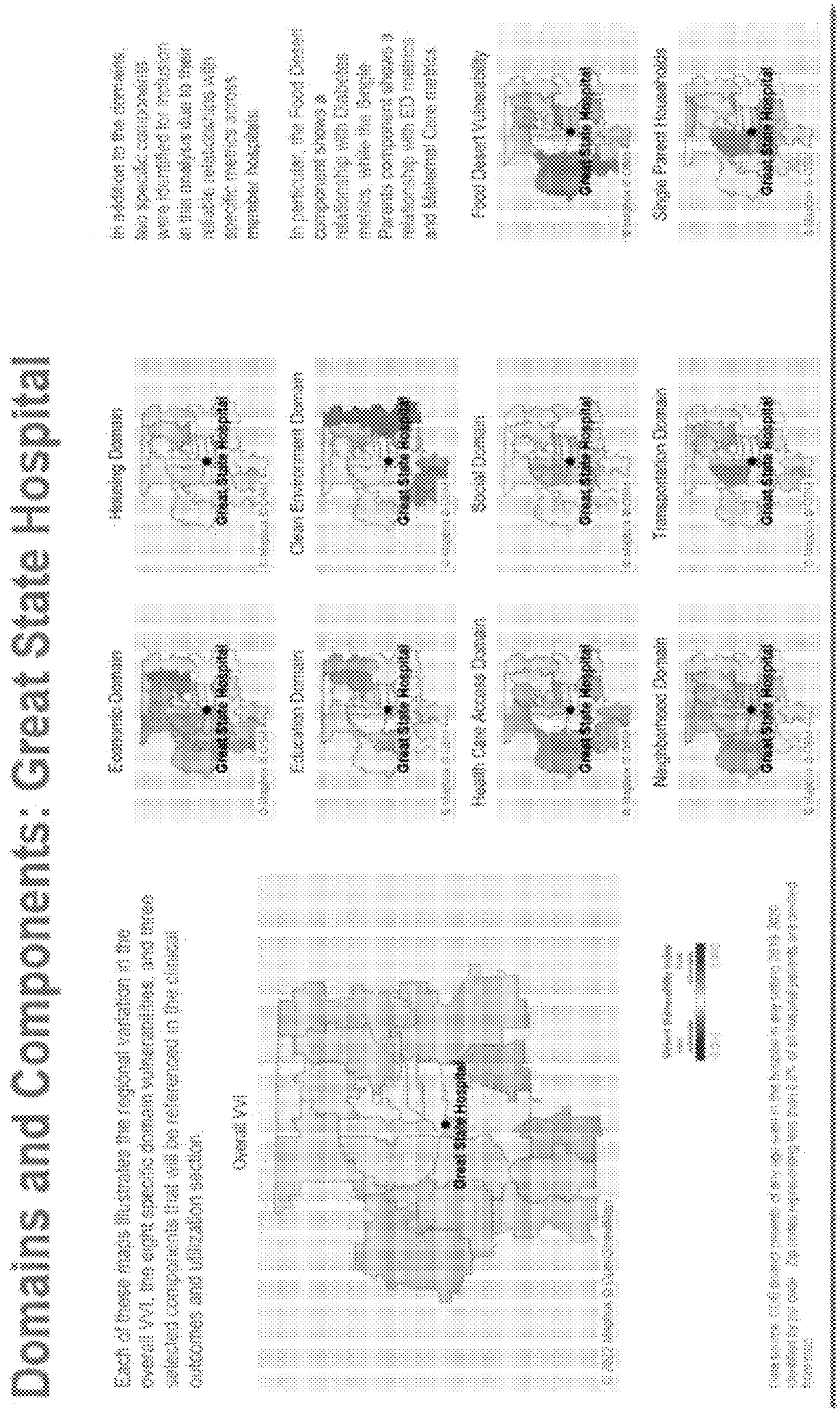
FIG. 24 shows system outputs for domains and components for Great State Hospital according to some embodiments.
Figure 26:
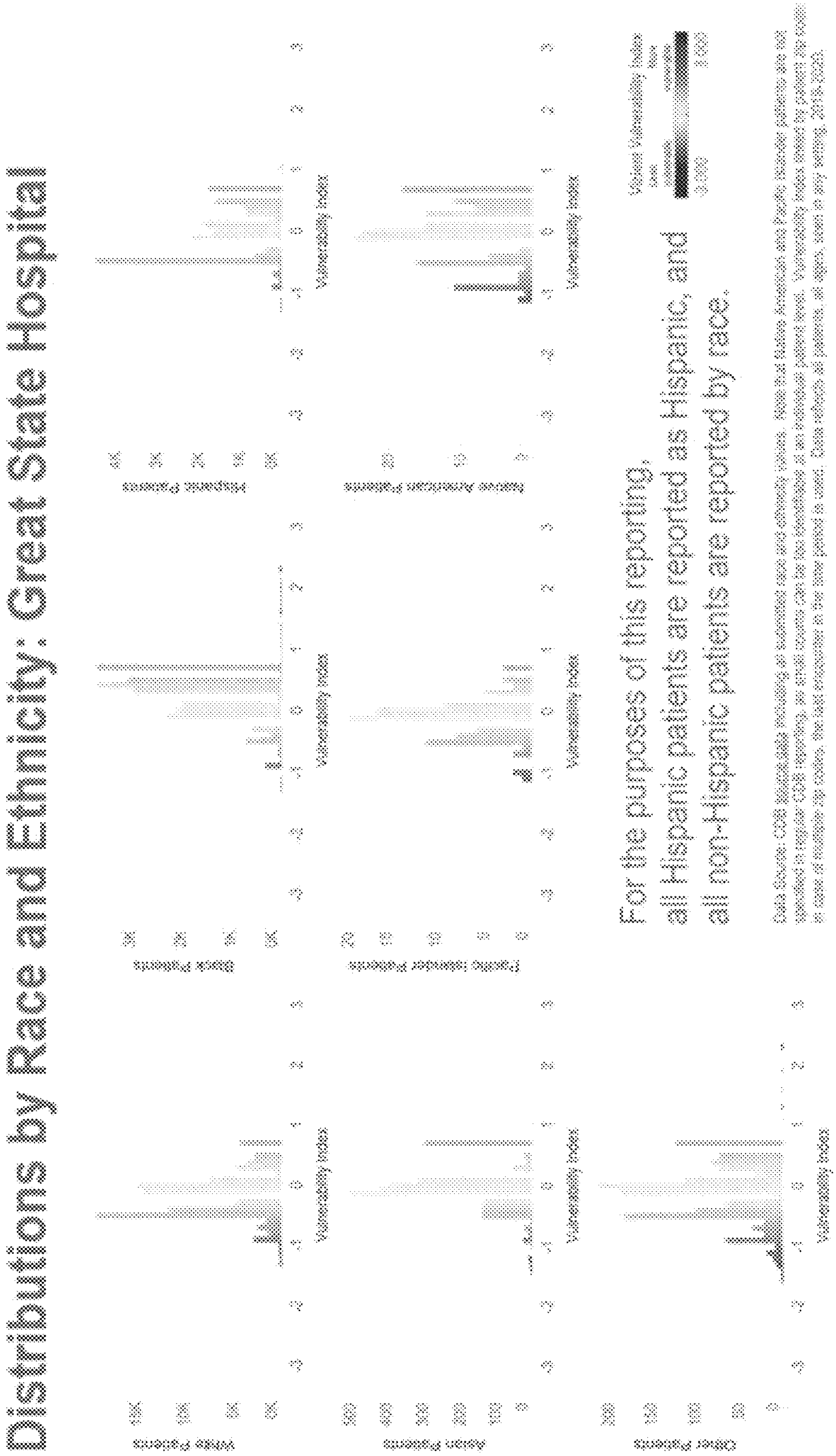
FIG. 26 illustrates a system output that displays distribution by race and ethnicity according to some embodiments.

In some embodiments, the vulnerability index system is configured to generate hospital-specific data profiles according to some embodiments. In some embodiments, the system is configured to link the vulnerability index to each member hospital's CDB data and/or output a comparison of each hospital to the overall CDB-wide observations. In some embodiments, the system is configured to display outputs that provide the answers to questions such as: What are the overall characteristics of the neighborhoods you serve? Where are you substantially different from the CDB as a whole? Of the patients you saw in 2019-2020, how do actual patient outcomes and utilization relate to neighborhood vulnerability? How do your outcomes and utilization compare with CDB averages for similar neighborhoods? FIG. 22 illustrates system outputs for vulnerability index and Domain Distribution for a theoretical Great State Hospital according to some embodiments. FIG. 23 illustrates system outputs for a patient locations and vulnerability index according to some embodiments. FIG. 24 shows system outputs for domains and components for Great State Hospital according to some embodiments. FIG. 25 illustrates a system output that includes specific domains and components with high vulnerability according to some embodiments. FIG. 26 illustrates a system output that displays distribution by race and ethnicity according to some embodiments. FIG. 27 illustrates a system output that displays overall statistics and measures of vulnerability according to some embodiments.

In some embodiments, the system is configured to analyze and display how clinical outcomes and utilization metrics vary by neighborhood vulnerability according to some embodiments. In some embodiments, as a non-limiting example, four sets of clinical outcomes and utilization metrics included in this profile were chosen for their relationships to neighborhood vulnerability and for their relevance to large numbers of patients. In some embodiments, the system is configured to look outside of the acute inpatient episode and focus on metrics that reflect a patient's longer-term relationship to primary care which include one or more of diabetes incidence & complications, maternal care, Emergency Department (ED) utilization, paired with office visit utilization, and breast cancer diagnosis and screening. In some embodiments, in each case patients from neighborhoods with higher vulnerability and specific obstacles to care are more likely to have a greater burden of disease, as well as utilization patterns in more ED utilization, less Office Visit utilization, and less breast cancer screening, that suggest less engagement with primary care resources in general. And the same neighborhoods are affected in multiple metrics. In some embodiments, with the system outputting an identification of specific obstacles to care, actionable interventions can be defined and tested, and with the identification of peer groups who serve similar neighborhoods, best practices can be shared.

In some embodiments, a non-limiting example of system processing and data output and display includes diabetes and neighborhood vulnerability. In some embodiments, three metrics related to diabetes incidence and complications are included in this non-limiting example. In some embodiments, each of the three metrics reflects a higher burden of disease in neighborhoods with higher vulnerability. In some embodiments, patients from more vulnerable neighborhoods are: more likely to have diabetes (defined for each distinct patient as any diagnosis code starting with E08, E09, E10, E11, E12, or E13, which encompasses any diabetes of any cause); more likely to have an A1C greater than 9 (flagged for any distinct patient with diabetes with at least one A1C measure greater than 9, excluding any patients with no A1C results reported); and more likely to have a lower limb amputation (including both patients with a lower limb amputation procedure code starting with 0Y6) in 2019 or 2020 as well as patients with a history of lower limb amputation diagnosis codes starting with Z89.4, Z89.5 or Z89.6).

Figure 29:
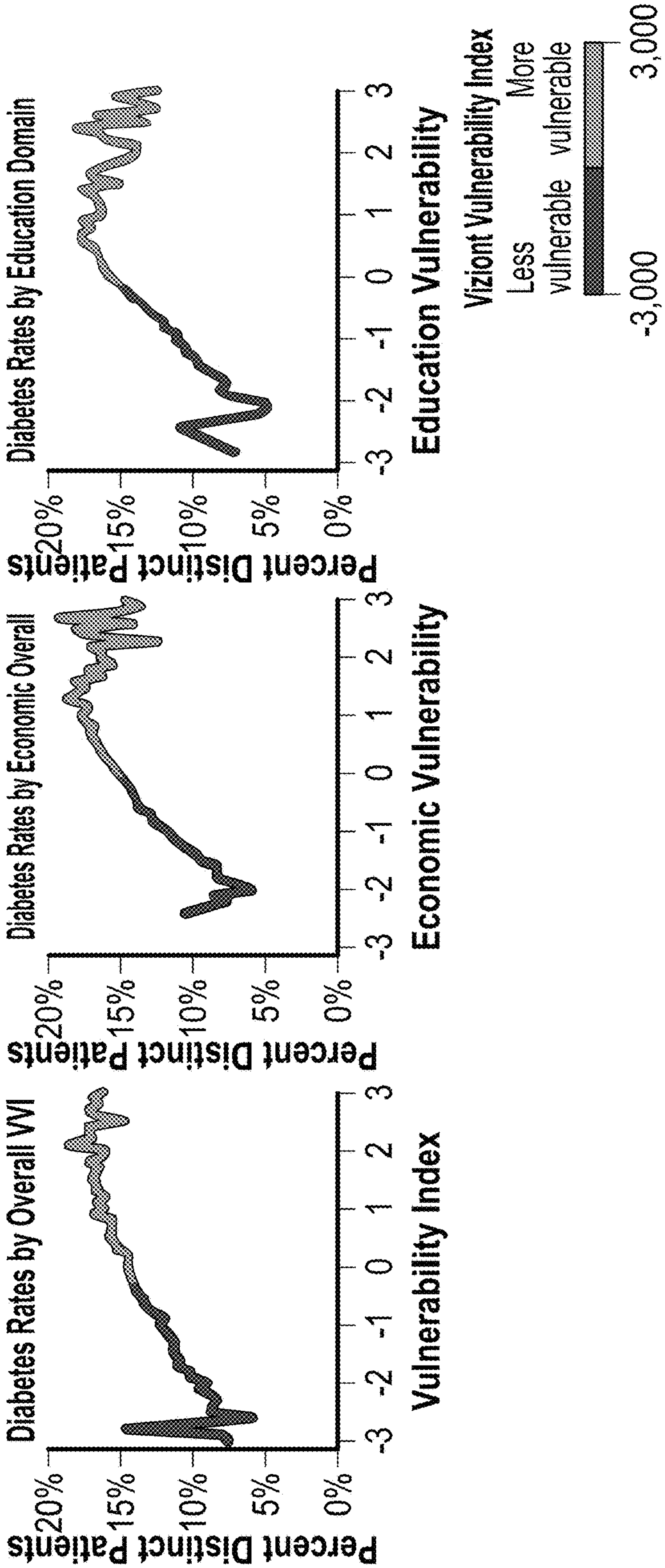
FIG. 29 shows calculations for how diabetes is more common among patients from more vulnerable neighborhoods according to some embodiments.
Figure 30:
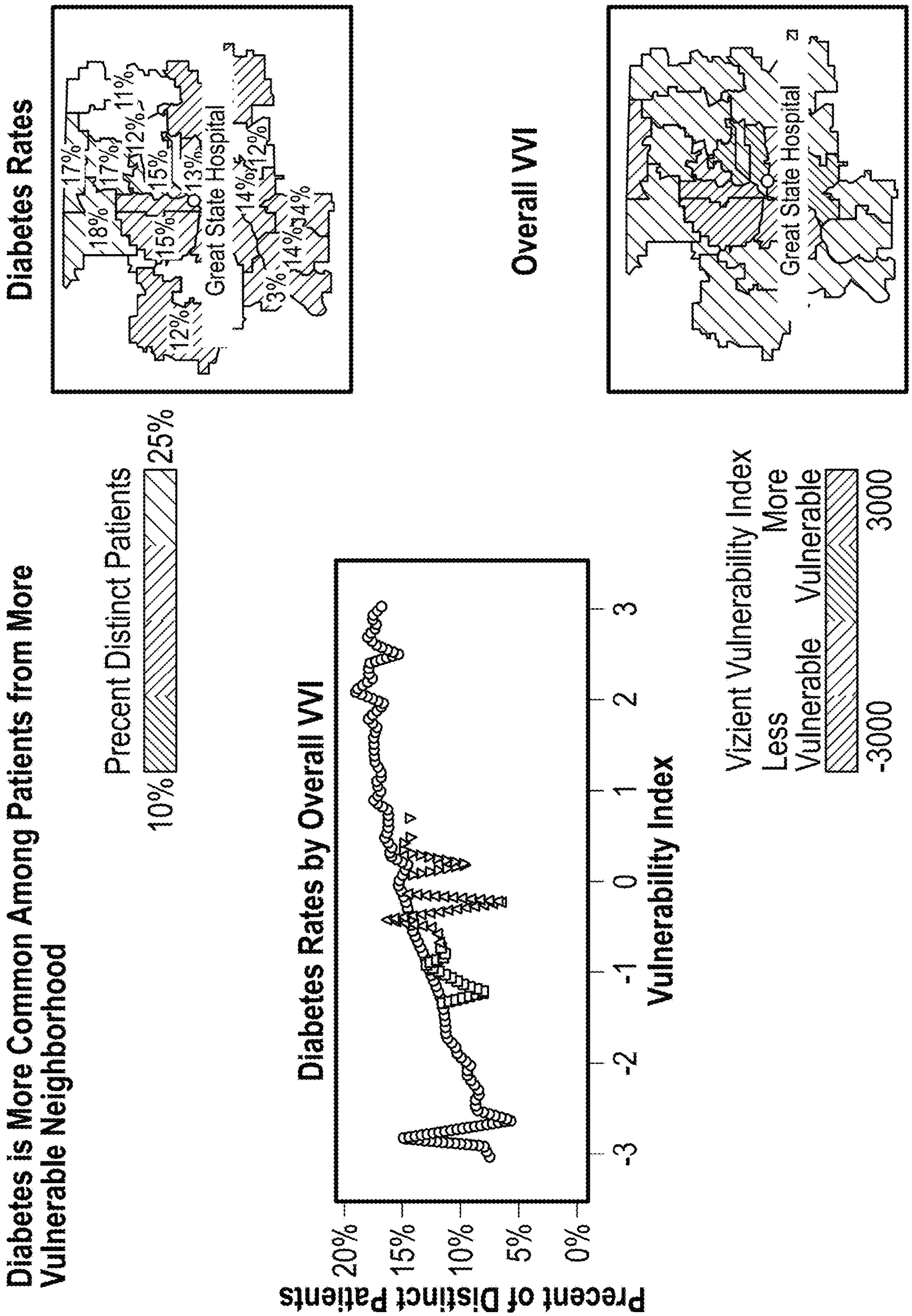
FIG. 30 depict more calculations for how diabetes is more common among patients from more vulnerable neighborhoods according to some embodiments.
Figure 31:
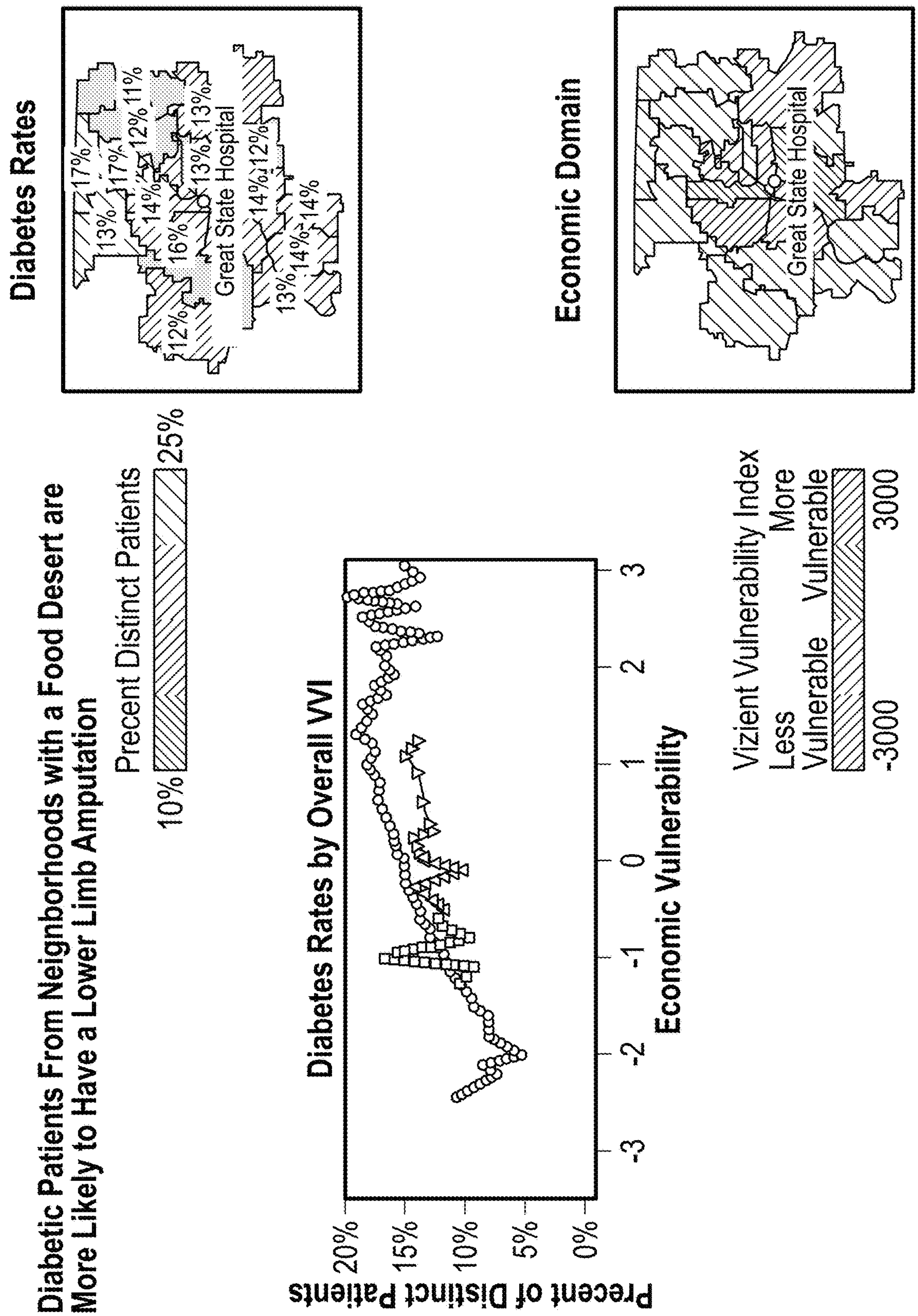
FIG. 31 shows the system outputting how diabetes is more common among patients from economically vulnerable neighborhoods according to some embodiments.
Figure 32:
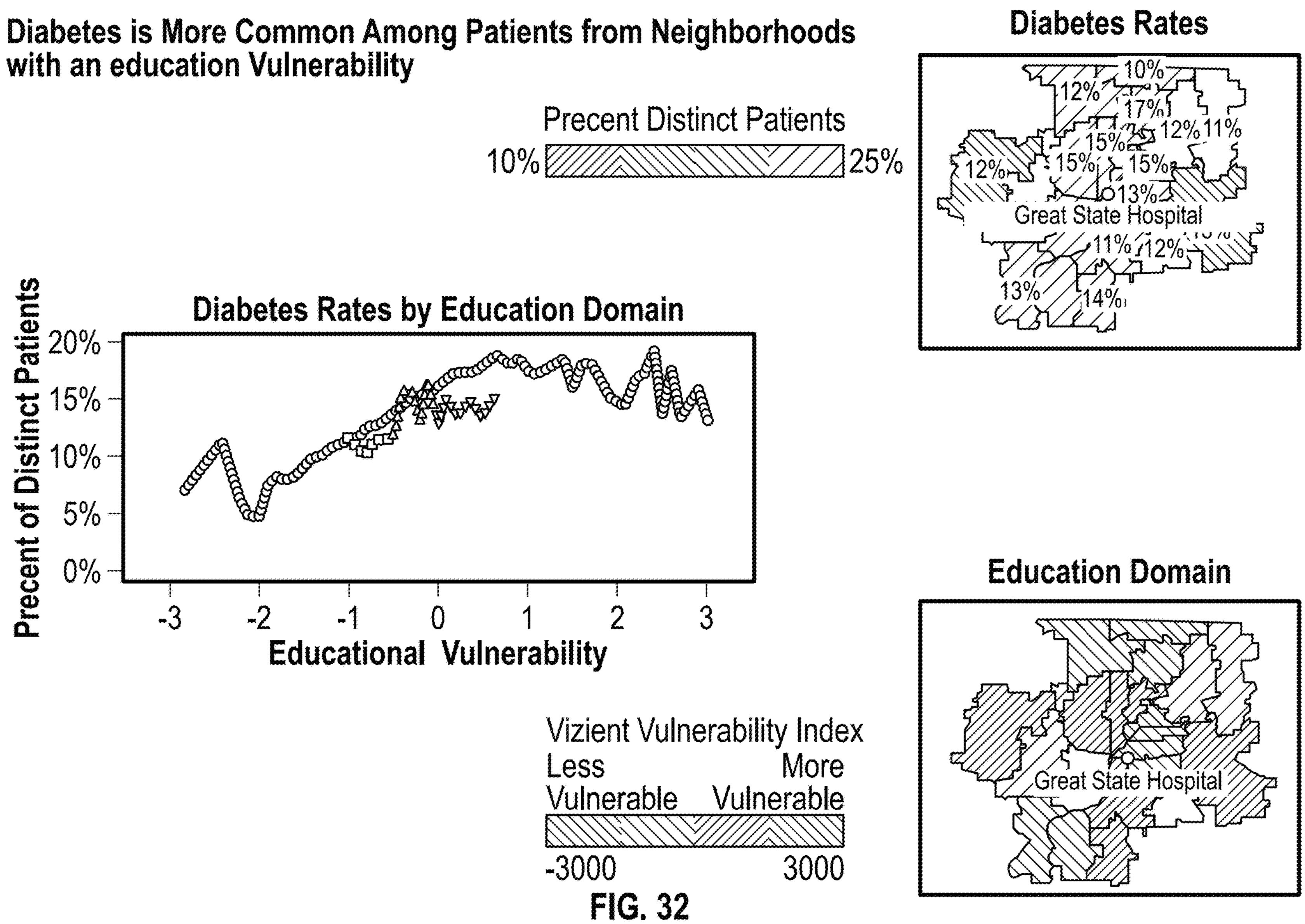
FIG. 32 depicts a system output showing how diabetes is more common among patients from neighborhoods with an education vulnerability according to some embodiments.
Figure 33:
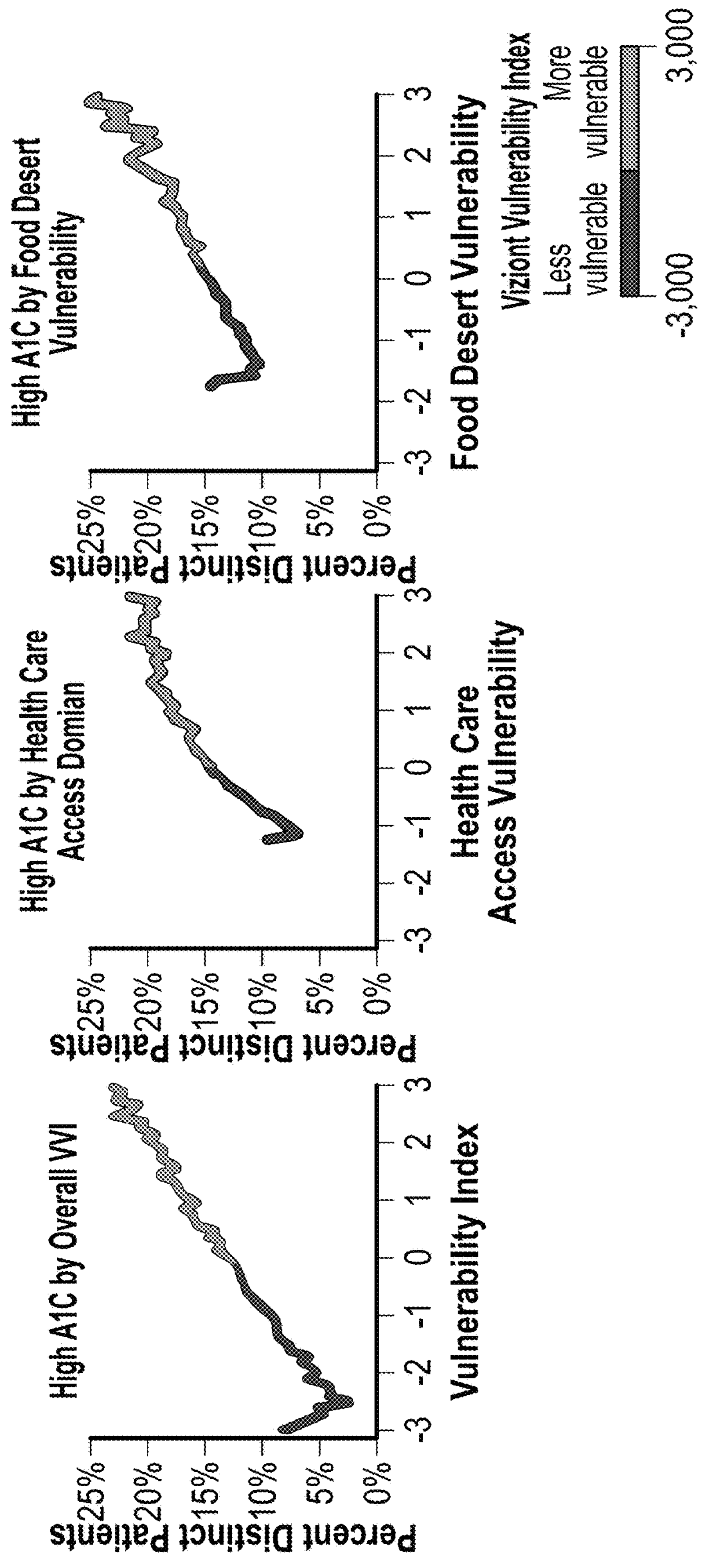
FIG. 33 illustrates how diabetic patients from more vulnerable neighborhoods are more likely to have A1C>9 according to some embodiments.
Figure 34:
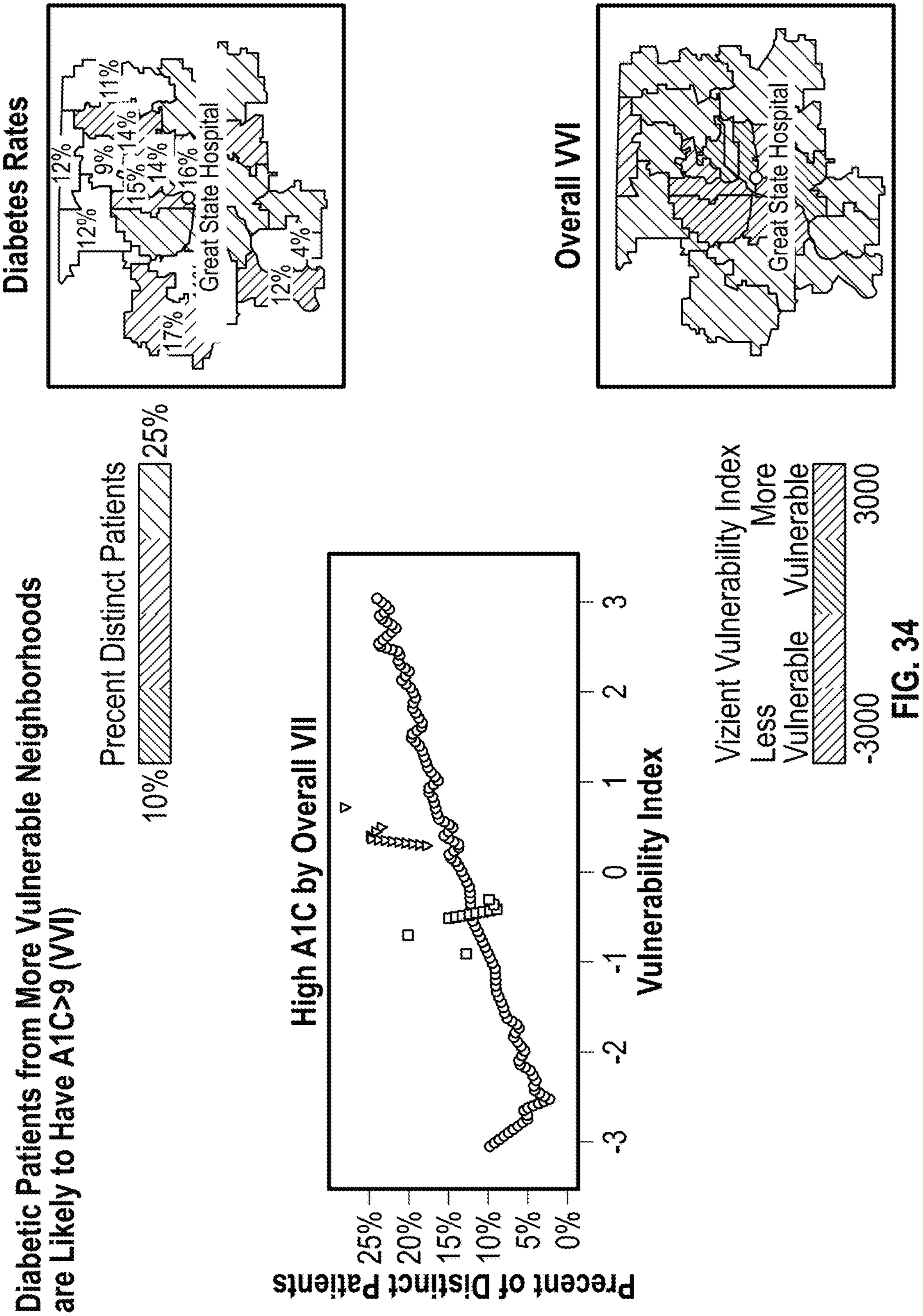
FIG. 34 shows a vulnerability index output depicting how diabetic patients from more vulnerable neighborhoods are more likely to have A1C>9 according to some embodiments.
Figure 35:
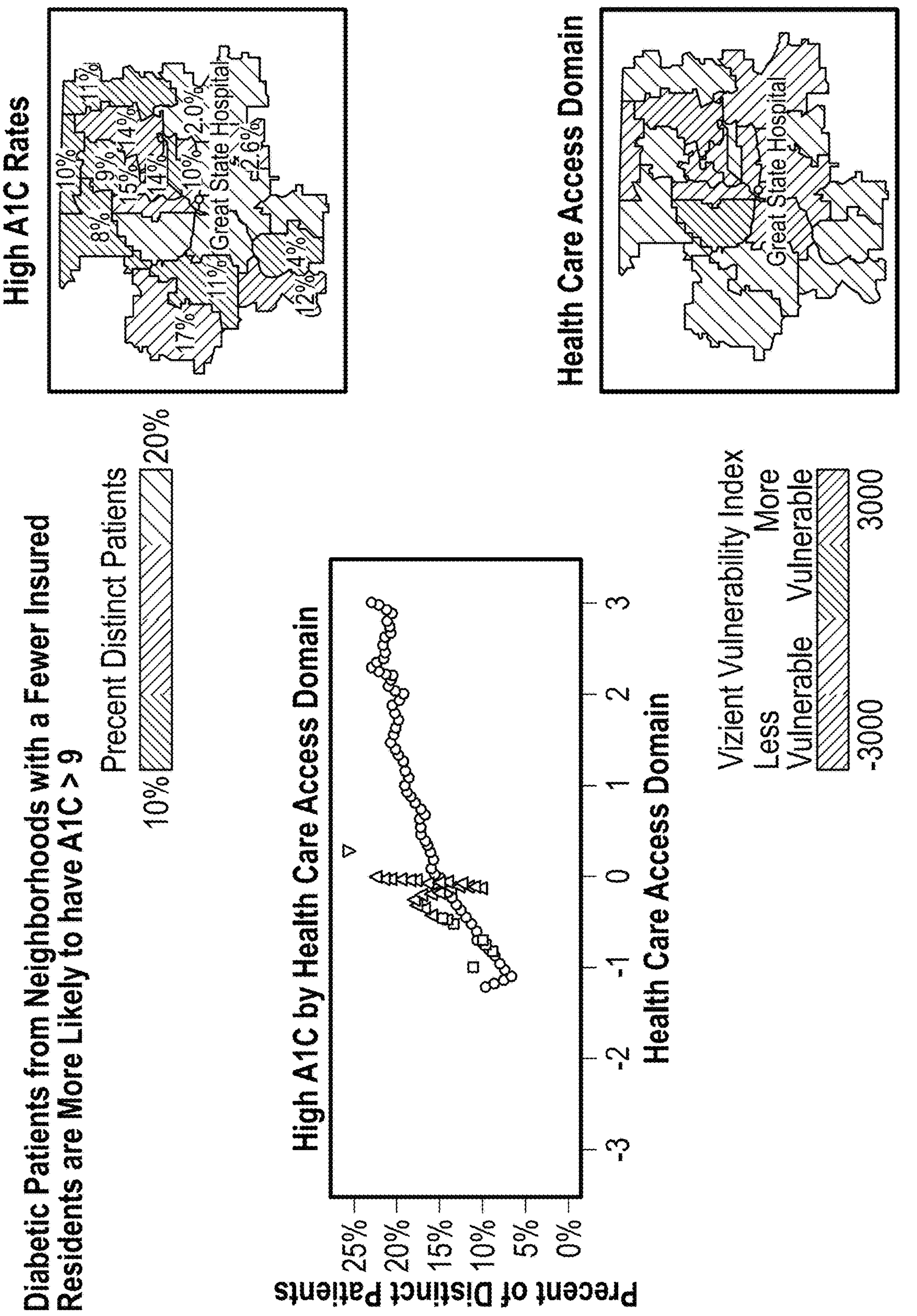
FIG. 35 shows how diabetic patients from neighborhoods with fewer insured residents are more likely to have A1C>9 according to some embodiments.
Figure 36:
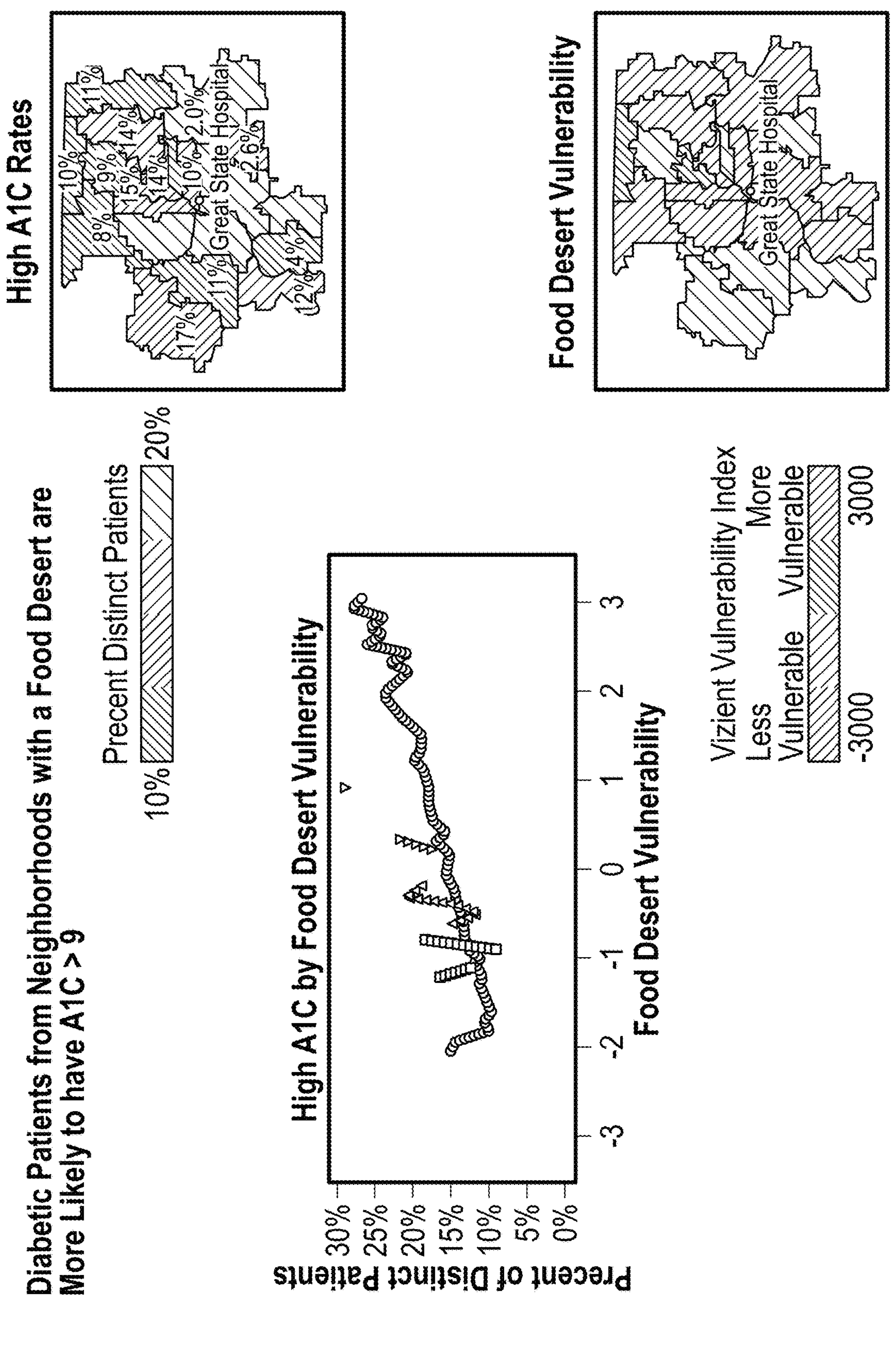
FIG. 36 illustrates how Diabetic patients from neighborhoods with a food desert are more likely to have A1C>9 according to some embodiments.
Figure 37:
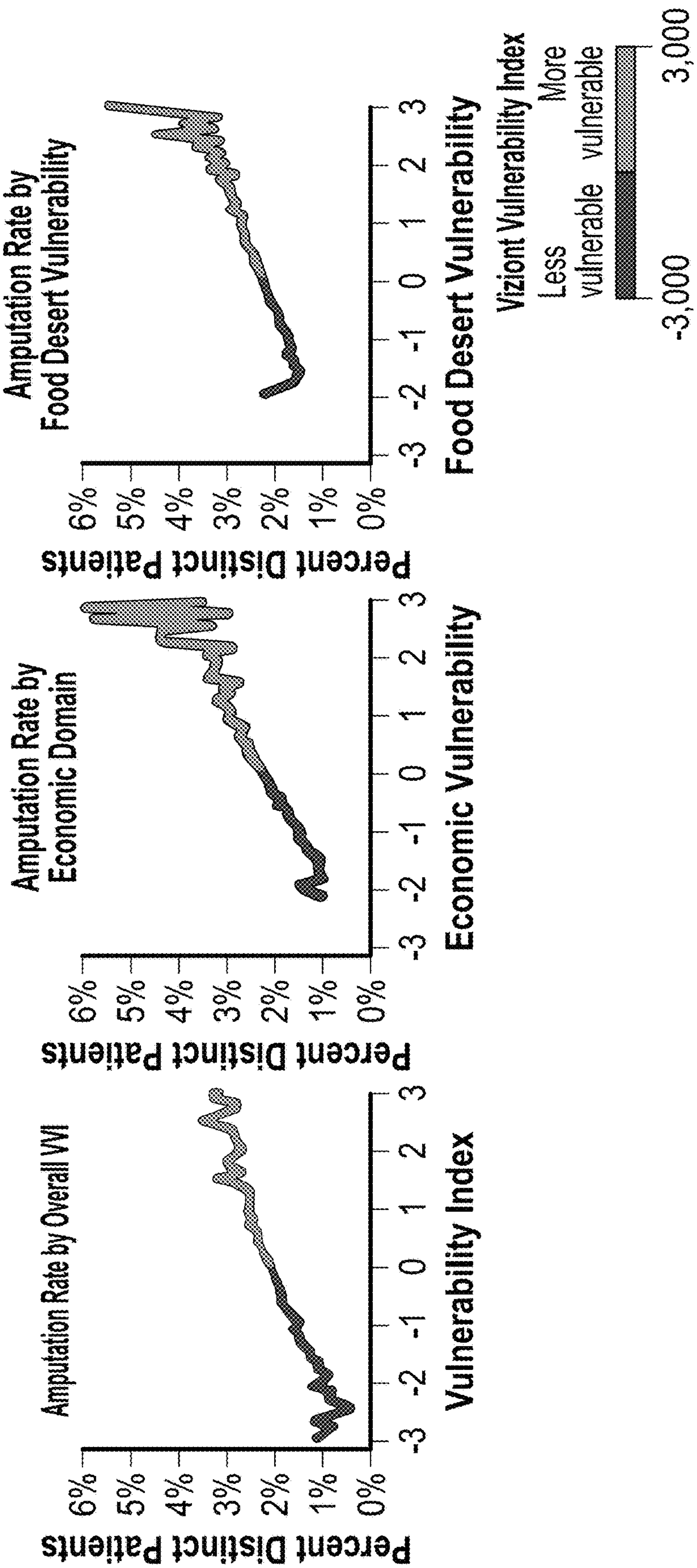
FIG. 37 shows how diabetic patients from more vulnerable neighborhoods are more likely to have a lower limb amputation according to some embodiments.
Figure 38:
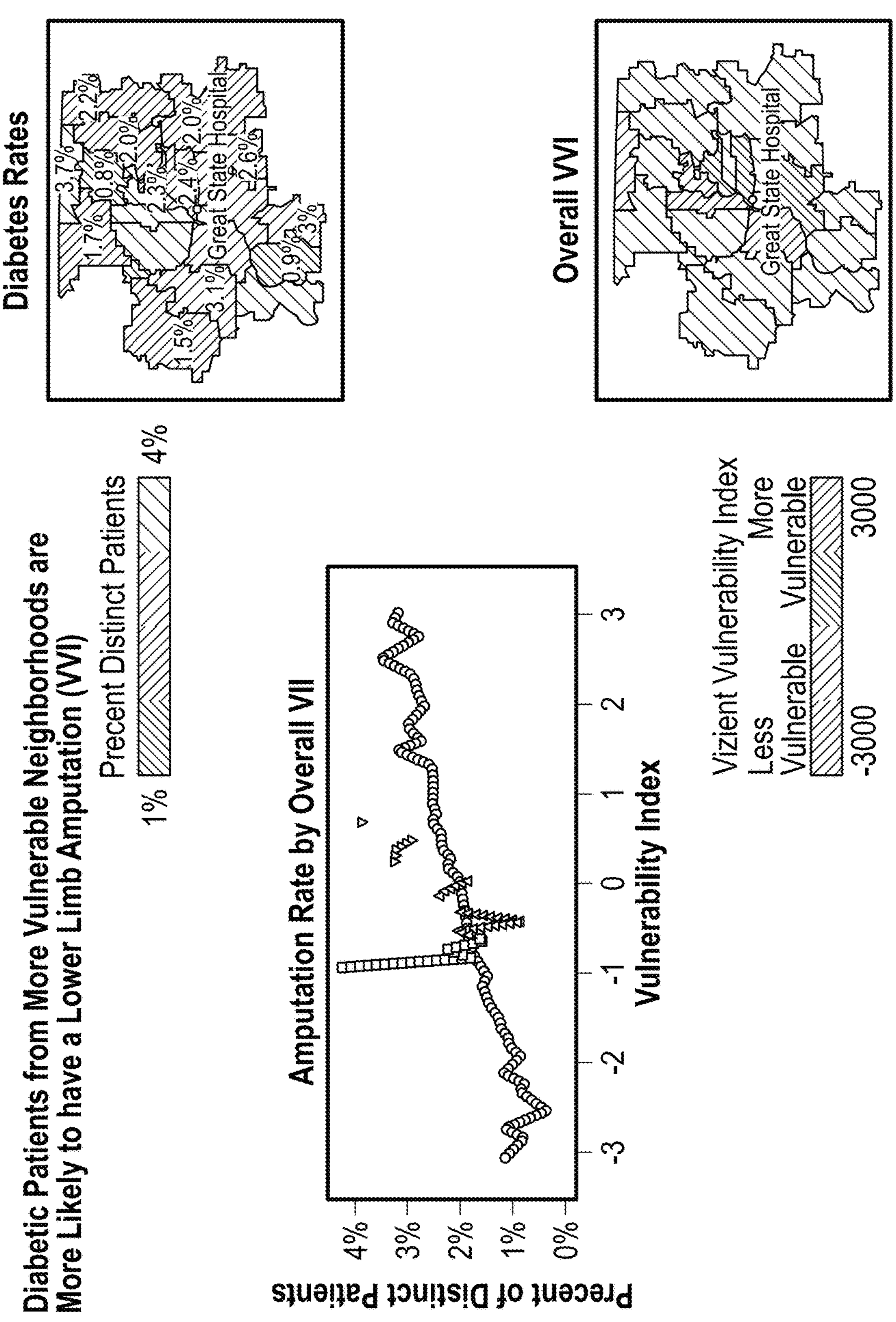
FIG. 38 shows a vulnerability index system output of analytics of how diabetic patients from more vulnerable neighborhoods are more likely to have a lower limb amputation according to some embodiments.
Figure 39:
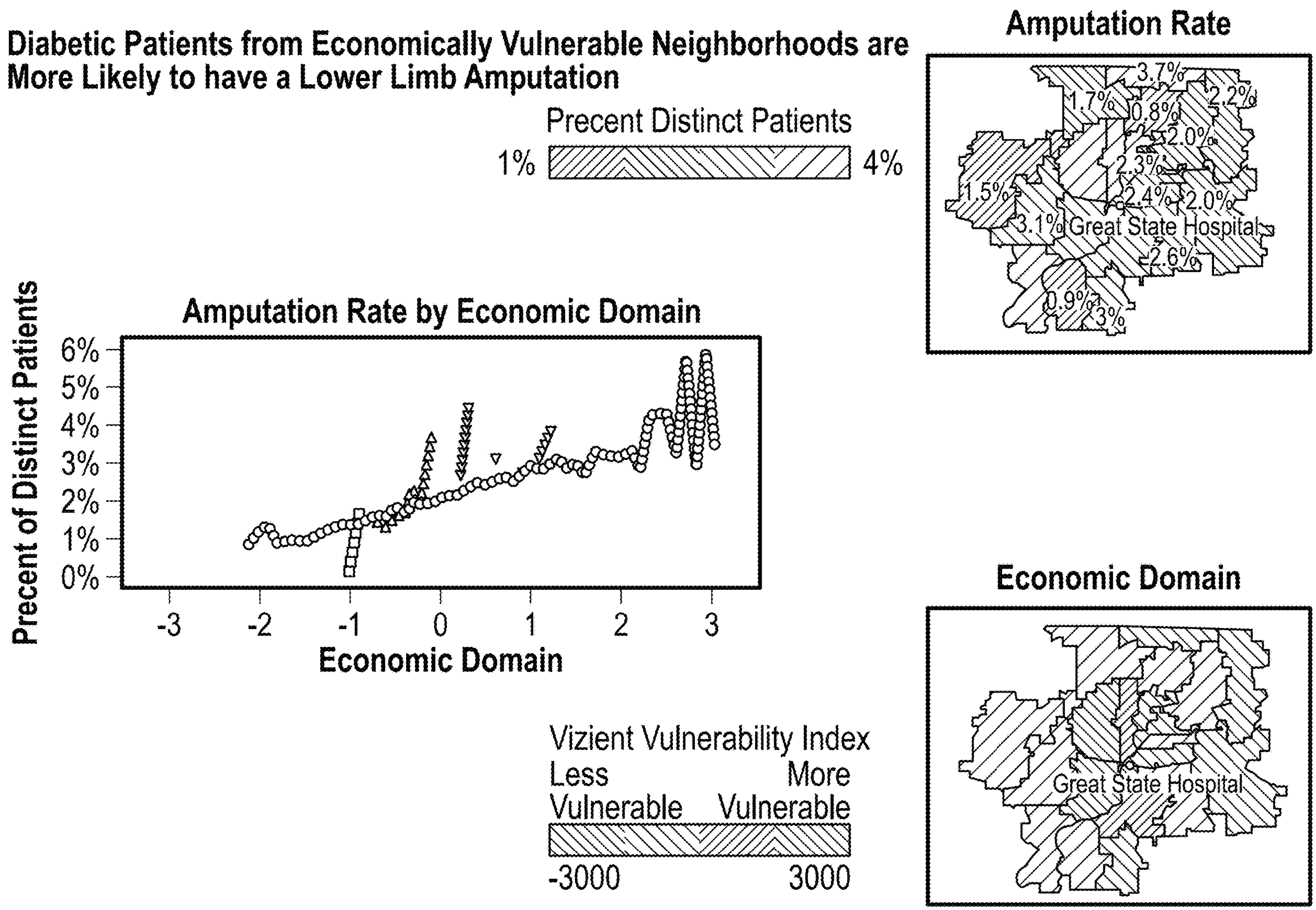
FIG. 39 illustrates how diabetic patients from economically vulnerable neighborhoods are more likely to have a lower limb amputation according to some embodiments.
Figure 40:
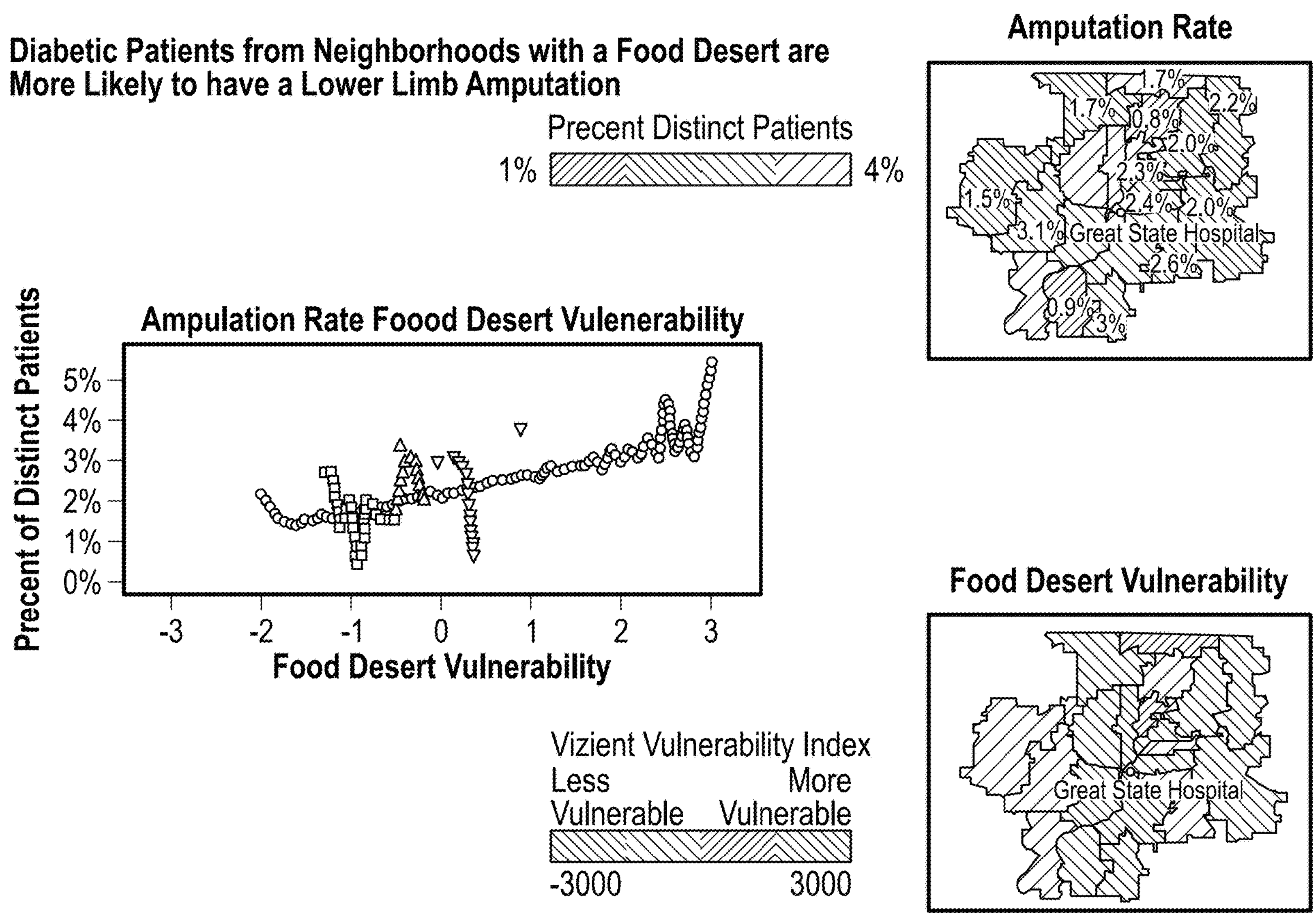
FIG. 40 shows how diabetic patients from neighborhoods with a food desert are more likely to have a lower limb amputation according to some embodiments.

In some embodiments, the system identified and output the domains and components of the vulnerability index that had the most reliable relationships to each of these metrics across all member hospitals. In some embodiments, for the diabetes metrics, this identified three domains and one component: economic domain including poverty, unemployment and lower median income; health care access domain, which reflects the percent of a neighborhood's residents with health insurance; education domain including college education, high school enrollment, and preschool enrollment; and one specific component of the neighborhood domain, food deserts, reflecting the percent of a neighborhood that is both in poverty and more than ½ a mile (urban) or 1 mile (rural) from a supermarket. FIG. 28 illustrates Great State system diabetes incidence and complications statistics outputs according to some embodiments. FIG. 29 shows calculations for how diabetes is more common among patients from more vulnerable neighborhoods according to some embodiments. FIG. 30 depict more calculations for how diabetes is more common among patients from more vulnerable neighborhoods according to some embodiments. FIG. 31 shows the system outputting how diabetes is more common among patients from economically vulnerable neighborhoods according to some embodiments. FIG. 32 depicts a system output showing how diabetes is more common among patients from neighborhoods with an education vulnerability according to some embodiments. FIG. 33 illustrates how diabetic patients from more vulnerable neighborhoods are more likely to have A1C>9 according to some embodiments. FIG. 34 shows a vulnerability index output depicting how diabetic patients from more vulnerable neighborhoods are more likely to have A1C>9 according to some embodiments. FIG. 35 shows how diabetic patients from neighborhoods with fewer insured residents are more likely to have A1C>9 according to some embodiments. FIG. 36 illustrates how diabetic patients from neighborhoods with a food desert are more likely to have A1C>9 according to some embodiments. FIG. 37 shows how diabetic patients from more vulnerable neighborhoods are more likely to have a lower limb amputation according to some embodiments. FIG. 38 shows a vulnerability index output of analytics of how diabetic patients from more vulnerable neighborhoods are more likely to have a lower limb amputation according to some embodiments. FIG. 39 illustrates how diabetic patients from economically vulnerable neighborhoods are more likely to have a lower limb amputation according to some embodiments. FIG. 40 shows how diabetic patients from neighborhoods with a food desert are more likely to have a lower limb amputation according to some embodiments.

In some embodiments, the system is configured to calculate and/or display emergency department utilization and neighborhood vulnerability. In some embodiments, three metrics related to outpatient ED utilization are included in this section. In some embodiments, patients from more vulnerable neighborhoods are: more likely to have at least one ED visit in 2019 or 2020 (restricted to patients residing within 25 miles); more likely to return to a second outpatient ED visit within 30 days; and less likely to have at least one office visit, among member hospitals that submit this data in the CDB.

In some embodiments, there is very little overlap between the patients seen in the ED and those seen in office visits during this time period in member hospitals that report office visit data to the CDB. In some embodiments, the system identified the domains and components of the vulnerability index that had the most reliable relationships to each of these metrics across all member hospitals. In some embodiments, for the ED metrics, this identified three domains and one component: economic domain including poverty, unemployment and lower median income; transportation domain which reflects access to cars and public transportation; neighborhood domain including park access, food deserts, and alcohol sales; and one specific component of the social domain: the percent of families with single parents.

Figure 41:
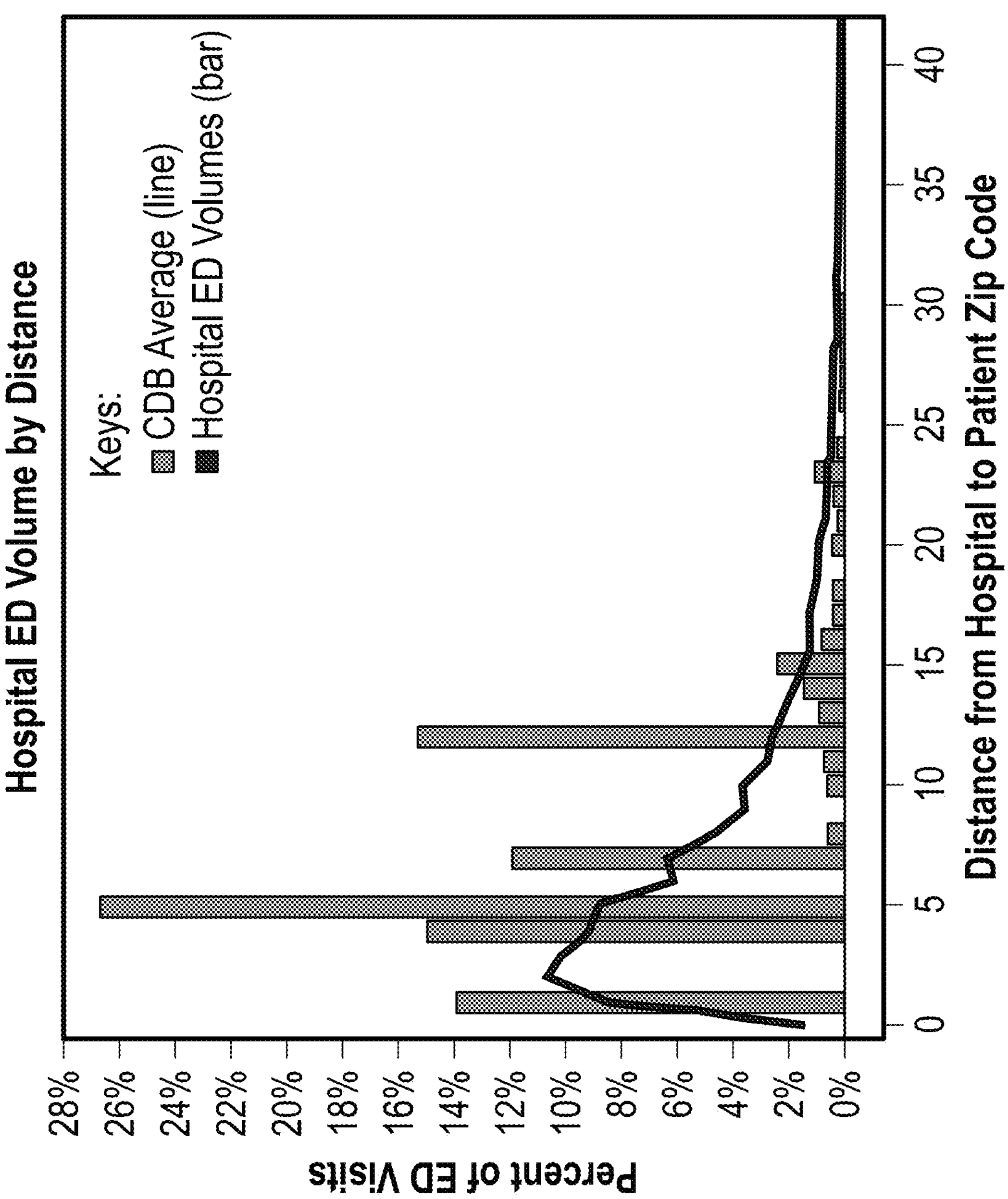
FIG. 41 shows a system output that includes how emergency departments (ED) frequently serve a smaller geographic area than the hospital as a whole according to some embodiments.
Figure 43:
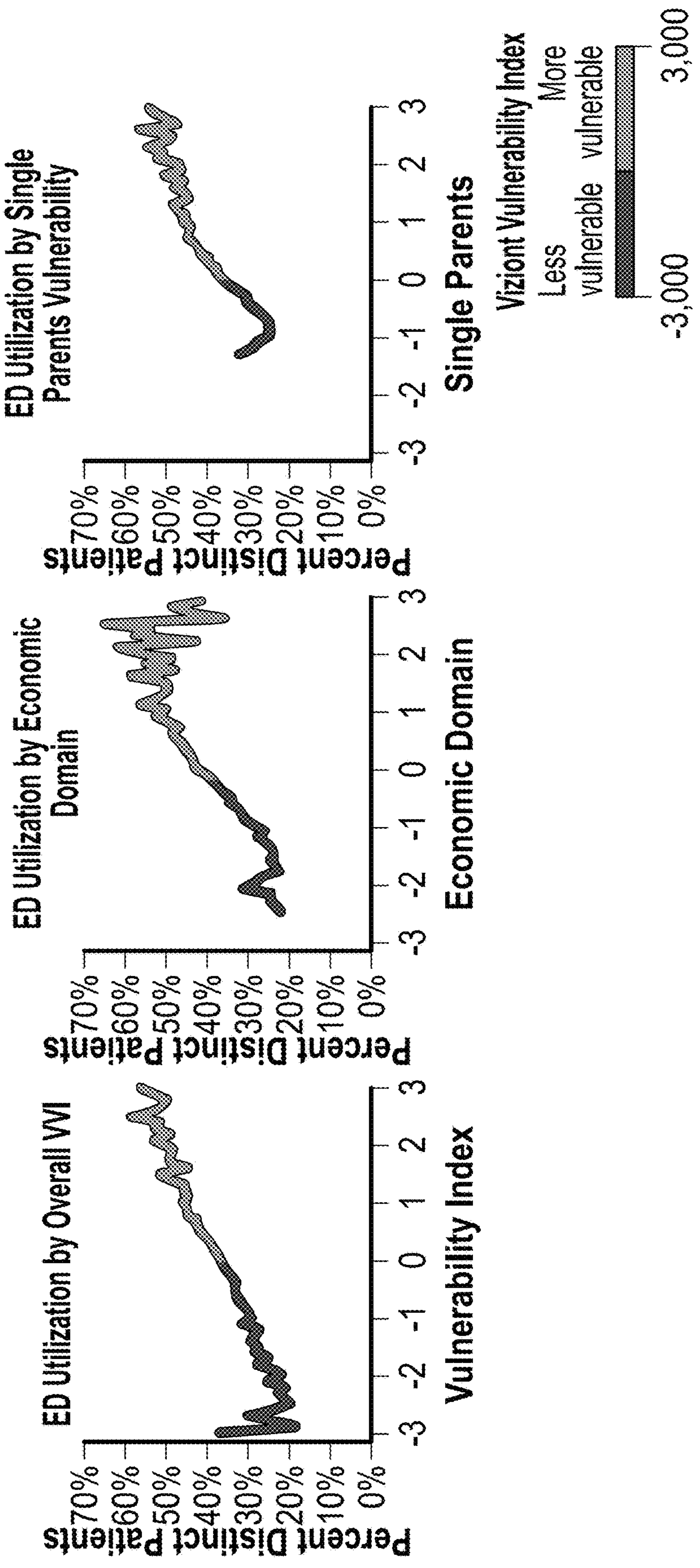
FIG. 43 show the system displaying how emergency department utilization is more common among patients from more vulnerable neighborhoods according to some embodiments.
Figure 44:
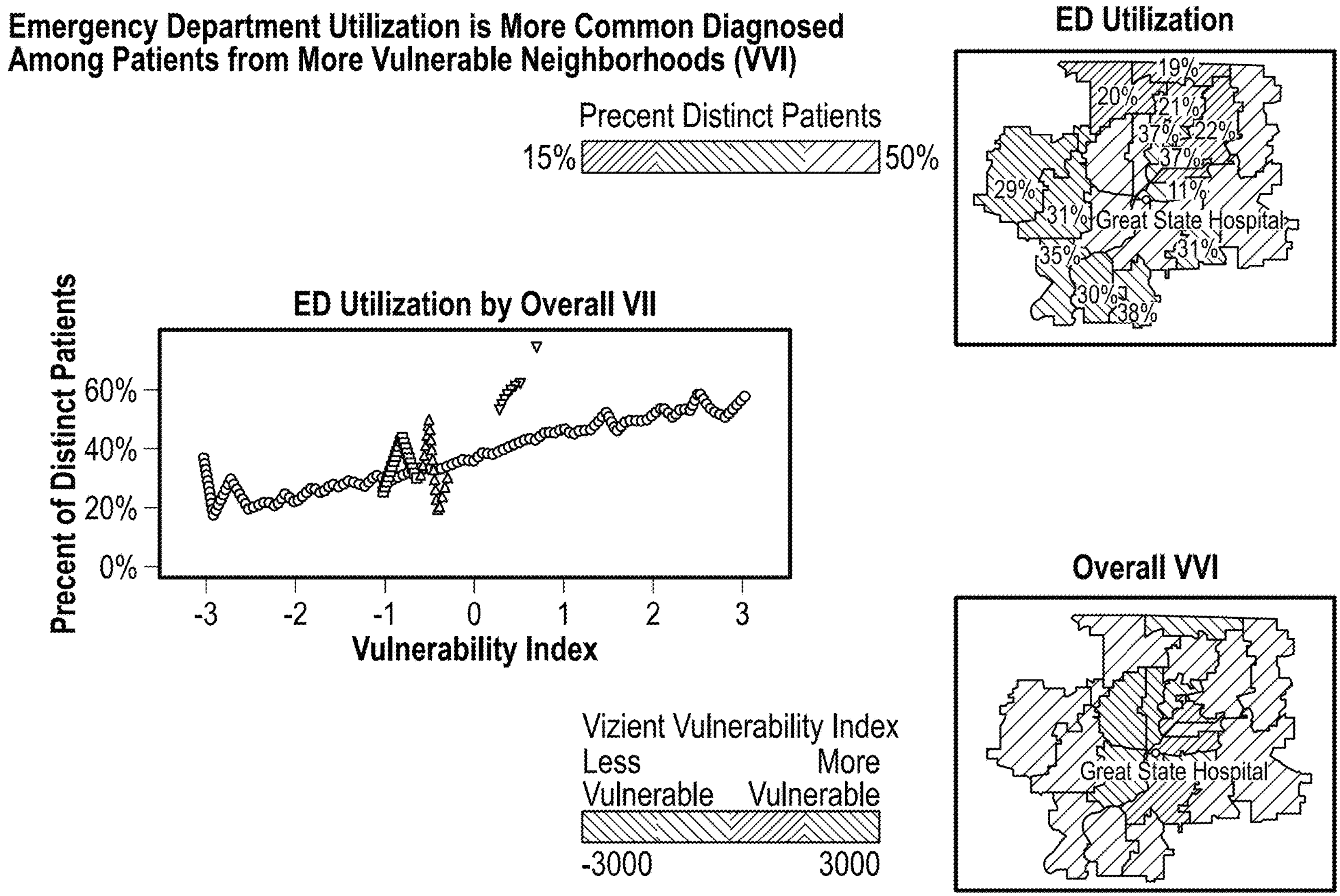
FIG. 44 shows another non-limiting example of the system displaying how emergency department utilization is more common among patients from more vulnerable neighborhoods according to some embodiments.
Figure 45:
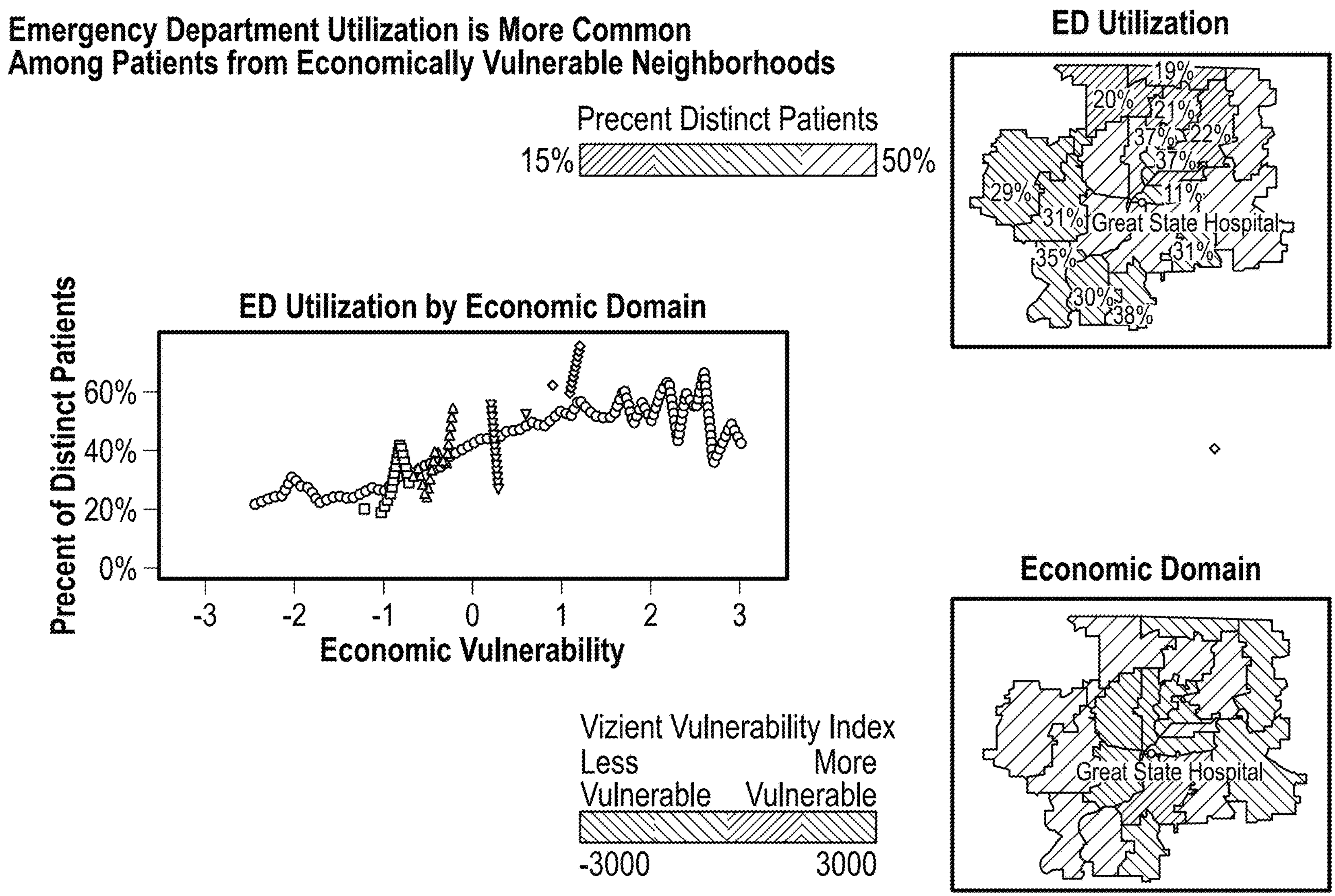
FIG. 45 shows how emergency department utilization is more common among patients from economically vulnerable neighborhoods according to some embodiments.
Figure 46:
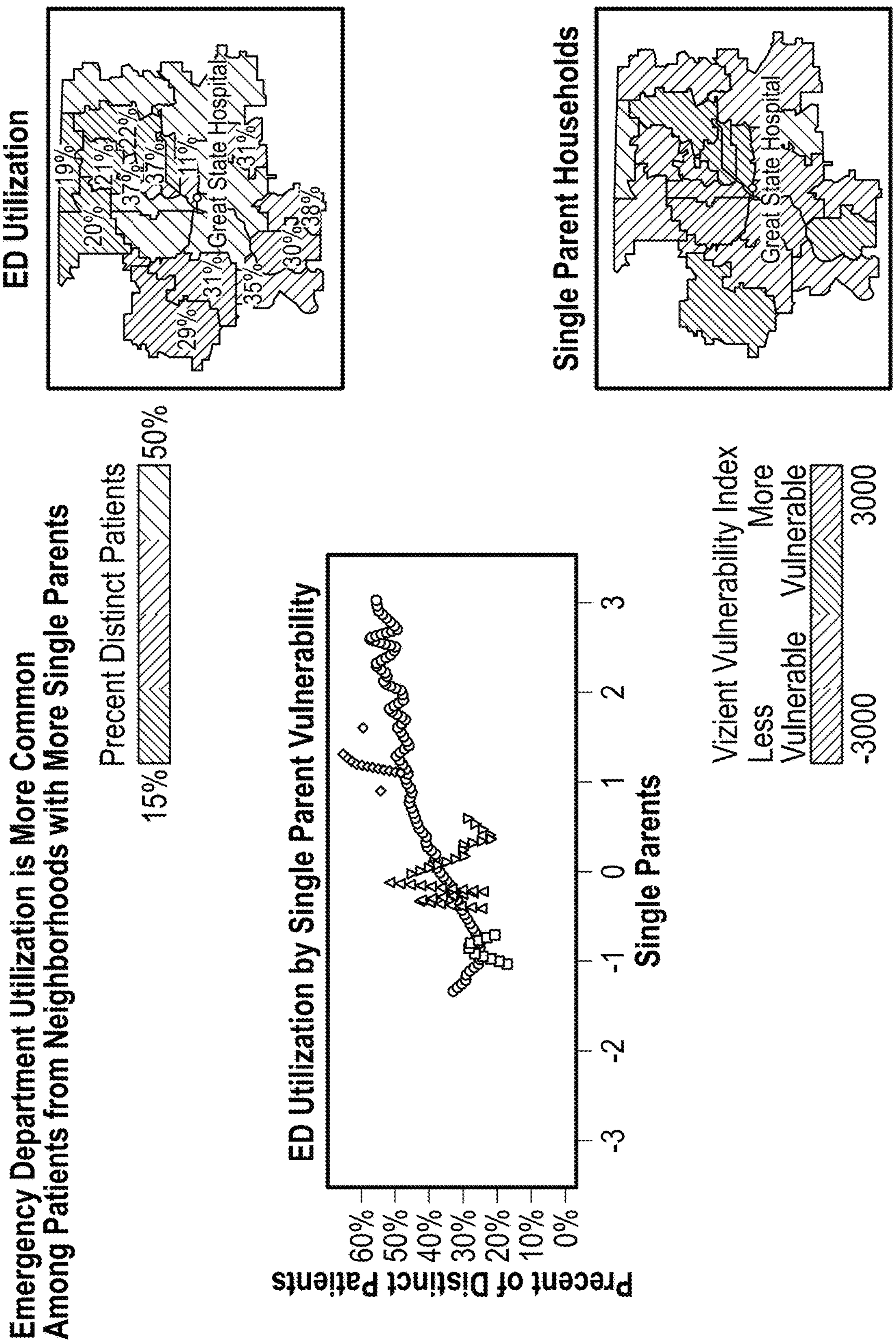
FIG. 46 illustrates how emergency department utilization is more common among patients from neighborhoods with more single parents.
Figure 47:
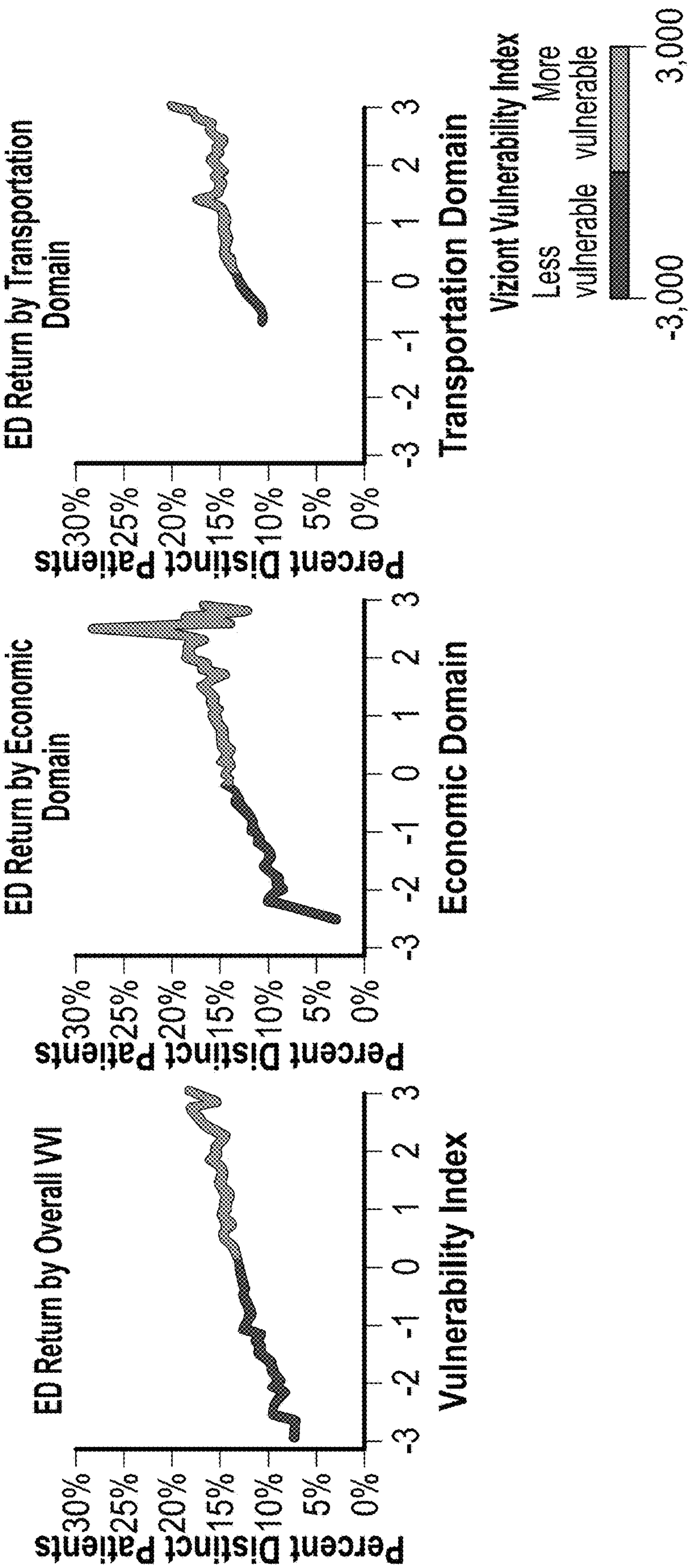
FIG. 47 depicts the system outputting graphs relating to how ED patients from more vulnerable neighborhoods are more likely to return to the ED within 30 days according to some embodiments.
Figure 48:
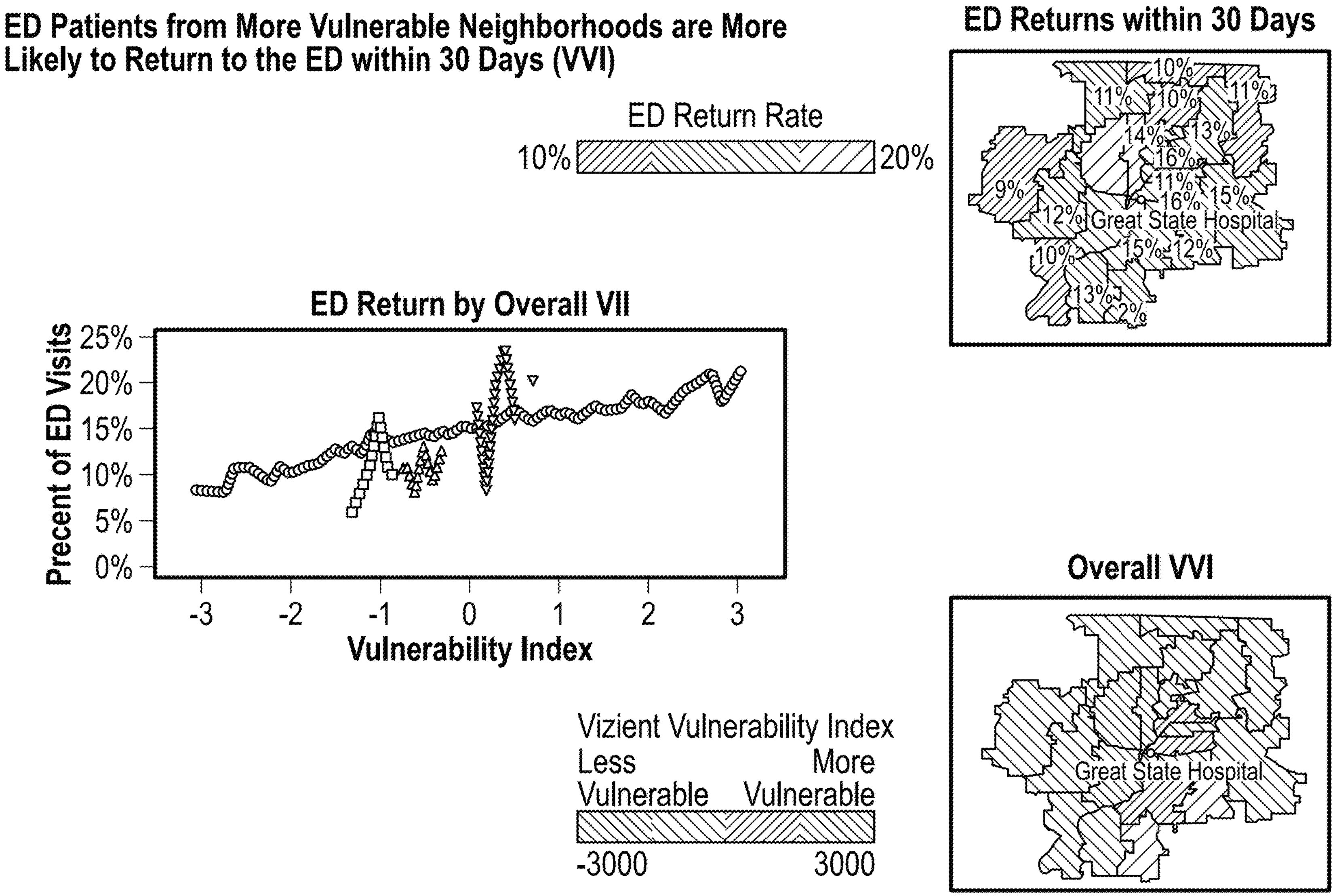
FIG. 48 is another example of a vulnerability index system outputting graphs relating to how ED patients from more vulnerable neighborhoods are more likely to return to the ED within 30 days according to some embodiments.
Figure 49:
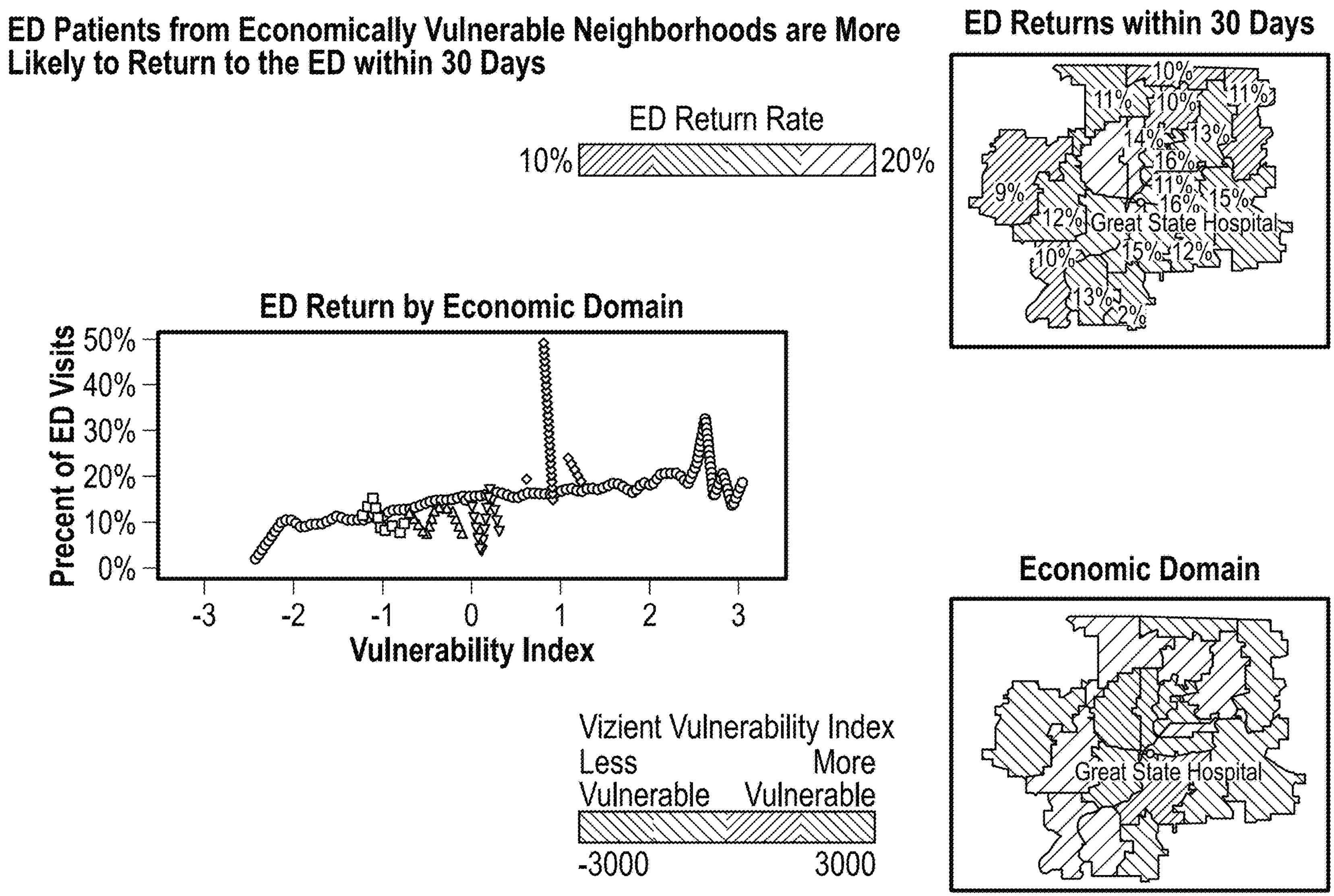
FIG. 49 illustrates how ED patients from economically vulnerable neighborhoods are more likely to return to the ED within 30 days according to some embodiments.
Figure 50:
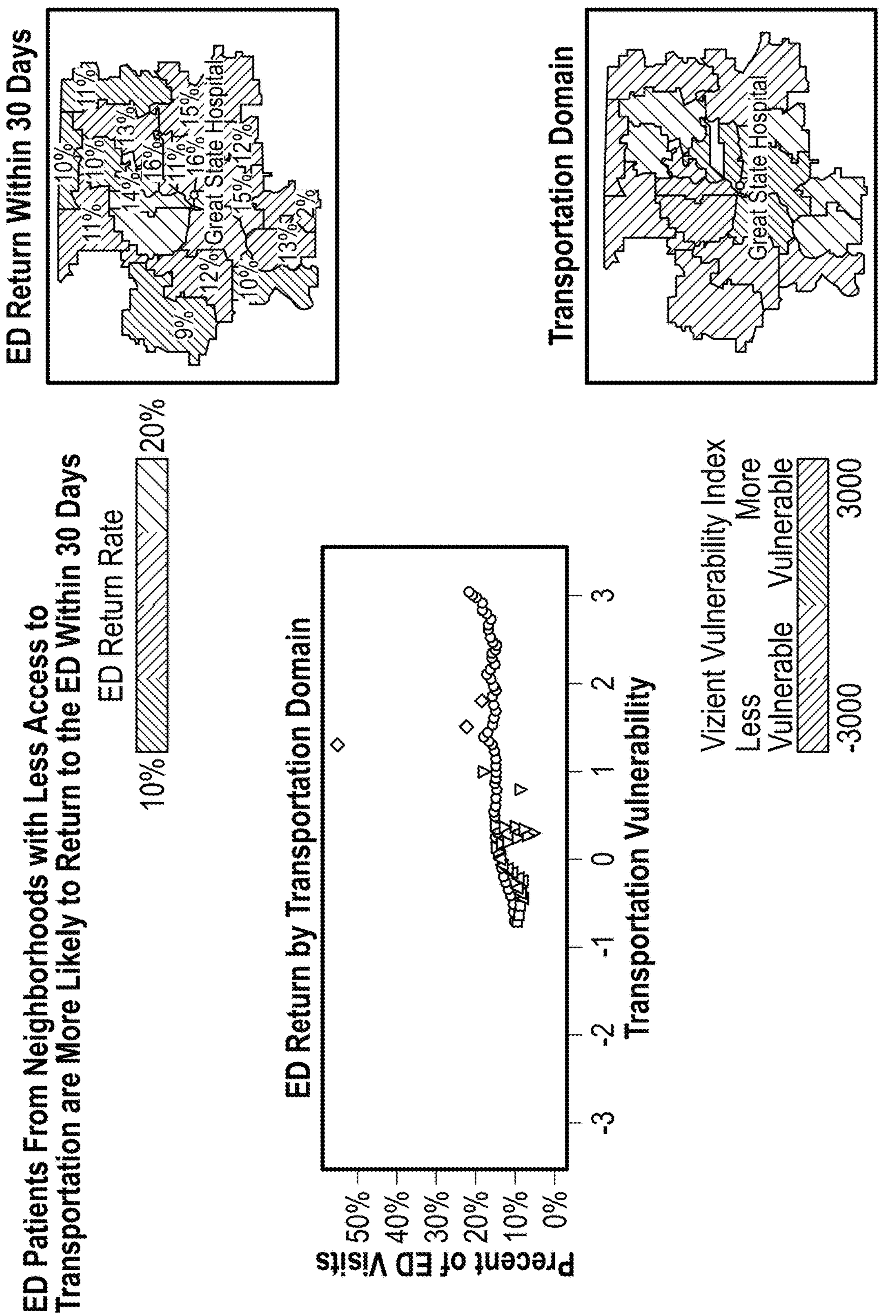
FIG. 50 illustrates how ED patients from neighborhoods with less access to transportation are more likely to return to the ED within 30 days according to some embodiments.
Figure 51:
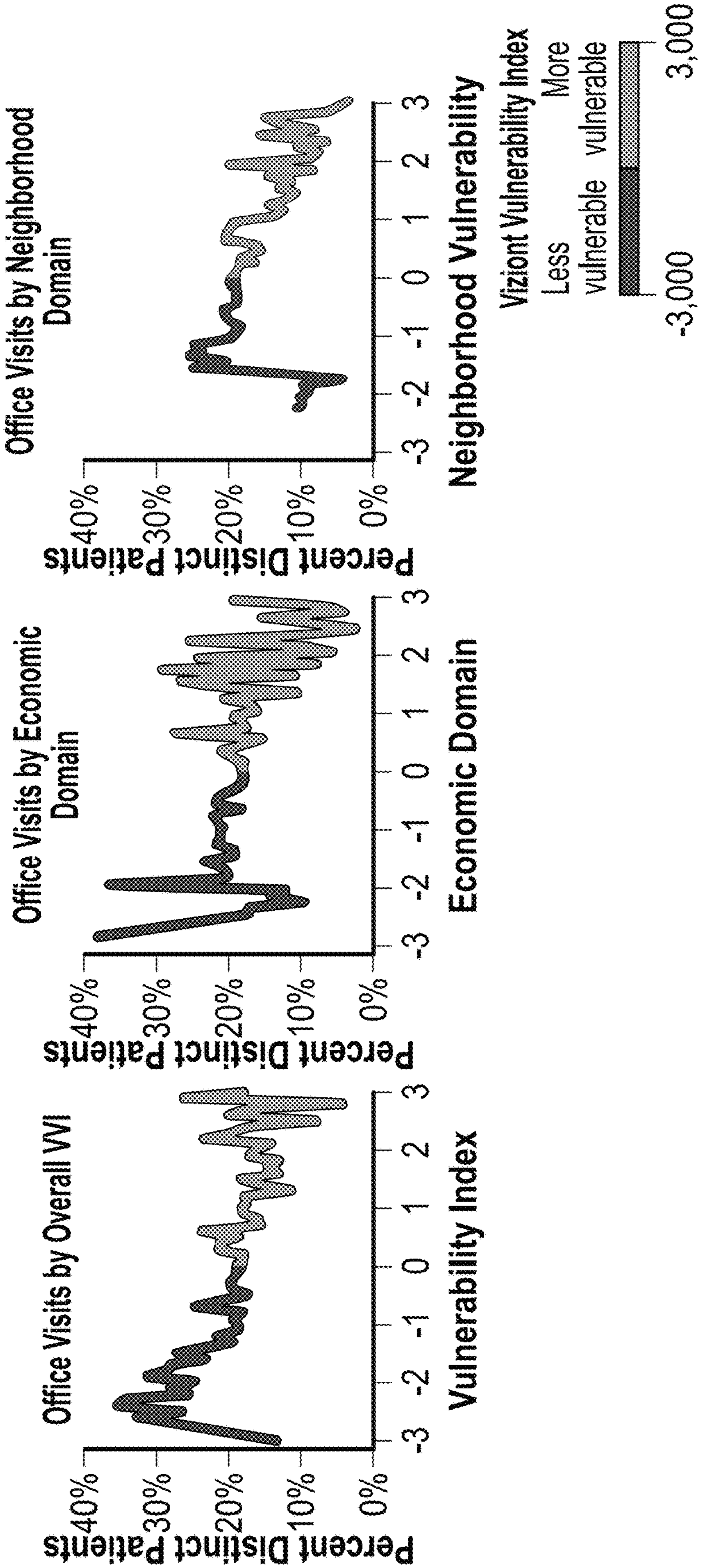
FIG. 51 shows how patients from more vulnerable neighborhoods are less likely to have any office visits according to some embodiments.
Figure 52:
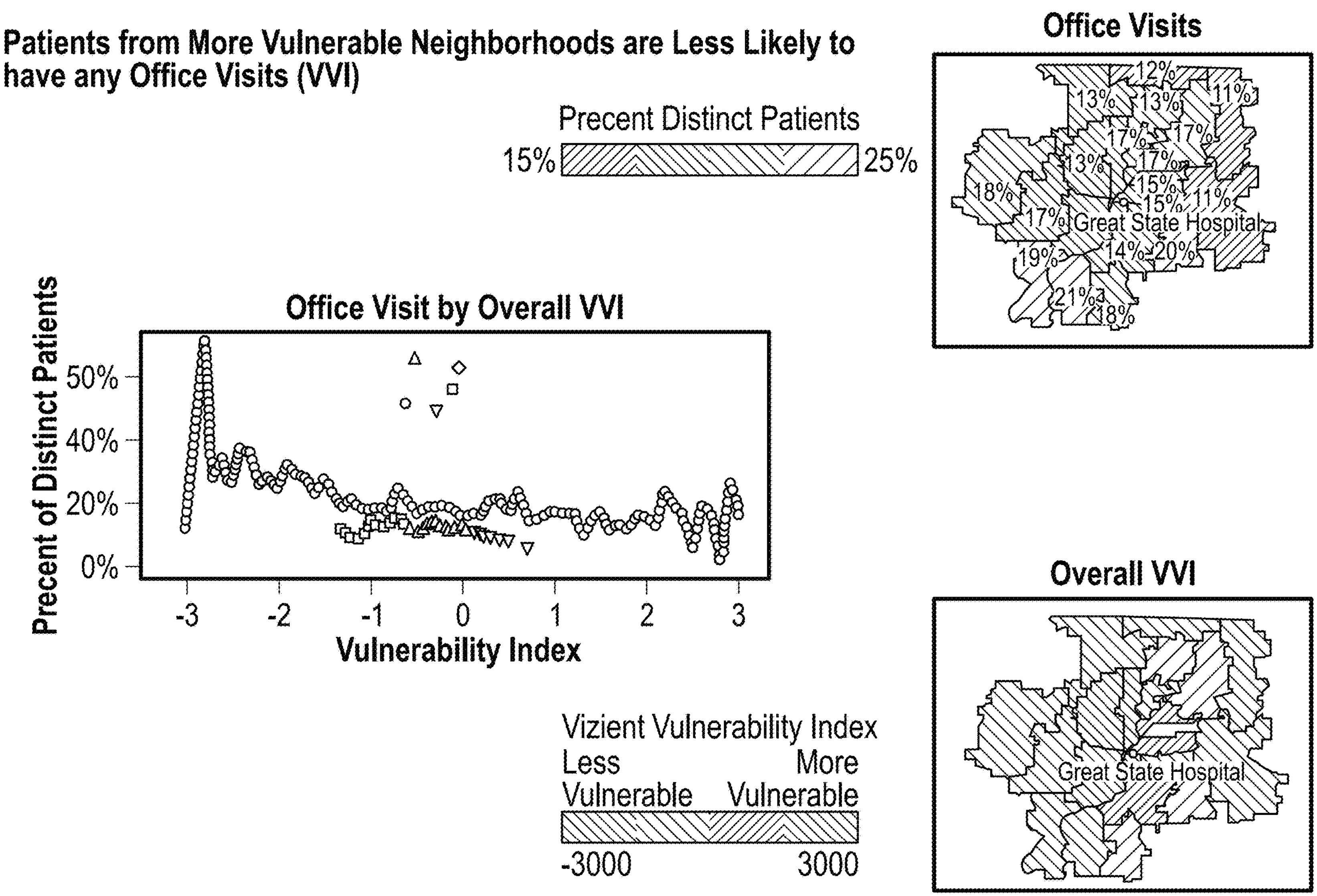
FIG. 52 is another non-limiting example of how the vulnerability index outputs how patients from more vulnerable neighborhoods are less likely to have any office visits according to some embodiments.
Figure 53:
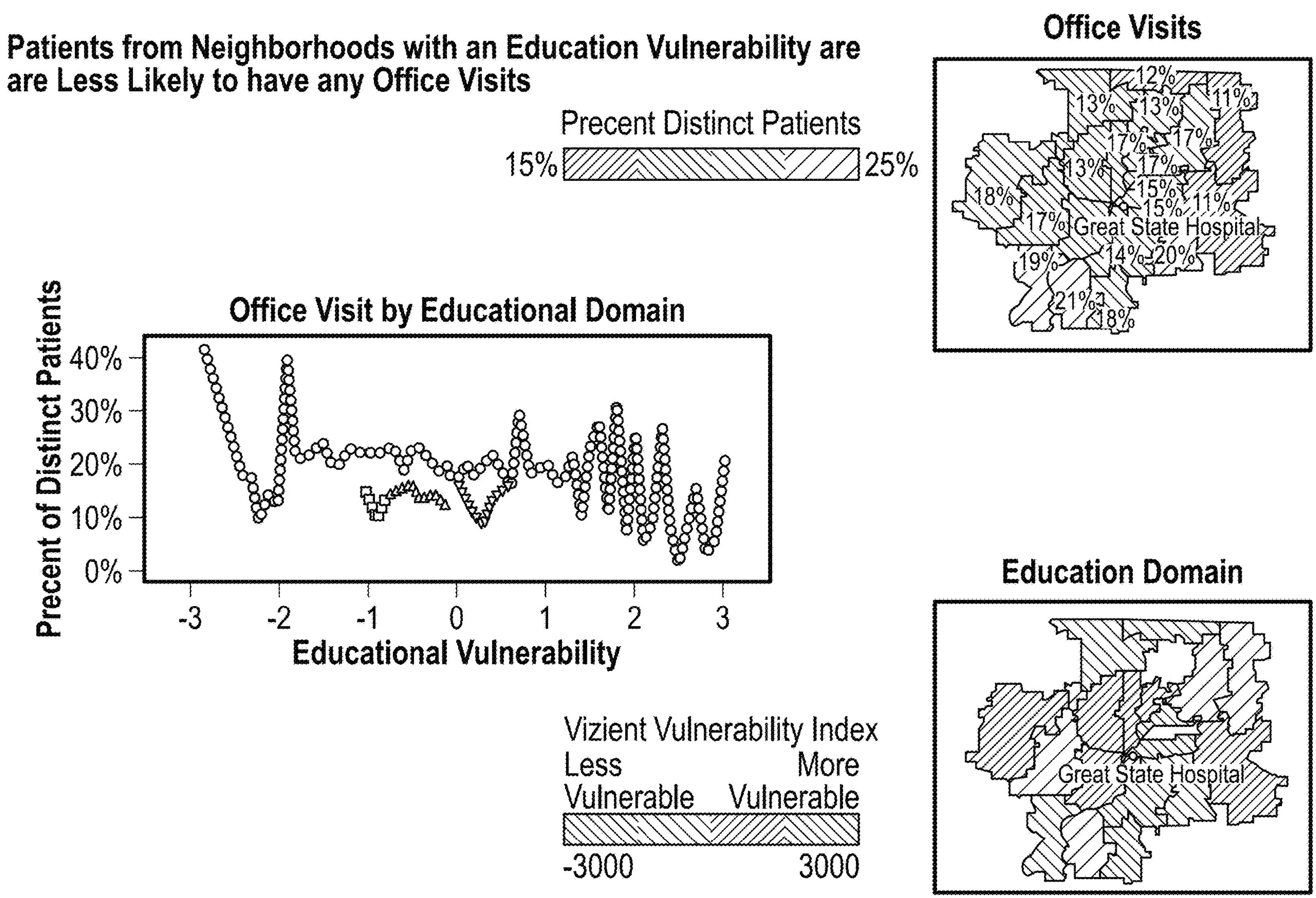
FIG. 53 shows how patients from neighborhoods with an education vulnerability are less likely to have any office visits according to some embodiments.
Figure 54:
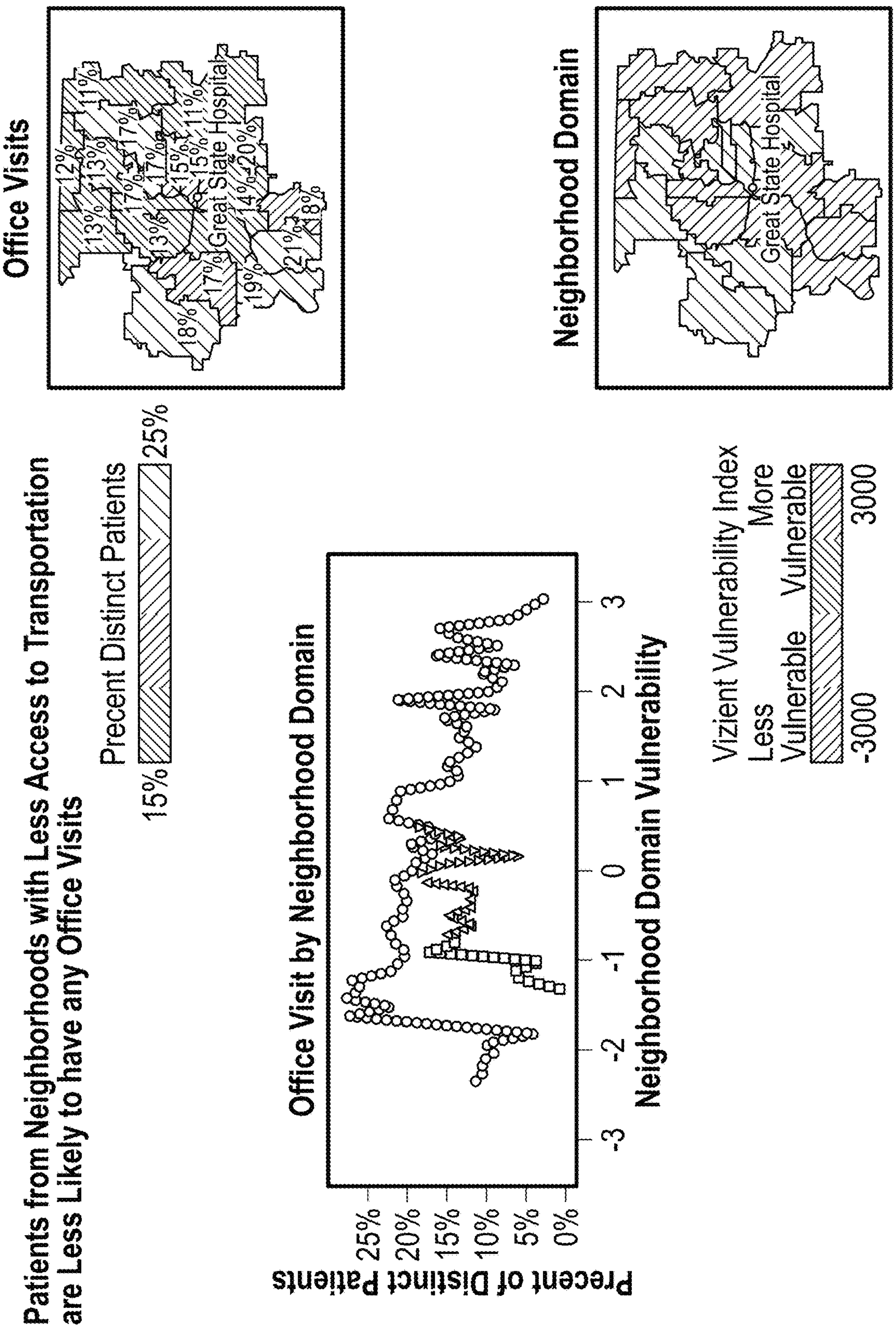
FIG. 54 depicts how patients from neighborhoods with less access to transportation are less likely to have any office visits according to some embodiments.

FIG. 41 shows a system output that includes how emergency departments (ED) frequently serve a smaller geographic area than the hospital as a whole according to some embodiments. FIG. 42 shows Great State System emergency department utilization statistics according to some embodiments. FIG. 43 show the system displaying how emergency department utilization is more common among patients from more vulnerable neighborhoods according to some embodiments. FIG. 44 shows another non-limiting example of the system displaying how emergency department utilization is more common among patients from more vulnerable neighborhoods according to some embodiments. FIG. 45 shows how emergency department utilization is more common among patients from economically vulnerable neighborhoods according to some embodiments. FIG. 46 illustrates how emergency department utilization is more common among patients from neighborhoods with more single parents. FIG. 47 depicts the system outputting graphs relating to how ED patients from more vulnerable neighborhoods are more likely to return to the ED within 30 days according to some embodiments. FIG. 48 is another example of the vulnerability index system outputting graphs relating to how ED patients from more vulnerable neighborhoods are more likely to return to the ED within 30 days according to some embodiments. FIG. 49 illustrates how ED patients from economically vulnerable neighborhoods are more likely to return to the ED within 30 days according to some embodiments. FIG. 50 illustrates how ED patients from neighborhoods with less access to transportation are more likely to return to the ED within 30 days according to some embodiments. FIG. 51 shows how patients from more vulnerable neighborhoods are less likely to have any office visits according to some embodiments. FIG. 52 is another non-limiting example of how vulnerability index outputs how patients from more vulnerable neighborhoods are less likely to have any office visits according to some embodiments. FIG. 53 shows how patients from neighborhoods with an education vulnerability are less likely to have any office visits according to some embodiments. FIG. 54 depicts how patients from neighborhoods with less access to transportation are less likely to have any office visits according to some embodiments.

In some embodiments, the system is configured to assess risk by maternal health and neighborhood vulnerability. In some embodiments, the system receives one or more of three metrics related to maternal health. In some embodiments, each of the three metrics reflects a higher burden of disease in neighborhoods with higher vulnerability. In some embodiments, patients from more vulnerable neighborhoods are more likely to have hypertension complications of pregnancy, including pre-eclampsia and eclampsia (defined with diagnosis codes starting with O10, O11, O13, O14, O15, or O16); more likely to have a serious maternal complication (using the CDC serious maternal complications measure); more likely to have a baby with low birthweight (less than 2500 g or 5.5 lbs). In some embodiments, the vulnerability index is configured to identify the domains and components that have the most reliable relationships to each of these metrics across all member hospitals.

In some embodiments, for the maternal health metrics, this identified three domains and one component: economic domain including poverty, unemployment and lower median income; health care access domain, which reflects the percent of a neighborhood's residents with health insurance; housing domain including crowded housing, incomplete plumbing, and severe housing costs (>50% of income for households below 80% of the poverty line); and one specific component of the social domain, the percent of families with single parents.

Figure 56:
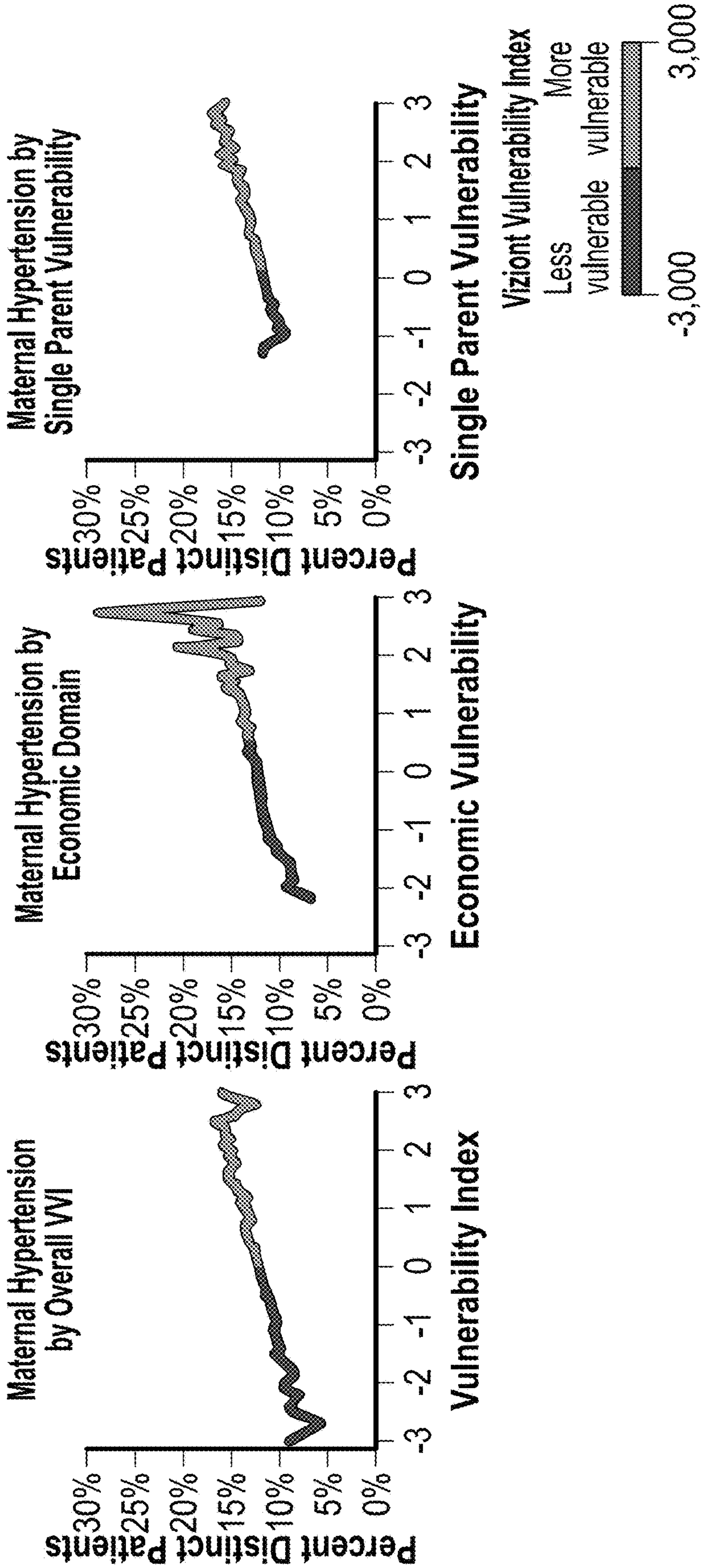
FIG. 56 illustrates how maternal hypertension is more common among patients from more vulnerable neighborhoods according to some embodiments.
Figure 57:
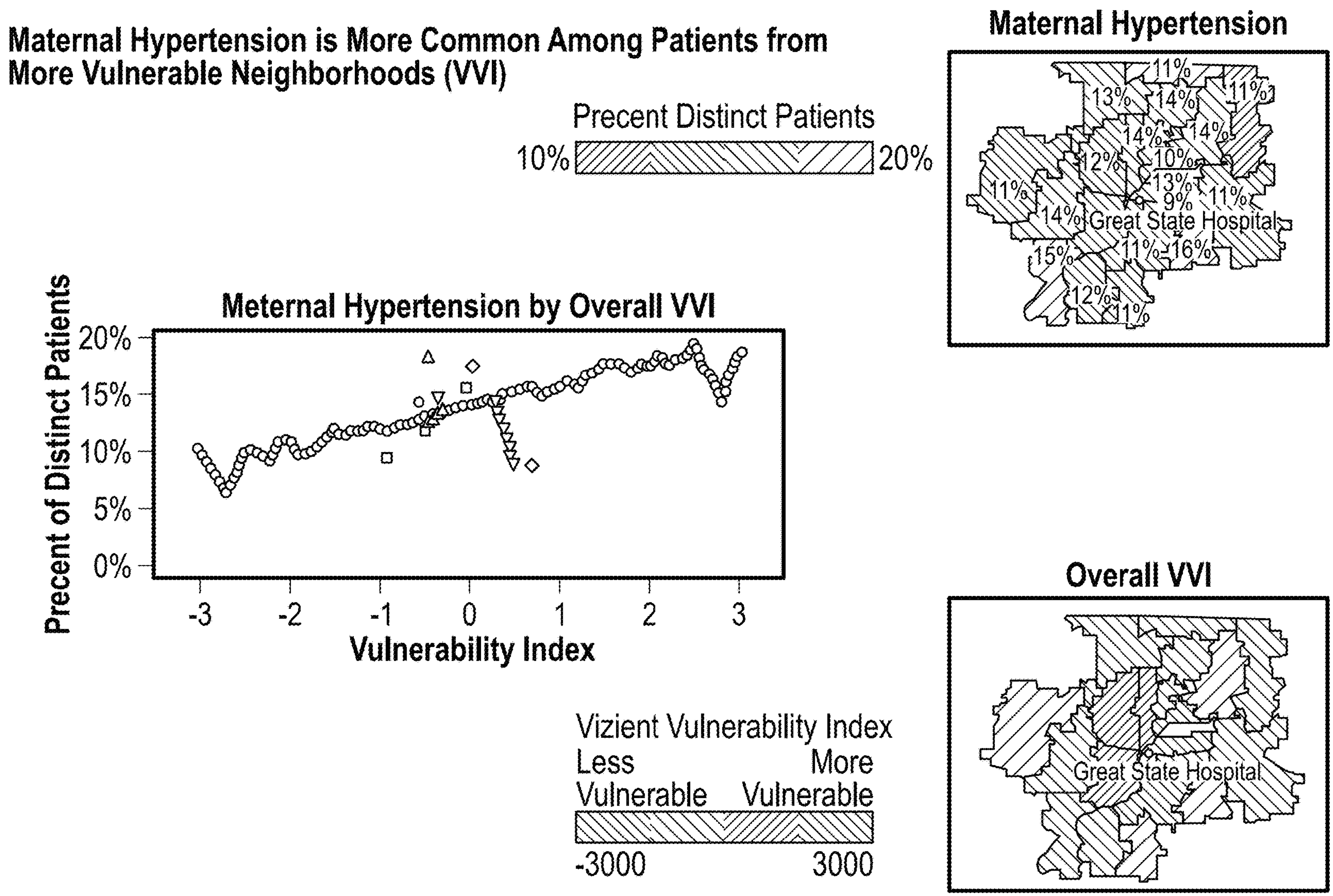
FIG. 57 depicts vulnerability index system generated statistics of how maternal hypertension is more common among patients from more vulnerable neighborhoods according to some embodiments.
Figure 58:
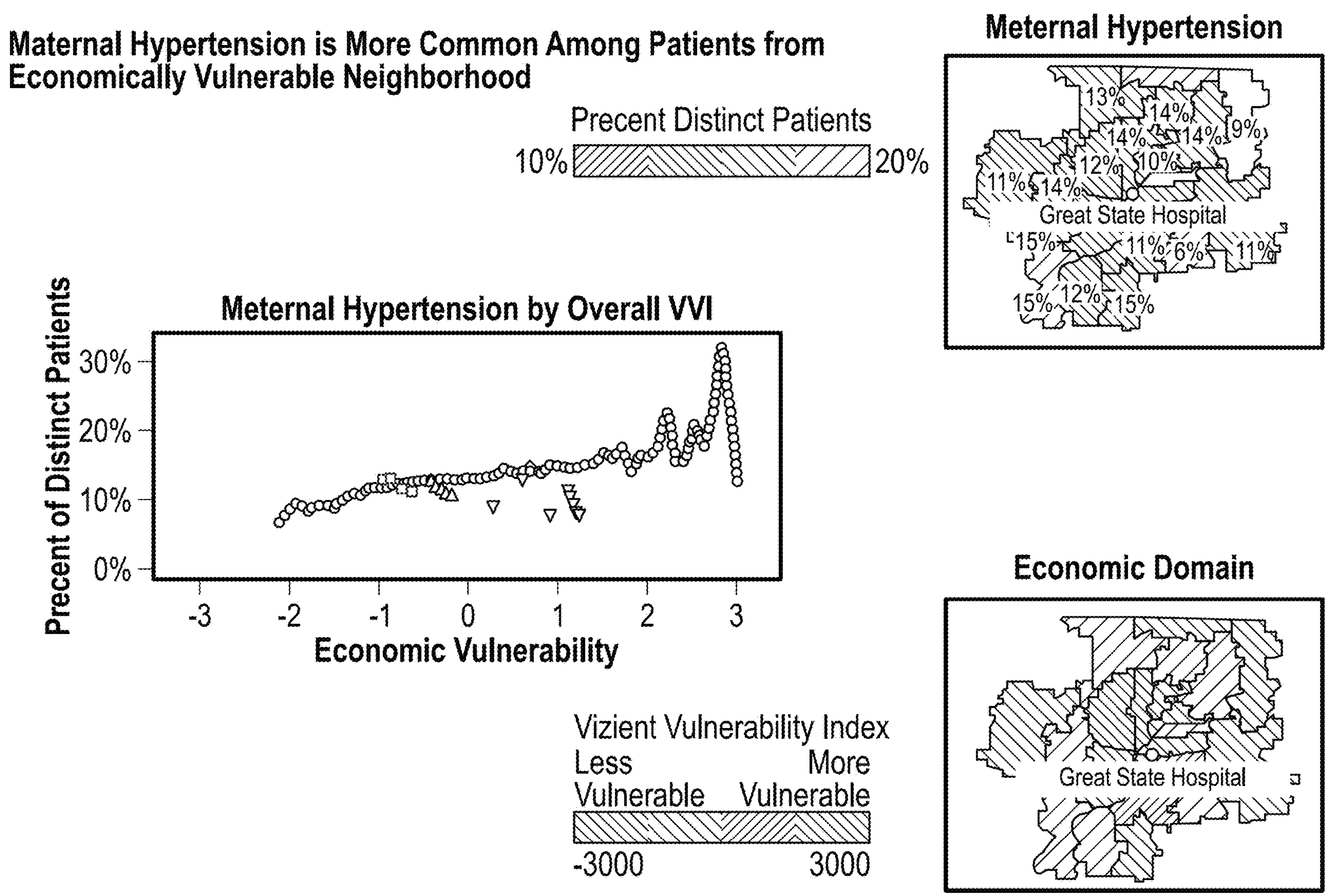
FIG. 58 shows how maternal hypertension is more common among patients from economically vulnerable neighborhoods according to some embodiments.
Figure 59:
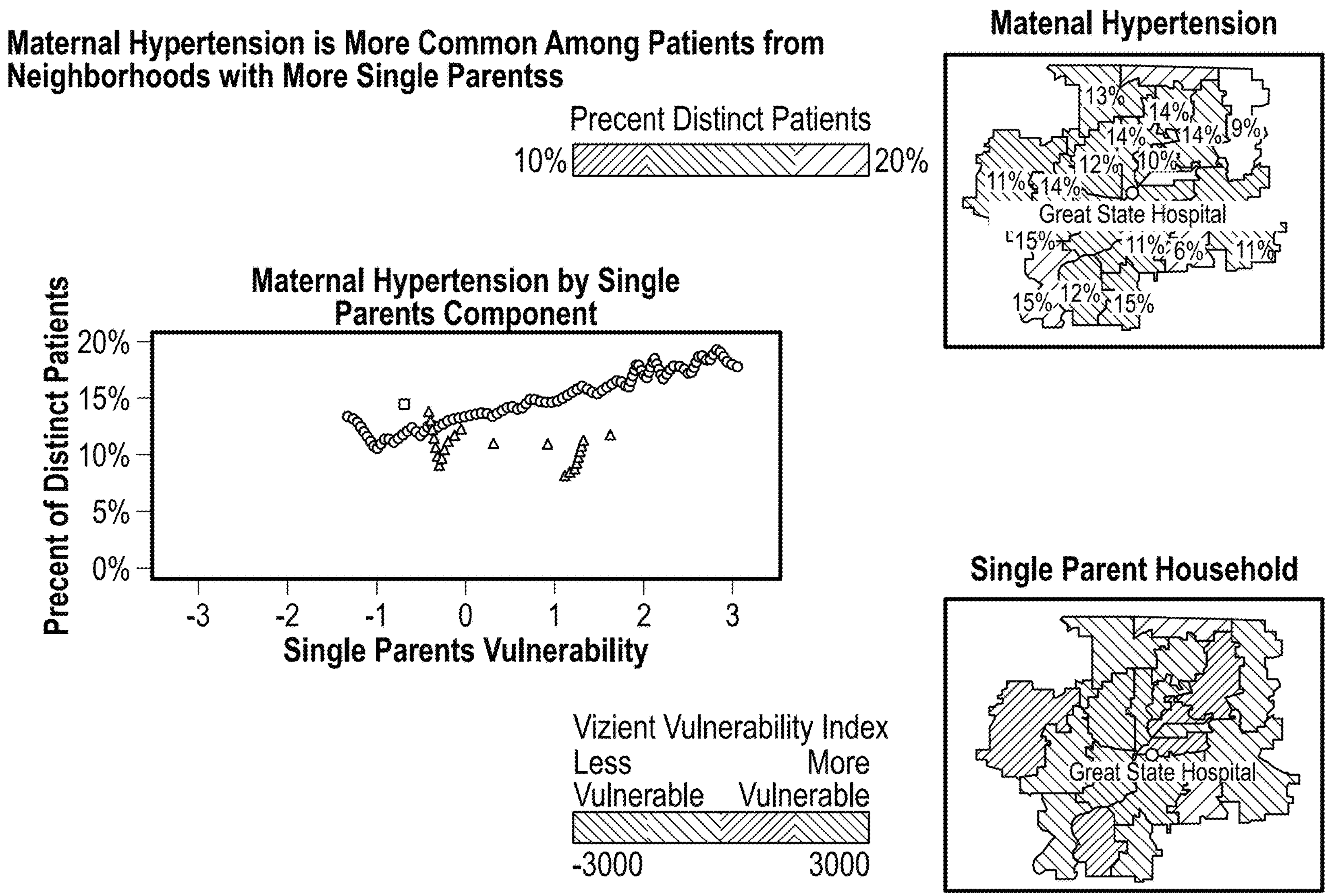
FIG. 59 shows how maternal hypertension is more common among patients from neighborhoods with more single parents according to some embodiments.
Figure 60:
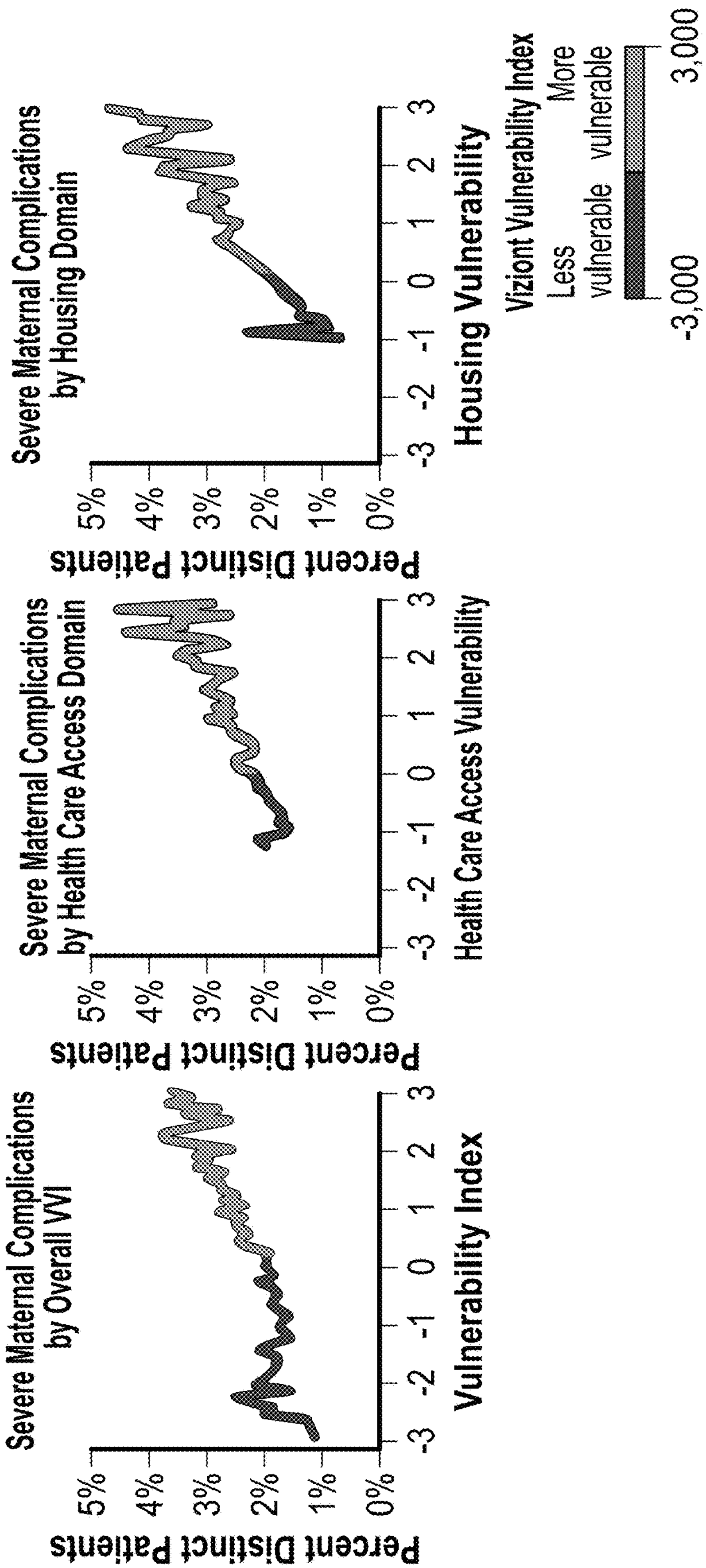
FIG. 60 illustrates how severe maternal complications are more common among patients from more vulnerable neighborhoods according to some embodiments.
Figure 61:
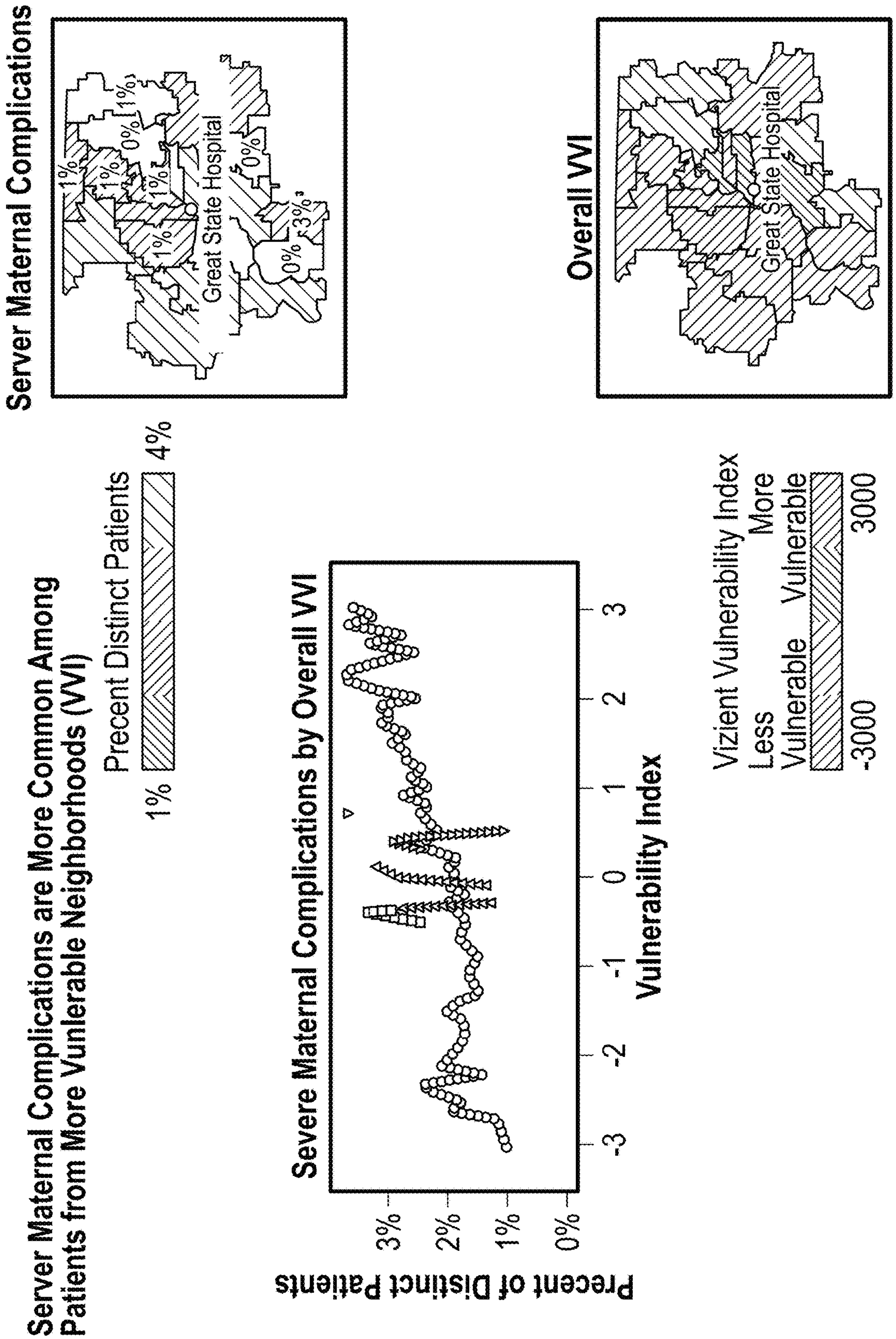
FIG. 61 depicts how vulnerability index system displays how severe maternal complications are more common among patients from more vulnerable neighborhoods according to some embodiments.

FIG. 55 depicts great state system maternity care statistical outputs according to some embodiments. FIG. 56 illustrates how maternal hypertension is more common among patients from more vulnerable neighborhoods according to some embodiments. FIG. 57 depicts vulnerability index generated statistics of how maternal hypertension is more common among patients from more vulnerable neighborhoods according to some embodiments. FIG. 58 shows how maternal hypertension is more common among patients from economically vulnerable neighborhoods according to some embodiments. FIG. 59 shows how maternal hypertension is more common among patients from neighborhoods with more single parents according to some embodiments. FIG. 60 illustrates how severe maternal complications are more common among patients from more vulnerable neighborhoods according to some embodiments. FIG. 61 depicts how vulnerability index displays how severe maternal complications are more common among patients from more vulnerable neighborhoods according to some embodiments.

Figure 62:
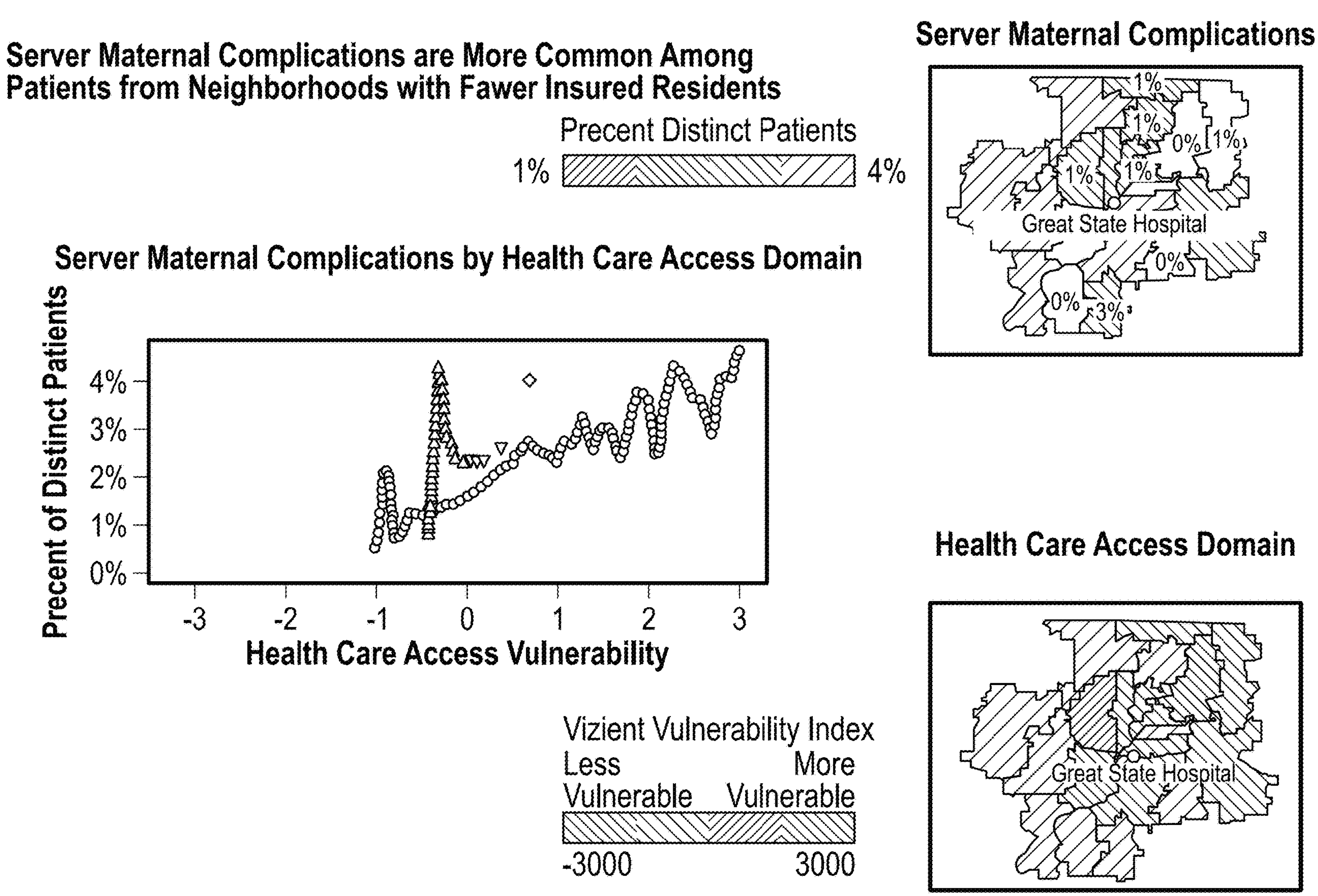
FIG. 62 illustrates how severe maternal complications are more common among patients from neighborhoods with fewer insured residents according to some embodiments.
Figure 63:
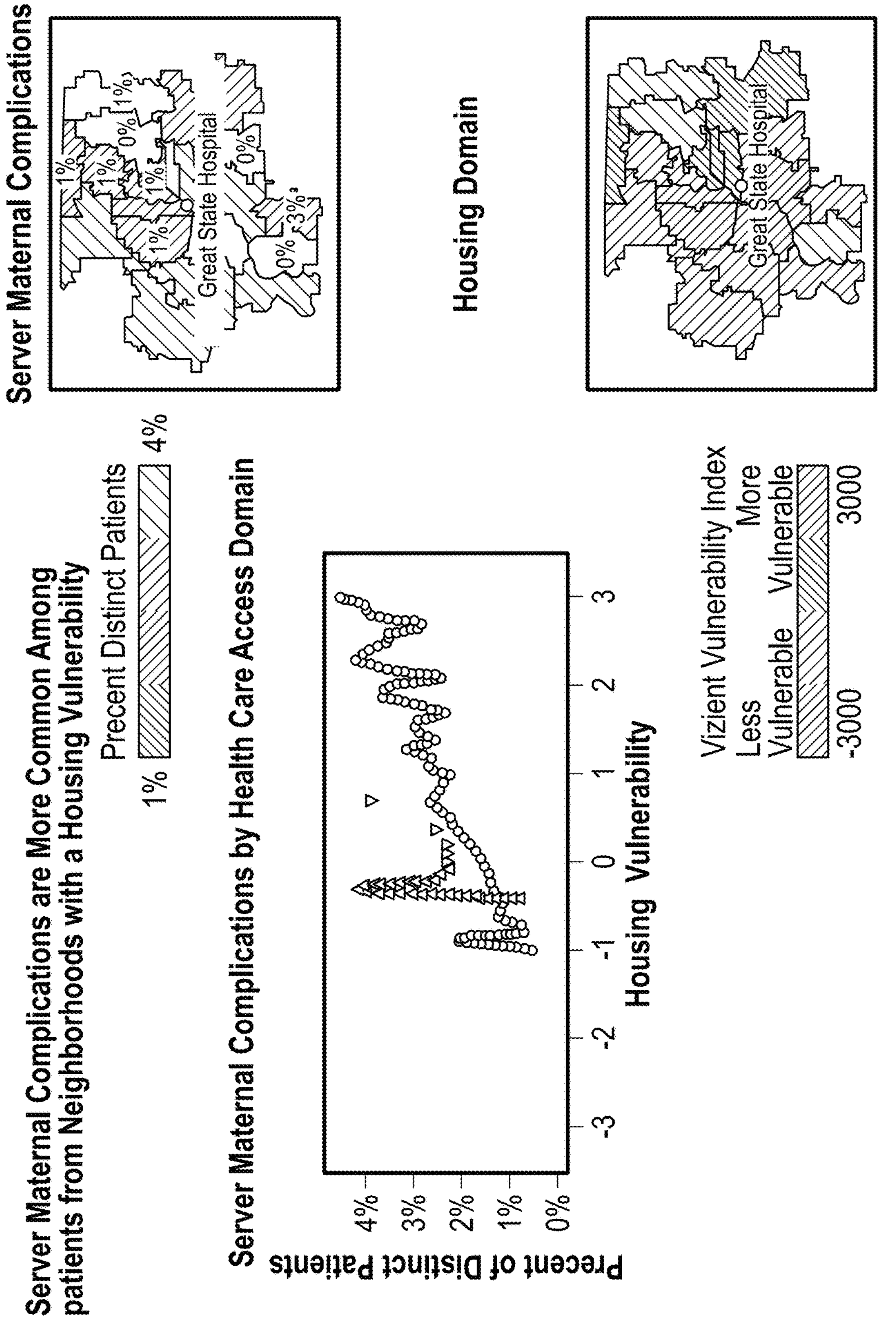
FIG. 63 shows how severe maternal complications are more common among patients from neighborhoods with a housing vulnerability according to some embodiments.
Figure 64:
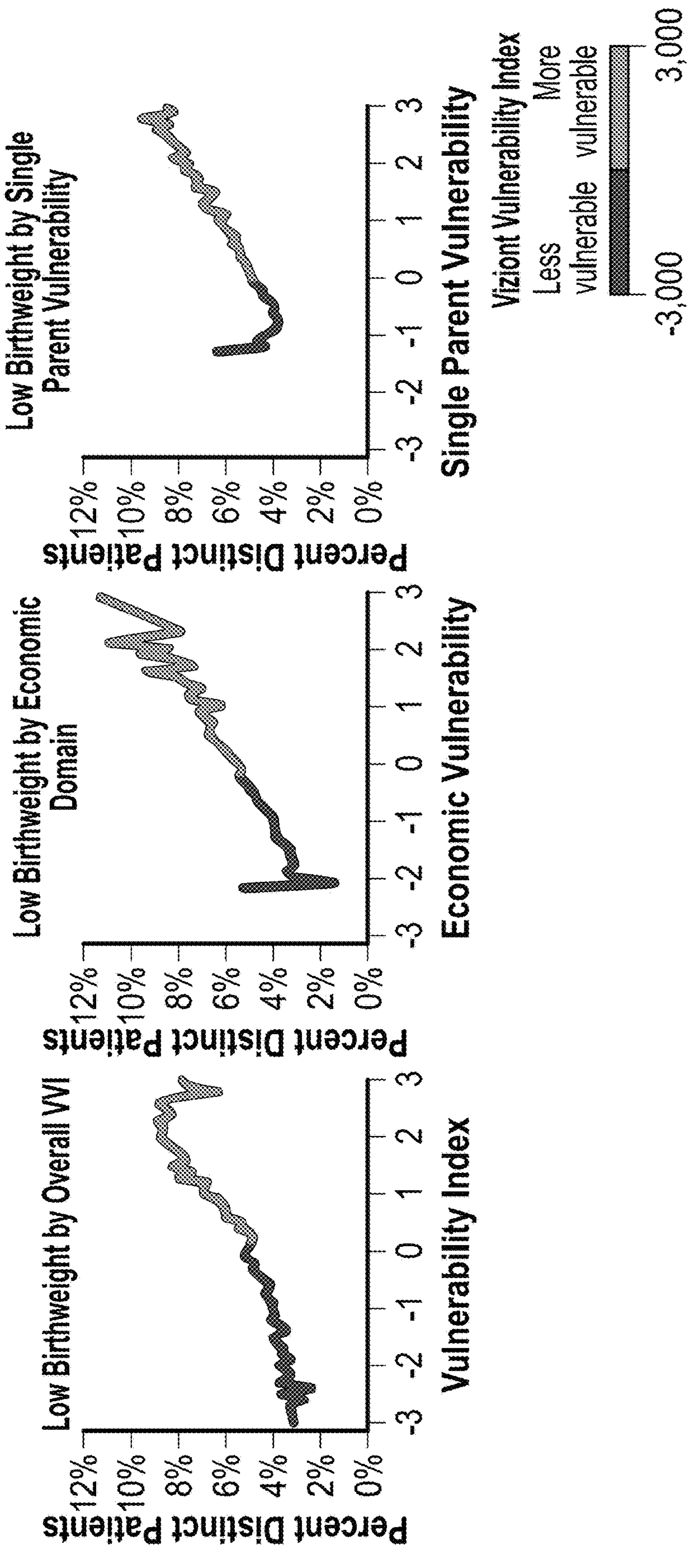
FIG. 64 depicts how newborns from more vulnerable neighborhoods are more likely to have low birthweight according to some embodiments.
Figure 65:
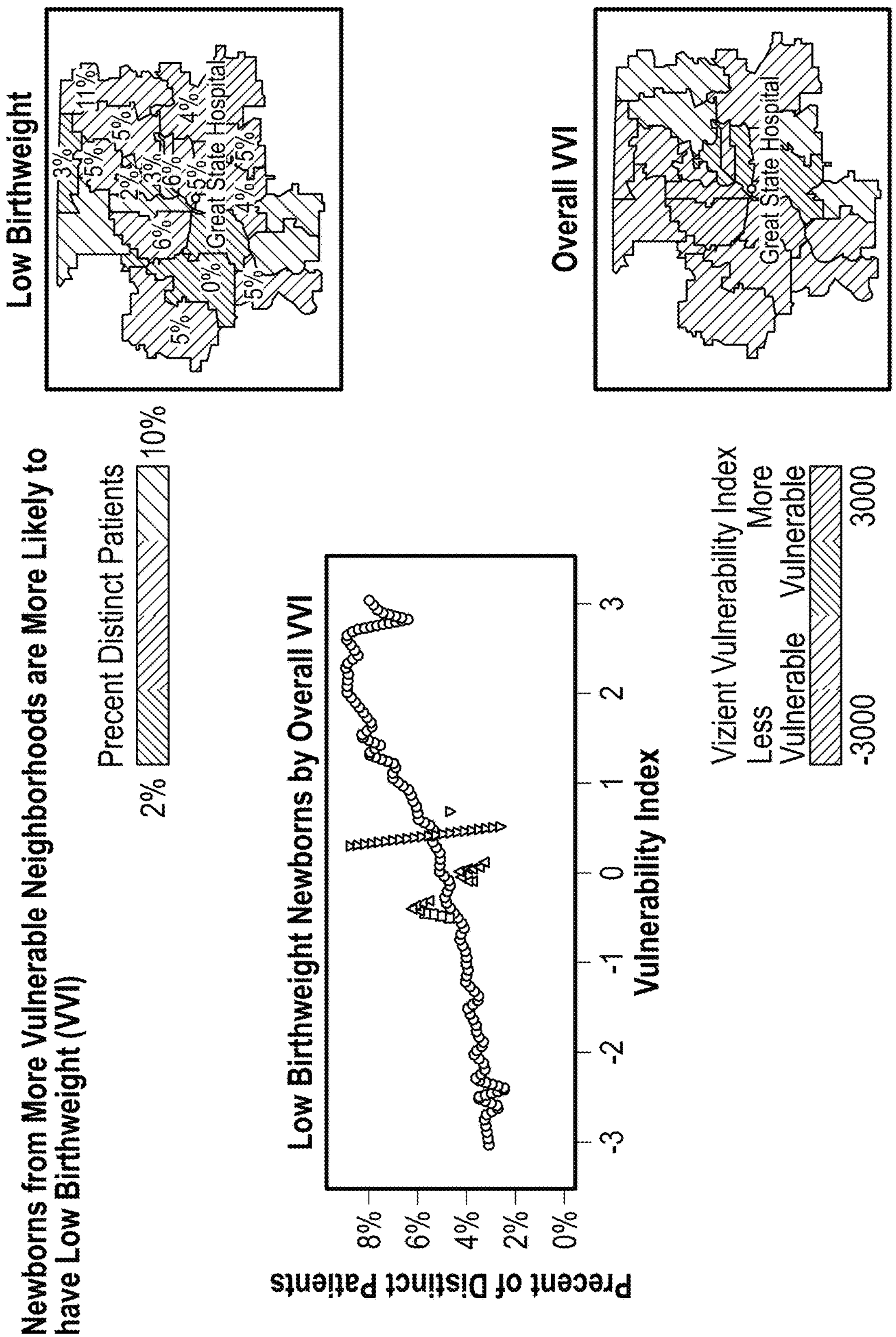
FIG. 65 shows how the vulnerability index system displays additional metrics that newborns from more vulnerable neighborhoods are more likely to have low birthweight according to some embodiments.
Figure 66:
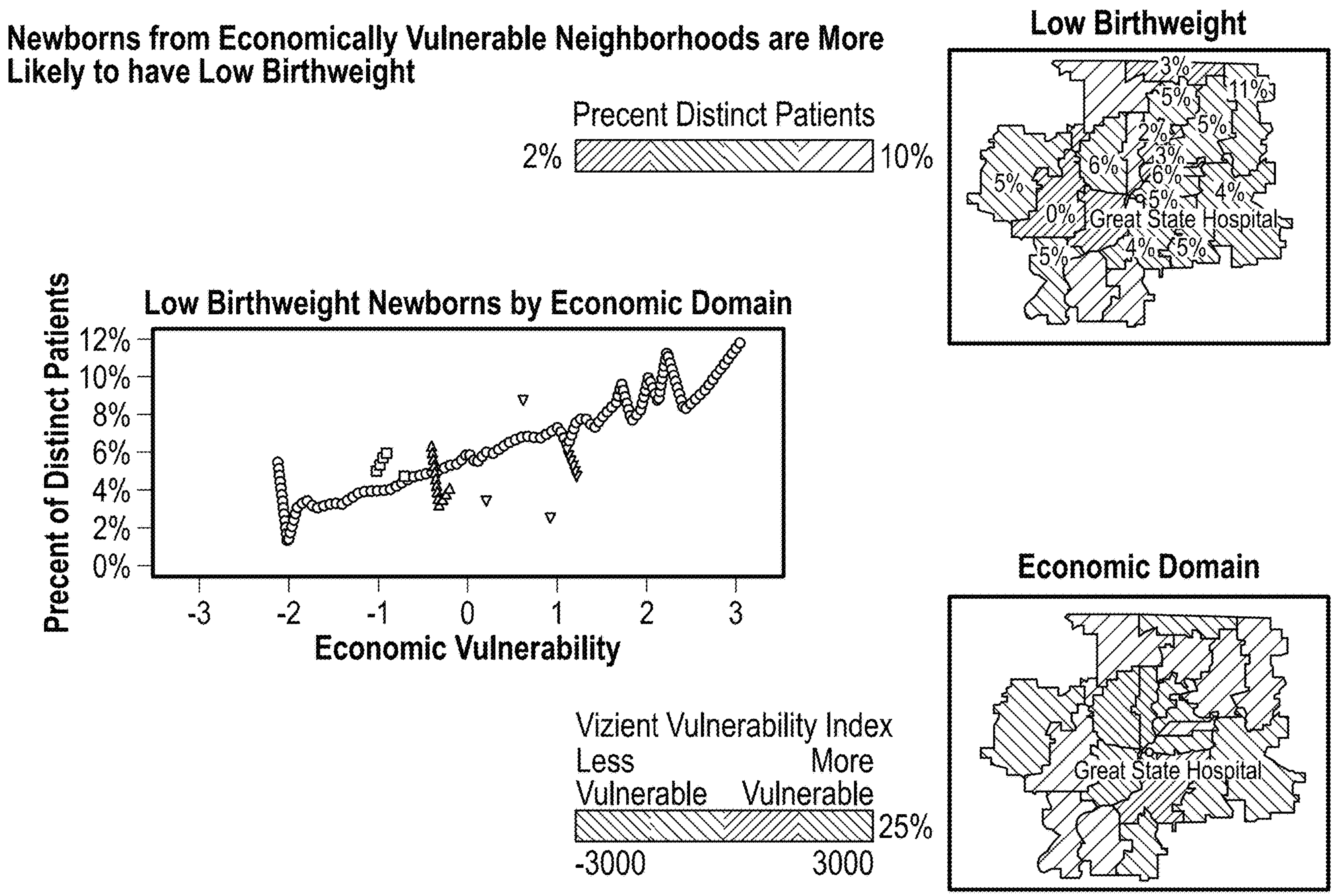
FIG. 66 depicts how newborns from economically vulnerable neighborhoods are more likely to have low birthweight according to some embodiments.
Figure 67:
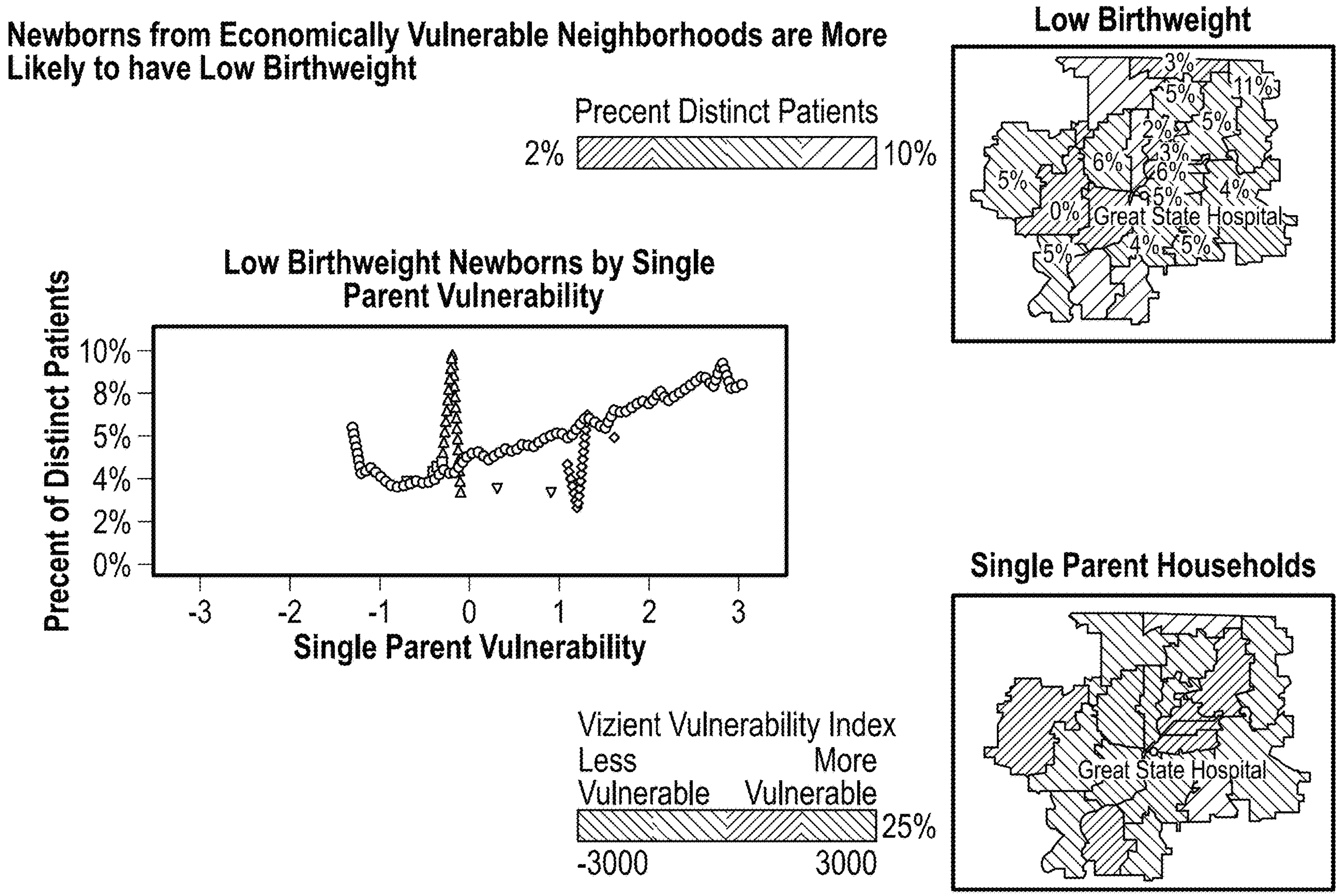
FIG. 67 depicts how newborns from neighborhoods with more single parents are more likely to have low birthweight according to some embodiments.

FIG. 62 illustrates how severe maternal complications are more common among patients from neighborhoods with fewer insured residents according to some embodiments. FIG. 63 shows how severe maternal complications are more common among patients from neighborhoods with a housing vulnerability according to some embodiments. FIG. 64 depicts how newborns from more vulnerable neighborhoods are more likely to have low birthweight according to some embodiments. FIG. 65 shows how vulnerability index displays additional metrics that newborns from more vulnerable neighborhoods are more likely to have low birthweight according to some embodiments. FIG. 66 depicts how newborns from economically vulnerable neighborhoods are more likely to have low birthweight according to some embodiments. FIG. 67 depicts how newborns from neighborhoods with more single parents are more likely to have low birthweight according to some embodiments.

In some embodiments, the system is configured to calculate neighborhood vulnerability to breast cancer. In some embodiments, the system is configured to include three metrics related to breast cancer. In some embodiments, the relationships between breast cancer and neighborhood vulnerability are more complicated than with the previous three topics. In some embodiments, patients from more vulnerable neighborhoods are: less likely to be diagnosed with breast cancer (any diagnosis starting with C50 or D05); less likely to have been screened for breast cancer in 2019 or 2020 (any diagnosis of Z12.31, Z12.39, or R92.2; patients diagnosed with breast cancer are also counted as having been screened); more likely, if they have breast cancer, to have a metastatic cancer diagnosis (any diagnosis starting with C77, C78, C79, C7B, or a diagnosis of C80.0). This data generated according to some embodiments suggests that breast cancer diagnoses may be made later in patients from more vulnerable neighborhoods.

In some embodiments, the vulnerability index is configured to identify the domains and components that had the most reliable relationships to each of these metrics across all member hospitals. For the breast cancer metrics, the system output identified three domains: Economic Domain including poverty, unemployment and lower median income; Health Care Access Domain, which reflects the percent of a neighborhood's residents with health insurance; and Education Domain including college education, high school enrollment, and preschool enrollment.

Figure 69:
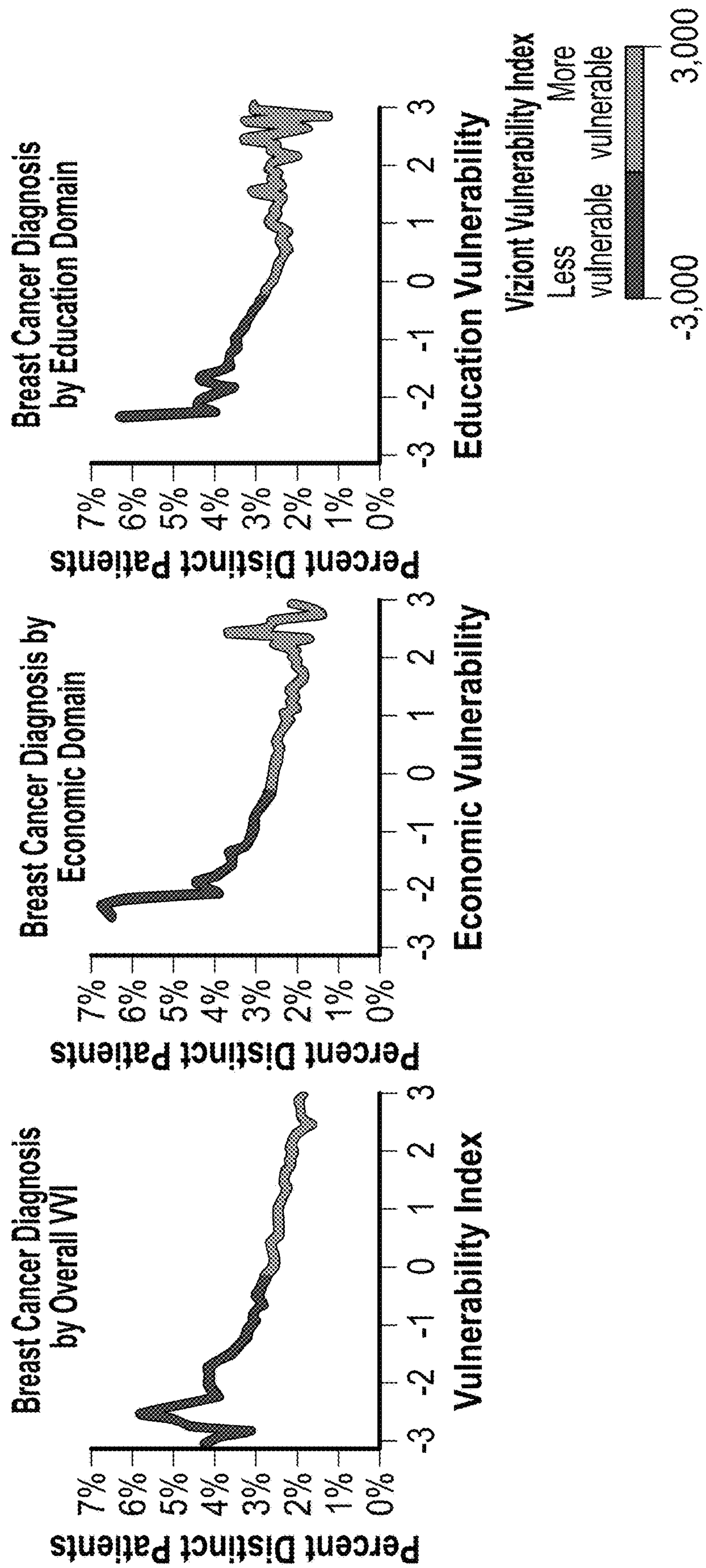
FIG. 69 illustrates how breast cancer is less commonly diagnosed among patients from more vulnerable neighborhoods according to some embodiments.
Figure 70:
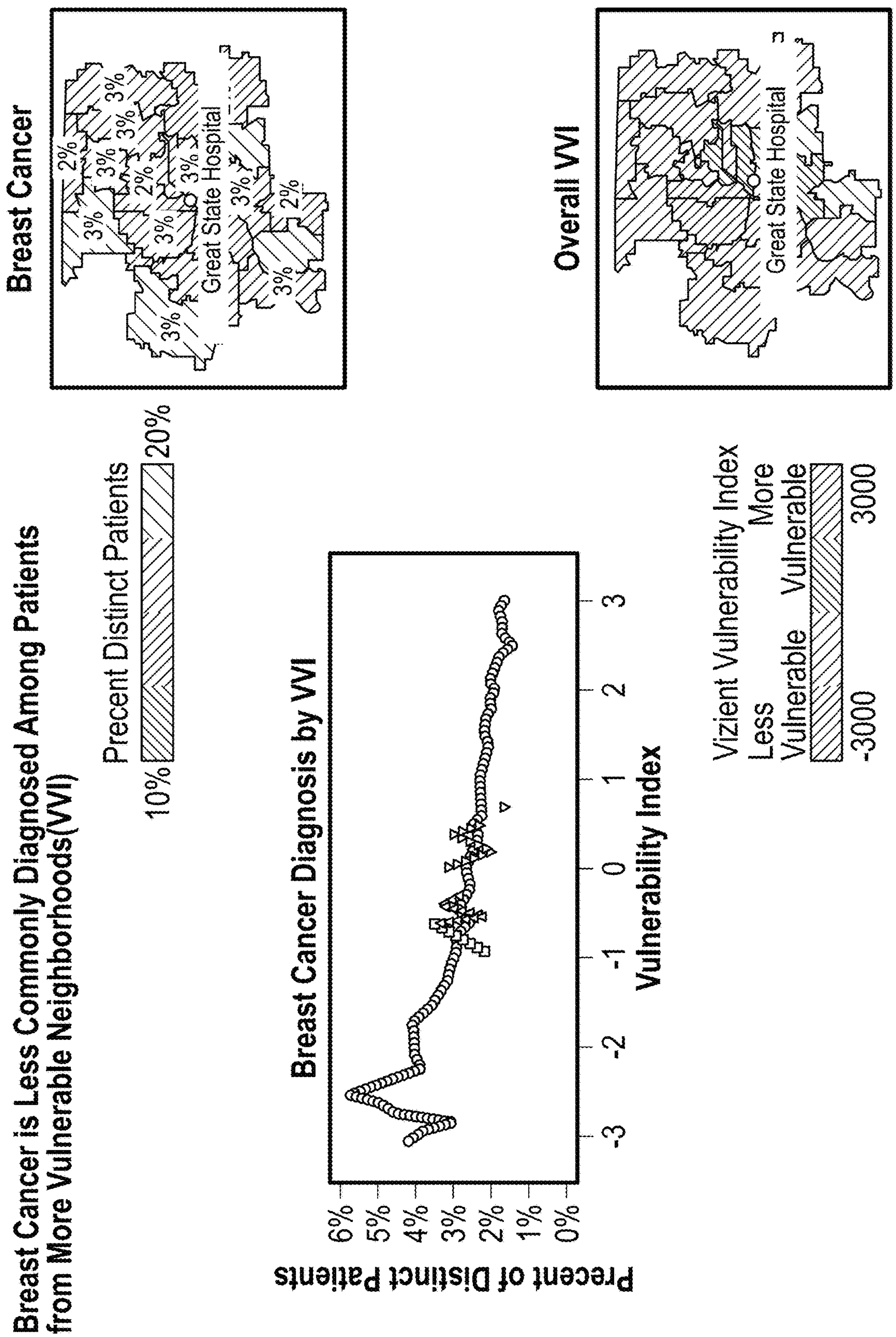
FIG. 70 shows how the vulnerability index system displays additional metrics that breast cancer is less commonly diagnosed among patients from more vulnerable neighborhoods according to some embodiments.
Figure 71:
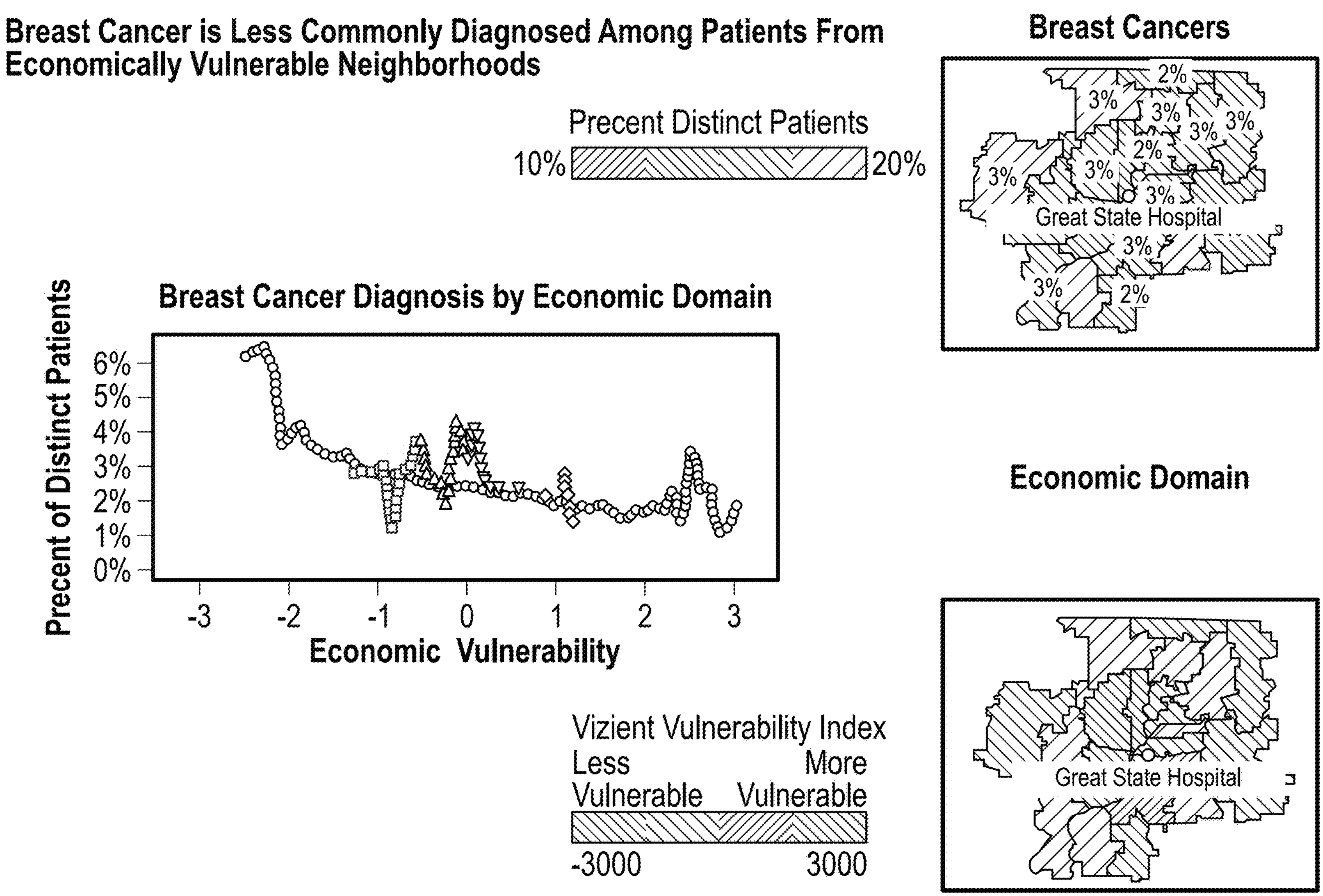
FIG. 71 depicts how breast cancer is less commonly diagnosed among patients from economically vulnerable neighborhoods according to some embodiments.
Figure 72:
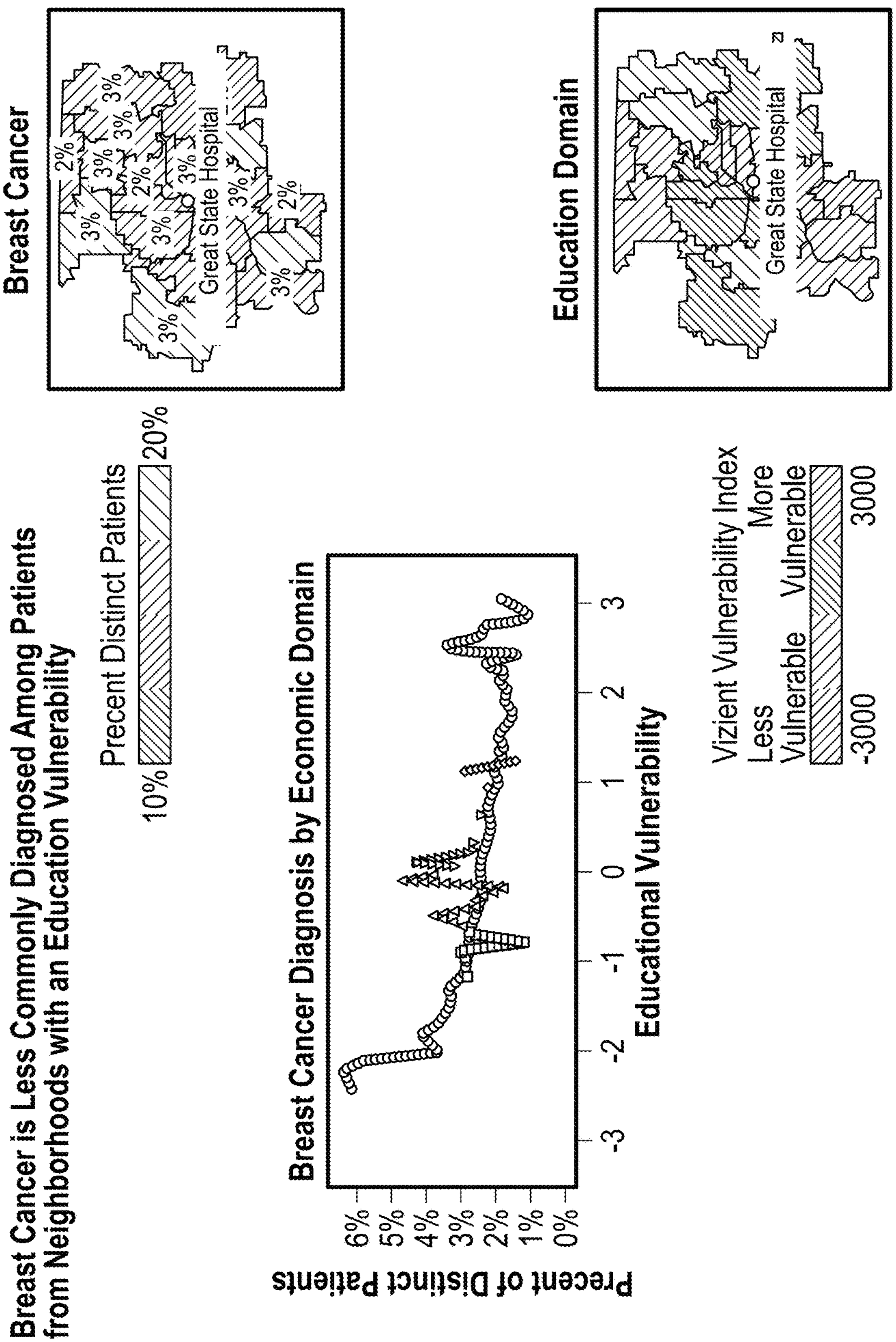
FIG. 72 depicts how breast cancer is less commonly diagnosed among patients from neighborhoods with an education vulnerability according to some embodiments.
Figure 73:
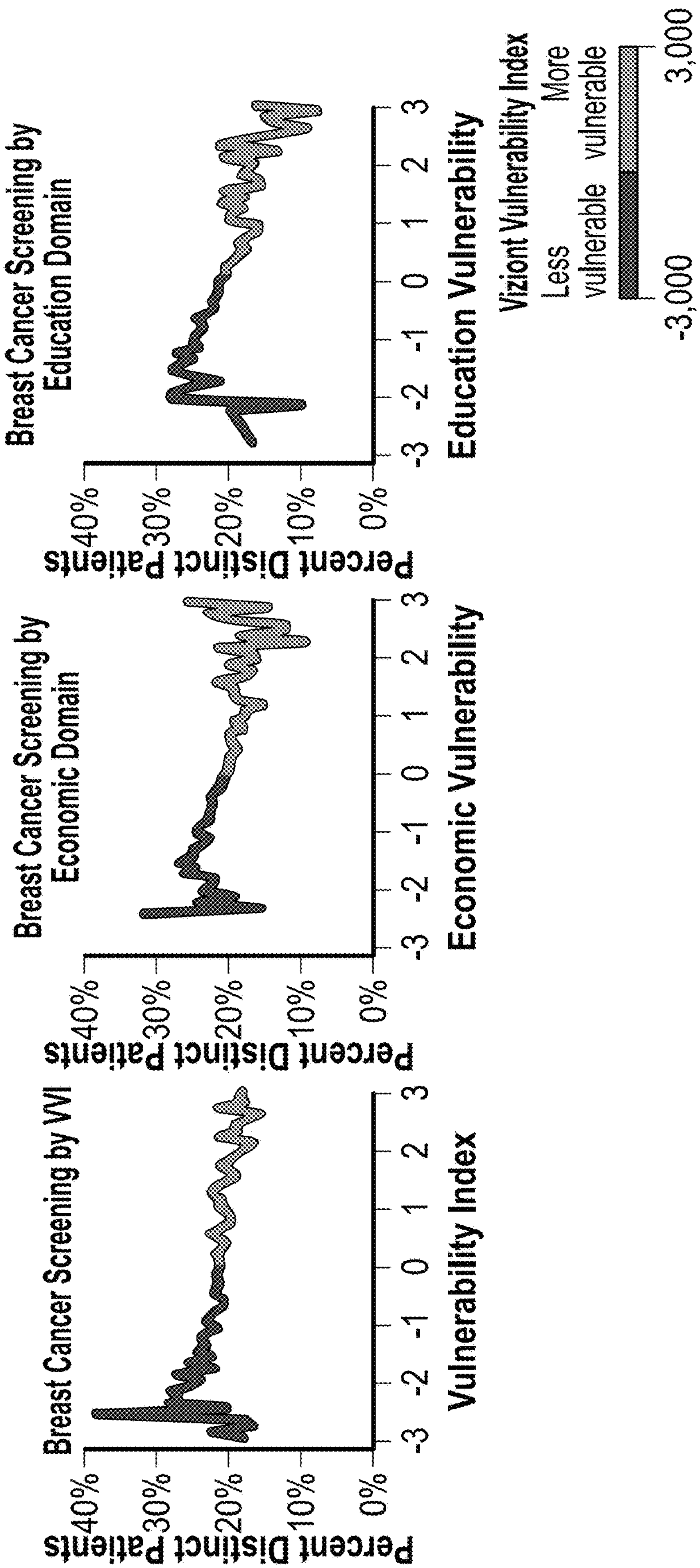
FIG. 73 illustrates how the system analyzes and displays how breast cancer screening is less common among patients from more vulnerable neighborhoods according to some embodiments.
Figure 74:
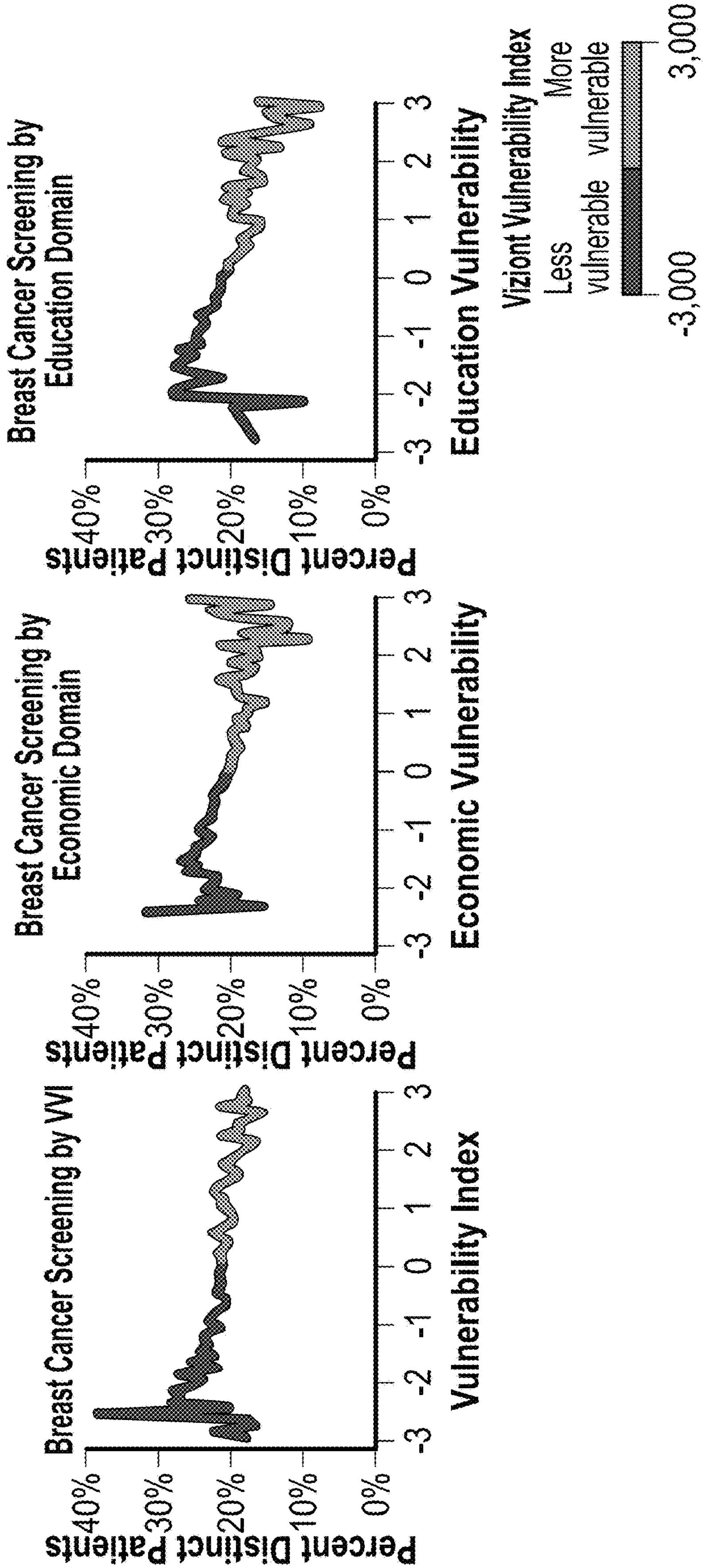
FIG. 74 depicts how the system generates displays that breast cancer screening is less common among patients from more vulnerable neighborhoods according to some embodiments.
Figure 75:
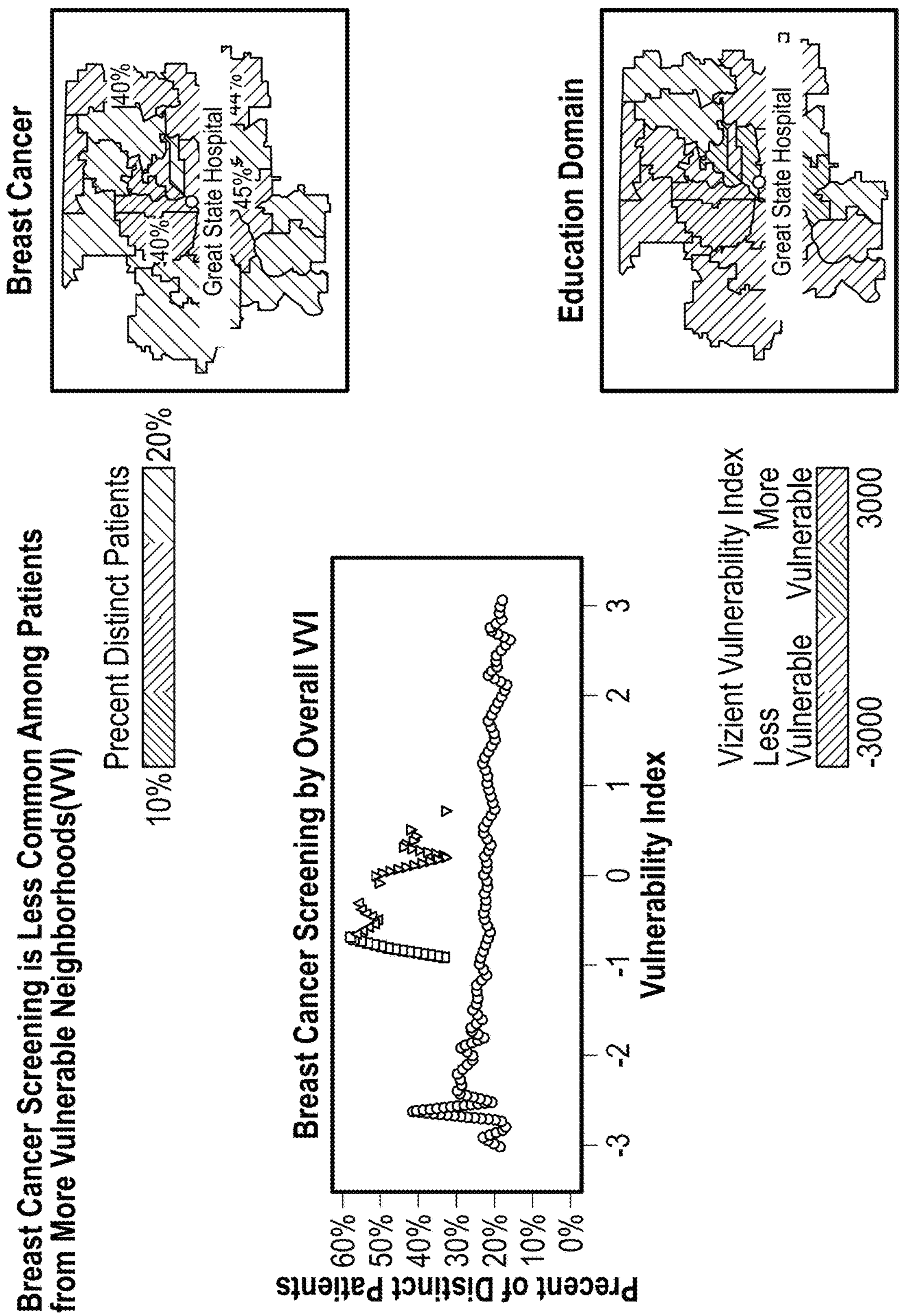
FIG. 75 shows depicts how the vulnerability index system generates additional displays that breast cancer screening is less common among patients from more vulnerable neighborhoods according to some embodiments.
Figure 76:
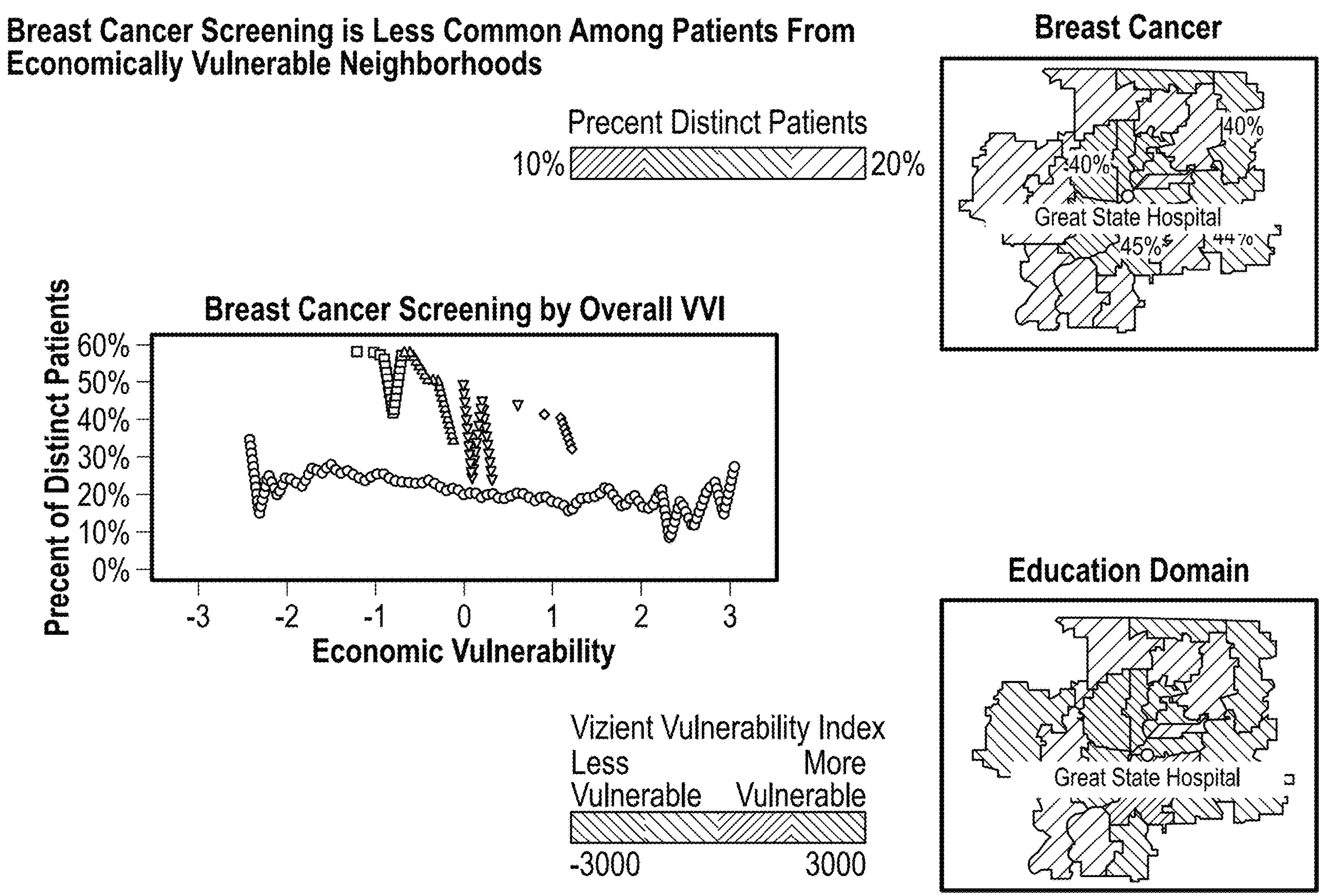
FIG. 76 shows how breast cancer screening is less common among patients from economically vulnerable neighborhoods according to some embodiments.
Figure 77:
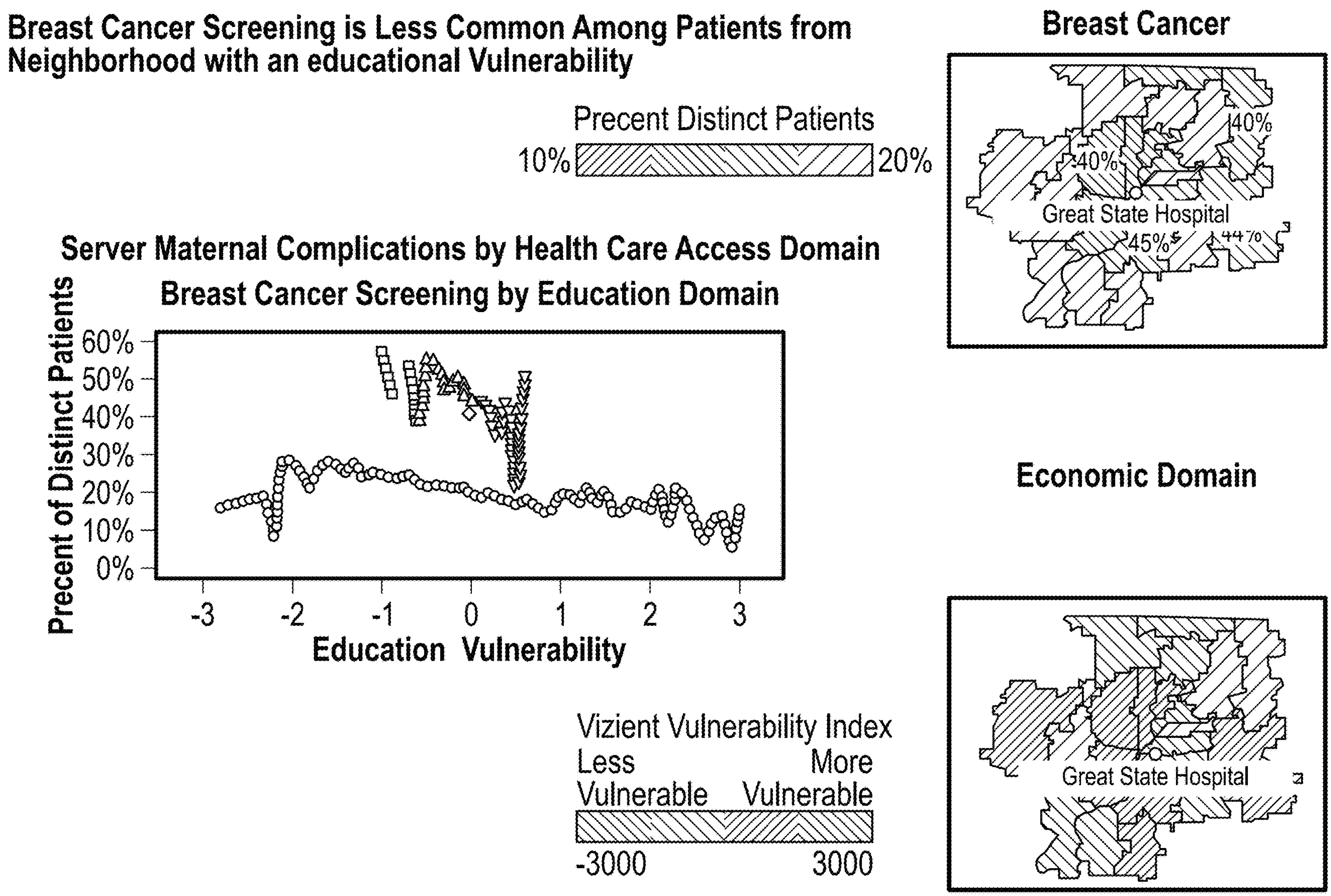
FIG. 77 illustrates how breast cancer screening is less common among patients from neighborhoods with an educational vulnerability according to some embodiments.
Figure 78:
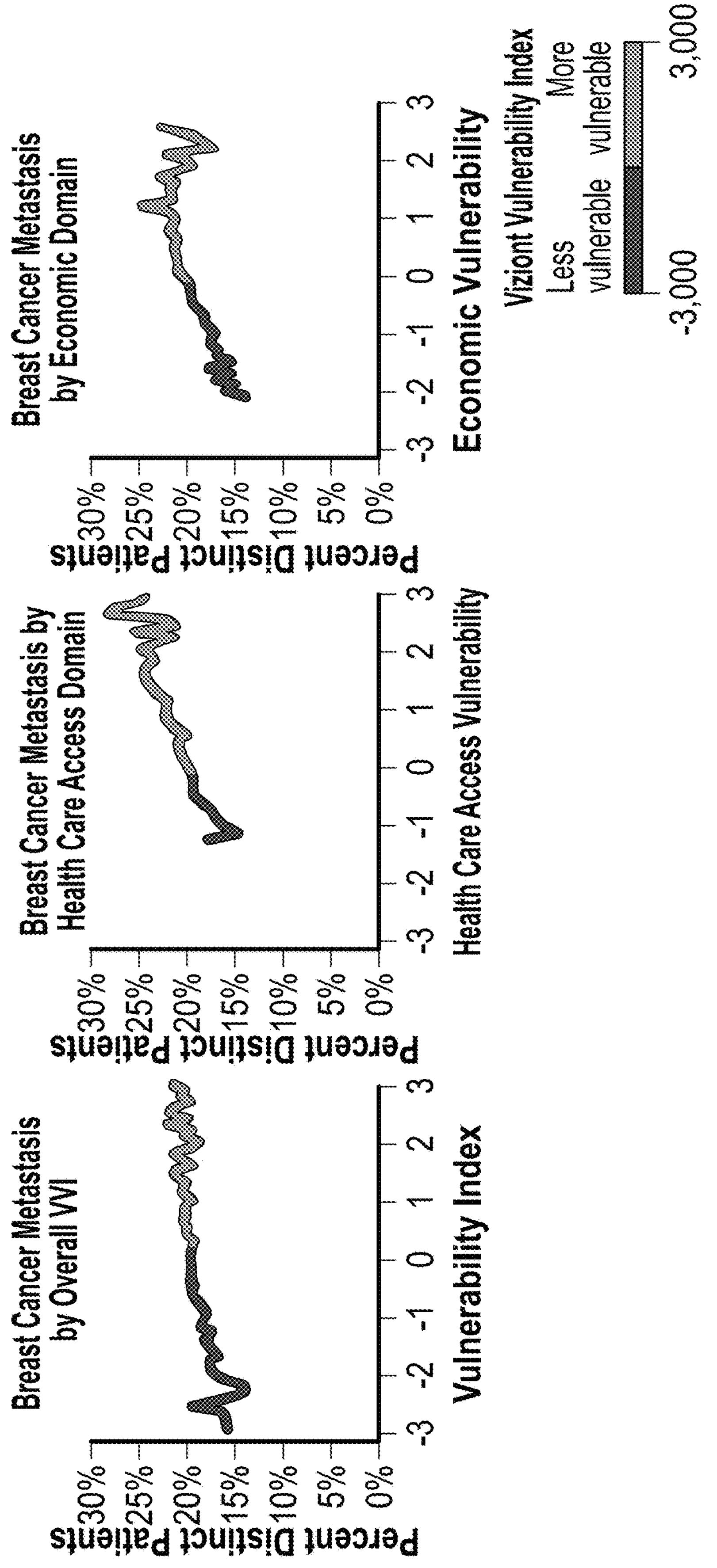
FIG. 78 depicts how patients with breast cancer from more vulnerable neighborhoods are more likely to have a metastatic cancer diagnosis according to some embodiments.
Figure 79:
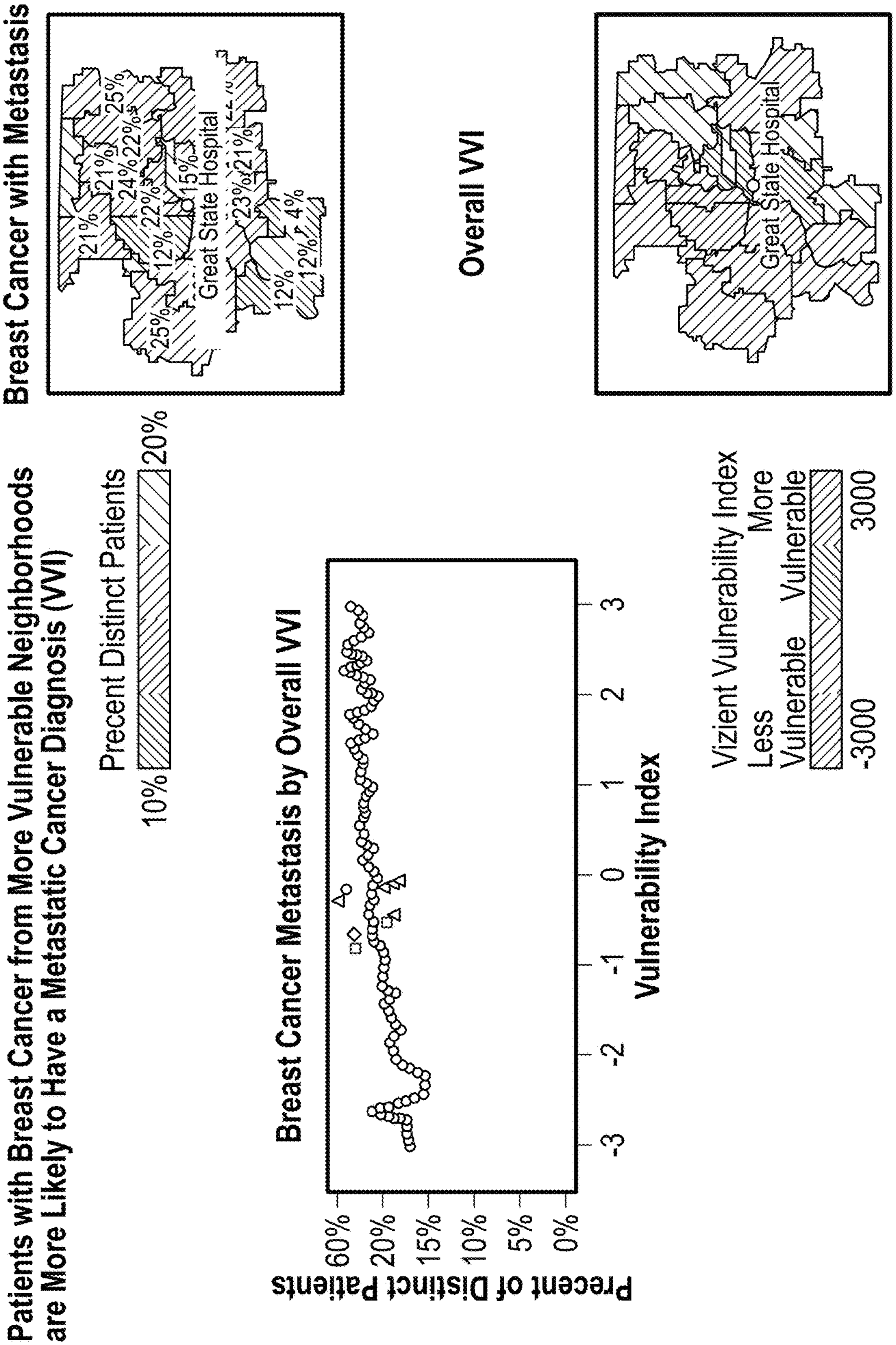
FIG. 79 illustrates how the vulnerability index system displays that patients with breast cancer from more vulnerable neighborhoods are more likely to have a metastatic cancer diagnosis according to some embodiments.
Figure 80:
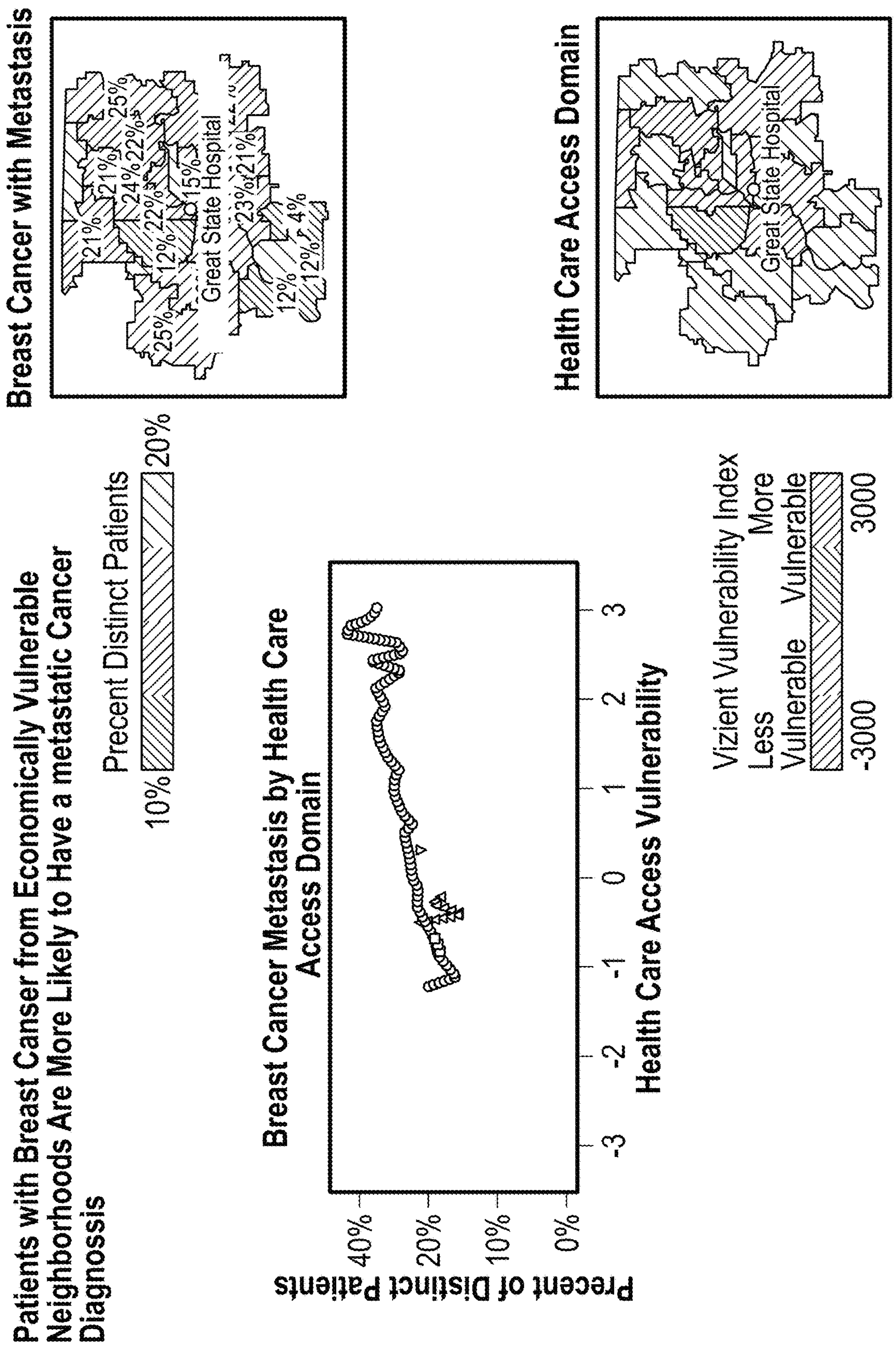
FIG. 80 depicts how patients with breast cancer from neighborhoods with fewer insured residents are more likely to have a metastatic cancer diagnosis according to some embodiments.
Figure 81:
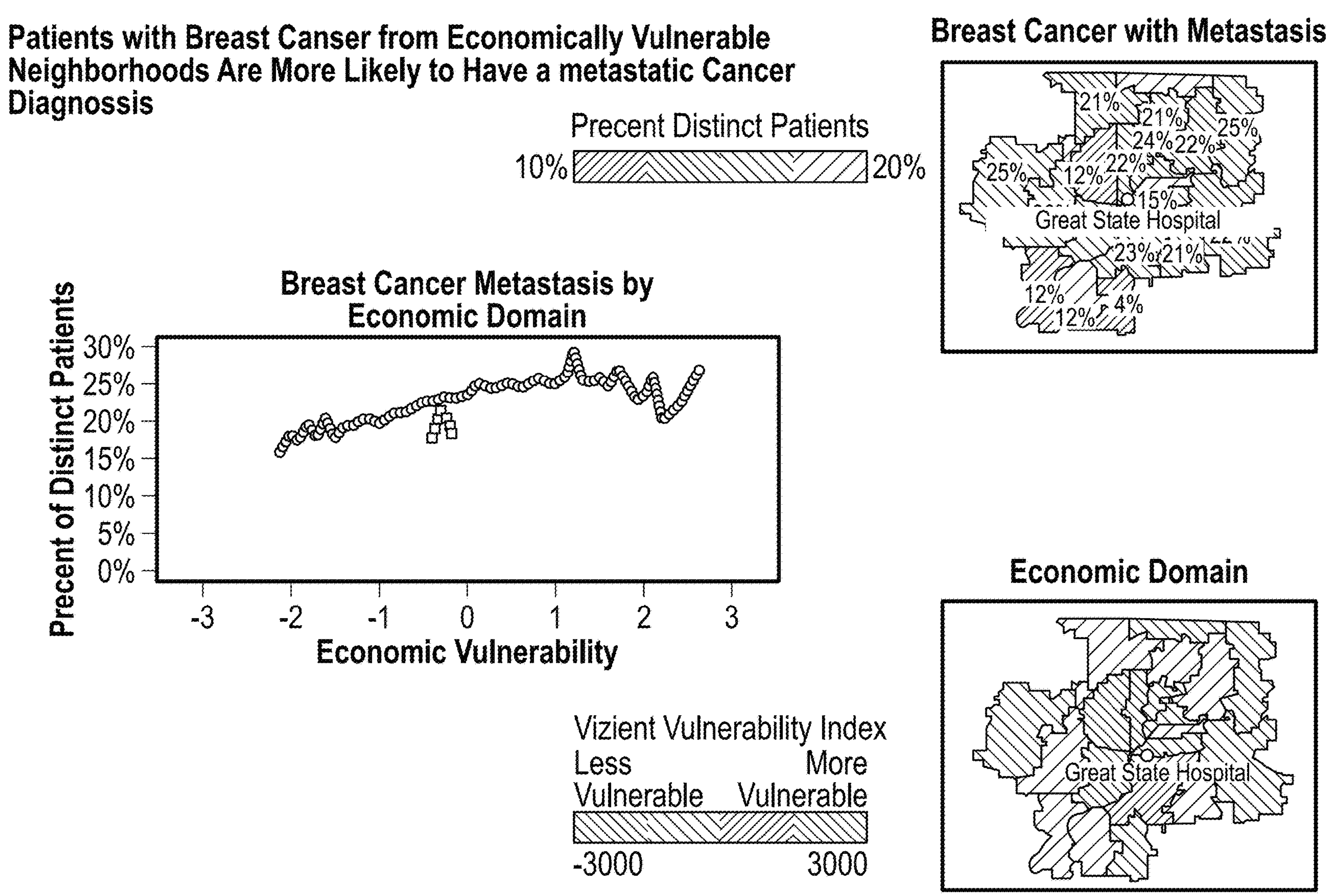
FIG. 81 shows how patients with breast cancer from economically vulnerable neighborhoods are more likely to have a metastatic cancer diagnosis according to some embodiments.

FIG. 68 shows Great State breast cancer statistics generated by the system according to some embodiments. FIG. 69 illustrates how breast cancer is less commonly diagnosed among patients from more vulnerable neighborhoods according to some embodiments. FIG. 70 shows how the vulnerability index displays additional metrics that breast cancer is less commonly diagnosed among patients from more vulnerable neighborhoods according to some embodiments. FIG. 71 depicts how breast cancer is less commonly diagnosed among patients from economically vulnerable neighborhoods according to some embodiments. FIG. 72 depicts how breast cancer is less commonly diagnosed among patients from neighborhoods with an education vulnerability according to some embodiments. FIG. 73 illustrates how the system analyzes and displays how breast cancer screening is less common among patients from more vulnerable neighborhoods according to some embodiments. FIG. 74 depicts how system generates displays that breast cancer screening is less common among patients from more vulnerable neighborhoods according to some embodiments. FIG. 75 shows depicts how vulnerability index generates additional displays that breast cancer screening is less common among patients from more vulnerable neighborhoods according to some embodiments. FIG. 76 shows how breast cancer screening is less common among patients from economically vulnerable neighborhoods according to some embodiments. FIG. 77 illustrates how breast cancer screening is less common among patients from neighborhoods with an educational vulnerability according to some embodiments. FIG. 78 depicts how patients with breast cancer from more vulnerable neighborhoods are more likely to have a metastatic cancer diagnosis according to some embodiments. FIG. 79 illustrates how vulnerability index displays that patients with breast cancer from more vulnerable neighborhoods are more likely to have a metastatic cancer diagnosis according to some embodiments. FIG. 80 depicts how patients with breast cancer from neighborhoods with fewer insured residents are more likely to have a metastatic cancer diagnosis according to some embodiments. FIG. 81 shows how patients with breast cancer from economically vulnerable neighborhoods are more likely to have a metastatic cancer diagnosis according to some embodiments.

In some embodiments, one or more aspects of the system include data collected from peer groups. In some embodiments, twenty peer groups were created based on a cluster analysis of all of the member hospitals with data in the CDB. In some embodiments, these peer groups are distinct from the Q&A Cohorts. In some embodiments, where Q&A Cohorts are defined by hospital sizes and service lines, peer groups are defined only by the neighborhoods each hospital serves. In some embodiments, the factors included in this cluster analysis are: the proportions of patients residing in neighborhoods of different overall vulnerability index (vulnerability index) values; and the proportions of patients residing in neighborhoods with a high vulnerability (index value >1) in each domain. In some embodiments, each cluster is characterized by: the domains where the neighborhoods they serve have the most vulnerability and by; and the proportions of patients who come from those neighborhoods.

In some embodiments, peer group characteristics were applied to the Great State Hospital. In some embodiments, this peer group includes 40 hospitals in 9 states. In some embodiments, the majority of neighborhoods that these hospitals serve have an overall vulnerability index between −1 and 1 (close to average) and high vulnerabilities in one or more domains. In some embodiments, these hospitals serve neighborhoods with high transportation vulnerabilities and economic vulnerabilities. In some embodiments, secondarily there are some neighborhoods with vulnerabilities in the housing, clean environment, and social domains.

In some embodiments, the vulnerability index includes up-to-date census data. In some embodiments, the vulnerability index includes one or more data metric inputs that include broadband access, opioid dispensing rates, segregation, distance to a hospital, primary care shortages, additional EPA metrics. In some embodiments, the system includes metric inputs from the Ambulatory Quality and Accountability reports and other CPSC outpatient data, as well as more nuanced longitudinal approaches to metric development including both CDB and CPSC data to build out more details regarding the course of care both before and after an acute inpatient episode.

Figure 82:
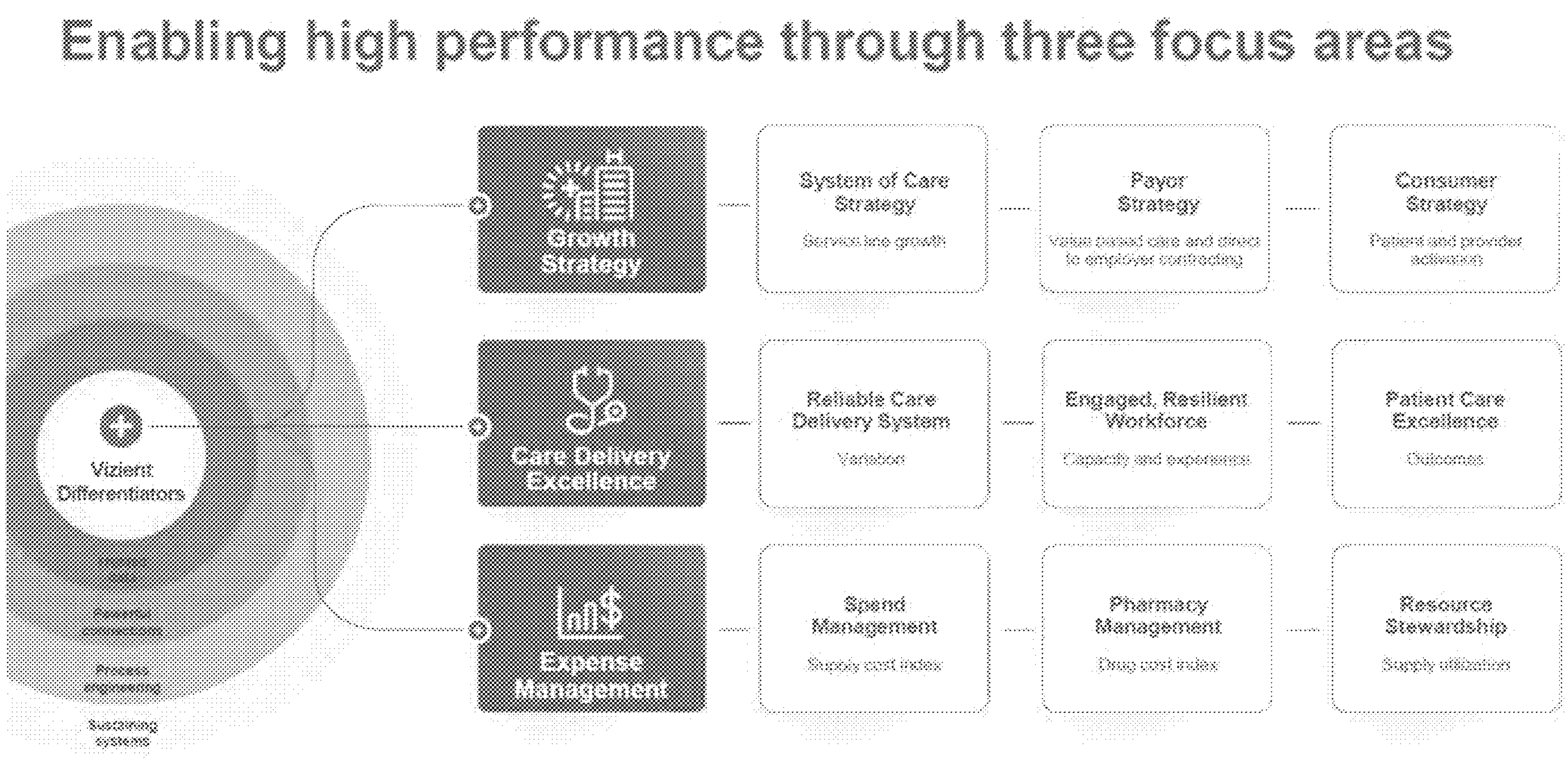
FIG. 82 illustrates how one or more aspects of the system enable high performance through at least three focus areas according to some embodiments.

FIG. 82 illustrates how one or more aspects of the system enable high performance through three focus areas according to some embodiments. In some embodiments, three areas of focus in health equity include: (1) data and analytics that provide hyper local insight into key social determinant challenges and impact on clinical care and outcomes; (2) enable economic resiliency of underserved communities by leveraging health system spending power; (3) connect members with research & intelligence, expertise and leading industry practices.

Figure 83:
FIG. 83 depicts various system outputs that show how Connecticut has pockets of vulnerable neighborhoods across the state according to some embodiments.
Figure 84:
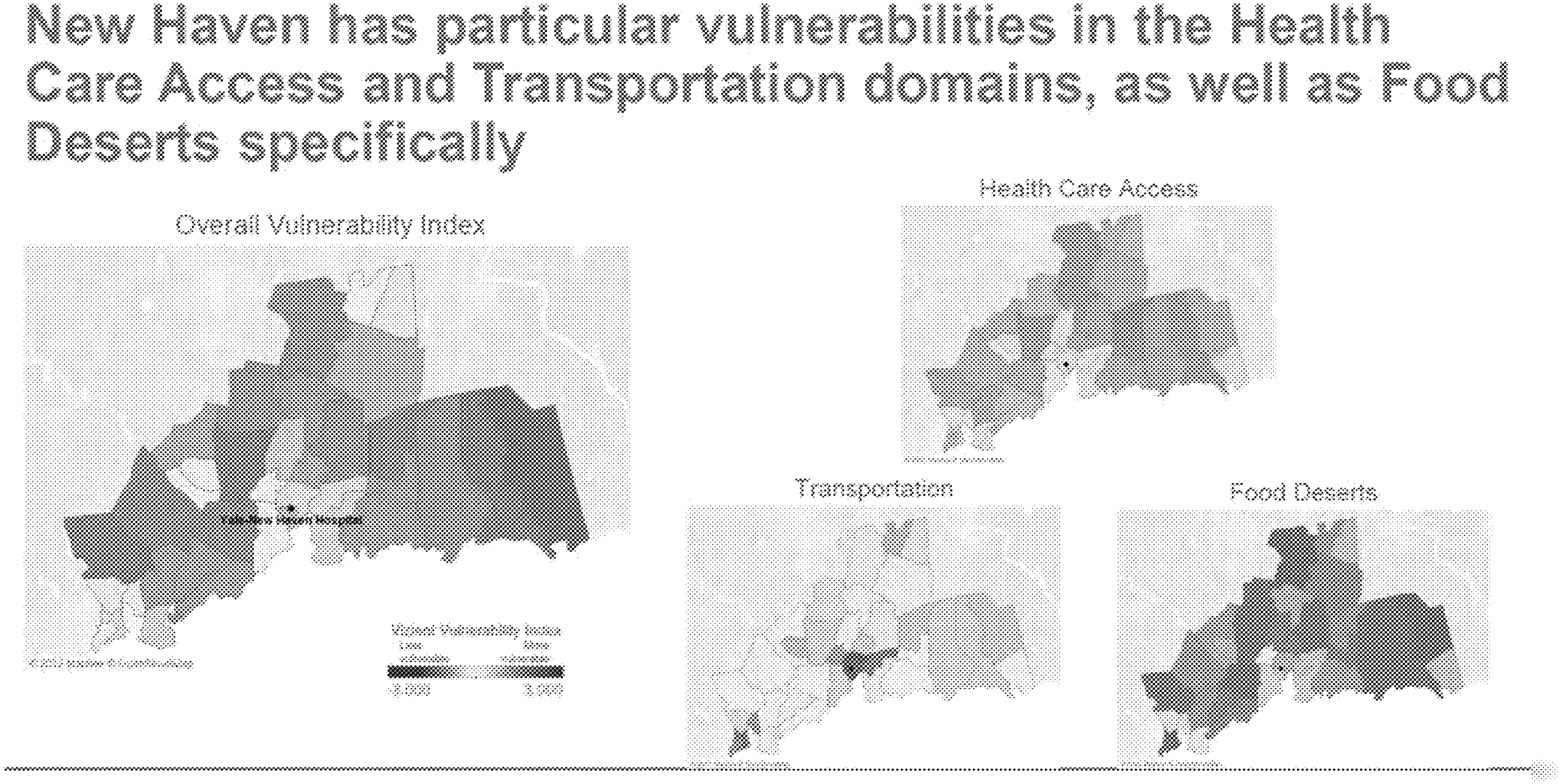
FIG. 84 depicts how New Haven has particular vulnerabilities in the Health Care Access and Transportation domains, as well as Food Deserts, specifically, according to some embodiments.
Figure 85:
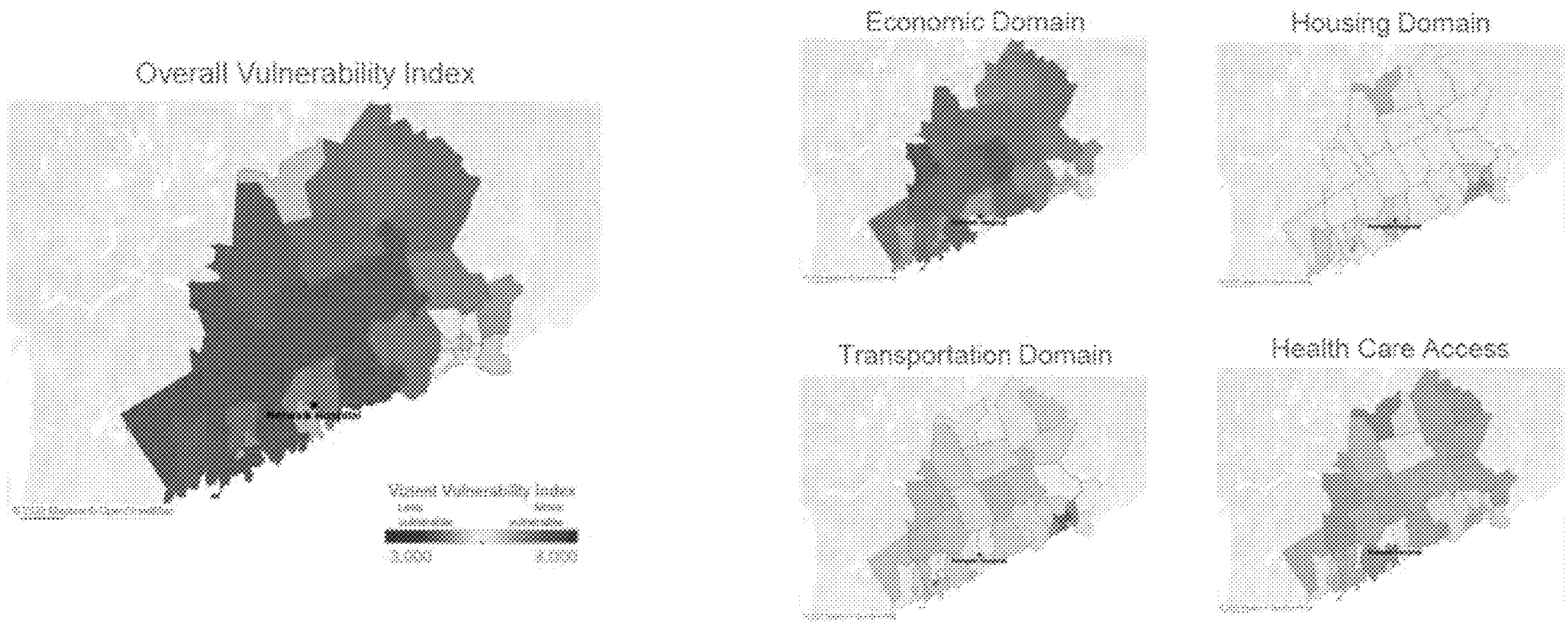
FIG. 85 shows system outputs that display maps that indicate Norwalk is relatively less vulnerable, except in the Housing, Transportation, and Health Care Access Domains according to some embodiments.
Figure 86:
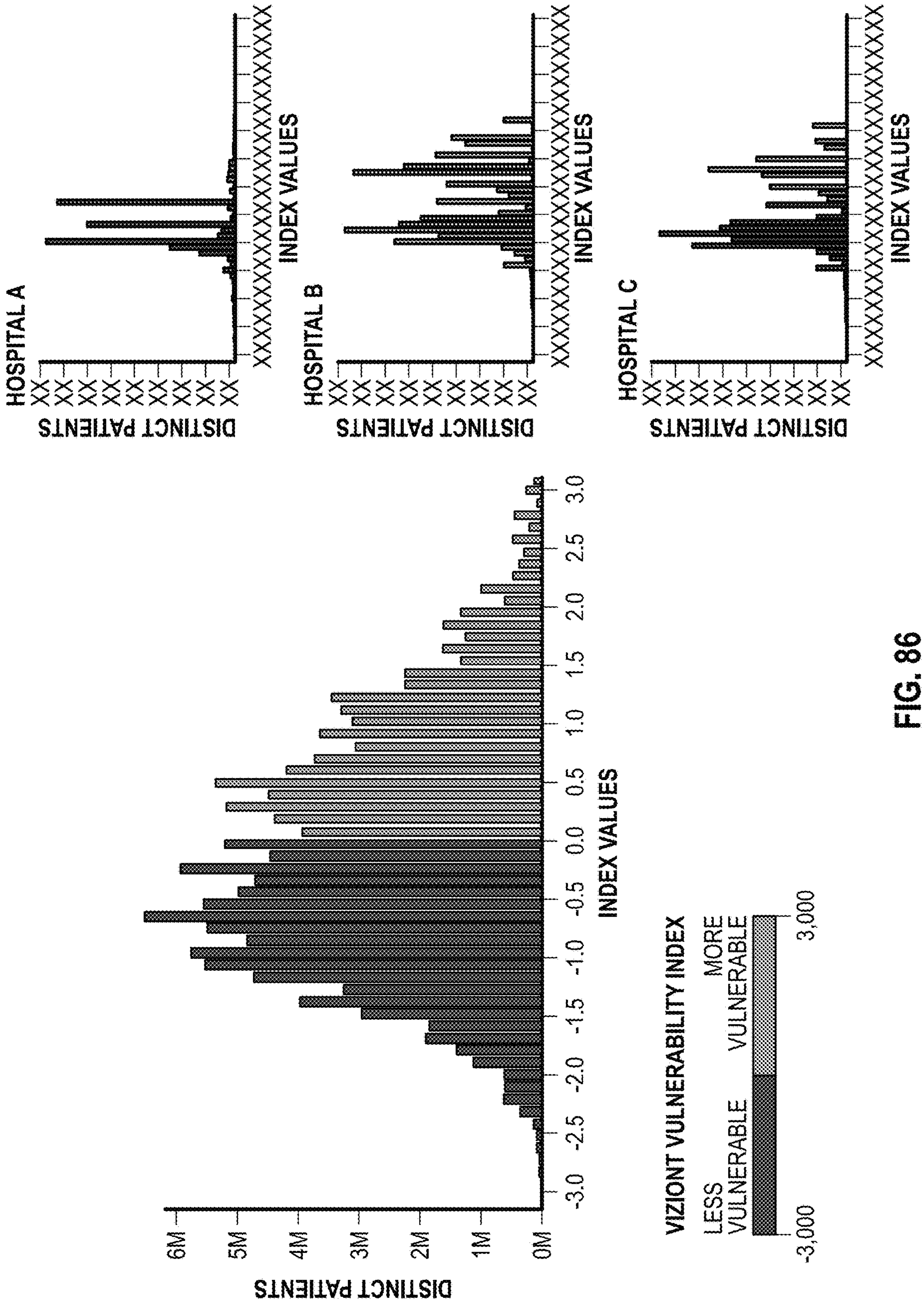
FIG. 86 illustrates patient distributions by vulnerability index vary among health system hospitals according to some embodiments.
Figure 87:
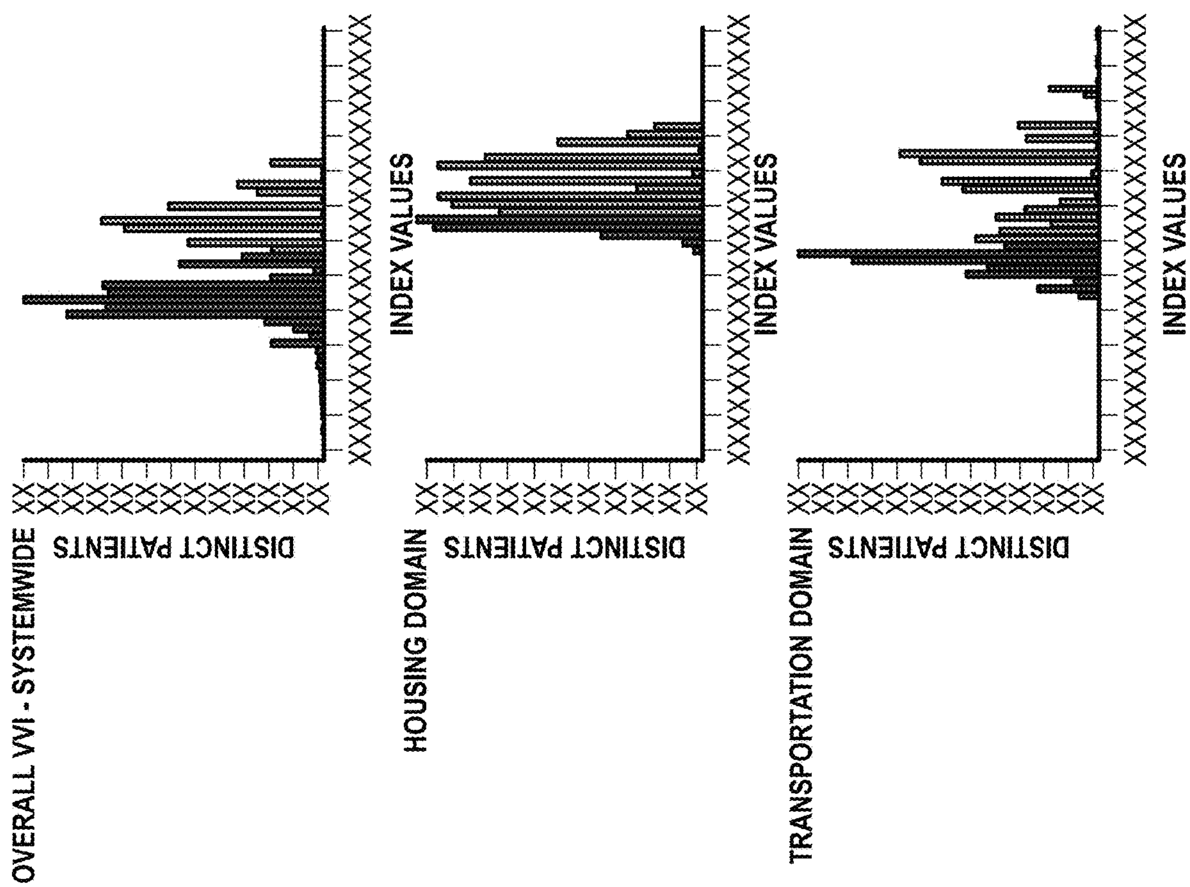
FIG. 87 shows system outputs of how housing and transportation vulnerabilities are more common in neighborhoods served by health system hospitals according to some embodiments.
Figure 88:
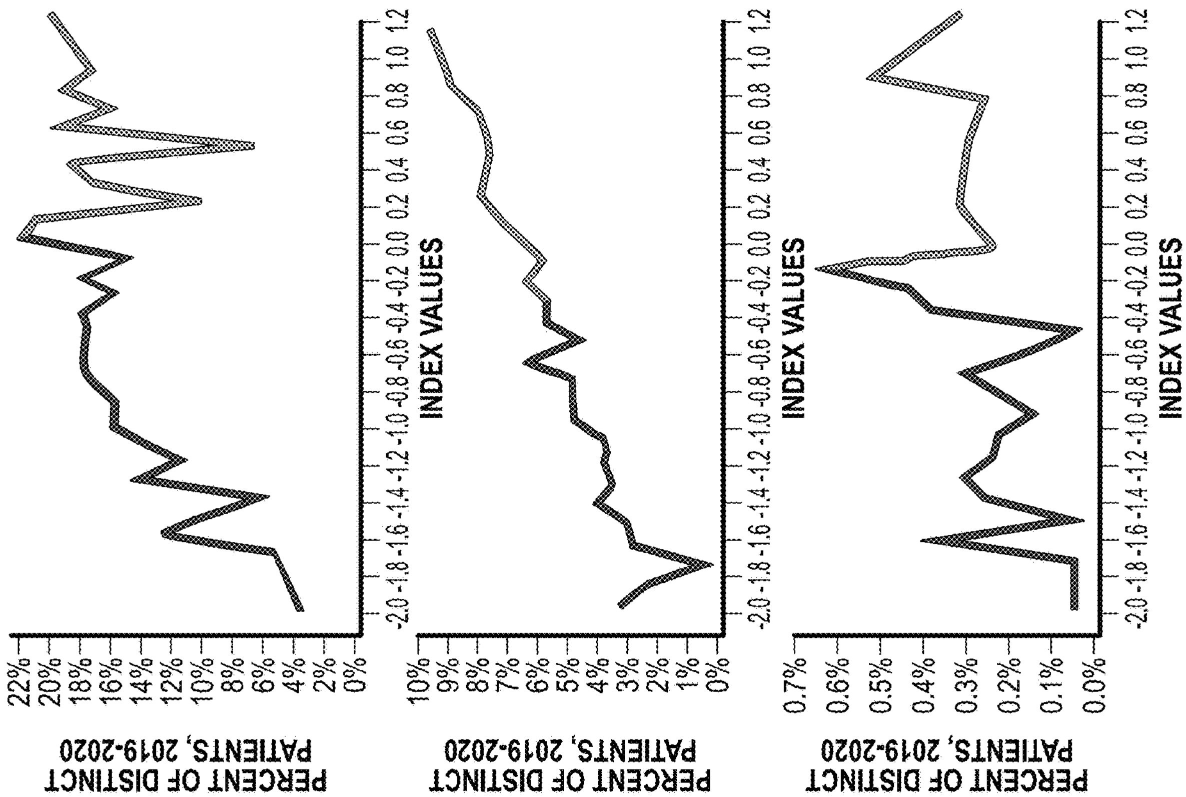
FIG. 88 depicts health system system-wide correlations to diabetes incidence and outcomes according to some embodiments.

FIG. 83 depicts various system outputs that show how Connecticut has pockets of vulnerable neighborhoods across the state according to some embodiments. FIG. 84 depicts how New Haven has particular vulnerabilities in the Health Care Access and Transportation domains, as well as Food Deserts, specifically, according to some embodiments. FIG. 85 shows system outputs that display maps that indicate Norwalk is relatively less vulnerable, except in the Housing, Transportation, and Health Care Access Domains according to some embodiments. FIG. 86 illustrates patient distributions by vulnerability index vary among health system hospitals according to some embodiments. FIG. 87 shows system outputs of how Specific housing and transportation vulnerabilities are more common in neighborhoods served by health system hospitals according to some embodiments. FIG. 88 depicts health system system-wide correlations to diabetes incidence and outcomes according to some embodiments.

In some embodiments, the system includes a community contracting module (program). In some embodiments, the community contracting module facilitates reinvesting in the local economy using the power of purchasing within healthcare systems by directing spending to local, diverse suppliers who in turn hire from the community providing livable wages, insurance, and career paths. In some embodiments, engaging all hospitals in a region as well as large suppliers, who through community contracting program contracts with local, diverse suppliers, creates a social and economically sustainable ecosystem resulting in healthier populations.

Figure 90:
FIG. 90 illustrates further how the community contracting module supports various aspects of the system according to some embodiments.

FIG. 89 depicts how the community contracting module supports various aspects of the system according to some embodiments. FIG. 90 illustrates further how the community contracting module supports various aspects of the system according to some embodiments. FIG. 91 depicts social, economic, local, and investment impacts of the community contracting module executing in conjunction which various aspects of the system according to some embodiments. FIG. 92 shows how scaling the system across a state provides unique value according to some embodiments.

Figure 93:
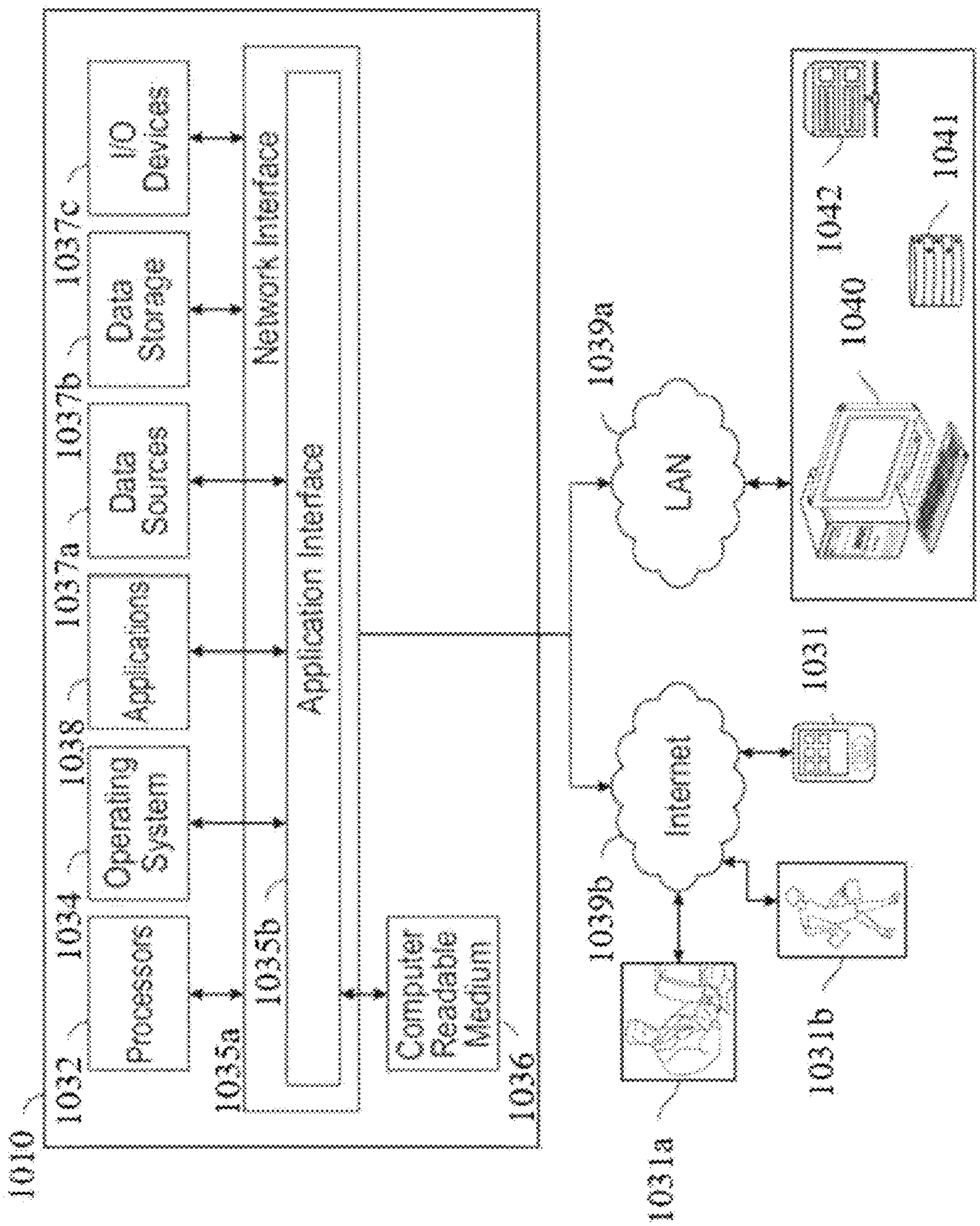
FIG. 93 illustrates a computer system 1010 enabling or comprising the systems and methods in accordance with some embodiments of the system.

FIG. 93 illustrates a computer system 1010 enabling or comprising the systems and methods in accordance with some embodiments of the system. In some embodiments, the computer system 1010 can operate and/or process computer-executable code of one or more software modules of the aforementioned system and method. Further, in some embodiments, the computer system 1010 can operate and/or display information within one or more graphical user interfaces (e.g., HMIs) integrated with or coupled to the system.

In some embodiments, the computer system 1010 can comprise at least one processor 1032. In some embodiments, the at least one processor 1032 can reside in, or coupled to, one or more conventional server platforms (not shown). In some embodiments, the computer system 1010 can include a network interface 1035*a* and an application interface 1035*b* coupled to the least one processor 1032 capable of processing at least one operating system 1034. Further, in some embodiments, the interfaces 1035*a*, 1035*b* coupled to at least one processor 1032 can be configured to process one or more of the software modules (e.g., such as enterprise applications 1038). In some embodiments, the software application modules 1038 can include server-based software, and can operate to host at least one user account and/or at least one client account, and operate to transfer data between one or more of these accounts using the at least one processor 1032.

With the above embodiments in mind, it is understood that the system can employ various computer-implemented operations involving data stored in computer systems. Moreover, the above-described databases and models described throughout this disclosure can store analytical models and other data on computer-readable storage media within the computer system 1010 and on computer-readable storage media coupled to the computer system 1010 according to various embodiments. In addition, in some embodiments, the above-described applications of the system can be stored on computer-readable storage media within the computer system 1010 and on computer-readable storage media coupled to the computer system 1010. In some embodiments, these operations are those requiring physical manipulation of physical quantities. Usually, though not necessarily, in some embodiments these quantities take the form of one or more of electrical, electromagnetic, magnetic, optical, or magneto-optical signals capable of being stored, transferred, combined, compared and otherwise manipulated. In some embodiments, the computer system 1010 can comprise at least one computer readable medium 1036 coupled to at least one of at least one data source 1037*a*, at least one data storage 1037*b*, and/or at least one input/output 1037*c*. In some embodiments, the computer system 1010 can be embodied as computer readable code on a computer readable medium 1036. In some embodiments, the computer readable medium 1036 can be any data storage that can store data, which can thereafter be read by a computer (such as computer 1040). In some embodiments, the computer readable medium 1036 can be any physical or material medium that can be used to tangibly store the desired information or data or instructions and which can be accessed by a computer 1040 or processor 1032. In some embodiments, the computer readable medium 1036 can include hard drives, network attached storage (NAS), read-only memory, random-access memory, FLASH based memory, CD-ROMs, CD-Rs, CD-RWs, DVDs, magnetic tapes, other optical and non-optical data storage. In some embodiments, various other forms of computer-readable media 1036 can transmit or carry instructions to a remote computer 1040 and/or at least one user 1031, including a router, private or public network, or other transmission or channel, both wired and wireless. In some embodiments, the software application modules 1038 can be configured to send and receive data from a database (e.g., from a computer readable medium 1036 including data sources 1037*a* and data storage 1037*b* that can comprise a database), and data can be received by the software application modules 1038 from at least one other source. In some embodiments, at least one of the software application modules 1038 can be configured within the computer system 1010 to output data to at least one user 1031 via at least one graphical user interface rendered on at least one digital display.

In some embodiments, the computer readable medium 1036 can be distributed over a conventional computer network via the network interface 1035*a* where the system embodied by the computer readable code can be stored and executed in a distributed fashion. For example, in some embodiments, one or more components of the computer system 1010 can be coupled to send and/or receive data through a local area network ("LAN") 1039*a* and/or an internet coupled network 1039*b* (e.g., such as a wireless internet). In some embodiments, the networks 1039*a*, 1039*b* can include wide area networks ("WAN"), direct connections (e.g., through a universal serial bus port), or other forms of computer-readable media 1036, or any combination thereof.

In some embodiments, components of the networks 1039*a*, 1039*b* can include any number of personal computers 1040 which include for example desktop computers, and/or laptop computers, or any fixed, generally non-mobile internet appliances coupled through the LAN 1039*a*. For example, some embodiments include one or more of personal computers 1040, databases 1041, and/or servers 1042 coupled through the LAN 1039*a* that can be configured for any type of user including an administrator. Some embodiments can include one or more personal computers 1040 coupled through network 1039*b*. In some embodiments, one or more components of the computer system 1010 can be coupled to send or receive data through an internet network (e.g., such as network 1039*b*). For example, some embodiments include at least one user 1031*a*, 1031*b*, is coupled wirelessly and accessing one or more software modules of the system including at least one enterprise application 1038 via an input and output ("I/O") 1037*c*. In some embodiments, the computer system 1010 can enable at least one user 1031*a*, 1031*b*, to be coupled to access enterprise applications 1038 via an I/O 1037*c* through LAN 1039*a*. In some embodiments, the user 1031 can comprise a user 1031*a* coupled to the computer system 1010 using a desktop computer, and/or laptop computers, or any fixed, generally non-mobile internet appliances coupled through the internet 1039*b*. In some embodiments, the user can comprise a mobile user 1031*b* coupled to the computer system 1010. In some embodiments, the user 1031*b* can connect using any mobile computing 1031*c* to wireless coupled to the computer system 1010, including, but not limited to, one or more personal digital assistants, at least one cellular phone, at least one mobile phone, at least one smart phone, at least one pager, at least one digital tablets, and/or at least one fixed or mobile internet appliances.

The following detailed description describes the development of the national vulnerability index (VI). In some embodiments, the VI is derived by statistically scoring vulnerability risk via explanatory domains across individual U.S. Census tracts. In some embodiments, the system includes a preliminary scoring algorithms used to preprocess data. In some embodiments, the disclosure includes pedagogically developing motivating statistics. In some embodiments, the system includes a spatial cross-validation algorithm used to identify a best model per tract-centered community. In some embodiments, the system is directed to statistical machinery ensuring the national comparison of local model results and enhancing the performance of the computer system by efficiently calculating such comparisons and presenting them in more readily understandable and computer resource-efficient ways.

In some embodiments, the number of populated Census tracts associated with the 2019 American Community Survey numbered 72,410, out of 73,056 total tracts [U.S. Census Bureau, 2019]. Several algorithmic sweeps of the data primed tracts for spatially measuring vulnerability, quantified via life-expectancy at birth (LEB) using various aspects of the system described herein according to some embodiments. In some embodiments, the Imputation, Bridging, Ferrying, and Ringing Algorithms described herein encompassed these operations. While the Bridging, Ferrying, and Ringing Algorithms follow sequentially, in that order, the Imputation Algorithm stands alone according to some embodiments. In some embodiments, while presented initially here, the system is configured to compute following the completion of the other three.

In some embodiments, the system includes an imputation algorithm that includes one or more steps described herein. FIG. 117 shows a non-limiting example of one or more steps for an imputation algorithm according to some embodiments. In some embodiments, the system includes an imputation module configured to execute one or more program steps including the imputation algorithm. While the algorithm itself can take various forms, the steps described herein enable one of ordinary skill to execute the system on various platforms. The example algorithms provided in the figures are merely non-limiting examples to aid those of ordinary skill and are understood to be representative of a more general execution of process flow.

In some embodiments, after merging all data sources, some tracts contained missing data. In some embodiments, individual tracts could be missing data for at least one of the 9 derived domains, or the outcome of life-expectancy at birth (LEB), or for one or more of 10 distinct variables in total. In some embodiments, although a variable could be missing domain or LEB data, tract spatial polygonal coordinate data were not missing. In some embodiments, the system is configured to execute a nearest-neighbor routine to impute missing data. In some embodiments, the imputation module is configured to execute one or more imputation program steps (sequentially) for one or more missing tracts on a per variable basis, or 10 times, ensuring all missing values receive an estimate derived via neighbor consideration.

In some embodiments, given a variable of interest, the imputation module first identified all tracts for which data were missing. Next, in some embodiments, imputation module is configured to pinpoint candidate tracts with non-missing data closest to tracts with missing data. In some embodiments, the system is configured to execute shapefiles configured to simplify three-dimensional curvilinear polygonal extents on the Earth's spherical surface via two-dimensional planar polygonal extents. In some embodiments, the system is configured to execute one or more shapefile operations, such as distance, which sometimes calculate incorrect values.

In some embodiments, to ensure correct distance calculations, the centroids of all polygonal tracts with missing data were first converted to latitudinal and longitudinal coordinates by the imputation module. This allows, per-centroid, defining a subsequent custom azimuthal equidistant projection by the system according to some embodiments. In some embodiments, this projection created a coordinate system centered on the centroid requiring imputation, ensuring the preservation of distances from the missing centroid to all non-missing centroids with data.

Next, in some embodiments, the system is configured to generate a buffer encompassing centroids. In some embodiments, missing data centroid was buffered by 5 km, thereby encompassing those centroids with data within that bound. In some embodiments, the buffering operation includes the system converting, by one or more processors, missing centroid point coordinates to a centroid-centered polygon. In some embodiments, to find non-missing-data centroids closest to the polygon, distances from the missing-data centroid to non-missing-data centroids, within the (e.g., 5-km) polygonal bound, were calculated by the system. Next, in some embodiments, the system is configured to retain one or more closest centroids (e.g., 3). Finally, in some embodiments, the system is configured to execute an inverse-distance weighting of these closest (3) points' variable values, with a power of 2, to estimate the imputed value.

In some embodiments, inverse-distance weighting allows observations arising from closer locations to weight more than those further away, with the power of 2 as a standard choice. In some embodiments, configuring the system to use up to three observations, when available, helped preserve spatial variability. In some embodiments, this means that the imputation for one missing centroid, using its three closest neighbors, generally differed than the imputation of a neighboring missing centroid, as the three nearest neighbors for each were likely different.

In some embodiments, following imputation of all missing points using centroid points with data up to a first distance (e.g., 5 km) away, the remaining set of still-missing centroids then repeated the process, searching for values greater than the first distance (5 km), but less than a second distance (e.g., 10 km) away. In some embodiments, centroids with data within the second distance (10 km) ring were then used to impute for the remaining missing data, again using inverse distance weighting, with a power of 2. In some embodiments, this procedure continued, using third, fourth, and fifth (e.g., 20, 100, and 2500 km) buffers, as necessary, to impute missing values, with the number of remaining missing points decreasing, or possibly staying constant, with each increase in polygonal buffer size. While specific values are used in this disclosure, it is understood those values may be replaces with more general terms (i.e., first instead of 5, second instead of 10, etc.) when defining the metes and bounds of the system according to some embodiments.

In some embodiments, when complete, the system is configured to receive the imputed inverse distance results for the variable's missing data and stack one or more of the imputed inverse distance results over each of the 5-, 10-, 20-, 100-, and 2500-km buffers. In some embodiments, the system is configured to combine the now non-missing, but imputed, data with the variable's original non-missing data. In some embodiments, this resulted in no data missing for a particular variable described herein. In some embodiments, this was then repeated for each of the 9 explanatory domains and outcome variable, or 10 times total, ensuring when complete, a data set with no missing values. FIG. 99 shows a non-limiting example Algorithm 1 summarizing one or more steps in the Imputation Algorithm according to some embodiments.

In some embodiments, the system includes a bridging algorithm. In some embodiments, the bridging algorithm is configured to identify empty spatial extents. In some embodiments, census tracts served as a stable set of geographic units for presenting American Community Survey data. In some embodiments, tracts generally represent 1,200 to 8,000 individuals, with an optimum size of 4,000. In some embodiments, due to an emphasis on capturing an optimum size of people, tracts necessarily vary in spatial extent. In some embodiments, tracts always respect county and state boundaries. In some embodiments, tracts subsume bodies of water, oceanside polygonal extents of shorelines, and very rural back-country. In some embodiments, as nobody lives in these areas, all tracts with zero population are excluded.

Two issues complicated the use of U.S. Census tracts as analytic base units in scoring spatial vulnerability according to some embodiments. In some embodiments, each issue centered on ensuring that tract connectivity accurately captured the practical movement of goods, services, and people across two-dimensional space.

In some embodiments, the first issue prevented contiguity across water. For example, the Straits of Mackinac separate the lower and upper peninsulas of Michigan, even though the Mackinac Bridge connects the two according to some embodiments. In some embodiments, it is reasonable to assume that the bridge enables connectivity between its endpoint tracts, notwithstanding their separability. In some embodiments, an individual on one side of the bridge may choose to elect services on the other. In some embodiments, connecting endpoint tracts captures local people flow across water features.

In some embodiments, the second issue prevented contiguity across land. In some embodiments, the exclusion of zero-population tracts reproduced the dilemma exemplified by the Straights, in that land "holes" develop. Irregardless of a hole, in some embodiments, a road may transit these excluded tracts, even though no people reside within. In some embodiments, roads similarly enable local people flow across zero-population tracts.

In some embodiments, the bridging algorithm described herein ensured connectivity in the two issues described: over each of population void water and land. In some embodiments, potential bridges were created by perpendicularly buffering a roads shapefile on both sides by 50 m, thus transforming linear roads into polygons. In some embodiments, work then commenced to identify which polygonal subsets of roads could serve as bridges across each of water and land.

In some embodiments, the system is configured to execute an identification of bridgeable water extents by first identifying potential shorelines. In some embodiments, accomplishing this on the tract-level required the system dissolving all internal boundaries of the tract shapefile. In some embodiments, the census counties shapefile generally subsumes water features. For example, in some embodiments, the counties shapefile partitions Lake Michigan into Michigan, Indiana, Illinois, and Wisconsin extents by extending neighboring county boundaries to subsume the Lake. In some embodiments, similar behavior occurs along the other Great Lakes and shorelines, especially Florida. In some embodiments, the dissolved counties shapefile subsumes the land extent of the nation, as defined by the dissolved tracts, as a whole.

In some embodiments, with potential national shorelines demarcated, the outline shapefile was then spatially differenced from the spatially larger counties shapefile by the system. In some embodiments, this operation kept the spatial extents in the counties shapefile not in the tract outline, thus effectively identifying water areas neighboring land. In some embodiments, these water extents buffer shorelines and the Great Lakes. Next, to simplify polygonal operations in some embodiments, the new water-feature shapefile was subdivided to the state level by the system, thus identifying state-level water-bridgeable extents.

In some embodiments, a similar differencing operation executing one or more steps described herein identified land-bridgeable extents. First, in some embodiments, the original tract shapefile outline created above by the system was differenced with a second tract-outline shapefile excluding zero-population holes. As this second tract-outline is spatially smaller than the first containing all tracts, its difference delineates potential land-bridgeable extents according to some embodiments. In some embodiments, to simplify polygonal operations, the new land-feature shapefile was subdivided by the system to the state level, thus identifying state-level land-bridgeable extents. "States" in this case includes Washington, DC according to some embodiments.

In some embodiments, separate polygons generated by the system identified bridgeable water and land extents, per state. In some embodiments, these two necessarily mutually exclusive state level sets were next combined by the system to create a single "empty" shapefile identifying that state's potential bridgeable extents. In some embodiments, intersection of this resulting empty shapefile with the polygonalized roads shapefile identified road bits able to serve as bridges by the system. In some embodiments, these polygonal bridges lack information about spatially neighboring tracts, thus frustrating bridge-tract connectivity.

In some embodiments, the system is configured to map bridges to tracts. In some embodiments, completing the bridging algorithm steps required anchoring, by one or more processors, identified bridges to appropriate end-point tracts. In some embodiments, tract geometry generated by the system determined if bridge ends connected to the same polygonal tract or to two separate tracts. In some embodiments, the latter scenario prevailed. In some embodiments, anchoring required configuring the system to label bridges with at least one tract endpoint identifier. In some embodiments, when labeled with tract identifiers, bridges were easily dissolved by the system, thereby creating a new tract comprised of the old tract with a new bridge extension. In some embodiments, polygonal bridges required inputting endpoint tract identifiers to the system.

In some embodiments, learning bridge labels first required the system generating, by one or more processors, spatially larger county shapefile, from which state-level bounding boxes were derived. In some embodiments, these boxes encompassed each state's possible water and land-extent bridges. In some embodiments, given these bridges, the centroid of each was obtained by the system. In some embodiments, since all polygonal bridges fell within a state's bounding box, bridge centroids did as well.

Next, in some embodiments, the system generated bridge centroids partitioned each state's bounding box into Voronoi polygons. In some embodiments, a program step includes Voronoi polygons dividing each state's bounding box into subset polygons defined by an anchoring bridge centroid. In some embodiments, all points in a Voronoi polygon are closer, in terms of Euclidean distance, to its defining centroid, when compared to all other competing centroids. In some embodiments, this operation allowed each bridge, via its centroid, to "extend its reach" into the larger polygonal extent defined by its encompassing Voronoi polygon.

In some embodiments, as a larger polygonal construct, the Voronoi polygons easily intersected with the tract shapefile, thereby tying tract labels to the extended reach Voronoi polygons. In some embodiments, any one Voronoi polygon housed exactly one empty bridge. In some embodiments, as first distance (e.g., 50 meters) buffered each bridge on all sides, including its ends, one end necessarily intersected at least one polygonal tract, ensuring overlap. In some embodiments, since resulting Voronoi polygons could intersect more than one candidate tract, the nearest, in terms of distance, was identified by execution the system. Finally, in some embodiments with each empty-bridge now overlapping its nearest tract, and thus identifiable, each bridge and tract intersecting pair was unioned by the system, meaning that each polygonal pair was merged into one polygon. Thus, where appropriate, in some embodiments, tracts polygonally extended their reach by crossing water or zero-population land extents. FIG. 100 shows and Algorithm 2 summarizing a non-limiting example of the Bridging Algorithm according to some embodiments.

In some embodiments, the system includes a Ferrying Algorithm. In some embodiments, the Bridging Algorithm is configured to generate connectivity between spatially disjoint polygons representing tracts that enjoy contiguity via some kind of bridge. Thus, in some embodiments, bridging generally increased tract-neighbor counts. Following bridging, in some embodiments, a few tracts still failed to connect to at least one other tract. In some embodiments, executing one or more ferrying algorithm program steps by the system described herein ensured these straggler tracts connected to the larger tract network.

Straggler tracts, following bridging, generally corresponded to true water-centered islands lacking a connective physical bridge according to some embodiments. In some embodiments, one tract in this non-limiting example represented these islands, preventing contiguity. In some embodiments, the system includes a geographical information system (GIS) configured to link stragglers with target tracts on the mainland.

In some embodiments, within the GIS, system generated digitized connective polygons connected stragglers to targets by ensuring overlap of each digitized end with each. Following this, in some embodiments, each digitized polygon was then split in two by program instructions, so that each of its overlapping sections intersected with exactly one of the straggler or the target. Next, in some embodiments, the simple polygon half overlapping the straggler was labeled by the system to match the straggler. In some embodiments, this was repeated for the target half. Finally, in some embodiments, digitized halves were dissolved with overlapping tracts via matching identifiers. In some embodiments, each of the straggler and target tracts extended their reach to polygonally meet in the body of water that previously separated them. FIG. 101 depicts a non-limiting Algorithm 3 summarizing one or more ferrying algorithm computer implemented steps according to some embodiments. As with any figure presented herein, the text and/or a portion of the text presented in the figures are understood to be readily incorporable into a description of the metes and bounds of the system.

In some embodiments, the system includes a Ringing Algorithm comprising one or more steps. In some embodiments, the Bridging and Ringing Algorithms together ensured that each tract with non-zero population connect to at least one neighbor. In some embodiments, combining tracts necessarily carve out national subsets. For example, since all tracts respect state boundaries, appropriate sets of tracts comprise states according to some embodiments.

In some embodiments, combining neighboring polygonal tracts defined local spatial neighborhoods, via which vulnerability assessment commenced. In some embodiments, informally, queen contiguity defined tract-neighbor relationships, meaning that any two tracts sharing a point were neighbors. In some embodiments, queen contiguity is a looser contiguity compared with rook contiguity, in which neighbors share a linear boundary. More formally, the Dimensionally Extended 9-Intersection Model (DE9-IM) defined geometric relationships between any two polygonal tracts.

In some embodiments, the DE9-IM describes two-dimensional topological relationships, two of which are queen and rook contiguity. The DE9-IM string F*T** defined queen contiguity, where the F (False) and T (True) disallow two-dimensional non-empty interior polygonal overlaps, while allowing zero-dimensional non-empty boundary point overlaps, respectively. In some embodiments, the asterisks * communicate spatial-relationship apathy in the positions where present. In some embodiments, queen contiguity served as a first-round neighbor-identification scheme.

In some embodiments, a second round executed by the system identified additional relationships induced via the bridging and ferrying algorithms. Rarely, the attaching of polygonal extents to original tract boundaries changed other polygonal point coordinates near attachment points according to some embodiments. In the case these small changes also occurred near a neighboring tract, in some embodiments, previous zero-dimensional point and/or one-dimensional linear boundaries sometimes became two-dimensional, meaning neighboring tracts now slightly overlapped. In some embodiments, the queen-contiguity DE9-IM strings above failed to capture these modified neighbor relationships. In some embodiments, to account for these special cases, a second pass through bridged and ferried polygons used the DE9-IM string 2*T**, an area overlap enabled queen contiguity relationship measure. In some embodiments, the 2 loosens the original definition by allowing only two-dimensional non-empty interior polygonal overlaps only. In some embodiments, polygons meeting this looser relationship standard on the second pass were removed from the first pass. In some embodiments, combining both passes contained neighbor assessments for each polygon, or tract.

In some embodiments, neighbor relationships identified each tract's immediate queen contiguous (possibly modified) neighbors. In some embodiments, this enabled the construction of tract sets, or communities, defined via contiguity by the system. In some embodiments, each tract defined its own community.

In some embodiments, construction of any one contiguous community by the system used a tract to anchor a community. In some embodiments, the anchoring tract includes a "0-ring." In some embodiments, communities then grew by appending contiguous neighbors to the 0-ring, defining a "1-ring." In some embodiments, the addition of neighbors to the 1-ring defined a "2-ring," while one more neighbor layer formed a "3-ring," after which ring-growth stopped. In some embodiments, bridged and ferried tracts ensured that communities jumped zero population water and land extents via contiguous polygonal extents, where appropriate. In some embodiments, each tract, or 0-ring, served as the anchor of a local community, defined as queen contiguous sets of tracts, out to that 0-ring's 3-ring. In some embodiments, 72,410 communities were created, one for each tract, or 0-ring. In some embodiments, each tract was a member of several different communities, ensuring high community polygonal overlap. FIG. 102 shows a non-limiting example Algorithm 4 summarizing the Ringing Algorithm according to some embodiments.

In some embodiments, following the completion of the Imputation, Bridging, Ferrying, and Ringing Algorithms, a spatial cross-validation algorithm, described below, ensured an appropriate balance between under and over fitting of all considered models, for each 0-ring-centered community. In some embodiments, the following subsections detail the statistical considerations executed by the system used to establish statistical validity of the Spatial Cross Validation Algorithm. In some embodiments, these steps include an introduction of the statistical methodology and theory, along with their applicability to Algorithm development.

In some embodiments, the system includes spatial weight matrices. In some embodiments, community construction via the Ringing Algorithm organized tracts for analysis. Mathematically, spatial weight matrices captured ring relationships according to some embodiments. In some embodiments, a square spatial weight matrix $W_k$ of size $n_k \times n_k$ represented the $k^{th}$ community comprised of $n_k$ tracts. In some embodiments, rows and columns of spatial weight matrices represent tracts, in the same order. In some embodiments, entry $w_{ijk}$ in $W_k$, representing the $i^{th}$ row and $j^{th}$ column in $W_k$, described the contiguity relationship between the $i^{th}$ and $j^{th}$ tracts for community k. In some embodiments, given a $k^{th}$ community, $w_{ij}$ or W, rather than $w_{ijk}$ or $W_k$, respectively, is simpler and preferred.

In some embodiments, in the case two tracts i and j are not contiguous neighbors, $w_{ij}=w_{ji}=0$. In some embodiments, if two tracts i and j did share at least one point via queen contiguity, $w_{ij}=1/n_i$, with $n_i$ the total number of tract neighbors of tract i. In some embodiments, tracts with a fewer number of neighbors weighted each pairwise relationship more than the pairwise connections of a tract with many neighbors. In some embodiments, diagonal entries $w_{ii}$ describing the relationship of a tract to itself were always zero, so that no tract i was ever self-contiguous. In some embodiments, the bridging and ferrying algorithms guaranteed that all tracts had at least one neighbor. In some embodiments, each W never contained the zero vector.

In some embodiments, weight matrices W were typically sparse, in that most entries were zero. In some embodiments, this means that in a given community, most tracts were discontiguous with most other community tracts.

In some embodiments, the system includes spatial error models (SEMs). In some embodiments, scoring community vulnerability followed imputing, bridging, ferrying, and ringing. In some embodiments, community assessment defined y, of size n×1, as the stochastic life expectancy at birth outcome in regressions against non-stochastic explanatory covariates X of size n×p, with p variable from 1 to 9. In some embodiments, the matrix X is always of full rank. In some embodiments, a scalar parameter $|\rho|<1$ measured spatial autocorrelation among the n tracts, while the non-stochastic n×n weights matrix W described tract-contiguity relationships.

In some embodiments, spatial error models (SEM), a regression methodology quantifying sample-unit spatial intensity while measuring outcome and explanatory-variable relationships, assessed all potential community fits. In some embodiments, SEMs leverage the equation pair $$y=X\beta+u \tag{1}$$

$$u=\rho Wu+\epsilon \tag{2}$$

to assess qualities-of-fit. In some embodiments, vector u, of size n×1, captured model disturbances, while $\epsilon$, of size n×1, did the same for innovations. In some embodiments, model parameters $\beta$, of size p×1, a vector of model weights, and $\rho$, required estimation. In some embodiments, the SEM assumed innovations have zero mean and homogeneous uncorrelated variance, so that $\epsilon \sim N(0, I\sigma^2)$.

In some embodiments, when autocorrelation is not present, $\rho=0$, simplifying equation (2) to $u=\epsilon$. In some embodiments, this simplifies equation (1) to $y=X\beta+\epsilon$, the general linear model, assuming uncorrelated and identical errors, i.e., $\epsilon \sim N(0, I\sigma^2)$. Thus, SEMs simplify in the presence of no spatial autocorrelation. In some embodiments, SEMs generalize linear models by incorporating spatial variability.

For completion's sake, observe that in some embodiments equations $$y_u=x_u^T\beta+u_u \tag{3}$$

$$u_u=\rho\omega_u^T u+e_u \tag{4}$$

describe (1) and (2) for the $u^{th}$ observation alone, where $x_u^T$ and $\omega_u^T$ are the $u^{th}$ rows of X and W, respectively. The notation uu represents the $u^{th}$ observation of the u vector. Although overloaded, the intent of symbol u is clear from context according to some embodiments.

In some embodiments, the system includes cross validation. Given a community, in some embodiments, models considered any combination of up to p=9 covariates when explaining observed variability of life-expectancy of birth. Generally speaking, one community may benefit from the inclusion of more covariates, while another may require fewer according to some embodiments. In some embodiments, inclusion of too many covariates may overfit, leading to poor model reproducibility with new data. On the other hand, in some embodiments, exclusions potentially underfit, leaving important explanatory relationships uncovered.

In some embodiments, in addition to concerns surrounding appropriate model fit for a community, questions abounded as to the utility of including a local spatial parameter. As noted above, in some embodiments, communities in which spatial autocorrelation played a role may benefit from SEM fits, while others lacking autocorrelation may benefit from simpler non-spatial linear models.

In some embodiments, communities considering up to 9 possible explanatory variables permit a total of 29=512 possible models, after including an intercept-only model. In some embodiments, since each of these may or may not include a spatial adjustment, any one of 2×29=210=1024 models could superlatively describe vulnerability for any one community. Evaluating each of these 1024 possibilities ensured no bias in finding each community's best. In some embodiments, five-fold cross validation assessed competing models, although any finite number of folds $F \geq 2$ were possible. In some embodiments, this means each community set of n polygonal units was partitioned into F=5 subsets, or folds, of approximate equal sample size by the system. In some embodiments, validation thus iterated 5 separate times. In some embodiments, for each iteration, one of the 5 folds was set aside as a hold-out, or test set, while the other 4 comprised that iteration's training set. In some embodiments, given a fold, each polygonal unit was in either the test or training set. In some embodiments, within an iteration, subscript S identified in-Sample (training) observations, while subscript O identified out-of-sample (test) observations. Thus, in some embodiments, the training-set contained ns polygonal units, while the test-set contained $n_O$ of the same, so that $n_O+n_S=n$.

In some embodiments, each fold iteration effectively partitioned design-matrix X row-wise into submatrices $X_S$ and $X_O$ of sizes $n_S \times p$ and $n_O \times p$, respectively, so that $X=[X_S^T\ X_O^T]^T$. Mathematically, in some embodiments, this means that any one fold f of the F=5 in cross-validation led to $$X = \begin{bmatrix} X_S \\ X_O \end{bmatrix}.$$

Similarly, in some embodiments, y partitioned into $y_S$ of size $n_S \times 1$ and $y_O$ of size $n_O \times 1$, so that $$y = \begin{bmatrix} y_S \\ y_O \end{bmatrix}. \tag{5}$$

Finally, in some embodiments, the weight matrix W partitioned via $$y = \begin{bmatrix} W_S & W_{SO} \\ W_{SO} & W_O \end{bmatrix}.$$

where block submatrix $W_S$, of size $n_S \times n_S$, held the training-data spatial relationships. Similarly, in some embodiments, submatrix $W_O$ of size $n_O \times n_O$ held the test-data spatial relationships. In some embodiments, submatrix $W_{SO}$, of size $n_S \times n_O$, described the training data spatial relationships among the test data. Finally, in some embodiments, submatrix $W_{OS}$, of size $n_O \times n_S$, described the test-data spatial relationships among the training data.

In some embodiments, within a partition, each fold-f iteration created a distinct test-data pairing $\{X_O^f, y_O^f\}$ comprised of data originating from polygonal units in the $f^{th}$ fold. In some embodiments, all other polygons in the F−1=4 other folds comprised training data $\{X_S^f, y_S^f\}$ for the $f^{th}$ fold. In some embodiments, each iteration replaced polygonal units for each fold f so that test and training-data pairings $\{X_O^f, y_O^f\}$ and $\{X_S^f, y_S^f\}$ updated as well.

In some embodiments, given fold f, regression of training components $y_S^f$ against $X_S^f$ over all possible spatial SEM and non-spatial linear models M, estimated models. In some embodiments, each fold f used training data $\{X_S^f, y_S^f\}$ to estimate $\hat{\beta}_m^f$ and $\hat{\rho}_m^f$ or each model m, where the hat notation indicates estimates. In some embodiments, in the case a non-spatial linear model was fit, $\hat{\rho}_m^f=0$. In some embodiments, these $\hat{\beta}_m^f$ and $\hat{\rho}_m^f$ then estimated outcome $y_O^f$ so as to create $\hat{y}_O^f$, via test explanatory data $X_O^f$. In some embodiments, each fold f enabled comparison of outcome estimates $\hat{y}_O^f$ against test outcome data $y_O^f$ or for the $u^{th}$ entry, $\hat{y}_{Ou}^f$ and $y_u^f$, respectively. Finally, in some embodiments comparison occurred via root-mean squared error (RMSE). In some embodiments, for fold f and model m, the RMSE, defined via $$RMSE_m^f = \sqrt{\frac{1}{n_o}\sum_{u=1}^{n_o}\left(\hat{y}_u^f - y_u^f\right)^2},$$

compared predicted $\hat{y}_u^f$ and observed $y_O^f$ values overall $n_O$ test-data polygonal units in fold f. In some embodiments, models m with lower RMSEs communicate better performance than those with higher RMSEs.

In some embodiments, given F=5 folds, cross-validation estimated five separate $RMSE_m^1$ . . . $RMSE_m^5$ for each model m, with the training and test data changing for each fold f. The average root-mean squared error $\overline{RMSE}_m$, for model m, and calculated over all F=5 folds via $$\overline{RMSE}_m = \frac{1}{F}\sum_{f=1}^{F} RMSE_m^f = \frac{1}{5}\sum_{f=1}^{5} RMSE_m^f,$$

provided an overall goodness-of-fit statistic for each model m according to some embodiments. In some embodiments, the model m with the lowest $\overline{RMSE}_m$ identified the best overall model for that community.

In some embodiments, the system is configured to correct multiplicative errors. In some embodiments, spatial-error models incorporate error multiplicatively, rather than linearly, complicating cross-validation. First, to understand the distinction, recall that in the general linear model introduced above according to some embodiments, $$y = X\beta + \epsilon,$$

in which $\epsilon \sim N(0, I\sigma^2)$ stochastically enters the model additively.

In some embodiments, training data $\{X_S^f, y_S^f\}$, when non-spatially regressed via $$y_S^f = X_S^f \beta_m + \epsilon,$$

the $m^{th}$ model, produced estimates $\hat{\beta}_m$. In some embodiments, these in turn led to predictions by $\hat{y}_O^f$ by using by using test explanatory data $X_O^f$ in prediction equation $$\hat{y}_O^f = X_O^f \hat{\beta}_m, \tag{6}$$

in which $\epsilon$, by the underlying normality assumption, is set to zero. In some embodiments, the additive nature of $\epsilon$, coupled with $E|\epsilon|=0$, enabled easy prediction $\hat{y}_O^f$.

In some embodiments, spatial dependencies in the disturbances u of an SEM model complicate the calculation of test-outcome predictors $\hat{y}_O^f$. To see this, note that for the $m^{th}$ model according to some embodiments, equation (2) implies $$u=\rho_m Wu+\epsilon$$

$$u-\rho_m Wu=\epsilon$$

$$(I-\rho_m W)u=\epsilon$$

$$u=(I-\rho\_mW)^{-1}\epsilon \quad (7)$$

Substitute the reformulated u of (7) into (1) so that for the $m^{th}$ model according to some embodiments, $$y=X\beta_m+(I-\rho_m W)^{-1}\epsilon.$$

In some embodiments, this final spatial formulation, contrary to the additive-error linear model above, has its errors $\epsilon$ enter multiplicatively. In some embodiments, these multiplicative disturbances complicate spatial cross-validation. In fact, observe that for SEMs, cross-validation uses test data $X_O$ to estimate predictions by $\hat{y}_O$ via equation $$\hat{y}_O=X_O\hat{\beta}_m+(I-\hat{\rho}_m W)^{-1}\epsilon, \quad (8)$$

derived from training data. In some embodiments, fold-f notation has been suppressed for simplicity.

In this formulation, in some embodiments, the assumption of zero-mean innovations; i.e., $E|\epsilon|=0$, leads to the loss of all spatial information when making test-observation predictions. Application of the expectation operator to both sides of (8), for model m, reveals that, on average $$\begin{aligned} E[\hat{y}_O] &= E\left[X_O\hat{\beta}_m+(I-\hat{\rho}_m W)^{-1}\epsilon\right] \quad (9)\\ &= X_O\hat{\beta}_m+E\left[(I-\hat{\rho}_m W)^{-1}\epsilon\right]\\ &= X_O\hat{\beta}_m+(I-\hat{\rho}_m W)^{-1}E[\epsilon]\\ &= X_O\hat{\beta}_m, \end{aligned}$$

a spatial-error formulation now no different than non-spatial linear models, i.e., equation (6), even though the expected value of $\hat{y}_O$ depends on each of the exogenous data X and weights matrix W. In fact, given that both $X_O$ and W are non-stochastic, in some embodiments equation (9) can be rewritten via the conditional expectation $$E[\hat{y}_O|X_O,W]=E[\hat{y}_O]=X_O\hat{\beta}_m \quad (10)$$

In some embodiments, cross-validation fails for spatial models defined via equations (1) and (2) which together imply equation (7). In some embodiments, correctly estimating $y_O$ for spatial error models requires more careful consideration.

In some embodiments, the system includes a best linear unbiased prediction. Best linear unbiased prediction holds the key to accurately estimate test predictions $y_O$ in a spatial model. In some embodiments, the section includes results from Kelejian and Prucha, 2007. In some embodiments, to see its applicability here according to some embodiments, first recognize that the normality of the innovations E implies normality of the outcome y in SEMs, so that y is itself a random vector, i.e., $$y\sim N[X\beta,\sigma^2(I-\rho W^T)^{-1}(I-\rho W^T)^{-1}] \quad (11)$$

$$y\sim N[x_u^T\beta,\sigma^2\ \mathrm{Var}(y_u)] \quad (12)$$

for the $u^{th}$ outcome observation $y_u$, where $\mathrm{Var}(y_u)$ equals the $u^{th}$ diagonal entry of $(I-\rho W^T)^{-1}(I-\rho W^T)^{-1}$.

Next, in some embodiments, define a selector matrix $S_{-u}$ equal to the identify matrix I with the $u^{th}$ row deleted. In some embodiments, assuming that I is of size n×n, then $S_{-u}$ is necessarily of size (n−1)×n, matrix $S_{-u}$ enjoys the special property that $$y_{-u}=S_{-i}y,$$

where the notation $y_{-u}$ represents the outcome vector y with the $u^{th}$ entry $(y_u)$ removed. Thus, the selector matrix excludes the $u^{th}$ entry from y, ensuring that $y_{-u}$ is of size (n−1)×1. With these definitions at hand, it is similarly easy to determine the distribution for $y_{-u}$; i.e., $$y_{-u}\sim N[S_{-u}X\beta,S_{-u}(I-\rho W)^{-1}(I-\rho W^T)^{-1}S_{-u}^T\sigma^2] \quad (13)$$

In some embodiments, the constituents $y_{-u}$ and $y_u$ partition y. In some embodiments, practically, this means their joint distribution can be written as $$y=\begin{bmatrix} y_u \\ y_{-u}\end{bmatrix}\sim N\left(\begin{bmatrix} E[y_u] \\ E[y_{-u}]\end{bmatrix}\begin{bmatrix} \mathrm{Var}(y_u) & \mathrm{Cov}(y_u,y_{-u}) \\ \mathrm{Cov}(y_u,y_{-u})^T & \mathrm{Var}(y_{-u})\end{bmatrix}\right). \quad (14)$$

with the covariance-variance matrix of Var(y) partitioned into two diagonal blocks $\mathrm{Var}(y_u)$ and $\mathrm{Var}(y_{-u})$ and two off-diagonal blocks $\mathrm{Cov}(y_u,y_{-u})$ and its transpose $\mathrm{Cov}(y_u,y_{-u})^T$.

In some embodiments, equation (14) communicates that the joint distribution of $y_u$ and $y_{-u}$ distributes normally. In some embodiments, the partitioned normal representation of equation (14) leads to [Goldberger, 1962]'s best prediction equation via consideration of the conditional expectation $E[y_u|X, W, y_{-u}]$. Note that this statement indicates that to estimate a value for the $u^{th}$ polygonal unit, consider not only the external covariates X and the spatial relationships W, but also the outcome values $y_{-u}$ in all other polygonal units according to some embodiments. In some embodiments, because X and W are non-stochastic, $E[y_u|X, W, Y_{-u}]=E[y_u|y_{-u}]$, implying that Goldberger's formula can be written as $$\hat{y}_u=E[y_u|y_{-u}]=E[y_u]+\mathrm{Cov}(y_u,y_{-u})\mathrm{Var}(y_{-u})^{-1}(y_{-u}-E[y_{-u}]). \quad (15)$$

In some embodiments, using known values, equation (15) simplifies to $$\hat{y}_u=E[y_u|y_{-u}]=x_u^T\beta+\mathrm{Cov}(u_u,y_{-u})\mathrm{Var}(y_{-u})^{-1}(y_{-u}-E[y_{-u}]). \quad (16)$$

or Kelejian and Prucha's so-called third estimator, or "KP3." In some embodiments, further simplification of equation (16) makes use of the selector matrix $S_{-u}$, along with various formulations involving expectations, variances, and covariances. In some embodiments, formula (16) ensures an accurate spatial prediction of the outcome $y_u$ associated with the $u^{th}$ polygonal unit, thereby improving the unsatisfactory prediction offered by equation (10) above. In some embodiments, it is instructive to note that by using both $\mathrm{Cov}(u_u, y_{-u})$ and $\mathrm{Var}(y_{-u})^{-1}$, the estimator of (16) $\hat{y}_u$ uses all training data, together with the data made available by using the $u^{th}$ observation for which a testing estimate is required. Sequentially estimating $\hat{y}_u$ for all required entries in y, via a leave-one-out approach, leads to vector-level predictions for $\hat{y}$.

In some embodiments, the system includes vulnerability algorithms. In some embodiments, the system includes spatial cross-validation algorithms. As a leave-one-out estimator, Kelejian and Prucha's KP3 enabled spatial estimation of $y_O^f$ for any fold f. This simply means that estimation of $y_O^f$ required sequentially estimating each $y_u$, where u indexed the test-set $n_O$ polygonal units, as well as the individual entries in $y_O$. Predictions $\hat{y}_u$ in equation (16) used all available training data $\{X_S^f, y_S^f\}$ and the $u^{th}$ test input data $X_O^f$. Training data manifested via predictions $\hat{\beta}$ and $\hat{\rho}$; the latter was used to estimate $Var(y_{-u})$. In the context of spatial cross-validation, this means all training-data, along with the $u^{th}$ polygonal unit, contributed to the final estimate. Non-zero covariances $Cov(y_u, y_{-u})$ contributed spatial-relationship information of each test observation to its training-set neighbors, relative to the test observations requiring prediction.

FIG. 103 depicts a non-limiting example Algorithm 5 which itemizes each step in applying the prediction methodology described herein to define a spatial cross-validation procedure, which applies traditional statistical cross-validation in a spatial regression framework. In some embodiments, the Algorithm itemizes the role of both training data targets and inputs $\{y_S^f, X_S^f\}$ and the same for testing data targets and inputs $\{y_O^f, X_O^f\}$, for each fold f. In some embodiments, it also highlights the function of training weight matrices $W_S$, and how these combined with each testing observation $y_u^f$, so as to ensure each sequential update used the spatial relationships particular to it. In some embodiments, evidence may suggest that the best model involved no spatial adjustments, the spatial cross-validation algorithm necessarily also subsumed the possibility that a simple non-spatial linear model was required.

In some embodiments, the system includes community correlation comparisons. In some embodiments, the system includes a national vulnerability index making use of localized data benefits from comparing vulnerability estimates from communities sharing no data. In some embodiments, communities developed via the 3-ring algorithm for tracts in Maine share no data with communities defined in California. In some embodiments, statistical regression results derived from disparate data sets prevent comparisons, due to covariance discordances among data sets. In some embodiments, enabling comparisons between models fit for varying 3-ring communities, in the context of the approach here, enabled interpretation of local models on a national scale. In some embodiments, the mathematical framework ensuring this linkage follows. Recall the framework presented in equations (1) and (2) above according to some embodiments, $$y=X\beta+u \quad (17)$$

$$u=\rho Wu+\epsilon|\rho|<1 \quad (18)$$

where y is an n×1 stochastic outcome vector, X is an n×p non-stochastic design matrix with p covariates, and W is a n×n nonstochastic weight matrix. Of course, $\epsilon \sim N(0, I\sigma 2)$.

In some embodiments, as described above, inference sought estimates for model parameters β, variance $\sigma^2$, and spatial autocorrelation $|\rho|<1$. In some embodiments, maximum likelihood of disturbances u, via the distributional assumptions of ε, simultaneously analytically maximized all three quantities, given the data X, outcome y, and weight matrix W. In some embodiments, an optimization routine found a value for ρ, after which, a new matrix $A=I-\rho W$ was then calculated, making use of both estimated ρ and the spatial weights matrix W. In some embodiments, the matrix I is the identity matrix. In some embodiments, calculation of A then enabled estimation of β and $\sigma^2$.

Define $y^*=Ay$ and $X^*=AX$ so that $y^*$ and $X^*$ are the A-transformed versions of y and X, respectively according to some embodiments. In some embodiments, it can be shown that the transformed regression $$y^*=X^*\beta+\epsilon$$

can also be used to estimate β. In some embodiments, matrix A, assuming estimation of ρ, enables an ordinary least-squares calculation of β. In some embodiments, ordinary least-squares theory dictates that $$\hat{\beta}=\{[X^*]^T X^*\}^{-1}[X^*]^T y^*.$$

In some embodiments, coded maximum-likelihood SEM routines make use of this formula, via the transformation matrix A, to quickly estimate a spatially-adjusted β. In some embodiments, this means that estimation of β depends on ρ; thus, $\hat{\beta}=\hat{\beta}(\rho)$.

In some embodiments, a convenient fact arises after standardizing individual variables in a design matrix X along with the outcome vector y. In some embodiments, standardization involves mean-centering and standardizing each column of X column-wise, via each column's mean and standard deviation, with a similar operation applied to y. In some embodiments, in the general linear model, a regression of the standardized y, say Zy against standardized X, say $Z_X$, of the form $$Z_y=Z_x\beta_Z+\epsilon_Z$$

with errors $\epsilon_Z \sim N(0, I\sigma_z^2)$, leads to the ordinary-least-squares estimate of $\beta_Z$ being equal to the Pearson correlation coefficient $\rho_P$ of unstandardized X and y. Thus, $\beta_Z=\rho_P(X, y)$.

In some embodiments, the scalar Pearson correlation is a separate, but similar, measure from the spatial correlation already mentioned. For example, both are bounded above by 1 and below by −1, so that $|\rho_P|\le 1$. In some embodiments, as a bounded quantity, $\rho_P$, and thus, the ordinary-least-squares estimate $\beta_Z$, doubles as a scale-invariant measure of the relationship strength between the model-inclusive X and outcome y.

In some embodiments, standardization enables comparisons of model parameter estimates derived from potential spatially cross-validated model community-fits arising from 3-ring tract data not sharing tracts. In some embodiments, the ordinary-least-squares estimator, say δ, obtained by regressing standardized y* against standardized X, in a spatial-error model framework, is a Pearson correlation coefficient.

In some embodiments, the matrix A depends on an estimate for the spatial autocorrelation ρ. In some embodiments, it is also instructive to note that ρ, the spatial autocorrelation associated with a model describing a 3-ring-defined community, is always a scalar. In some embodiments, the Pearson correlation describes the relationship between a life-expectancy-at-birth outcome, and at least one, but possibly up to 9, separate explanatory variables. In some embodiments, the Pearson correlation may be a scalar $\rho_P$ or vector $\rho_P$, depending on the number of relationships it describes.

In some embodiments, to show that estimation of a Pearson correlation coefficient is possible, given an estimate of the spatial autocorrelation ρ, along with standardized y* and standardized X*, first suppose that $$H = I_n - \frac{1}{n}J$$

is the centering matrix, with $J=11^T$ of size n×n. In some embodiments, when written as $HX^*$, H centers the columns of matrix $X^*=[x_1^* \ldots x_p^*]$ by each column's mean $E[x_j^*]=\mu_j^*=1\mu_j^*$, when multiplied from the left. In some embodiments, the centering matrix H is a projection matrix, meaning it is both symmetric and idempotent.

Next, in some embodiments, assume further that $\Sigma_X^*$ is a diagonal matrix whose entries contain the variances of each $x_j^*$ so that $\Sigma_X^*=\text{diag}\{\text{Var}(x_1^*), \ldots, \text{Var}(x_p^*)\}$. Observe that for matrix X, $X^T HX=\Sigma_X$. This also implies that $(X^T HX)^{-1}=\Sigma_{x_x}^{-1}$.

In some embodiments, then, matrix $\Sigma_{x^*}^{-1/2}$, together with H, whitens X*. In some embodiments, whitening is the matrix equivalent of standardizing a variable. In some embodiments, $Z_{X^*}=HX^*\Sigma_{x^*}^{-1/2}$ is the whitened matrix for X*. In some embodiments, $Z_{y^*}=Hy^*\Sigma_{y^*}^{-1/2}$ is the whitened vector for y*. Note that since y*is a vector, $\Sigma_{y^*}^{-1/2}$ is a scalar.

In some embodiments, with the whitening (standardization) of transformed matrices X* and y* at hand, via $Z_X^*HX^*\Sigma_{x^*}^{-1/2}$ and $Z_{y^*}=Hy^*\Sigma_{y^*}^{-1/2}$, respectively, estimation of the ordinary least-squares estimator δ, along with substitution, leads to $$\begin{aligned}\hat{\delta} &= \left(Z_{X^*}^T Z_{X^*}\right)^{-1} Z_{X^*}^T Z_{y^*} \\ &= \left[\left(HX^*\Sigma_{x^*}^{-1/2}\right)^T HX^*\Sigma_{x^*}^{-1/2}\right]^{-1}\left(HX^*\Sigma_{x^*}^{-1/2}\right)^T Hy^*\Sigma_{y^*}^{-1/2}\end{aligned}$$

Next, in some embodiments, apply transposition, and then take advantage of the idempotency of H, meaning that $H=HH=H^2$, so that $$\begin{aligned}\hat{\delta} &= \left(Z_{X^*}^T X^{*T} H^T HX^*\Sigma_{x^*}^{-1/2}\right)^{-1}\Sigma_{X^*}^{-T/2} X^{*T} H^T Hy^*\Sigma_{y^*}^{-1/2} \\ &= \left(\Sigma_{X^*}^{-T/2} X^{*T} HX^*\Sigma_{x^*}^{-1/2}\right)^{-1}\Sigma_{X^*}^{-T/2} X^{*T} H^{*T} Hy^*\Sigma_{y^*}^{-1/2}\end{aligned}$$

now, apply the matrix inverse, so as to simplify some of the expression on the left, $$\hat{\delta}=\Sigma_{x^*}^{1/2}(X^{*T}HX^*)^{-1}\Sigma_{X^*}^{T/2}\Sigma_{X^*}^{-T/2}X^{*T}Hy^*\Sigma_{y^*}^{-1/2}$$

followed by recognizing that $\Sigma_{X^*}^{T/2}\Sigma_{X^*}^{-T/2}=I$, leading to $$\hat{\delta}=\Sigma_{x^*}^{1/2}(X^{*T}HX^*)^{-1}X^{*T}Hy^*\Sigma_{y^*}^{-1/2}.$$

nearing the end, recall that $(X^T HX^*)^{-1}=\Sigma_X^{-1}$, meaning that $$\hat{\delta}=\Sigma_{x^*}^{1/2}\Sigma_{x^*}^{-1}X^{*T}Hy^*\Sigma_{y^*}^{-1/2}$$

so that simplifying the $\Sigma_{X^*}$ terms provides $$\hat{\delta}=\Sigma_{x^*}^{1/2}X^{*T}Hy^*\Sigma_{y^*}^{-1/2}$$

at long last, rewrite, emphasizing the statistical operations at play to obtain $$\hat{\delta} = \text{Var}(X^*)^{-\frac{1}{2}}\text{Cov}(X^*, y^*)\text{Var}(y^*)^{-1/2}$$

and, by recognizing the above as the matrix definition of Pearson correlation, write $$\hat{\delta}=\hat{\rho}_P(X^*,y^*),$$

as was to be shown.

Thus, within an SEM, standardization of explanatory variables and outcome, prior to estimation of the ordinary-least-squares estimator δ, but after calculating an autocorrelation estimate for ρ (thereby ensuring the use of the transformation matrix A), enabled Pearson correlation coefficients to describe variable-outcome relationships. Since Pearson correlation coefficients, contrary to ordinary-least-squares estimators, are scale-invariant, they enable comparison of outcome-domain relationships across different communities. Further, given that the Pearson correlation coefficients described here arise from SEMs, they conveniently adjust away estimated spatial autocorrelation effects. As noted in passing, however, regression of standardized coefficients in non-spatial linear models arise lead to ordinary least-squares estimates being Pearson correlation coefficients as well, ensuring a global comparison framework for all modeling results.

In some embodiments, the system includes an averaging algorithm. In some embodiments, the spatial cross-validation algorithm was applied to all 72,410 tracts in which at least one individual lived in calendar year 2019. In some embodiments, this means each tract's 3-ring set of polygonal tracts, or community, was used to identify a best model. In some embodiments, each community estimated a vector of unstandardized coefficients β and standardized scale-invariant Pearson correlations $\rho_P$. Both β and $\rho_P$ adjust for community spatial autocorrelation ρ. In some embodiments, in the case the community's best model was a non-spatial linear model, spatial autocorrelation was zero; i.e., ρ=0.

In some embodiments, the 3-ring construction necessarily implied that individual tracts participate in multiple communities. For example, in some embodiments, the centering 0-ring that defined one community is necessarily a member of the 1-ring of a separate community centered on a tract neighboring the 0-ring. In the latter case, the second community's centering tract is that community's 0-ring according to some embodiments. Generally, in some embodiments, given that tracts extended to 3-rings, individual tracts were members of several different communities, each centered on a different tract.

To formalize this idea, suppose that $C_k$ is the collection of $n_k$ tracts defined by a centering 0-ring for the $k^{th}$ community according to some embodiments. In some embodiments, to ease the presentation, assume the community of interest is known; thus, write C, containing n tracts, in lieu of $C_k$. Community C necessarily includes exactly $c_0=1$ 0-ring element, some number $c_1\geq 1$ of 1-ring elements, $c_2\geq 0$ 2-ring elements, and $c_3\geq 0$ 3-ring elements. In some embodiments, community C must have at least one 1-ring tract to which the 0-tract connects, by design, as bridging and ferrying ensure that no tract is disconnected from the tract set as a whole. In some embodiments, communities could, however, not have any $c_2$ nor $c_3$ elements. This happens with small two-tract partitioned islands not connected to the larger network. In some embodiments, overall, $c_0+c_1+c_2+c_3=n$, meaning that each tract of a community C is a member of either the 0-, 1-, 2-, or 3-ring.

In some embodiments, the Spatial Cross-validation algorithm ensures that each tract i in a community receives both a tract-specific prediction $\hat{y}_i$ of life-expectancy at birth (LEB), a community specific unstandardized estimate of the relationship of LEB y with the $j^{th}$ covariate $x_j$ via $\hat{\beta}_j$, an entry in model-estimated β, and a community-specific standardized estimate of the relationship between y and $x_j$ via $\rho_{Pj}(y, x_j)$, an entry in $\rho_P(y, x_j)$. Note that all tracts in a community receive the same estimate of $\hat{\beta}_j$ and $\beta_P(y, x_j)$, while the estimates for $\hat{y}_i$ vary by tract i according to some embodiments.

In some embodiments, the fact that each tract in a community C receives an LEB prediction $\hat{y}_i$, along with community spatial overlap, implies that each individual tract i receives estimates from all Q communities of which it is a member. In some embodiments, the average $\hat{y}_{iq}$ over all Q estimates for tract i provided a natural summary prediction statistic for each tract i. In some embodiments, the final estimated LEB-outcome value for each tract i was $$\bar{y}_i = \frac{1}{Q}\sum_{q=1}^{Q}\hat{y}_{iq}$$

In some embodiments, as noted above, each community C has $c_0=1$ tract elements, along with $c_1$ 1-ring, $c_2$ 2-ring, and $c_3$ 3-ring elements. In some embodiments, this means that each $r^{th}$ ring contributes $c_r/n$ towards the estimate $\bar{y}_i$, implying that in a certain light, $\bar{y}_i$ is a weighted average.

In some embodiments, tract-specific estimates of unstandardized $\hat{\beta}_j$ and standardized $\hat{\rho}_P(y, x_j)$ were obtained similarly. In some embodiments, this means that for each tract, all $c_0=1$, along with $c_1$, $c_2$, and $c_3$ 0-, 1-, 2-, and 3-ring elements were averaged via $$\bar{\beta}_j = \frac{1}{Q}\sum_{q=1}^{Q}\bar{\beta}_{jq} \text{ and}$$

$$\bar{\rho}_j(y,\ x_j) = \frac{1}{Q}\sum_{q=1}^{Q}\bar{\rho}_{jq}(y,\ x_j),$$

respectively, over all communities Q in which tract i participated in model fitting.

As non-limiting examples for implementing various aspects of the system, some analyses used the statistical programming R, version 4.1.0 [R Core Team, 2021]. In some embodiments, inverse distance weighting in the Imputation Algorithm used package gstat ([Pebesma, 2004], [Graler et al., 2016]). In some embodiments, construction of spatial weight matrices W utilized package spdep ([Bivand, 2002]), fitting of SEM spatial regressions and prediction (involving Kelejian and Prucha's KP3 estimator [Kelejian and Prucha, 2007]) utilized package spatialreg ([Bivand et al., 2021]), and all spatial data used the simple feature standard via package sf ([Pebesma, 2018]). In some embodiments, census-data management used package tidycensus ([Walker, 2021]), while Census shapefile management relied on package tigris [Walker and Herman, 2021].

In some embodiments, U.S. Census Shapefiles in addition to housing tabular data collected via the ACS, the Census also maintains geographic information via TIGER/Line Shapefiles, or ex-tracts of selected geographic information from the Census Bureau's Master Address File (MAF)/Topologically Integrated Geographic Encoding and Referencing (TIGER) Database (MTDB). In some embodiments, shapefiles are point, linear, and polygonal digital representations of zero-, one-, or two-dimensional entities, respectively, in two-dimensional space. In some embodiments, TIGER/Line Shapefiles contain information of various geographic cuts and entities throughout the 50 United States, Puerto Rico, the Virgin Islands, Guam, American Samoa, and the Northern Mariana Islands. In some embodiments, each shapefile contained a standard and unique geographic identifier for each geographic unit, thus linking tabular US Census unit data with its spatial representation. In some embodiments, all US Census shapefiles are in the Global Coordinate System North American Datum of 1983 (GCS NAD83).

In some embodiments, development of a system implemented locality measure utilized several different shapefiles available from the US Census. In some embodiments, the US Nation polygonal shapefile, with resolution 1:5,000,000, served as a general high-resolution outline shapefile, and included the 50 states and all other areas listed above.

In some embodiments, the Counties and Equivalent Entities polygonal shapefile, or US Counties, with resolution 1:500,000, and representing governmental unit boundaries as of Jan. 1, 2019, included traditional counties for most states; cities independent of a county in Maryland, Missouri, Nevada, and Virginia; boroughs in Alaska, parishes in Louisiana; municipalities in Puerto Rico; districts and islands in American Samoa; municipalities in the Northern Mariana Islands, and islands in the Virgin Islands. In some embodiments, the set of all US Counties included 3,311 polygonal units and partitioned the United States. In some embodiments, all counties fell within exactly one state or its equivalent, with no county or county equivalent having polygonal representation in two or more states. In some embodiments, the US Counties shapefile was downloaded nationally.

In some embodiments, the ZIP Code Tabulation Areas (5-digit) (ZCTA) polygonal shapefile, with unknown resolution, represented most areas of the United States, including (check the islands). In some embodiments, as a polygonal representation intended to emulate areas served via the USPS, ZCTAs do not include many nonresidential areas and point-represented Post Office boxes. In some embodiments, the set of 33,144 polygonal ZCTAs does not partition the United States, meaning there are holes. In some embodiments, areas included as part of a county via the U.S. Counties shapefile may not be included as part of the ZCTA shapefile. In some embodiments, ZCTA political boundaries could possibly extend up to several kilometers from shoreline. In some embodiments, ZCTAs usually, but not always, respect county and state boundaries, meaning that a ZCTA may have polygonal representation in two or more counties and/or states. The ZCTA shapefile was downloaded nationally.

In some embodiments, the Primary and Secondary Roads linear shapefile, with unknown resolution, contained primary and secondary road features. In some embodiments, the system is configured to use primary roads to identify divided limited access highways within the federal interstate highway system. In some embodiments, these roads include interchanges and ramps, as well as toll highways. In some embodiments, secondary roads include main arteries in the U.S.-highway, state-highway, or county-highway systems, with one or more lanes of traffic in each direction as a defining characteristic. In some embodiments, the Primary and Secondary Roads shapefile was downloaded by state or state equivalent.

In some embodiments, modification of shapefiles occurred prior to use in community construction. First, in some embodiments, the 10-fold higher resolution U.S. Nation shapefile clipped the low-resolution Counties and Equivalent Entities shapefile, leading to a Clean US Counties shapefile. In some embodiments, this operation effectively replaced less resolved shorelines with more highly resolved ones, as the original counties shapefile emphasized political boundaries, which typically extend out to sea. In some embodiments, this also aided the manifestation of other water features, e.g., Lake Michigan, as the counties in the original shapefile subsumed the entirety of the Lake (see FIG. 94: (a)). In some embodiments, clipping changed no internal county boundaries. Additionally, given the clarity in the definition of land-based boundaries with Canada and Mexico, no land-based international external boundaries changed as well.

In some embodiments, the roads shapefile was perpendicularly buffered 50 meters on both sides, thereby transforming each state's original linear shapefile into a polygonal one. This was done to ensure concordance with all other polygonal shapefiles. In some embodiments, one or more shapefiles used an Albers Equal Area (AEA) projection to ease the display of results.

In some embodiments, the system includes executing county bridging. In some embodiments, bridging counties is configured to be executed on a per-state basis and depended on spatially identifying water areas over which bridges could connect otherwise unconnected counties. In some embodiments, since counties partition the entire whole of the United States, bridges only connected open water.

In some embodiments, to accomplish this on a per-state basis, both the state's original county shapefile Counties and high-resolution clipped shapefile clean U.S. Counties were differenced to extract water areas only (see FIG. 94: (a)). In some embodiments, resulting difference polygons representing calculated areas 3 square kilometers or less identified states with no external water extent. In this case, no counties were bridged.

In some embodiments, when the difference polygon represented more than 3 square kilometers, however, the difference external-water shapefile was then intersected with the buffered Roads shapefile for that state. In some embodiments, the result effectively identified bridges over water. In some embodiments, having been intersected with the water difference shapefile, the resulting bridge shapefile spatially intersected at least one county. In some embodiments, in the case of a one-county intersection, the addition of the road polygon led to no change, at least in terms of the contiguity relationships amongst counties. In some embodiments, in the case of two or more counties, however, the road addition ensured the contiguously bridging of formerly separate counties. See FIG. 94: (b)

Finally, to complete the operation, in some embodiments, bridges and counties were spatially unioned, meaning that county and bridge polygons sharing the same county identifier, and at least a zero-dimensional point of intersection, were merged. In this way, counties "grew" by extending their polygonal reach across water features via bridges to neighboring counties.

In some embodiments, the system is configured to execute ZCTA Bridging. In some embodiments, the bridge-over-water transformation process implemented for counties was repeated for ZCTAs, but with the additional step of bridging empty land areas. In some embodiments, empty land areas arise due to ZCTAs, in general, not encompassing the entirety of a state. In some embodiments, holes in ZCTA state shapefiles are common in western states with their open and unpopulated expanses, although most states and equivalents contain at least one open hole.

To identify land bridges, in some embodiments, the set of ZCTAs for a state was first dissolved to remove internal boundaries, leaving a full state outline. In some embodiments, ZCTAs that straddled state boundaries were clipped to only include that portion of the ZCTA overlapping with that state. In some embodiments, the full state outline was then differenced with the state-wide original ZCTA shapefile, which identified state-centric holes. In some embodiments, the land holes were then unioned with county-derived external water extents, which together formed the "empty" areal set over which land and water bridges, respectively, could be constructed.

Next, in some embodiments, the bridge-placement empty candidate region set, typically comprised of several different polygons, or "empties," was intersected by the system with the state's buffered road shapefile, preliminarily and effectively identifying "empty bridges" over land and "water bridges" over water. In some embodiments, empty bridges are buffered polygonal road bits that traverse empty polygons that do not correspond to any identifiable ZCTA. In some embodiments, contrary to the county process, empty bridges contain no connecting ZCTA information.

In some embodiments, to resolve ZCTA contiguity, and map empty bridges to a candidate local ZCTA, the point centroid of each empty was first obtained. Next, in some embodiments, a rectangular polygonal bounding box encompassing the state as a whole was constructed. From these, in some embodiments, Voronoi polygons were derived by partitioning the bounding box into polygons anchored by each point centroid. In some embodiments, any point within a Voronoi polygon is closer, in terms of Euclidean distance, to its defining centroid, compared to all others. In some embodiments, while the AEA projection does not generally preserve distance, resulting Voronoi polygons were small enough to mediate any distortion concerns. In some embodiments, each resulting Voronoi polygon effectively "staked a claim" for each empty-bridge candidate.

In some embodiments, to map the resulting identity-less Voronoi polygons to identifiable ZCTAs, the Voronoi polygons were next intersected with the buffered empty bridges. In some embodiments, this system executed operation allows each empty bridge to "extend its reach" into a much larger polygonal area defined by its encompassing Voronoi polygon. Finally, in some embodiments, these extended-reach Voronoi polygons were intersected with the ZCTA shapefile, thereby tying ZCTA labels to the extended-reach Voronoi polygons, any one of which housed exactly one empty bridge. In some embodiments, as each empty bridge was buffered, it necessarily intersects/connects on at least one end with at least one ZCTA polygon, ensuring polygonal overlap. Finally, in some embodiments, each empty bridge was dissolved into a connecting ZCTA, thereby allowing ZCTAs, when necessary, to polygonally extent its reach via bridge empties to now-neighboring ZCTAs.

In some embodiments, following the bridging of all states, resulting modified state ZCTA shapefiles were then unioned and dissolved. In this way, any ZCTA that straddled a state boundary, but was partitioned into state bits, was then merged together again. In some embodiments, this process led to a shapefile polygon count of 33,143 ZCTAs from an initial set of 33,144 ZCTAs. The missing ZCTA, 04570, Squirrel Island, ME, is spatially excluded from the Clean U.S. Counties shapefile for the state of Maine, leading to its exclusion from the analysis. Including it following the bridging algorithm ensures representation of the full original set of 33,144 ZCTAs.

FIG. 94 provides an example of county bridging over the Straits of Mackinac, the body of water separating the lower and upper peninsulas of Michigan and joining Lakes Michigan and Huron according to some embodiments. In some embodiments, traffic moves across the Straits from Mackinac County in the north to Emmet and Cheboygan Counties in the south via a bridge carrying Interstate 75. From a community point-of-view, in some embodiments, it is reasonable to believe that Mackinac County shares resources with its neighbors to the south, and so inducing contiguity between the one north and at least one of the two south counties more readily reflects the transportation of people, good, and services across the waterway.

FIG. 94: (a), pictorially represents the first step of the county bridging algorithm involving the two county shapefiles, along with their difference according to some embodiments. In some embodiments, the purple (dark) counties, labeled as "Clean Counties" for simplicity, reflect the polygons in the Michigan state Clean U.S. Counties shapefile. In some embodiments, the purple external boundary clarifies several Great Lakes, and results from the intersection of the original Counties shapefile with the U.S. Nation shapefile. In some embodiments, the three green (lighter) counties, or "Focus Counties," depict the location of Mackinac, Emmet, and Cheboygan Counties relative to the state as a whole.

The original Counties shapefile, labeled "Political Counties" within FIG. 94: (a), depicts the low-resolution county boundaries in the Counties shapefile. In some embodiments, the Michigan political carving of the Great Lakes is visible, as the gray (lines) outlines extend far from the lakeshore. In some embodiments, the difference between the Political Counties and the purple Clean Counties within the Figure leads to the white areas within the Political Counties. In some embodiments, these areas depict portions of the Great Lakes; i.e., these polygons encompass water. In some embodiments, these water areas form the candidate regions in which county bridges arise.

FIG. 94: (b) depicts the Focus Counties in FIG. 94: (a) in greater detail, adding in cyan the roads originating from the Primary and Secondary Roads shapefile. 'Note that at least one road fails to connect with any others, while at least one appears to terminate randomly according to some embodiments. In some embodiments, this does not definitively mean that the road simply starts and stops, but rather, the road in question has a Primary and Secondary status for only a portion of its extent. In some embodiments, the Straits of Mackinac bridge, highlighted in orange, demonstrates the resulting contiguity induced between the upper and lower peninsulas with its inclusion. In some embodiments, although not explicitly depicted, the southern half of the polygonal extent of the bridge extends the northernmost reach of Cheboygan County, while its northern half extends the southern each of Mackinac County. In some embodiments, both extensions meet in the middle, sharing a linear border of approximately 50 meters in length. Thus, in some embodiments, the county bridging algorithm executed by the system contiguously joined these two counties, as intended, meaning that Mackinac County and Cheboygan counties are now neighbors.

In some embodiments, the ZCTA bridging algorithm follows the county bridging algorithm. In some embodiments, while similar in spirit, the ZCTA bridging algorithm lacks the availability of a differenced set of shapefiles at the ZCTA level to tie water polygons with any crossing bridges. In some embodiments, ZCTAs also suffer from holes, due to ZCTAs not fully partitioning the entirety of the country.

FIG. 95 depicts key aspects of the ZCTA bridging process, starting with FIG. 95: (a), which depicts the many ZCTAs of Michigan along with the possible bridges over both land and water in orange. In some embodiments, ZCTA Bridging. ZCTA bridging first separately identifies water extents and empty extents, or holes within a state lacking assignment to a ZCTA. Voronoi polygons serve to map ZCTA information to neighboring roads, enabling the bridging of both water and empty extents.

FIG. 95: (b) highlights the centroids of each of the bridges in FIG. 95: (a) along with the Voronoi polygons those centroids induce according to some embodiments. In some embodiments, an orange bridge centroid anchors each gray-outlined Voronoi polygon; polygons seemingly lacking a centroid arise from two bridge centroids being close together in feature space, leading to their appearing overlapped in the Figure. Although the scaling of FIG. 95: (b) may make some difficult to see, all polygons contain exactly one centroid.

Finally, FIG. 95: (c) is a close-up of the Straits of Mackinac, in which one bridge centroid highlights its underlying bridge polygon according to some embodiments. In this case, the resulting bridge polygon ends up connecting ZCTAs 49781 and 49701 by combining fully with ZCTA 49781. In some embodiments, the bridge polygon ends up extending the northern ZCTA of 49781 to the south, where it abuts with 49701 along the northern shore of the lower peninsula. In some embodiments, as the new-found contiguity between the two ZCTAs is all that matters, and not the location of the connection, the algorithm worked as expected.

In some embodiments, as pertains to ringing, construction of localized communities followed bridging of counties and ZCTAs. In some embodiments, county shapefiles shepherded the construction of communities defined as sets of polygonal ZC-TAs. In some embodiments, to define ZCTA communities starting with one county, the union of each county and its set of neighboring counties identified a so-called "1-ring." In some embodiments, queen contiguity, meaning that counties need only share one point, defined a county neighbor. In some embodiments, queen contiguity contrasts with rook contiguity, in which neighbors must share at least one 1-dimensional linear boundary for inclusion.

In some embodiments, The set of intersecting ZCTAs with a county's 1-ring defined that county's community. In some embodiments, similar to counties, queen contiguity identified ZCTAs for inclusion. In some embodiments, in the case that ZCTAs resulting from a county 1-ring numbered less than 100, a second ring surrounded the first to create a "2-ring." In some embodiments, counties grew up to a 3-ring to collect at least 100 distinct ZCTAs, at which point ring-growth stopped, regardless of the final number of ZCTAs. In some embodiments, bridged counties ensured that counties separated by water, but which could be bridged, could contribute to ring growth. In some embodiments, all counties were grown in this way to create 3,311 necessarily overlapping 1-rings (or possibly greater) consisting of at least 100 ZC-TAs. In some embodiments, ZCTAs could contribute to multiple county communities, depending on anchoring county. In some embodiments, the county bridging process guaranteed consideration of bridged counties. In some embodiments, following introduction via a county ring, the ZCTA bridging process executed by the system did the same for bridged ZCTAs.

In some embodiments, following the county community building, spatial weight matrices $W_k$ of size N×N summarized spatial relationships between the N resulting constituent ZCTAs in the $k^{th}$ community. Each of the 3,311 induced communities led to a distinct spatial weight matrix $W_k$. ZCTA spatial contiguity utilized bridged ZCTAs, so that ZCTAs separated by water or empty land, but for which a primary or secondary road served as a connection, were considered contiguous. In some embodiments, entry $\omega_{ij}$ in $W_k$ for the $i^{th}$ row and $j^{th}$ column in $W_k$ described the contiguity relationship between ZCTAs i and j for community k. In some embodiments, there is no ambiguity regarding the spatial weight matrix of interest, so $\omega_{ij}$ or W in lieu of $\omega_{ijk}$ or $W_k$, respectively, is understood and preferred.

In some embodiments, in the case two ZCTAs share no common points, $\omega_{ij}=0$. However, if two ZCTAs i and j did share at least one point via queen contiguity, $\omega_{ij}=1/N_i$, with $N_i$ the total number of ZCTA neighbors of ZCTA i. Thus, ZCTAs with a fewer number of neighbors weighted each pairwise relationship more than the pairwise connections of a ZCTA with many neighbors. Diagonal entries $\omega_{ii}$ describing the relationship of a ZCTA to itself were always zero, so that no ZCTA i was ever self-contiguous. In the case that a ZCTA i had no neighbors, it was excluded. These island ZCTAs occurred due to the lack of a bridging primary or secondary road to connect it with other ZCTAs.

Note that weight matrices W were typically sparse, in that most entries contained zeros. This means that in a given community, most ZCTAs do not share a point boundary with most other community ZCTAs.

Figure 96:
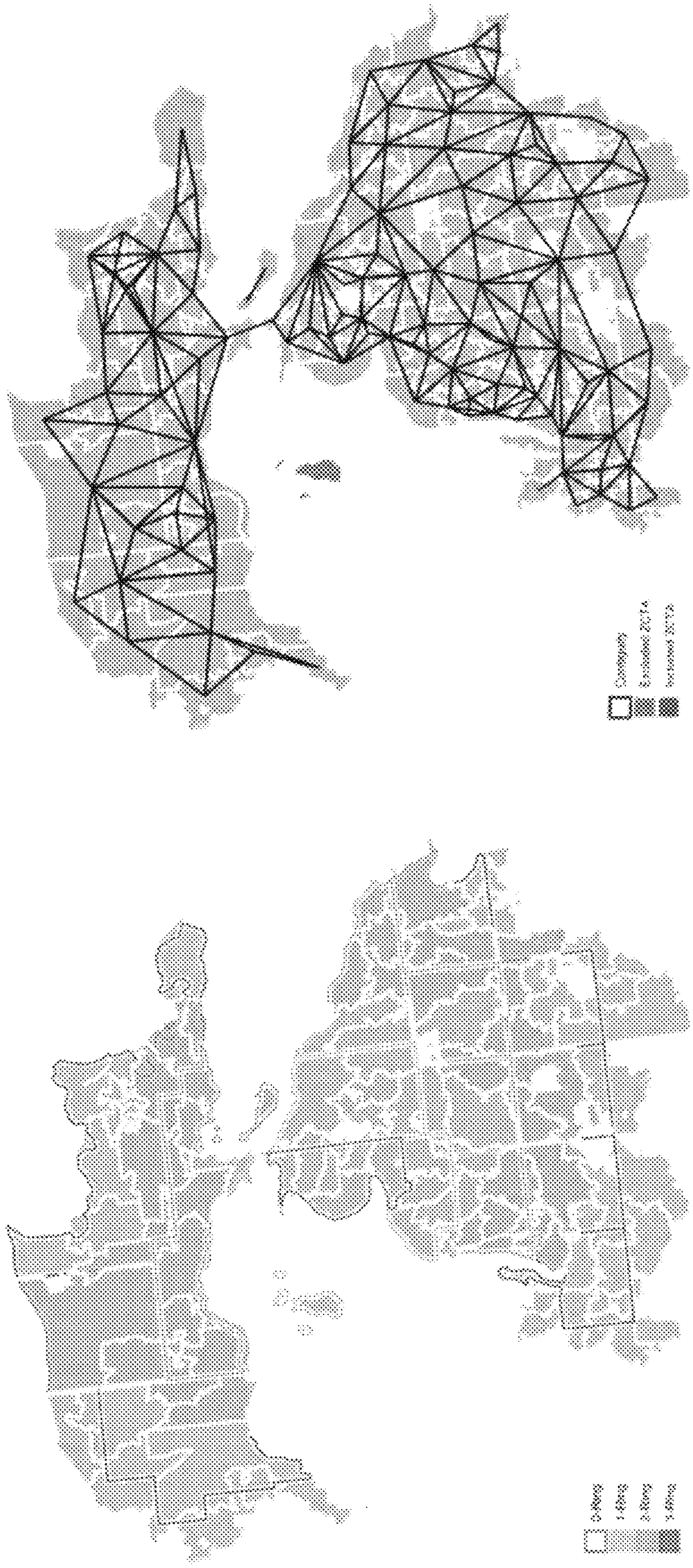

FIG. 96 applies ringing to the three bridged Michigan counties of Mackinac, Emmet, and Cheboygan. Each county served as its own 0-ring, or basis county, around which a 1-ring of surrounding rings added. FIG. 117 shows Table 1 which tabulates the number of distinct ZCTAs added with each new added ring, based on queen contiguity. In some embodiments, table 1 makes clear that a 1-ring, or inclusion of all counties surrounding the county in question, was insufficient to incorporate at least 100 ZCTAs into its resulting community. In some embodiments, a second ring was added to form 2-rings. In some embodiments, Emmet County required a third ring, leading to a 3-ring incorporating 117 ZCTAs, while Cheboygan and Mackinac Counties stopped at 2-rings, encompassing 107 and 102 ZCTAs, respectively. In some embodiments, each community shares ZCTAs, although each also has at least one ZCTA unique to it. In some embodiments, communities created for other not-included neighboring counties, or 0-rings, also use several of the same ZCTAs. The duplicitous use of ZCTAs proves useful in analysis.

Figure 98:
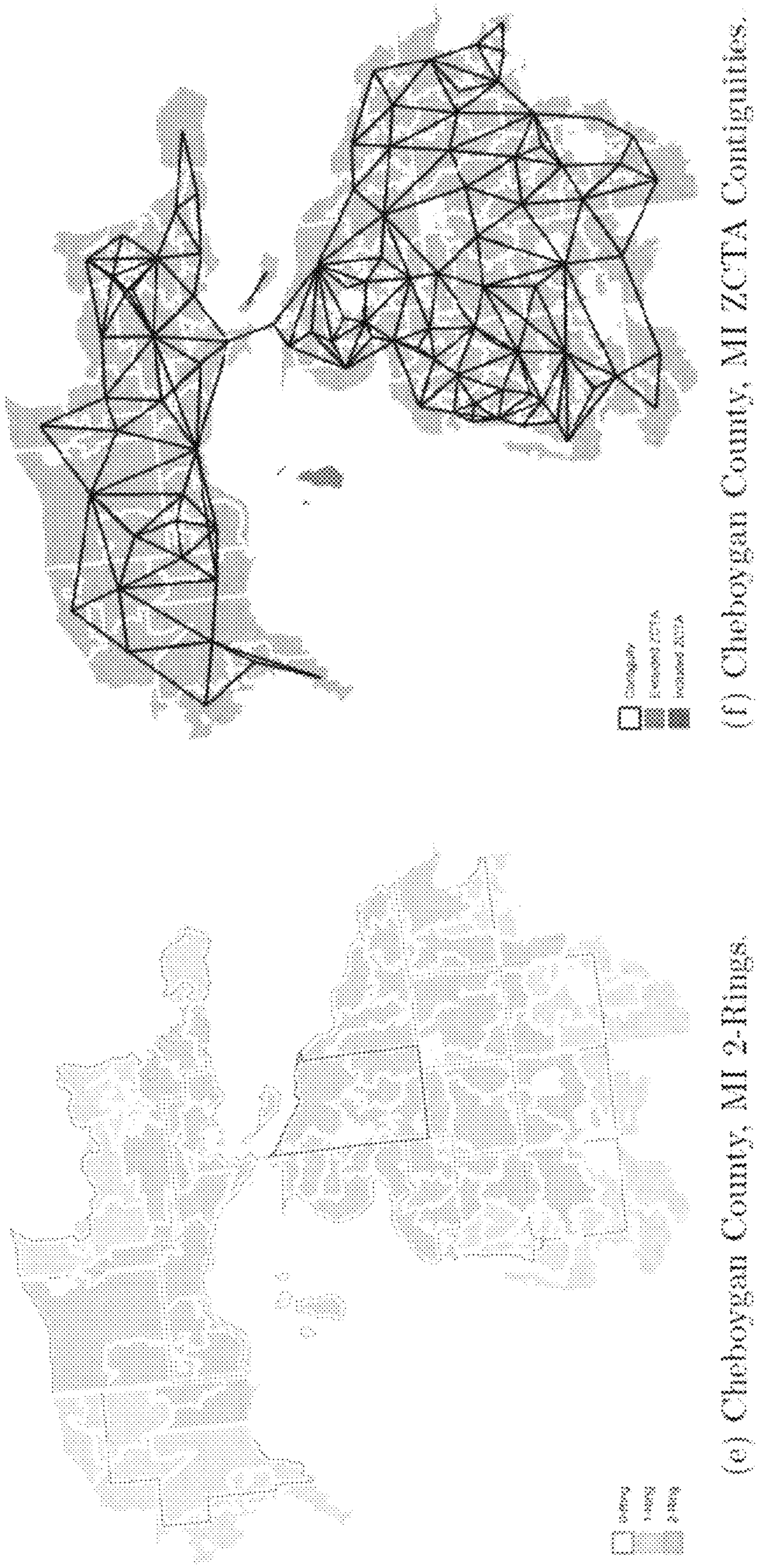

FIGS. 96-98 depict the results of the ringing process for each of the three counties according to some embodiments. In some embodiments, the left column of subfigures clarifies the ZCTA additions following each subsequent county ring to the identified base county 0-ring, while the right column highlights the contiguity relationships between pairs of ZCTAs. In some embodiments, each row details a particular county. In some embodiments, the growth of rings along the subfigures in the left column demonstrates county bridging, in that ring growth "jumped" the Straits of Mackinac, depending on the location of the initial 0-ring county. In some embodiments, the presence of a black contiguity line across the Straits in each subfigure in the right column shows the same for ZCTA bridging.

In some embodiments, the right-column set of subfigures also highlights, in orange, Beaver Island 49782 in Lake Michigan. In some embodiments, beaver Island is a part of Charlevoix County, a member of the 1-ring set of counties for Emmet and Cheboygan Counties, and the 2-ring set for Mackinac County. In some embodiments, Beaver Island would typically be included in the 2- and 3-rings constructed here. In some embodiments, since ZCTA 49782 lacks any defined contiguous neighbors, its row in the three resulting spatial weight matrices W considered here would contain all zeros. Thus, 49782 was excluded for all spatial weight matrices W for which Charlevoix County contributed ZCTAs.

FIGS. 96-98 show ringing for Emmet, Mackinac, and Cheboygan Counties, Michigan. In some embodiments, left plots (a), (c), and (e) depict the system results of constructing 3-, 2-, and 1-rings for each of Emmet, Mackinac, and Cheboygan Counties, respectively. In some embodiments, each County, or "0-ring" outlined in orange. In some embodiments, bolder lines demarcate counties, while lighter lines do the same for ZCTAs. In some embodiments, queen contiguity ensures ZCTA inclusion, thus leading to "ZCTA-spilling" across outermost county boundaries. In some embodiments, emmet county contained less than 100 ZCTAs with the inclusion of all 2-ring counties, and thus required a third ring. In some embodiments, similar logic applied to Mackinac and Cheboygan Counties, necessitating a second ring to supplement the first. In some embodiments, the inclusion of lower peninsula counties with upper-peninsula Mackinac County, and vice versa with Emmet and Cheboygan Counties, clarifies county bridging across the two peninsulas. In some embodiments, right plots (b), (d), and (f) show contiguities, given the required number of rings, among purple ZCTAs. In some embodiments, black lines identify contiguous ZCTAs, while white holes depict land empties. In some embodiments, the black line connecting the upper and lower peninsulas demonstrates cross-peninsula ZCTA bridging. In some embodiments, the orange island group, or Beaver Island and vicinity, ZCTA 49782, in Lake Michigan, lacked contiguous neighbors, and was thus excluded.

FIGS. 104-111 depict a table with various non-limiting process steps according to some embodiments. FIGS. 112-115 show a table with various non-limiting process steps for a water solution subprocess according to some embodiments. FIG. 116 shows ZCTA tabulation counts according to some embodiments.

The subject matter described herein are directed to technological improvements to the field of risk determination by identifying areas of high risk at a greater resolution than prior art systems. The disclosure describes the specifics of how a machine including one or more computers comprising one or more processors and one or more non-transitory computer readable media implement the system and its improvements over the prior art. The instructions executed by the machine cannot be performed in the human mind or derived by a human using a pen and paper but require the machine to convert process input data to useful output data. Moreover, the claims presented herein do not attempt to tie-up a judicial exception with known conventional steps implemented by a general-purpose computer; nor do they attempt to tie-up a judicial exception by simply linking it to a technological field. Indeed, the systems and methods described herein were unknown and/or not present in the public domain at the time of filing, and they provide technologic improvements advantages not known in the prior art. Furthermore, the system includes unconventional steps that confine the claim to a useful application.

It is understood that the system is not limited in its application to the details of construction and the arrangement of components set forth in the previous description or illustrated in the drawings. The system and methods disclosed herein fall within the scope of numerous embodiments. The previous discussion is presented to enable a person skilled in the art to make and use embodiments of the system. Any portion of the structures and/or principles included in some embodiments can be applied to any and/or all embodiments: it is understood that features from some embodiments presented herein are combinable with other features according to some other embodiments. Thus, some embodiments of the system are not intended to be limited to what is illustrated but are to be accorded the widest scope consistent with all principles and features disclosed herein.

Some embodiments of the system are presented with specific values and/or setpoints. These values and setpoints are not intended to be limiting and are merely examples of a higher configuration versus a lower configuration and are intended as an aid for those of ordinary skill to make and use the system.

Any text in the drawings is part of the system's disclosure and is understood to be readily incorporable into any description of the metes and bounds of the system. Any functional language in the drawings is a reference to the system being configured to perform the recited function, and structures shown or described in the drawings are to be considered as the system comprising the structures recited therein. Any figure depicting a graphical user interface is a disclosure of the system configured to display the contents of the graphical user interface. It is understood that defining the metes and bounds of the system using a description of images in the drawing does not need a corresponding text description in the written specification to fall with the scope of the disclosure.

Furthermore, acting as Applicant's own lexicographer, Applicant imparts the explicit meaning and/or disavow of claim scope to the following terms:

Applicant defines any use of "and/or" such as, for example, "A and/or B," or "at least one of A and/or B" to mean element A alone, element B alone, or elements A and B together. In addition, a recitation of "at least one of A, B, and C," a recitation of "at least one of A, B, or C," or a recitation of "at least one of A, B, or C or any combination thereof" are each defined to mean element A alone, element B alone, element C alone, or any combination of elements A, B and C, such as AB, AC, BC, or ABC, for example.

"Substantially" and "approximately" when used in conjunction with a value encompass a difference of 5% or less of the same unit and/or scale of that being measured.

"Simultaneously" as used herein includes lag and/or latency times associated with a conventional and/or proprietary computer, such as processors and/or networks described herein attempting to process multiple types of data at the same time. "Simultaneously" also includes the time it takes for digital signals to transfer from one physical location to another, be it over a wireless and/or wired network, and/or within processor circuitry.

As used herein, "can" or "may" or derivations there of (e.g., the system display can show X) are used for descriptive purposes only and is understood to be synonymous and/or interchangeable with "configured to" (e.g., the computer is configured to execute instructions X) when defining the metes and bounds of the system. The phrase "configured to" also denotes the step of configuring a structure or computer to execute a function in some embodiments.

In addition, the term "configured to" means that the limitations recited in the specification and/or the claims must be arranged in such a way to perform the recited function: "configured to" excludes structures in the art that are "capable of" being modified to perform the recited function but the disclosures associated with the art have no explicit teachings to do so. For example, a recitation of a "container configured to receive a fluid from structure X at an upper portion and deliver fluid from a lower portion to structure Y" is limited to systems where structure X, structure Y, and the container are all disclosed as arranged to perform the recited function. The recitation "configured to" excludes elements that may be "capable of" performing the recited function simply by virtue of their construction but associated disclosures (or lack thereof) provide no teachings to make such a modification to meet the functional limitations between all structures recited. Another example is "a computer system configured to or programmed to execute a series of instructions X, Y, and Z." In this example, the instructions must be present on a non-transitory computer readable medium such that the computer system is "configured to" and/or "programmed to" execute the recited instructions: "configure to" and/or "programmed to" excludes art teaching computer systems with non-transitory computer readable media merely "capable of" having the recited instructions stored thereon but have no teachings of the instructions X, Y, and Z programmed and stored thereon. The recitation "configured to" can also be interpreted as synonymous with operatively connected when used in conjunction with physical structures.

It is understood that the phraseology and terminology used herein is for description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The previous detailed description is to be read with reference to the figures, in which like elements in different figures have like reference numerals. The figures, which are not necessarily to scale, depict some embodiments and are not intended to limit the scope of embodiments of the system.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g. a cloud of computing resources.

The embodiments of the invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations are presented in a specific order according to some embodiments, the execution of those steps do not necessarily occur in the order listed unless explicitly specified. Also, other housekeeping operations can be performed in between operations, operations can be adjusted so that they occur at slightly different times, and/or operations can be distributed in a system which allows the occurrence of the processing operations at various intervals associated with the processing, as long as the processing of the overlay operations are performed in the desired way and result in the desired system output.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

We claim:

1. A system for improving mapping accuracy for a distribution of a vulnerability index comprising:

one or more computers comprising one or more processors and one or more non-transitory computer readable media, the one or more non-transitory computer readable media including program instructions stored thereon that when executed cause the one or more computers to:

receive, by the one or more processors, mapping data from one or more databases, the mapping data comprising one or more tracts;

receive, by the one or more processors, population data from the one or more databases;

receive, by the one or more processors, domain data from the one or more databases;

execute, by the one or more processors, an imputation algorithm configured to combine the population data and the domain data into index data;

generate, by the one or more processors, an index map comprising the index data;

identify, by the one or more processors, one or more tracts within the index map comprising missing data;

identify, by the one or more processors, one or more candidate tracts with non-missing data closest to the one or more tracts with the missing data;

execute, by the one or more processors, a missing data assignment of at least a portion of the non-missing data from the one or more candidate tracts to the one or more tracts with the missing data to create a modified index map; and display, by the one or more processors, the modified index map on a graphical user interface.

2. The system of claim 1, wherein each of the one or more tracts includes polygonal boundaries defining a geographical area.

3. The system of claim 2, wherein the imputation algorithm comprises program steps that cause the one or more computers to:

execute, by the one or more processors, an attempted assignment of at least a portion of the population data to each of the one or more tracts with the missing data; and execute, by the one or more processors, an attempted assignment of at least a portion of the domain data to each of the one or more tracts with the missing data.

4. The system of claim 1, wherein the missing data includes the population data and/or the domain data.

5. The system of claim 1, wherein the imputation algorithm comprises program steps that cause the one or more computers to:

execute, by the one or more processors, an assignment of at least a portion of the population data and/or of at least a portion of the domain data from the one or more candidate tracts to the one or more tracts with the missing data.

6. The system of claim 5, wherein the system is configured to execute shapefiles configured to simplify three-dimensional curvilinear polygonal extents on Earth's spherical surface via two-dimensional planar polygonal extents.

7. The system of claim 5, wherein the domain data comprises one or more variables; and wherein the system is configured to execute the missing data assignment for each of the one or more variables.

8. The system of claim 5, wherein the imputation algorithm comprises program steps that cause the one or more computers to:

determine, by the one or more processors, a centroid for each of the one or more tracts; and convert, by the one or more processors, each centroid for the one or more tracts with the missing data to latitudinal and longitudinal coordinates.

9. The system of claim 8, wherein the imputation algorithm comprises program steps that cause the one or more computers to:

define, by the one or more processors, a custom azimuthal equidistant projection for each centroid.

10. The system of claim 9, wherein the imputation algorithm comprises program steps that cause the one or more computers to:

generate, by the one or more processors, at least one buffer encompassing at least one of each centroid.

11. The system of claim 5, wherein the system is configured to execute one or more of a bridging algorithm, a ferrying algorithm, and a ringing algorithm.

12. The system of claim 11, wherein the bridging algorithm is configured to ensured connectivity over one or more of a population void over water and a population void over land by identifying bridges.

13. The system of claim 11, wherein the ferrying algorithm is configured to ensured connectivity over one or more of a population void over water and a population void over land by identifying ferry routes.

14. The system of claim 11, wherein the ringing algorithm is configured to identify one or more neighboring tracts at a predetermined distance from a centroid of a tract.

* * * * *